US009520015B2

(12) United States Patent
Colvin et al.

(10) Patent No.: US 9,520,015 B2
(45) Date of Patent: Dec. 13, 2016

(54) SYSTEMS AND METHODS FOR PLAYING A GAME OF CHANCE WITH BONUS FEATURE

(71) Applicant: Gaming Arts LLC, Las Vegas, NV (US)

(72) Inventors: David Colvin, Las Vegas, NV (US); Eric D. Colvin, Las Vegas, NV (US)

(73) Assignee: GAMING ARTS LLC, Las Vegas, NV (US)

( * ) Notice: Subject to any disclaimer, the term of this patent is extended or adjusted under 35 U.S.C. 154(b) by 0 days.

(21) Appl. No.: 13/788,076

(22) Filed: Mar. 7, 2013

(65) Prior Publication Data

US 2014/0073402 A1 Mar. 13, 2014

Related U.S. Application Data

(60) Provisional application No. 61/698,963, filed on Sep. 10, 2012.

(51) Int. Cl.

*G06F 19/00* (2011.01)
*G07F 17/32* (2006.01)
*A63F 3/06* (2006.01)

(52) U.S. Cl.

CPC ......... *G07F 17/3209* (2013.01); *A63F 3/0645* (2013.01); *G07F 17/326* (2013.01); (Continued)

(58) Field of Classification Search

USPC ...................................................... 463/18, 19
See application file for complete search history.

(56) References Cited

U.S. PATENT DOCUMENTS 4,378,940 A 4/1983 Gluz
4,475,157 A 10/1984 Bolan
(Continued)

FOREIGN PATENT DOCUMENTS

EP 1377349 A1 1/2004
EP 1418994 A1 5/2004
(Continued)

OTHER PUBLICATIONS

Video King Pick 'N Play product webpage, available at http://www.videokingnetwork.com/product.asp?id=78, visited Jan. 13, 2013.
(Continued)

*Primary Examiner* — Lawrence Galka
(74) *Attorney, Agent, or Firm* — Howard & Howard Attorneys PLLC

(57) ABSTRACT

Systems and methods enable one or more players to play a game of chance. A system includes a processor and a memory device configured to store processor executable instructions to provide a game of chance in which a plurality of house indicia is selected from a pool of house indicia and in which one or more player indicia is provided. The processor is programmed by the instructions to randomly select a predetermined number of house indicia from the pool of house indicia, provide a random chance of selecting a bonus indicia, determine whether a winning number of matching indicia has been achieved by identifying each player indicia that matches one of the selected predetermined number of house indicia, and present a bonus to the player upon a determination that the bonus indicia matches a player indicia and that a winning number of matching indicia has been achieved.

37 Claims, 145 Drawing Sheets

(52) U.S. Cl.
CPC ........ *G07F 17/329* (2013.01); *G07F 17/3244* (2013.01); *G07F 17/3262* (2013.01); *G07F 17/3267* (2013.01); *G07F 17/3286* (2013.01)

(56) References Cited

U.S. PATENT DOCUMENTS

| | | | | |
|---|---|---|---|---|
| 4,651,995 | A | 3/1987 | Henkel | |
| 4,661,906 | A | 4/1987 | DiFrancesco | |
| 4,768,151 | A | 8/1988 | Birenbaum | |
| 5,718,631 | A | 2/1998 | Invencion | |
| 5,813,911 | A | 9/1998 | Margolin | |
| 5,967,895 | A | 10/1999 | Kellen | |
| 6,048,269 | A | 4/2000 | Burns | |
| 6,398,645 | B1 | 6/2002 | Yoseloff | |
| 6,398,646 | B1 | 6/2002 | Wei | |
| 6,645,072 | B1 | 11/2003 | Kellen | |
| 6,645,077 | B2 | 11/2003 | Rowe | |
| 6,656,045 | B2 | 12/2003 | Wei | |
| 6,729,957 | B2 | 5/2004 | Burns | |
| 6,776,715 | B2 | 8/2004 | Price | |
| 6,852,031 | B1 | 2/2005 | Rowe | |
| 7,118,477 | B1 | 10/2006 | Kellen | |
| 7,258,608 | B2 * | 8/2007 | Khal | 463/18 |
| 7,335,106 | B2 | 2/2008 | Johnson | |
| 7,357,715 | B2 | 4/2008 | Kane | |
| 7,438,640 | B2 | 10/2008 | Amour | |
| 7,470,186 | B2 * | 12/2008 | Cannon | 463/18 |
| 7,537,521 | B2 | 5/2009 | Amour | |
| 7,614,948 | B2 | 11/2009 | Saffari | |
| 7,749,067 | B2 | 7/2010 | Frain | |
| 7,815,502 | B2 | 10/2010 | Hardy | |
| 7,824,257 | B2 * | 11/2010 | Jubinville et al. | 463/17 |
| 7,850,518 | B2 * | 12/2010 | Walker et al. | 463/17 |
| 7,862,427 | B2 | 1/2011 | Nguyen | |
| 7,874,907 | B2 | 1/2011 | Lozano | |
| 7,887,420 | B2 | 2/2011 | Nguyen | |
| 7,892,085 | B2 | 2/2011 | Harris | |
| 7,946,915 | B2 | 5/2011 | Cannon | |
| 7,951,004 | B2 | 5/2011 | Saffari | |
| 7,959,509 | B2 * | 6/2011 | Saffari et al. | 463/27 |
| 7,980,942 | B2 | 7/2011 | Kane | |
| 7,980,943 | B2 | 7/2011 | McGlone | |
| 7,985,130 | B2 * | 7/2011 | Lind et al. | 463/19 |
| 8,021,230 | B2 | 9/2011 | Baerlocher et al. | |
| 8,025,561 | B2 | 9/2011 | Reddicks et al. | |
| 8,070,579 | B2 | 12/2011 | Bienvenue | |
| 8,109,828 | B2 | 2/2012 | Kane | |
| 8,201,827 | B2 | 6/2012 | Weingardt | |
| 2002/0137217 | A1 | 9/2002 | Rowe | |
| 2002/0177478 | A1 | 11/2002 | Glasson et al. | |
| 2003/0040354 | A1 | 2/2003 | Itkis | |
| 2003/0045341 | A1 | 3/2003 | Itkis | |
| 2003/0045342 | A1 | 3/2003 | Miller | |
| 2003/0144050 | A1 | 7/2003 | Keaton | |
| 2003/0148808 | A1 | 8/2003 | Price | |
| 2004/0048671 | A1 | 3/2004 | Rowe | |
| 2004/0173965 | A1 | 9/2004 | Stanek | |
| 2004/0178579 | A1 | 9/2004 | Lowell | |
| 2004/0251628 | A1 | 12/2004 | Kilby | |
| 2004/0266509 | A1 | 12/2004 | Benett | |
| 2005/0059468 | A1 * | 3/2005 | Cannon | 463/19 |
| 2005/0064932 | A1 | 3/2005 | Cannon | |
| 2006/0027965 | A1 | 2/2006 | Kane | |
| 2006/0046819 | A1 | 3/2006 | Nguyen | |
| 2006/0052160 | A1 | 3/2006 | Saffari et al. | |
| 2006/0073888 | A1 | 4/2006 | Nguyen et al. | |
| 2006/0128457 | A1 | 6/2006 | Cannon | |
| 2006/0151944 | A1 * | 7/2006 | Jubinville et al. | 273/138.1 |
| 2006/0160603 | A1 | 7/2006 | Lulek | |
| 2006/0160620 | A1 | 7/2006 | Matthews | |
| 2006/0178196 | A1 * | 8/2006 | Thomas | 463/18 |
| 2006/0189382 | A1 | 8/2006 | Muir et al. | |
| 2007/0060288 | A1 | 3/2007 | Willyard | |
| 2007/0060361 | A1 | 3/2007 | Nguyen | |
| 2007/0093285 | A1 | 4/2007 | Lee | |
| 2007/0155471 | A1 | 7/2007 | Powell | |
| 2007/0161423 | A1 | 7/2007 | Bienevenue | |
| 2007/0173313 | A1 | 7/2007 | Bienvenue | |
| 2007/0281773 | A1 | 12/2007 | Sprinkle | |
| 2007/0287533 | A1 | 12/2007 | Amour | |
| 2007/0293305 | A1 | 12/2007 | Amour | |
| 2008/0026813 | A1 * | 1/2008 | Cannon | 463/18 |
| 2008/0070670 | A1 | 3/2008 | Brunelle et al. | |
| 2008/0102946 | A1 | 5/2008 | Amour | |
| 2008/0176627 | A1 | 7/2008 | Lardie | |
| 2008/0220845 | A1 | 9/2008 | Kane | |
| 2008/0248865 | A1 | 10/2008 | Tedesco | |
| 2009/0098934 | A1 | 4/2009 | Amour | |
| 2009/0197663 | A1 * | 8/2009 | Schultz | 463/18 |
| 2009/0197664 | A1 * | 8/2009 | Schultz | 463/18 |
| 2009/0197684 | A1 | 8/2009 | Arezina et al. | |
| 2009/0318231 | A1 | 12/2009 | Lange | |
| 2010/0016068 | A1 | 1/2010 | White et al. | |
| 2010/0197385 | A1 * | 8/2010 | Aoki et al. | 463/27 |
| 2010/0267444 | A1 | 10/2010 | Walker et al. | |
| 2010/0304847 | A1 * | 12/2010 | Bramble | 463/25 |
| 2011/0028201 | A1 | 2/2011 | Warner | |
| 2011/0045889 | A1 | 2/2011 | Khal | |
| 2011/0045890 | A1 | 2/2011 | Khal | |
| 2011/0105218 | A1 | 5/2011 | Anderson | |
| 2011/0105234 | A1 | 5/2011 | Nguyen | |
| 2011/0143832 | A1 | 6/2011 | Walker et al. | |
| 2011/0263325 | A1 | 10/2011 | Atkinson | |
| 2011/0275430 | A1 | 11/2011 | Walker et al. | |
| 2012/0040733 | A1 | 2/2012 | Bienevenue | |
| 2012/0122539 | A1 | 5/2012 | Khal | |
| 2012/0172105 | A1 | 7/2012 | Huynh et al. | |
| 2012/0172111 | A1 * | 7/2012 | Parham et al. | 463/22 |
| 2012/0238342 | A1 | 9/2012 | Amour | |
| 2012/0246034 | A1 | 9/2012 | Kolios | |
| 2012/0258793 | A1 | 10/2012 | LeBaron | |
| 2012/0270631 | A1 | 10/2012 | Graves | |
| 2013/0123018 | A1 | 5/2013 | Sareli et al. | |

FOREIGN PATENT DOCUMENTS

| | | | |
|---|---|---|---|
| EP | 1969570 | A2 | 9/2008 |
| EP | 1965875 | A4 | 8/2009 |
| WO | 2005/029425 | A1 | 3/2005 |

OTHER PUBLICATIONS

Non-Final Office Action dated Jun. 25, 2013 for U.S. Appl. No. 13/788,045, filed Mar. 7, 2013 (inventors David Colvin et al.).

U.S. Appl. No. 13/788,013, filed Mar. 7, 2013 (inventors David Colvin et al.).

U.S. Appl. No. 13/788,018, filed Mar. 7, 2013 (inventors David Colvin et al.).

U.S. Appl. No. 13/788,026, filed Mar. 7, 2013 (inventors David Colvin et al.).

U.S. Appl. No. 13/788,038, filed Mar. 7, 2013 (inventors David Colvin et al.).

U.S. Appl. No. 13/788,045, filed Mar. 7, 2013 (inventors David Colvin et al.).

U.S. Appl. No. 13/788,050, filed Mar. 7, 2013 (inventors David Colvin et al.).

U.S. Appl. No. 13/788,055, filed Mar. 7, 2013 (inventors David Colvin et al.).

U.S. Appl. No. 13/788,061, filed Mar. 7, 2013 (inventors David Colvin et al.).

U.S. Appl. No. 13/788,065, filed Mar. 7, 2013 (inventors David Colvin et al.).

U.S. Appl. No. 13/788,070, filed Mar. 7, 2013 (inventors David Colvin et al.).

Non-Final Office Action dated Dec. 6, 2013 for U.S. Appl. No. 13/788,070, filed Mar. 7, 2013 (inventors David Colvin et al.).

International Search Report and Written Opinion dated Dec. 31, 2013 for International Application No. PCT/US2013/058953 filed Sep. 10, 2013 (inventors David Colvin et al.).

Non-Final Office Action dated Feb. 27, 2014 for U.S. Appl. No. 13/788,026, filed Mar. 7, 2013 (inventors David Colvin et al.).

(56) References Cited

OTHER PUBLICATIONS

Non-Final Office Action dated Jul. 3, 2014 for U.S. Appl. No. 13/788,013, filed Mar. 7, 2013 (inventors David Colvin et al.).
Non-Final Office Action dated Jul. 3, 2014 for U.S. Appl. No. 13/788,018, filed Mar. 7, 2013 (inventors David Colvin et al.).
Non-Final Office Action dated Jul. 3, 2014 for U.S. Appl. No. 13/788,038, filed Mar. 7, 2013 (inventors David Colvin et al.).
Non-Final Office Action dated Jul. 3, 2014 for U.S. Appl. No. 13/788,050, filed Mar. 7, 2013 (inventors David Colvin et al.).
Non-Final Office Action dated Jul. 3, 2014 for U.S. Appl. No. 13/788,055, filed Mar. 7, 2013 (inventors David Colvin et al.).
Non-Final Office Action dated Jul. 3, 2014 for U.S. Appl. No. 13/788,061, filed Mar. 7, 2013 (inventors David Colvin et al.).
Non-Final Office Action dated Jul. 24, 2014 for U.S. Appl. No. 13/788,065, filed Mar. 7, 2013 (inventors David Colvin et al.).
Non-Final Office Action dated Aug. 29, 2014 for U.S. Appl. No. 13/788,070, filed Mar. 7, 2013 (inventors David Colvin et al.).
Final Office Action dated Nov. 3, 2014 for U.S. Appl. No. 13/788,026, filed Mar. 7, 2013 (inventors David Colvin et al.).
Patent Examination Report No. 1 (AU 2015201204); Date of Issue: Feb. 22, 2016.
European Search Report (EP 15 16 3389); Date of Completion: Jul. 17, 2015.
European Search Report (EP 13 83 4962); Date of Completion: Apr. 4, 2016.
High Five Bingo, "5 Types of Bingo Game" published on or before Mar. 3, 2010, printed from URL <http://web.archive.org/web/20100323032754/ http://www.high5bingo.com/5-types-of-bingo.html>, 3 pages.
Mecca Bingo published on or before Feb. 28, 2009, printed from URL <http://web.archive.org/web/20090228085104 /http://high5bingo.com/mecca-bingo.html>, 3 pages.

* cited by examiner

FIG. 15
1500
1501
CREDIT
185
BET
WIN
0
PAID
0
B I N G O
NUMBER OF
BALL CALLS
0
25¢
SEE PAYS
CARDS
MAX
GAME
PLAY
802
1504
806
808
1502
1506
1508
1510
1512
1514
1516
1518
1520
1522

3900

3904 3902

| Ball Calls | Payout |
|---|---|
| 49 or fewer | 20,000 |
| 50 exactly | 10,000 |
| 51 exactly | 5,000 |
| 52 exactly | 2,500 |
| 53 exactly | 2,000 |
| 54 exactly | 1,000 |
| 55 exactly | 500 |
| 56 exactly | 500 |

FIG. 39

4000

4004 4002

| Ball Calls | Payout |
|---|---|
| 17 or fewer | 10,000 |
| 18 exactly | 5,000 |
| 19 exactly | 5,000 |
| 20 exactly | 1,199 |
| 21 exactly | 1,199 |
| 22 exactly | 1,199 |
| 23 exactly | 1,199 |
| 24 exactly | 1,199 |
| 25 exactly | 599 |
| 26 exactly | 200 |
| 27 exactly | 100 |

FIG. 40

4100

Pay Tables for 3x3 Cards

Single Bingo (any line)

*Pay Table*

| Ball Calls | Probability | 1 credit | 2 credits | 3 credits | 4 credits | 5 credits |
|---|---|---|---|---|---|---|
| 2 | 0.00919540 | 19 | 38 | 57 | 76 | 100 |
| 3 | 0.01937603 | 8 | 16 | 24 | 32 | 40 |
| 4 | 0.02988506 | 3 | 6 | 9 | 12 | 15 |
| 5-6 | 0.08968380 | 2 | 4 | 6 | 8 | 10 |
| 7-8 | 0.12218933 | 1 | 2 | 3 | 4 | 5 |

*Cash Ball Distribution*

| Number of Cash Balls | Count | Probability |
|---|---|---|
| 0 | 4 | 0.04819277 |
| 1 | 4 | 0.04819277 |
| 2 | 4 | 0.04819277 |
| 3 | 4 | 0.04819277 |
| 4 | 67 | 0.80722892 |
| Total | 83 | |

*Probability of Multiplied Win*

| Ball Calls | Any Win | 1x | 2x | 4x | 8x | 10x |
|---|---|---|---|---|---|---|
| 2 | 9.1954E-03 | 7.1452E-03 | 1.9438E-03 | 1.0646E-04 | 0.0000E+00 | 0.0000E+00 |
| 3 | 1.9376E-02 | 1.4962E-02 | 4.1681E-03 | 2.4475E-04 | 7.9524E-07 | 0.0000E+00 |
| 4 | 2.9885E-02 | 2.2953E-02 | 6.5240E-03 | 4.0576E-04 | 2.4612E-06 | 3.2245E-09 |
| 5-6 | 8.9684E-02 | 6.8380E-02 | 1.9955E-02 | 1.3356E-03 | 1.3132E-05 | 3.7404E-08 |
| 7-8 | 1.2219E-01 | 9.2407E-02 | 2.7749E-02 | 2.0052E-03 | 2.7849E-05 | 1.1656E-07 |
| Frequency | 3.70 | 4.86 | 16.57 | 244.04 | 22,605.4 | 6,361,879 |

Return Percentage: 90.85% (1 - 4 credits), 92.00% (5 credits)

FIG. 41

4200

Pay Tables for 3x3 Cards

Double Bingo (any 2 lines)

*Pay Table*

| Ball Calls | Probability | 1 credit | 2 credits | 3 credits | 4 credits | 5 credits |
|---|---|---|---|---|---|---|
| 4 | 0.00065681 | 100 | 200 | 300 | 400 | 600 |
| 5 | 0.00245884 | 40 | 80 | 120 | 160 | 200 |
| 6 | 0.00571260 | 20 | 40 | 60 | 80 | 100 |
| 7 | 0.01054103 | 5 | 10 | 15 | 20 | 25 |
| 8 | 0.01689207 | 4 | 8 | 12 | 16 | 20 |
| 9-10 | 0.05774549 | 3 | 6 | 9 | 12 | 15 |
| 11-13 | 0.15399773 | 1 | 2 | 3 | 4 | 5 |

*Cash Ball Distribution*

| Number of Cash Balls | Count | Probability |
|---|---|---|
| 0 | 30 | 0.25210084 |
| 1 | 29 | 0.24369748 |
| 2 | 30 | 0.25210084 |
| 3 | 15 | 0.12605042 |
| 4 | 15 | 0.12605042 |
| Total | 119 | |

*Probability of Multiplied Win*

| Ball Calls | Any Win | 1x | 2x | 4x | 8x | 10x |
|---|---|---|---|---|---|---|
| 4 | 6.5681E-04 | 5.2620E-04 | 1.1886E-04 | 1.1356E-05 | 3.9576E-07 | 3.0210E-09 |
| 5 | 2.4588E-03 | 1.9665E-03 | 4.4744E-04 | 4.3304E-05 | 1.5490E-06 | 1.2756E-08 |
| 6 | 5.7126E-03 | 4.5615E-03 | 1.0449E-03 | 1.0234E-04 | 3.7476E-06 | 3.2865E-08 |
| 7 | 1.0541E-02 | 8.4042E-03 | 1.9377E-03 | 1.9190E-04 | 7.1788E-06 | 6.6435E-08 |
| 8 | 1.6892E-02 | 1.3448E-02 | 3.1197E-03 | 3.1225E-04 | 1.1914E-05 | 1.1558E-07 |
| 9-10 | 5.7745E-02 | 4.5870E-02 | 1.0740E-02 | 1.0920E-03 | 4.2878E-05 | 4.4383E-07 |
| 11-13 | 1.5400E-01 | 1.2190E-01 | 2.8960E-02 | 3.0162E-03 | 1.2362E-04 | 1.3995E-06 |
| Frequency | 4.03 | 5.08 | 21.57 | 209.67 | 5,227.9 | 482,164 |

Return Percentage: 90.37% (1 - 4 credits), 92.00% (5 credits)

FIG. 42

4300

Pay Tables for 3x3 Cards

4-Pack

*Pay Table*

| Ball Calls | Probability | 1 credit | 2 credits | 3 credits | 4 credits | 5 credits |
|---|---|---|---|---|---|---|
| 3 | 0.00098522 | 150 | 300 | 450 | 600 | 800 |
| 4 | 0.00295567 | 60 | 120 | 180 | 240 | 300 |
| 5 | 0.00588326 | 7 | 14 | 21 | 28 | 35 |
| 6-7 | 0.02404755 | 4 | 8 | 12 | 16 | 20 |
| 8-10 | 0.07680227 | 2 | 4 | 6 | 8 | 10 |
| 11-14 | 0.18786787 | 1 | 2 | 3 | 4 | 5 |

*Cash Ball Distribution*

| Number of Cash Balls | Count | Probability |
|---|---|---|
| 0 | 2 | 0.07142857 |
| 1 | 22 | 0.78571429 |
| 2 | 1 | 0.03571429 |
| 3 | 1 | 0.03571429 |
| 4 | 2 | 0.07142857 |
| Total | 28 | |

*Probability of Multiplied Win*

| Ball Calls | Any Win | 1x | 2x | 4x | 8x | 10x |
|---|---|---|---|---|---|---|
| 3 | 9.8522E-04 | 8.6587E-04 | 1.1562E-04 | 3.6486E-06 | 7.8000E-08 | 0.0000E+00 |
| 4 | 2.9557E-03 | 2.5976E-03 | 3.4686E-04 | 1.0946E-05 | 2.3400E-07 | 0.0000E+00 |
| 5 | 5.8833E-03 | 5.1702E-03 | 6.9081E-04 | 2.1828E-05 | 4.6948E-07 | 7.3159E-11 |
| 6-7 | 2.4048E-02 | 2.1126E-02 | 2.8296E-03 | 8.9854E-05 | 1.9776E-06 | 1.4559E-09 |
| 8-10 | 7.6802E-02 | 6.7406E-02 | 9.0959E-03 | 2.9323E-04 | 6.8952E-06 | 1.6079E-08 |
| 11-14 | 1.8787E-01 | 1.6449E-01 | 2.2598E-02 | 7.5439E-04 | 2.0300E-05 | 1.0709E-07 |
| Frequency | 3.35 | 3.82 | 28.03 | 851.86 | 33,383.9 | 8,019,265 |

Return Percentage: 90.87% (1 - 4 credits), 91.99% (5 credits)

FIG. 43

4400

Pay Tables for 3x3 Cards

6-Pack

*Pay Table*

| Ball Calls | Probability | 1 credit | 2 credits | 3 credits | 4 credits | 5 credits |
|---|---|---|---|---|---|---|
| 5 | 0.00002807 | 1,250 | 2,500 | 3,750 | 5,000 | 8,750 |
| 6-7 | 0.00055942 | 100 | 200 | 300 | 400 | 500 |
| 8-9 | 0.00288001 | 25 | 50 | 75 | 100 | 125 |
| 10-12 | 0.01729157 | 6 | 12 | 18 | 24 | 30 |
| 13-15 | 0.05198789 | 3 | 6 | 9 | 12 | 15 |
| 16-20 | 0.23164370 | 1 | 2 | 3 | 4 | 5 |

*Cash Ball Distribution*

| Number of Cash Balls | Count | Probability |
|---|---|---|
| 0 | 25 | 0.17985612 |
| 1 | 60 | 0.43165468 |
| 2 | 5 | 0.03597122 |
| 3 | 4 | 0.02877698 |
| 4 | 45 | 0.32374101 |
| Total | 139 | |

*Probability of Multiplied Win*

| Ball Calls | Any Win | 1x | 2x | 4x | 8x | 10x |
|---|---|---|---|---|---|---|
| 5 | 2.8069E-05 | 2.0494E-05 | 6.4211E-06 | 1.0677E-06 | 8.4886E-08 | 1.6579E-09 |
| 6-7 | 5.5942E-04 | 4.0837E-04 | 1.2801E-04 | 2.1304E-05 | 1.6974E-06 | 3.3341E-08 |
| 8-9 | 2.8800E-03 | 2.1005E-03 | 6.6004E-04 | 1.1036E-04 | 8.8926E-06 | 1.7974E-07 |
| 10-12 | 1.7292E-02 | 1.2583E-02 | 3.9783E-03 | 6.7305E-04 | 5.5741E-05 | 1.2028E-06 |
| 13-15 | 5.1988E-02 | 3.7695E-02 | 1.2036E-02 | 2.0741E-03 | 1.7897E-04 | 4.2152E-06 |
| 16-20 | 2.3164E-01 | 1.6675E-01 | 5.4285E-02 | 9.6847E-03 | 8.9731E-04 | 2.4039E-05 |
| Frequency | 3.29 | 4.55 | 14.07 | 79.59 | 875.1 | 33,702 |

Return Percentage: 90.08% (1 - 4 credits), 92.00% (5 credits)

FIG. 44

4500

Pay Tables for 3x3 Cards

Letter X

*Pay Table*

| Ball Calls | Probability | 1 credit | 2 credits | 3 credits | 4 credits | 5 credits |
|---|---|---|---|---|---|---|
| 4 | 0.00003649 | 500 | 1,000 | 1,500 | 2,000 | 4,000 |
| 5-6 | 0.00051086 | 50 | 100 | 150 | 200 | 250 |
| 7-8 | 0.00200693 | 30 | 60 | 90 | 120 | 150 |
| 9-10 | 0.00510856 | 10 | 20 | 30 | 40 | 50 |
| 11-12 | 0.01039956 | 6 | 12 | 18 | 24 | 30 |
| 13-17 | 0.06878307 | 3 | 6 | 9 | 12 | 15 |
| 18-24 | 0.30089400 | 1 | 2 | 3 | 4 | 5 |

*Cash Ball Distribution*

| Number of Cash Balls | Count | Probability |
|---|---|---|
| 0 | 1 | 0.05000000 |
| 1 | 9 | 0.45000000 |
| 2 | 6 | 0.30000000 |
| 3 | 2 | 0.10000000 |
| 4 | 2 | 0.10000000 |
| Total | 20 | |

*Probability of Multiplied Win*

| Ball Calls | Any Win | 1x | 2x | 4x | 8x | 10x |
|---|---|---|---|---|---|---|
| 4 | 3.6490E-05 | 2.8562E-05 | 7.3597E-06 | 5.5084E-07 | 1.7443E-08 | 1.3315E-10 |
| 5-6 | 5.1086E-04 | 3.9986E-04 | 1.0304E-04 | 7.7118E-06 | 2.4420E-07 | 1.8641E-09 |
| 7-8 | 2.0069E-03 | 1.5709E-03 | 4.0478E-04 | 3.0296E-05 | 9.5934E-07 | 7.3232E-09 |
| 9-10 | 5.1086E-03 | 3.9986E-03 | 1.0304E-03 | 7.7118E-05 | 2.4420E-06 | 1.8641E-08 |
| 11-12 | 1.0400E-02 | 8.1400E-03 | 2.0975E-03 | 1.5699E-04 | 4.9711E-06 | 3.7948E-08 |
| 13-17 | 6.8783E-02 | 5.3839E-02 | 1.3873E-02 | 1.0383E-03 | 3.2879E-05 | 2.5099E-07 |
| 18-24 | 3.0089E-01 | 2.3552E-01 | 6.0688E-02 | 4.5422E-03 | 1.4383E-04 | 1.0980E-06 |
| Frequency | 2.58 | 3.29 | 12.79 | 170.85 | 5,395.3 | 706,789 |

Return Percentage: 90.62% (1 - 4 credits), 91.99% (5 credits)

FIG. 45

4600

Pay Tables for 3x3 Cards

Stairs

*Pay Table*

| Ball Calls | Probability | 1 credit | 2 credits | 3 credits | 4 credits | 5 credits |
|---|---|---|---|---|---|---|
| 5 | 0.00001403 | 500 | 1,000 | 1,500 | 2,000 | 6,250 |
| 6 | 0.00007017 | 100 | 200 | 300 | 400 | 750 |
| 7-8 | 0.00069780 | 50 | 100 | 150 | 200 | 250 |
| 9-10 | 0.00269575 | 20 | 40 | 60 | 80 | 100 |
| 11-12 | 0.00724854 | 10 | 20 | 30 | 40 | 50 |
| 13-15 | 0.02825839 | 5 | 10 | 15 | 20 | 25 |
| 16-19 | 0.09945750 | 2 | 4 | 6 | 8 | 10 |
| 20-23 | 0.21338168 | 1 | 2 | 3 | 4 | 5 |

*Cash Ball Distribution*

| Number of Cash Balls | Count | Probability |
|---|---|---|
| 0 | 20 | 0.33898305 |
| 1 | 20 | 0.33898305 |
| 2 | 9 | 0.15254237 |
| 3 | 5 | 0.08474576 |
| 4 | 5 | 0.08474576 |
| Total | 59 | |

*Probability of Multiplied Win*

| Ball Calls | Any Win | 1x | 2x | 4x | 8x | 10x |
|---|---|---|---|---|---|---|
| 5 | 1.4034E-05 | 1.1421E-05 | 2.3466E-06 | 2.5265E-07 | 1.3779E-08 | 2.1700E-10 |
| 6 | 7.0172E-05 | 5.7106E-05 | 1.1733E-05 | 1.2633E-06 | 6.8897E-08 | 1.0850E-09 |
| 7-8 | 6.9780E-04 | 5.6776E-04 | 1.1675E-04 | 1.2589E-05 | 6.8888E-07 | 1.0945E-08 |
| 9-10 | 2.6957E-03 | 2.1923E-03 | 4.5177E-04 | 4.8903E-05 | 2.6995E-06 | 4.3868E-08 |
| 11-12 | 7.2485E-03 | 5.8901E-03 | 1.2182E-03 | 1.3273E-04 | 7.4334E-06 | 1.2520E-07 |
| 13-15 | 2.8258E-02 | 2.2923E-02 | 4.7768E-03 | 5.2757E-04 | 3.0403E-05 | 5.4713E-07 |
| 16-19 | 9.9457E-02 | 8.0366E-02 | 1.7034E-02 | 1.9373E-03 | 1.1836E-04 | 2.3962E-06 |
| 20-23 | 2.1338E-01 | 1.7111E-01 | 3.7468E-02 | 4.4922E-03 | 3.0127E-04 | 7.1030E-06 |
| Frequency | 2.84 | 3.53 | 16.37 | 139.81 | 2,169.5 | 97,774 |

Return Percentage: 90.25% (1 - 4 credits), 91.98% (5 credits)

FIG. 46

4700

Pay Tables for 3x3 Cards

Letter U

*Pay Table*

| Ball Calls | Probability | 1 credit | 2 credits | 3 credits | 4 credits | 5 credits |
|---|---|---|---|---|---|---|
| 10 or fewer | 0.00005894 | 500 | 1,000 | 1,500 | 2,000 | 3,500 |
| 11 | 0.00010315 | 200 | 400 | 600 | 800 | 1,000 |
| 12 | 0.00022694 | 100 | 200 | 300 | 400 | 500 |
| 13-14 | 0.00129679 | 50 | 100 | 150 | 200 | 250 |
| 15-16 | 0.00393359 | 20 | 40 | 60 | 80 | 100 |
| 17-18 | 0.01001277 | 10 | 20 | 30 | 40 | 50 |
| 19-20 | 0.02244621 | 5 | 10 | 15 | 20 | 25 |
| 21-22 | 0.04569408 | 3 | 6 | 9 | 12 | 15 |
| 23-25 | 0.15235092 | 1 | 2 | 3 | 4 | 5 |

*Cash Ball Distribution*

| Number of Cash Balls | Count | Probability |
|---|---|---|
| 0 | 26 | 0.74285714 |
| 1 | 1 | 0.02857143 |
| 2 | 1 | 0.02857143 |
| 3 | 1 | 0.02857143 |
| 4 | 6 | 0.17142857 |
| Total | 35 | |

*Probability of Multiplied Win*

| Ball Calls | Any | None | 2x | 4x | 8x | 10x |
|---|---|---|---|---|---|---|
| 10 or fewer | 5.8945E-05 | 5.0058E-05 | 6.3220E-06 | 2.2407E-06 | 3.1134E-07 | 1.2905E-08 |
| 11 | 1.0315E-04 | 8.7601E-05 | 1.1063E-05 | 3.9212E-06 | 5.4484E-07 | 2.2584E-08 |
| 12 | 2.2694E-04 | 1.9272E-04 | 2.4340E-05 | 8.6266E-06 | 1.1987E-06 | 4.9685E-08 |
| 13-14 | 1.2968E-03 | 1.1013E-03 | 1.3908E-04 | 4.9295E-05 | 6.8495E-06 | 2.8392E-07 |
| 15-16 | 3.9336E-03 | 3.3405E-03 | 4.2189E-04 | 1.4953E-04 | 2.0777E-05 | 8.6121E-07 |
| 17-18 | 1.0013E-02 | 8.5032E-03 | 1.0739E-03 | 3.8062E-04 | 5.2886E-05 | 2.1922E-06 |
| 19-20 | 2.2446E-02 | 1.9062E-02 | 2.4074E-03 | 8.5325E-04 | 1.1856E-04 | 4.9143E-06 |
| 21-22 | 4.5694E-02 | 3.8805E-02 | 4.9008E-03 | 1.7370E-03 | 2.4135E-04 | 1.0004E-05 |
| 23-25 | 1.5235E-01 | 1.2938E-01 | 1.6340E-02 | 5.7913E-03 | 8.0470E-04 | 3.3355E-05 |
| Frequency | 4.24 | 4.99 | 39.49 | 111.41 | 801.8 | 19,344 |

Return Percentage: 90.50% (1 - 4 credits), 91.98% (5 credits)

FIG. 47

4800

Pay Tables for 3x3 Cards

Coverall

*Pay Table*

| Ball Calls | Probability | 1 credit | 2 credits | 3 credits | 4 credits | 5 credits |
|---|---|---|---|---|---|---|
| 10 or fewer | 0.00000769 | 800 | 1,600 | 2,400 | 3,200 | 6,000 |
| 11 | 0.00002050 | 400 | 800 | 1,200 | 1,600 | 4,000 |
| 12 | 0.00005638 | 250 | 500 | 750 | 1,000 | 1,250 |
| 13-14 | 0.00042850 | 100 | 200 | 300 | 400 | 500 |
| 15-16 | 0.00168582 | 25 | 50 | 75 | 100 | 125 |
| 17-18 | 0.00527736 | 10 | 20 | 30 | 40 | 50 |
| 19-20 | 0.01404631 | 5 | 10 | 15 | 20 | 25 |
| 21-22 | 0.03311165 | 3 | 6 | 9 | 12 | 15 |
| 23-26 | 0.21228787 | 2 | 4 | 6 | 8 | 10 |

*Cash Ball Distribution*

| Number of Cash Balls | Count | Probability |
|---|---|---|
| 0 | 75 | 0.70754717 |
| 1 | 20 | 0.18867925 |
| 2 | 1 | 0.00943396 |
| 3 | 1 | 0.00943396 |
| 4 | 9 | 0.08490566 |
| Total | 106 | |

*Probability of Multiplied Win*

| Ball Calls | Any | None | 2x | 4x | 8x | 10x |
|---|---|---|---|---|---|---|
| 10 or fewer | 7.6885E-06 | 6.7440E-06 | 7.4267E-07 | 1.6974E-07 | 3.0347E-08 | 1.6674E-09 |
| 11 | 2.0503E-05 | 1.7984E-05 | 1.9804E-06 | 4.5265E-07 | 8.0925E-08 | 4.4464E-09 |
| 12 | 5.6382E-05 | 4.9456E-05 | 5.4462E-06 | 1.2448E-06 | 2.2254E-07 | 1.2228E-08 |
| 13-14 | 4.2850E-04 | 3.7587E-04 | 4.1391E-05 | 9.4604E-06 | 1.6913E-06 | 9.2931E-08 |
| 15-16 | 1.6858E-03 | 1.4787E-03 | 1.6284E-04 | 3.7219E-05 | 6.6541E-06 | 3.6561E-07 |
| 17-18 | 5.2774E-03 | 4.6291E-03 | 5.0977E-04 | 1.1651E-04 | 2.0830E-05 | 1.1445E-06 |
| 19-20 | 1.4046E-02 | 1.2321E-02 | 1.3568E-03 | 3.1011E-04 | 5.5442E-05 | 3.0463E-06 |
| 21-22 | 3.3112E-02 | 2.9044E-02 | 3.1984E-03 | 7.3103E-04 | 1.3069E-04 | 7.1810E-06 |
| 23-26 | 2.1229E-01 | 1.8621E-01 | 2.0506E-02 | 4.6868E-03 | 8.3792E-04 | 4.6039E-05 |
| Frequency | 3.75 | 4.27 | 38.78 | 169.69 | 949.2 | 17,275 |

Return Percentage: 90.67% (1 - 4 credits), 92.01% (5 credits)

FIG. 48

4900

Pay Tables for 4x4 Cards

Single Bingo (any line)

*Pay Table*

| Ball Calls | Probability | 1 credit | 2 credits | 3 credits | 4 credits | 5 credits |
|---|---|---|---|---|---|---|
| 4 | 0.00005139 | 300 | 600 | 900 | 1,200 | 2,500 |
| 5 | 0.00020557 | 170 | 340 | 510 | 680 | 1,000 |
| 6 | 0.00051393 | 80 | 160 | 240 | 320 | 400 |
| 7-8 | 0.00282309 | 40 | 80 | 120 | 160 | 200 |
| 9-10 | 0.00714495 | 10 | 20 | 30 | 40 | 50 |
| 11-12 | 0.01434322 | 6 | 12 | 18 | 24 | 30 |
| 13-14 | 0.02480806 | 3 | 6 | 9 | 12 | 15 |
| 15-18 | 0.09322020 | 2 | 4 | 6 | 8 | 10 |
| 19-22 | 0.16117973 | 1 | 2 | 3 | 4 | 5 |

*Cash Ball Distribution*

| Number of Cash Balls | Count | Probability |
|---|---|---|
| 0 | 2 | 0.33333333 |
| 1 | 1 | 0.16666667 |
| 2 | 1 | 0.16666667 |
| 3 | 1 | 0.16666667 |
| 4 | 1 | 0.16666667 |
| Total | 6 | |

*Probability of Multiplied Win*

| Ball Calls | Any Win | 1x | 2x | 4x | 8x | 10x |
|---|---|---|---|---|---|---|
| 4 | 5.1393E-05 | 4.4701E-05 | 6.2562E-06 | 4.2616E-07 | 9.7285E-09 | 4.4020E-11 |
| 5 | 2.0557E-04 | 1.7880E-04 | 2.5025E-05 | 1.7046E-06 | 3.8914E-08 | 1.7608E-10 |
| 6 | 5.1393E-04 | 4.4701E-04 | 6.2562E-05 | 4.2616E-06 | 9.7285E-08 | 4.4020E-10 |
| 7-8 | 2.8231E-03 | 2.4554E-03 | 3.4370E-04 | 2.3419E-05 | 5.3509E-07 | 2.4326E-09 |
| 9-10 | 7.1449E-03 | 6.2140E-03 | 8.7022E-04 | 5.9371E-05 | 1.3620E-06 | 6.3210E-09 |
| 11-12 | 1.4343E-02 | 1.2472E-02 | 1.7486E-03 | 1.1966E-04 | 2.7710E-06 | 1.3468E-08 |
| 13-14 | 2.4808E-02 | 2.1565E-02 | 3.0298E-03 | 2.0845E-04 | 4.9076E-06 | 2.5731E-08 |
| 15-18 | 9.3220E-02 | 8.0959E-02 | 1.1442E-02 | 7.9927E-04 | 1.9679E-05 | 1.2316E-07 |
| 19-22 | 1.6118E-01 | 1.3971E-01 | 1.9990E-02 | 1.4398E-03 | 3.8551E-05 | 3.1159E-07 |
| Frequency | 3.29 | 3.79 | 26.65 | 376.45 | 14,716.3 | 2,068,850 |

Return Percentage: 90.11% (1 - 4 credits), 92.00% (5 credits)

FIG. 49

5000

Pay Tables for 4x4 Cards

Double Bingo (any 2 lines)

*Pay Table*

| Ball Calls | Probability | 1 credit | 2 credits | 3 credits | 4 credits | 5 credits |
|---|---|---|---|---|---|---|
| 9 or fewer | 0.00001593 | 600 | 1,200 | 1,800 | 2,400 | 6,000 |
| 10-12 | 0.00033736 | 100 | 200 | 300 | 400 | 600 |
| 13-14 | 0.00116051 | 50 | 100 | 150 | 200 | 250 |
| 15-16 | 0.00339631 | 25 | 50 | 75 | 100 | 125 |
| 17-18 | 0.00814533 | 12 | 24 | 36 | 48 | 60 |
| 19-20 | 0.01675429 | 7 | 14 | 21 | 28 | 35 |
| 21-22 | 0.03038944 | 4 | 8 | 12 | 16 | 20 |
| 23-24 | 0.04946290 | 2 | 4 | 6 | 8 | 10 |
| 25-28 | 0.17136510 | 1 | 2 | 3 | 4 | 5 |

*Cash Ball Distribution*

| Number of Cash Balls | Count | Probability |
|---|---|---|
| 0 | 16 | 0.51612903 |
| 1 | 8 | 0.25806452 |
| 2 | 4 | 0.12903226 |
| 3 | 2 | 0.06451613 |
| 4 | 1 | 0.03225806 |
| Total | 31 | |

*Probability of Multiplied Win*

| Ball Calls | Any Win | 1x | 2x | 4x | 8x | 10x |
|---|---|---|---|---|---|---|
| 9 or fewer | 1.5927E-05 | 1.4122E-05 | 1.6641E-06 | 1.3569E-07 | 5.9365E-09 | 9.4288E-11 |
| 10-12 | 3.3736E-04 | 2.9894E-04 | 3.5386E-05 | 2.9046E-06 | 1.2835E-07 | 2.0711E-09 |
| 13-14 | 1.1605E-03 | 1.0278E-03 | 1.2215E-04 | 1.0085E-05 | 4.4974E-07 | 7.3668E-09 |
| 15-16 | 3.3963E-03 | 3.0064E-03 | 3.5871E-04 | 2.9797E-05 | 1.3416E-06 | 2.2334E-08 |
| 17-18 | 8.1453E-03 | 7.2062E-03 | 8.6355E-04 | 7.2219E-05 | 3.2873E-06 | 5.5736E-08 |
| 19-20 | 1.6754E-02 | 1.4813E-02 | 1.7837E-03 | 1.5029E-04 | 6.9243E-06 | 1.1984E-07 |
| 21-22 | 3.0389E-02 | 2.6850E-02 | 3.2501E-03 | 2.7612E-04 | 1.2894E-05 | 2.2825E-07 |
| 23-24 | 4.9463E-02 | 4.3669E-02 | 5.3166E-03 | 4.5582E-04 | 2.1603E-05 | 3.9196E-07 |
| 25-28 | 1.7137E-01 | 1.5108E-01 | 1.8588E-02 | 1.6202E-03 | 7.8867E-05 | 1.4945E-06 |
| Frequency | 3.56 | 4.03 | 32.98 | 382.03 | 7,968.0 | 430,631 |

Return Percentage: 90.17% (1 - 4 credits), 92.02% (5 credits)

FIG. 50

5100

Pay Tables for 4x4 Cards

Triple Bingo (any 3 lines)

*Pay Table*

| Ball Calls | Probability | 1 credit | 2 credits | 3 credits | 4 credits | 5 credits |
|---|---|---|---|---|---|---|
| 12 or fewer | 0.00000394 | 2,000 | 4,000 | 6,000 | 8,000 | 20,000 |
| 13-14 | 0.00003523 | 500 | 1,000 | 1,500 | 2,000 | 3,700 |
| 15-16 | 0.00019570 | 100 | 200 | 300 | 400 | 500 |
| 17-18 | 0.00077713 | 50 | 100 | 150 | 200 | 250 |
| 19-20 | 0.00242379 | 18 | 36 | 54 | 72 | 90 |
| 21-22 | 0.00627600 | 9 | 18 | 27 | 36 | 45 |
| 23-24 | 0.01397178 | 5 | 10 | 15 | 20 | 25 |
| 25-26 | 0.02735690 | 4 | 8 | 12 | 16 | 20 |
| 27-28 | 0.04780213 | 3 | 6 | 9 | 12 | 15 |
| 29-31 | 0.12453101 | 2 | 4 | 6 | 8 | 10 |

*Cash Ball Distribution*

| Number of Cash Balls | Count | Probability |
|---|---|---|
| 0 | 9 | 0.50000000 |
| 1 | 6 | 0.33333333 |
| 2 | 1 | 0.05555556 |
| 3 | 1 | 0.05555556 |
| 4 | 1 | 0.05555556 |
| Total | 18 | |

*Probability of Multiplied Win*

| Ball Calls | Any Win | 1x | 2x | 4x | 8x | 10x |
|---|---|---|---|---|---|---|
| 12 or fewer | 3.9441E-06 | 3.3810E-06 | 5.0049E-07 | 5.7262E-08 | 5.1688E-09 | 1.6263E-10 |
| 13-14 | 3.5231E-05 | 3.0149E-05 | 4.5100E-06 | 5.2263E-07 | 4.8089E-08 | 1.5500E-09 |
| 15-16 | 1.9570E-04 | 1.6724E-04 | 2.5222E-05 | 2.9515E-06 | 2.7559E-07 | 9.0473E-09 |
| 17-18 | 7.7713E-04 | 6.6334E-04 | 1.0074E-04 | 1.1889E-05 | 1.1243E-06 | 3.7505E-08 |
| 19-20 | 2.4238E-03 | 2.0667E-03 | 3.1585E-04 | 3.7560E-05 | 3.5936E-06 | 1.2167E-07 |
| 21-22 | 6.2760E-03 | 5.3458E-03 | 8.2187E-04 | 9.8442E-05 | 9.5236E-06 | 3.2706E-07 |
| 23-24 | 1.3972E-02 | 1.1889E-02 | 1.8384E-03 | 2.2175E-04 | 2.1689E-05 | 7.5539E-07 |
| 25-26 | 2.7357E-02 | 2.3256E-02 | 3.6168E-03 | 4.3934E-04 | 4.3445E-05 | 1.5349E-06 |
| 27-28 | 4.7802E-02 | 4.0594E-02 | 6.3506E-03 | 7.7700E-04 | 7.7714E-05 | 2.7866E-06 |
| 29-31 | 1.2453E-01 | 1.0560E-01 | 1.6654E-02 | 2.0579E-03 | 2.0908E-04 | 7.6514E-06 |
| Frequency | 4.48 | 5.27 | 33.64 | 274.17 | 2,728.5 | 75,613 |

Return Percentage: 90.09% (1 - 4 credits), 92.02% (5 credits)

FIG. 51

5200

Pay Tables for 4x4 Cards

Letter U

*Pay Table*

| Ball Calls | Probability | 1 credit | 2 credits | 3 credits | 4 credits | 5 credits |
|---|---|---|---|---|---|---|
| 22 or fewer | 0.00009886 | 100 | 200 | 300 | 400 | 900 |
| 23-25 | 0.00040089 | 50 | 100 | 150 | 200 | 300 |
| 26-29 | 0.00256260 | 25 | 50 | 75 | 100 | 125 |
| 30-33 | 0.01108916 | 15 | 30 | 45 | 60 | 75 |
| 34-37 | 0.03910414 | 5 | 10 | 15 | 20 | 25 |
| 38-42 | 0.17171100 | 1 | 2 | 3 | 4 | 5 |

*Cash Ball Distribution*

| Number of Cash Balls | Count | Probability |
|---|---|---|
| 0 | 100 | 0.58479532 |
| 1 | 2 | 0.01169591 |
| 2 | 1 | 0.00584795 |
| 3 | 1 | 0.00584795 |
| 4 | 67 | 0.39181287 |
| Total | 171 | |

*Probability of Multiplied Win*

| Ball Calls | Any Win | 1x | 2x | 4x | 8x | 10x |
|---|---|---|---|---|---|---|
| 22 or fewer | 9.8865E-05 | 7.4068E-05 | 1.7465E-05 | 6.3780E-06 | 9.1180E-07 | 4.1806E-08 |
| 23-25 | 4.0089E-04 | 3.0034E-04 | 7.0819E-05 | 2.5863E-05 | 3.6973E-06 | 1.6952E-07 |
| 26-29 | 2.5626E-03 | 1.9199E-03 | 4.5269E-04 | 1.6532E-04 | 2.3634E-05 | 1.0836E-06 |
| 30-33 | 1.1089E-02 | 8.3079E-03 | 1.9589E-03 | 7.1539E-04 | 1.0227E-04 | 4.6892E-06 |
| 34-37 | 3.9104E-02 | 2.9296E-02 | 6.9079E-03 | 2.5227E-03 | 3.6065E-04 | 1.6536E-05 |
| 38-42 | 1.7171E-01 | 1.2864E-01 | 3.0333E-02 | 1.1078E-02 | 1.5836E-03 | 7.2610E-05 |
| Frequency | 4.45 | 5.93 | 25.16 | 68.90 | 482.0 | 10,512 |

Return Percentage: 90.28% (1 - 4 credits), 91.99% (5 credits)

FIG. 52

5300

Pay Tables for 4x4 Cards

6-Pack

*Pay Table*

| Ball Calls | Probability | 1 credit | 2 credits | 3 credits | 4 credits | 5 credits |
|---|---|---|---|---|---|---|
| 8 or fewer | 0.00002732 | 500 | 1,000 | 1,500 | 2,000 | 4,000 |
| 9-10 | 0.00017543 | 150 | 300 | 450 | 600 | 900 |
| 11-13 | 0.00140229 | 30 | 60 | 90 | 120 | 150 |
| 14-15 | 0.00292946 | 20 | 40 | 60 | 80 | 100 |
| 16-17 | 0.00623051 | 10 | 20 | 30 | 40 | 50 |
| 18-21 | 0.03152993 | 5 | 10 | 15 | 20 | 25 |
| 22-24 | 0.05173939 | 3 | 6 | 9 | 12 | 15 |
| 25-26 | 0.05335485 | 2 | 4 | 6 | 8 | 10 |
| 27-29 | 0.11295025 | 1 | 2 | 3 | 4 | 5 |

*Cash Ball Distribution*

| Number of Cash Balls | Count | Probability |
|---|---|---|
| 0 | 50 | 0.34722222 |
| 1 | 51 | 0.35416667 |
| 2 | 1 | 0.00694444 |
| 3 | 1 | 0.00694444 |
| 4 | 41 | 0.28472222 |
| Total | 144 | |

*Probability of Multiplied Win*

| Ball Calls | Any Win | 1x | 2x | 4x | 8x | 10x |
|---|---|---|---|---|---|---|
| 8 or fewer | 2.7322E-05 | 2.2698E-05 | 4.0633E-06 | 5.2616E-07 | 3.3862E-08 | 6.0204E-10 |
| 9-10 | 1.7543E-04 | 1.4569E-04 | 2.6122E-05 | 3.3925E-06 | 2.1961E-07 | 3.9508E-09 |
| 11-13 | 1.4023E-03 | 1.1635E-03 | 2.0950E-04 | 2.7425E-05 | 1.8034E-06 | 3.3479E-08 |
| 14-15 | 2.9295E-03 | 2.4279E-03 | 4.3947E-04 | 5.8094E-05 | 3.8942E-06 | 7.5059E-08 |
| 16-17 | 6.2305E-03 | 5.1572E-03 | 9.3902E-04 | 1.2550E-04 | 8.5957E-06 | 1.7263E-07 |
| 18-21 | 3.1530E-02 | 2.6029E-02 | 4.7974E-03 | 6.5589E-04 | 4.6949E-05 | 1.0234E-06 |
| 22-24 | 5.1739E-02 | 4.2566E-02 | 7.9661E-03 | 1.1203E-03 | 8.4649E-05 | 2.0291E-06 |
| 25-26 | 5.3355E-02 | 4.3764E-02 | 8.2981E-03 | 1.1954E-03 | 9.4524E-05 | 2.4436E-06 |
| 27-29 | 1.1295E-01 | 9.2305E-02 | 1.7782E-02 | 2.6375E-03 | 2.2018E-04 | 6.2024E-06 |
| Frequency | 3.84 | 4.68 | 24.71 | 171.70 | 2,169.9 | 83,442 |

Return Percentage: 90.36% (1 - 4 credits), 92.00% (5 credits)

FIG. 53

5400

Pay Tables for 4x4 Cards

9-Pack

*Pay Table*

| Ball Calls | Probability | 1 credit | 2 credits | 3 credits | 4 credits | 5 credits |
|---|---|---|---|---|---|---|
| 16 or fewer | 0.00002718 | 600 | 1,200 | 1,800 | 2,400 | 5,000 |
| 17 | 0.00003044 | 400 | 800 | 1,200 | 1,600 | 2,500 |
| 18-19 | 0.00015978 | 250 | 500 | 750 | 1,000 | 1,250 |
| 20-21 | 0.00046647 | 100 | 200 | 300 | 400 | 500 |
| 22-23 | 0.00118584 | 50 | 100 | 150 | 200 | 250 |
| 24-25 | 0.00269690 | 20 | 40 | 60 | 80 | 100 |
| 26-27 | 0.00558830 | 8 | 16 | 24 | 32 | 40 |
| 28-29 | 0.01068395 | 5 | 10 | 15 | 20 | 25 |
| 30-32 | 0.03294379 | 3 | 6 | 9 | 12 | 15 |
| 33-35 | 0.06717354 | 2 | 4 | 6 | 8 | 10 |
| 36-39 | 0.17264737 | 1 | 2 | 3 | 4 | 5 |

*Cash Ball Distribution*

| Number of Cash Balls | Count | Probability |
|---|---|---|
| 0 | 50 | 0.49504950 |
| 1 | 25 | 0.24752475 |
| 2 | 9 | 0.08910891 |
| 3 | 9 | 0.08910891 |
| 4 | 8 | 0.07920792 |
| Total | 101 | |

*Probability of Multiplied Win*

| Ball Calls | Any Win | 1x | 2x | 4x | 8x | 10x |
|---|---|---|---|---|---|---|
| 16 or fewer | 2.7180E-05 | 2.2700E-05 | 3.8605E-06 | 5.6976E-07 | 4.8145E-08 | 1.4020E-09 |
| 17 | 3.0443E-05 | 2.5422E-05 | 4.3258E-06 | 6.3906E-07 | 5.4100E-08 | 1.5805E-09 |
| 18-19 | 1.5978E-04 | 1.3340E-04 | 2.2721E-05 | 3.3624E-06 | 2.8555E-07 | 8.3892E-09 |
| 20-21 | 4.6647E-04 | 3.8932E-04 | 6.6426E-05 | 9.8614E-06 | 8.4241E-07 | 2.5006E-08 |
| 22-23 | 1.1858E-03 | 9.8914E-04 | 1.6922E-04 | 2.5241E-05 | 2.1751E-06 | 6.5560E-08 |
| 24-25 | 2.6969E-03 | 2.2477E-03 | 3.8598E-04 | 5.7961E-05 | 5.0567E-06 | 1.5569E-07 |
| 26-27 | 5.5883E-03 | 4.6524E-03 | 8.0302E-04 | 1.2169E-04 | 1.0796E-05 | 3.4193E-07 |
| 28-29 | 1.0684E-02 | 8.8815E-03 | 1.5435E-03 | 2.3677E-04 | 2.1469E-05 | 7.0505E-07 |
| 30-32 | 3.2944E-02 | 2.7311E-02 | 4.8059E-03 | 7.5348E-04 | 7.1002E-05 | 2.4786E-06 |
| 33-35 | 6.7174E-02 | 5.5431E-02 | 9.9572E-03 | 1.6170E-03 | 1.6177E-04 | 6.1681E-06 |
| 36-39 | 1.7265E-01 | 1.4117E-01 | 2.6378E-02 | 4.5698E-03 | 5.0650E-04 | 2.2113E-05 |
| Frequency | 3.41 | 4.14 | 22.66 | 135.20 | 1,282.1 | 31,187 |

Return Percentage: 90.30% (1 - 4 credits), 91.99% (5 credits)

FIG. 54

5500

Pay Tables for 4x4 Cards

Frame

*Pay Table*

| Ball Calls | Probability | 1 credit | 2 credits | 3 credits | 4 credits | 5 credits |
|---|---|---|---|---|---|---|
| 22 or fewer | 0.00000928 | 800 | 1,600 | 2,400 | 3,200 | 6,250 |
| 23 | 0.00001013 | 500 | 1,000 | 1,500 | 2,000 | 5,000 |
| 24-25 | 0.00005524 | 250 | 500 | 750 | 1,000 | 1,625 |
| 26-27 | 0.00017488 | 150 | 300 | 450 | 600 | 750 |
| 28-29 | 0.00049538 | 80 | 160 | 240 | 320 | 400 |
| 30-32 | 0.00249606 | 50 | 100 | 150 | 200 | 250 |
| 33-34 | 0.00462994 | 20 | 40 | 60 | 80 | 100 |
| 35-36 | 0.01009528 | 10 | 20 | 30 | 40 | 50 |
| 37-38 | 0.02089605 | 5 | 10 | 15 | 20 | 25 |
| 39-40 | 0.04132968 | 2 | 4 | 6 | 8 | 10 |
| 41-43 | 0.13997459 | 1 | 2 | 3 | 4 | 5 |

*Cash Ball Distribution*

| Number of Cash Balls | Count | Probability |
|---|---|---|
| 0 | 70 | 0.70000000 |
| 1 | 12 | 0.12000000 |
| 2 | 5 | 0.05000000 |
| 3 | 3 | 0.03000000 |
| 4 | 10 | 0.10000000 |
| Total | 100 | |

*Probability of Multiplied Win*

| Ball Calls | Any Win | 1x | 2x | 4x | 8x | 10x |
|---|---|---|---|---|---|---|
| 22 or fewer | 9.2818E-06 | 7.9877E-06 | 9.8660E-07 | 2.6375E-07 | 4.1321E-08 | 2.3612E-09 |
| 23 | 1.0126E-05 | 8.7139E-06 | 1.0763E-06 | 2.8773E-07 | 4.5078E-08 | 2.5759E-09 |
| 24-25 | 5.5236E-05 | 4.7535E-05 | 5.8713E-06 | 1.5696E-06 | 2.4591E-07 | 1.4052E-08 |
| 26-27 | 1.7488E-04 | 1.5050E-04 | 1.8589E-05 | 4.9693E-06 | 7.7854E-07 | 4.4488E-08 |
| 28-29 | 4.9538E-04 | 4.2631E-04 | 5.2656E-05 | 1.4076E-05 | 2.2054E-06 | 1.2602E-07 |
| 30-32 | 2.4961E-03 | 2.1481E-03 | 2.6532E-04 | 7.0928E-05 | 1.1112E-05 | 6.3498E-07 |
| 33-34 | 4.6299E-03 | 3.9844E-03 | 4.9214E-04 | 1.3156E-04 | 2.0612E-05 | 1.1778E-06 |
| 35-36 | 1.0095E-02 | 8.6878E-03 | 1.0731E-03 | 2.8687E-04 | 4.4943E-05 | 2.5682E-06 |
| 37-38 | 2.0896E-02 | 1.7983E-02 | 2.2211E-03 | 5.9378E-04 | 9.3027E-05 | 5.3158E-06 |
| 39-40 | 4.1330E-02 | 3.5568E-02 | 4.3931E-03 | 1.1744E-03 | 1.8400E-04 | 1.0514E-05 |
| 41-43 | 1.3997E-01 | 1.2046E-01 | 1.4879E-02 | 3.9775E-03 | 6.2315E-04 | 3.5609E-05 |
| Frequency | 4.54 | 5.28 | 42.73 | 159.84 | 1,020.2 | 17,854 |

Return Percentage: 90.36% (1 - 4 credits), 92.00% (5 credits)

FIG. 55

5600

Pay Tables for 4x4 Cards

Coverall

*Pay Table*

| Ball Calls | Probability | 1 credit | 2 credits | 3 credits | 4 credits | 5 credits |
|---|---|---|---|---|---|---|
| 27 or fewer | 0.00000578 | 800 | 1,600 | 2,400 | 3,200 | 6,250 |
| 28 | 0.00000771 | 500 | 1,000 | 1,500 | 2,000 | 5,000 |
| 29 | 0.00001661 | 300 | 600 | 900 | 1,200 | 3,500 |
| 30-31 | 0.00010319 | 150 | 300 | 450 | 600 | 750 |
| 32-33 | 0.00038418 | 80 | 160 | 240 | 320 | 400 |
| 34-35 | 0.00128307 | 40 | 80 | 120 | 160 | 200 |
| 36-37 | 0.00390973 | 20 | 40 | 60 | 80 | 100 |
| 38-39 | 0.01101426 | 10 | 20 | 30 | 40 | 50 |
| 40-41 | 0.02898916 | 5 | 10 | 15 | 20 | 25 |
| 42-43 | 0.07189160 | 2 | 4 | 6 | 8 | 10 |
| 44-45 | 0.16916622 | 1 | 2 | 3 | 4 | 5 |

*Cash Ball Distribution*

| Number of Cash Balls | Count | Probability |
|---|---|---|
| 0 | 81 | 0.75700935 |
| 1 | 14 | 0.13084112 |
| 2 | 5 | 0.04672897 |
| 3 | 3 | 0.02803738 |
| 4 | 4 | 0.03738318 |
| Total | 107 | |

*Probability of Multiplied Win*

| Ball Calls | Any Win | 1x | 2x | 4x | 8x | 10x |
|---|---|---|---|---|---|---|
| 27 or fewer | 5.7822E-06 | 5.0868E-06 | 5.3737E-07 | 1.3086E-07 | 2.5156E-08 | 2.0218E-09 |
| 28 | 7.7095E-06 | 6.7823E-06 | 7.1649E-07 | 1.7448E-07 | 3.3541E-08 | 2.6957E-09 |
| 29 | 1.6605E-05 | 1.4608E-05 | 1.5432E-06 | 3.7579E-07 | 7.2243E-08 | 5.8062E-09 |
| 30-31 | 1.0319E-04 | 9.0779E-05 | 9.5899E-06 | 2.3353E-06 | 4.4894E-07 | 3.6081E-08 |
| 32-33 | 3.8418E-04 | 3.3797E-04 | 3.5704E-05 | 8.6944E-06 | 1.6714E-06 | 1.3433E-07 |
| 34-35 | 1.2831E-03 | 1.1288E-03 | 1.1924E-04 | 2.9037E-05 | 5.5821E-06 | 4.4864E-07 |
| 36-37 | 3.9097E-03 | 3.4395E-03 | 3.6335E-04 | 8.8481E-05 | 1.7010E-05 | 1.3671E-06 |
| 38-39 | 1.1014E-02 | 9.6896E-03 | 1.0236E-03 | 2.4926E-04 | 4.7919E-05 | 3.8513E-06 |
| 40-41 | 2.8989E-02 | 2.5503E-02 | 2.6941E-03 | 6.5606E-04 | 1.2612E-04 | 1.0136E-05 |
| 42-43 | 7.1892E-02 | 6.3245E-02 | 6.6813E-03 | 1.6270E-03 | 3.1277E-04 | 2.5138E-05 |
| 44-45 | 1.6917E-01 | 1.4882E-01 | 1.5722E-02 | 3.8284E-03 | 7.3598E-04 | 5.9151E-05 |
| Frequency | 3.49 | 3.96 | 37.52 | 154.08 | 801.5 | 9,973 |

Return Percentage: 90.45% (1 - 4 credits), 92.01% (5 credits)

FIG. 56

5700

Pay Tables for 5x5 Cards

Single Bingo (any line)

*Pay Table*

| Ball Calls | Probability | 1 credit | 2 credits | 3 credits | 4 credits | 5 credits |
|---|---|---|---|---|---|---|
| 5 or fewer | 0.00001692 | 250 | 500 | 750 | 1,000 | 4,000 |
| 6-7 | 0.00010800 | 40 | 80 | 120 | 160 | 250 |
| 8-11 | 0.00117494 | 25 | 50 | 75 | 100 | 125 |
| 12-15 | 0.00457182 | 8 | 16 | 24 | 32 | 40 |
| 16-19 | 0.01212141 | 6 | 12 | 18 | 24 | 30 |
| 20-23 | 0.02571940 | 4 | 8 | 12 | 16 | 20 |
| 24-27 | 0.04669550 | 3 | 6 | 9 | 12 | 15 |
| 28-32 | 0.09840592 | 2 | 4 | 6 | 8 | 10 |
| 33-38 | 0.18297542 | 1 | 2 | 3 | 4 | 5 |

*Cash Ball Distribution*

| Number of Cash Balls | Count | Probability |
|---|---|---|
| 0 | 2 | 0.16666667 |
| 1 | 1 | 0.08333333 |
| 2 | 1 | 0.08333333 |
| 3 | 1 | 0.08333333 |
| 4 | 7 | 0.58333333 |
| Total | 12 | |

*Probability of Multiplied Win*

| Ball Calls | Any Win | 1x | 2x | 4x | 8x | 10x |
|---|---|---|---|---|---|---|
| 5 or fewer | 1.69183E-05 | 1.44845E-05 | 2.29602E-06 | 1.35275E-07 | 2.48547E-09 | 9.00947E-12 |
| 6-7 | 1.07999E-04 | 9.22581E-05 | 1.48295E-05 | 8.94415E-07 | 1.71730E-08 | 6.96287E-11 |
| 8-11 | 1.17494E-03 | 1.00033E-03 | 1.64164E-04 | 1.02372E-05 | 2.08290E-07 | 9.57022E-10 |
| 12-15 | 4.57182E-03 | 3.88003E-03 | 6.49187E-04 | 4.17034E-05 | 8.90342E-07 | 4.48376E-09 |
| 16-19 | 1.21214E-02 | 1.02595E-02 | 1.74450E-03 | 1.14819E-04 | 2.54784E-06 | 1.38174E-08 |
| 20-23 | 2.57194E-02 | 2.17171E-02 | 3.74465E-03 | 2.51786E-04 | 5.79023E-06 | 3.39049E-08 |
| 24-27 | 4.66955E-02 | 3.93411E-02 | 6.87135E-03 | 4.71716E-04 | 1.12692E-05 | 7.22888E-08 |
| 28-32 | 9.84059E-02 | 8.26910E-02 | 1.46564E-02 | 1.03237E-03 | 2.59763E-05 | 1.89395E-07 |
| 33-38 | 1.82975E-01 | 1.53204E-01 | 2.76911E-02 | 2.02464E-03 | 5.51289E-05 | 4.81149E-07 |
| Frequency | 2.69 | 3.20 | 18.01 | 253.27 | 9,820.2 | 1,256,164 |

Return Percentage: 90.84% (1 - 4 credits), 92.05% (5 credits)

FIG. 57

5800

Pay Tables for 5x5 Cards

Double Bingo (any 2 lines)

*Pay Table*

| Ball Calls | Probability | 1 credit | 2 credits | 3 credits | 4 credits | 5 credits |
|---|---|---|---|---|---|---|
| 16 or fewer | 0.00002509 | 400 | 800 | 1,200 | 1,600 | 4,000 |
| 17-19 | 0.00012641 | 160 | 320 | 480 | 640 | 1,000 |
| 20-23 | 0.00085587 | 80 | 160 | 240 | 320 | 400 |
| 24-25 | 0.00122575 | 40 | 80 | 120 | 160 | 200 |
| 26-30 | 0.00964859 | 9 | 18 | 27 | 36 | 45 |
| 31-32 | 0.00902689 | 6 | 12 | 18 | 24 | 30 |
| 33-34 | 0.01409443 | 4 | 8 | 12 | 16 | 20 |
| 35-38 | 0.05081989 | 2 | 4 | 6 | 8 | 10 |
| 39-46 | 0.23812268 | 1 | 2 | 3 | 4 | 5 |

*Cash Ball Distribution*

| Number of Cash Balls | Count | Probability |
|---|---|---|
| 0 | 10 | 0.23809524 |
| 1 | 1 | 0.02380952 |
| 2 | 6 | 0.14285714 |
| 3 | 9 | 0.21428571 |
| 4 | 16 | 0.38095238 |
| Total | 42 | |

*Probability of Multiplied Win*

| Ball Calls | Any Win | 1x | 2x | 4x | 8x | 10x |
|---|---|---|---|---|---|---|
| 16 or fewer | 2.50870E-05 | 1.91426E-05 | 5.21943E-06 | 6.88845E-07 | 3.55622E-08 | 5.94286E-10 |
| 17-19 | 1.26414E-04 | 9.63184E-05 | 2.63985E-05 | 3.51052E-06 | 1.83100E-07 | 3.10466E-09 |
| 20-23 | 8.55872E-04 | 6.50982E-04 | 1.79507E-04 | 2.40879E-05 | 1.27205E-06 | 2.19605E-08 |
| 24-25 | 1.22575E-03 | 9.31117E-04 | 2.57903E-04 | 3.48409E-05 | 1.85718E-06 | 3.25061E-08 |
| 26-30 | 9.64859E-03 | 7.31406E-03 | 2.04046E-03 | 2.78708E-04 | 1.50914E-05 | 2.70466E-07 |
| 31-32 | 9.02689E-03 | 6.83118E-03 | 1.91678E-03 | 2.64181E-04 | 1.44914E-05 | 2.64873E-07 |
| 33-34 | 1.40944E-02 | 1.06532E-02 | 3.00138E-03 | 4.16330E-04 | 2.30520E-05 | 4.27428E-07 |
| 35-38 | 5.08199E-02 | 3.83327E-02 | 1.08745E-02 | 1.52522E-03 | 8.58374E-05 | 1.63188E-06 |
| 39-46 | 2.38123E-01 | 1.78731E-01 | 5.15290E-02 | 7.41971E-03 | 4.34108E-04 | 8.75418E-06 |
| Frequency | 3.09 | 4.11 | 14.32 | 100.33 | 1,736.3 | 87,666 |

Return Percentage: 90.04% (1 - 4 credits), 92.00% (5 credits)

FIG. 58

5900

Pay Tables for 5x5 Cards

Triple Bingo (any 3 lines)

*Pay Table*

| Ball Calls | Probability | 1 credit | 2 credits | 3 credits | 4 credits | 5 credits |
|---|---|---|---|---|---|---|
| 24 or fewer | 0.00003400 | 500 | 1,000 | 1,500 | 2,000 | 3,500 |
| 25 | 0.00002747 | 250 | 500 | 750 | 1,000 | 1,750 |
| 26-27 | 0.00012156 | 150 | 300 | 450 | 600 | 750 |
| 28-29 | 0.00030638 | 80 | 160 | 240 | 320 | 400 |
| 30-32 | 0.00131906 | 50 | 100 | 150 | 200 | 250 |
| 33-35 | 0.00383164 | 10 | 20 | 30 | 40 | 50 |
| 36-39 | 0.01496656 | 6 | 12 | 18 | 24 | 30 |
| 40-42 | 0.02654790 | 3 | 6 | 9 | 12 | 15 |
| 43-45 | 0.04941917 | 2 | 4 | 6 | 8 | 10 |
| 46-50 | 0.15737156 | 1 | 2 | 3 | 4 | 5 |

*Cash Ball Distribution*

| Number of Cash Balls | Count | Probability |
|---|---|---|
| 0 | 9 | 0.28125000 |
| 1 | 1 | 0.03125000 |
| 2 | 1 | 0.03125000 |
| 3 | 1 | 0.03125000 |
| 4 | 20 | 0.62500000 |
| Total | 32 | |

*Probability of Multiplied Win*

| Ball Calls | Any Win | 1x | 2x | 4x | 8x | 10x |
|---|---|---|---|---|---|---|
| 24 or fewer | 3.39962E-05 | 2.27319E-05 | 8.91639E-06 | 2.13259E-06 | 2.08514E-07 | 6.83999E-09 |
| 25 | 2.74733E-05 | 1.83389E-05 | 7.22038E-06 | 1.73732E-06 | 1.71099E-07 | 5.66240E-09 |
| 26-27 | 1.21557E-04 | 8.10353E-05 | 3.19965E-05 | 7.73420E-06 | 7.65967E-07 | 2.55250E-08 |
| 28-29 | 3.06379E-04 | 2.03922E-04 | 8.07947E-05 | 1.96384E-05 | 1.95819E-06 | 6.58084E-08 |
| 30-32 | 1.31906E-03 | 8.76119E-04 | 3.48682E-04 | 8.53760E-05 | 8.59038E-06 | 2.91990E-07 |
| 33-35 | 3.83164E-03 | 2.53900E-03 | 1.01555E-03 | 2.50726E-04 | 2.54887E-05 | 8.77728E-07 |
| 36-39 | 1.49666E-02 | 9.88827E-03 | 3.97968E-03 | 9.92778E-04 | 1.02251E-04 | 3.58027E-06 |
| 40-42 | 2.65479E-02 | 1.74906E-02 | 7.08066E-03 | 1.78398E-03 | 1.86065E-04 | 6.62073E-06 |
| 43-45 | 4.94192E-02 | 3.24712E-02 | 1.32181E-02 | 3.36209E-03 | 3.54921E-04 | 1.28265E-05 |
| 46-50 | 1.57372E-01 | 1.02973E-01 | 4.22716E-02 | 1.09101E-02 | 1.17339E-03 | 4.34299E-05 |
| Frequency | 3.94 | 6.00 | 14.70 | 57.42 | 539.4 | 14,764 |

Return Percentage: 90.58% (1 - 4 credits), 92.00% (5 credits)

FIG. 59

6000

Pay Tables for 5x5 Cards

Letter X

*Pay Table*

| Ball Calls | Probability | 1 credit | 2 credits | 3 credits | 4 credits | 5 credits |
|---|---|---|---|---|---|---|
| 22 or fewer | 0.00001895 | 1,500 | 3,000 | 4,500 | 6,000 | 10,000 |
| 23-25 | 0.00004515 | 500 | 1,000 | 1,500 | 2,000 | 3,000 |
| 26-30 | 0.00028281 | 250 | 500 | 750 | 1,000 | 1,250 |
| 31-34 | 0.00072925 | 100 | 200 | 300 | 400 | 500 |
| 35-38 | 0.00182249 | 25 | 50 | 75 | 100 | 125 |
| 39-43 | 0.00569644 | 10 | 20 | 30 | 40 | 50 |
| 44-48 | 0.01377155 | 4 | 8 | 12 | 16 | 20 |
| 49-53 | 0.03016846 | 3 | 6 | 9 | 12 | 15 |
| 54-58 | 0.06107945 | 2 | 4 | 6 | 8 | 10 |
| 59-64 | 0.14873808 | 1 | 2 | 3 | 4 | 5 |

*Cash Ball Distribution*

| Number of Cash Balls | Count | Probability |
|---|---|---|
| 0 | 4 | 0.28571429 |
| 1 | 1 | 0.07142857 |
| 2 | 2 | 0.14285714 |
| 3 | 2 | 0.14285714 |
| 4 | 5 | 0.35714286 |
| Total | 14 | |

*Probability of Multiplied Win*

| Ball Calls | Any Win | 1x | 2x | 4x | 8x | 10x |
|---|---|---|---|---|---|---|
| 22 or fewer | 1.89538E-05 | 1.49718E-05 | 3.51105E-06 | 4.47330E-07 | 2.31415E-08 | 3.89851E-10 |
| 23-25 | 4.51546E-05 | 3.56682E-05 | 8.36457E-06 | 1.06570E-06 | 5.51313E-08 | 9.28762E-10 |
| 26-30 | 2.82813E-04 | 2.23398E-04 | 5.23891E-05 | 6.67470E-06 | 3.45299E-07 | 5.81704E-09 |
| 31-34 | 7.29254E-04 | 5.76048E-04 | 1.35089E-04 | 1.72112E-05 | 8.90380E-07 | 1.49997E-08 |
| 35-38 | 1.82249E-03 | 1.43961E-03 | 3.37603E-04 | 4.30128E-05 | 2.22516E-06 | 3.74859E-08 |
| 39-43 | 5.69644E-03 | 4.49970E-03 | 1.05523E-03 | 1.34443E-04 | 6.95506E-06 | 1.17167E-07 |
| 44-48 | 1.37715E-02 | 1.08783E-02 | 2.55108E-03 | 3.25024E-04 | 1.68143E-05 | 2.83260E-07 |
| 49-53 | 3.01685E-02 | 2.38305E-02 | 5.58850E-03 | 7.12010E-04 | 3.68341E-05 | 6.20520E-07 |
| 54-58 | 6.10794E-02 | 4.82475E-02 | 1.13145E-02 | 1.44154E-03 | 7.45748E-05 | 1.25631E-06 |
| 59-64 | 1.48738E-01 | 1.17490E-01 | 2.75527E-02 | 3.51039E-03 | 1.81601E-04 | 3.05932E-06 |
| Frequency | 3.81 | 4.83 | 20.58 | 161.50 | 3,121.9 | 185,315 |

Return Percentage: 90.26% (1 - 4 credits), 92.03% (5 credits)

FIG. 60

6100

Pay Tables for 5x5 Cards

6-Pack

*Pay Table*

| Ball Calls | Probability | 1 credit | 2 credits | 3 credits | 4 credits | 5 credits |
|---|---|---|---|---|---|---|
| 8 or fewer | 0.00004044 | 500 | 1,000 | 1,500 | 2,000 | 4,000 |
| 9-10 | 0.00014486 | 150 | 300 | 450 | 600 | 900 |
| 11-14 | 0.00131626 | 25 | 50 | 75 | 100 | 125 |
| 15-17 | 0.00314624 | 15 | 30 | 45 | 60 | 75 |
| 18-19 | 0.00404028 | 10 | 20 | 30 | 40 | 50 |
| 20-28 | 0.05874589 | 5 | 10 | 15 | 20 | 25 |
| 29-30 | 0.02714807 | 3 | 6 | 9 | 12 | 15 |
| 31-33 | 0.05369727 | 2 | 4 | 6 | 8 | 10 |
| 34-39 | 0.15744214 | 1 | 2 | 3 | 4 | 5 |

*Cash Ball Distribution*

| Number of Cash Balls | Count | Probability |
|---|---|---|
| 0 | 2 | 0.28571429 |
| 1 | 2 | 0.28571429 |
| 2 | 1 | 0.14285714 |
| 3 | 1 | 0.14285714 |
| 4 | 1 | 0.14285714 |
| Total | 7 | |

*Probability of Multiplied Win*

| Ball Calls | Any Win | 1x | 2x | 4x | 8x | 10x |
|---|---|---|---|---|---|---|
| 8 or fewer | 4.04426E-05 | 3.63770E-05 | 3.86162E-06 | 1.99539E-07 | 4.36554E-09 | 2.59381E-11 |
| 9-10 | 1.44857E-04 | 1.30187E-04 | 1.39254E-05 | 7.28288E-07 | 1.62693E-08 | 1.00777E-10 |
| 11-14 | 1.31626E-03 | 1.18126E-03 | 1.28009E-04 | 6.83587E-06 | 1.58330E-07 | 1.05289E-09 |
| 15-17 | 3.14624E-03 | 2.81921E-03 | 3.09719E-04 | 1.69053E-05 | 4.06507E-07 | 2.90137E-09 |
| 18-19 | 4.04028E-03 | 3.61585E-03 | 4.01576E-04 | 2.23017E-05 | 5.52218E-07 | 4.15833E-09 |
| 20-28 | 5.87459E-02 | 5.23694E-02 | 6.01450E-03 | 3.52327E-04 | 9.54154E-06 | 8.41616E-08 |
| 29-30 | 2.71481E-02 | 2.41288E-02 | 2.84123E-03 | 1.73037E-04 | 4.98883E-06 | 4.87096E-08 |
| 31-33 | 5.36973E-02 | 4.76354E-02 | 5.69582E-03 | 3.55277E-04 | 1.06437E-05 | 1.10474E-07 |
| 34-39 | 1.57442E-01 | 1.39147E-01 | 1.71395E-02 | 1.11949E-03 | 3.60724E-05 | 4.18594E-07 |
| Frequency | 3.27 | 3.69 | 30.72 | 488.50 | 16,029.7 | 1,492,141 |

Return Percentage: 90.14% (1 - 4 credits), 91.97% (5 credits)

FIG. 61

6200

Pay Tables for 5x5 Cards

9-Pack

*Pay Table*

| Ball Calls | Probability | 1 credit | 2 credits | 3 credits | 4 credits | 5 credits |
|---|---|---|---|---|---|---|
| 18 or fewer | 0.00002326 | 800 | 1,600 | 2,400 | 3,200 | 5,000 |
| 19-21 | 0.00008441 | 400 | 800 | 1,200 | 1,600 | 2,500 |
| 22-23 | 0.00015052 | 250 | 500 | 750 | 1,000 | 1,250 |
| 24-26 | 0.00055587 | 100 | 200 | 300 | 400 | 500 |
| 27-29 | 0.00138847 | 50 | 100 | 150 | 200 | 250 |
| 30-32 | 0.00308184 | 20 | 40 | 60 | 80 | 100 |
| 33-35 | 0.00621042 | 8 | 16 | 24 | 32 | 40 |
| 36-39 | 0.01705631 | 5 | 10 | 15 | 20 | 25 |
| 40-43 | 0.03419672 | 3 | 6 | 9 | 12 | 15 |
| 44-47 | 0.06119398 | 2 | 4 | 6 | 8 | 10 |
| 48-52 | 0.12924233 | 1 | 2 | 3 | 4 | 5 |

*Cash Ball Distribution*

| Number of Cash Balls | Count | Probability |
|---|---|---|
| 0 | 40 | 0.32786885 |
| 1 | 33 | 0.27049180 |
| 2 | 16 | 0.13114754 |
| 3 | 15 | 0.12295082 |
| 4 | 18 | 0.14754098 |
| Total | 122 | |

*Probability of Multiplied Win*

| Ball Calls | Any Win | 1x | 2x | 4x | 8x | 10x |
|---|---|---|---|---|---|---|
| 18 or fewer | 2.3265E-05 | 1.9873E-05 | 3.0934E-06 | 2.8545E-07 | 1.3005E-08 | 1.9881E-10 |
| 19-21 | 8.4415E-05 | 7.2096E-05 | 1.1233E-05 | 1.0381E-06 | 4.7424E-08 | 7.2873E-10 |
| 22-23 | 1.5052E-04 | 1.2853E-04 | 2.0046E-05 | 1.8559E-06 | 8.5057E-08 | 1.3148E-09 |
| 24-26 | 5.5587E-04 | 4.7452E-04 | 7.4137E-05 | 6.8847E-06 | 3.1724E-07 | 4.9537E-09 |
| 27-29 | 1.3885E-03 | 1.1847E-03 | 1.8562E-04 | 1.7321E-05 | 8.0510E-07 | 1.2776E-08 |
| 30-32 | 3.0818E-03 | 2.6278E-03 | 4.1332E-04 | 3.8829E-05 | 1.8267E-06 | 2.9639E-08 |
| 33-35 | 6.2104E-03 | 5.2908E-03 | 8.3648E-04 | 7.9290E-05 | 3.7903E-06 | 6.3310E-08 |
| 36-39 | 1.7056E-02 | 1.4510E-02 | 2.3130E-03 | 2.2241E-04 | 1.0905E-05 | 1.9059E-07 |
| 40-43 | 3.4197E-02 | 2.9029E-02 | 4.6837E-03 | 4.5981E-04 | 2.3380E-05 | 4.3499E-07 |
| 44-47 | 6.1194E-02 | 5.1801E-02 | 8.4902E-03 | 8.5623E-04 | 4.5595E-05 | 9.1514E-07 |
| 48-52 | 1.2924E-01 | 1.0893E-01 | 1.8279E-02 | 1.9182E-03 | 1.0915E-04 | 2.4268E-06 |
| Frequency | 3.95 | 4.67 | 28.32 | 277.61 | 5,104.2 | 245,071 |

Return Percentage: 90.46% (1 - 4 credits), 92.00% (5 credits)

FIG. 62

6300

Pay Tables for 5x5 Cards

Frame

*Pay Table*

| Ball Calls | Probability | 1 credit | 2 credits | 3 credits | 4 credits | 5 credits |
|---|---|---|---|---|---|---|
| 40 or fewer | 0.00000735 | 1,000 | 2,000 | 3,000 | 4,000 | 10,000 |
| 41-42 | 0.00001212 | 600 | 1,200 | 1,800 | 2,400 | 5,000 |
| 43-45 | 0.00005615 | 400 | 800 | 1,200 | 1,600 | 2,000 |
| 46-48 | 0.00018810 | 250 | 500 | 750 | 1,000 | 1,250 |
| 49-51 | 0.00057540 | 100 | 200 | 300 | 400 | 500 |
| 52-55 | 0.00264030 | 50 | 100 | 150 | 200 | 250 |
| 56-57 | 0.00329272 | 20 | 40 | 60 | 80 | 100 |
| 58-59 | 0.00605969 | 10 | 20 | 30 | 40 | 50 |
| 60-62 | 0.01913786 | 5 | 10 | 15 | 20 | 25 |
| 63-65 | 0.04382473 | 2 | 4 | 6 | 8 | 10 |
| 66-69 | 0.14797184 | 1 | 2 | 3 | 4 | 5 |

*Cash Ball Distribution*

| Number of Cash Balls | Count | Probability |
|---|---|---|
| 0 | 21 | 0.65625000 |
| 1 | 2 | 0.06250000 |
| 2 | 3 | 0.09375000 |
| 3 | 3 | 0.09375000 |
| 4 | 3 | 0.09375000 |
| Total | 32 | |

*Probability of Multiplied Win*

| Ball Calls | Any Win | 1x | 2x | 4x | 8x | 10x |
|---|---|---|---|---|---|---|
| 40 or fewer | 7.3511E-06 | 6.2003E-06 | 9.0678E-07 | 2.1848E-07 | 2.4449E-08 | 1.0319E-09 |
| 41-42 | 1.2124E-05 | 1.0226E-05 | 1.4955E-06 | 3.6032E-07 | 4.0322E-08 | 1.7019E-09 |
| 43-45 | 5.6154E-05 | 4.7363E-05 | 6.9267E-06 | 1.6689E-06 | 1.8676E-07 | 7.8829E-09 |
| 46-48 | 1.8810E-04 | 1.5865E-04 | 2.3202E-05 | 5.5903E-06 | 6.2559E-07 | 2.6405E-08 |
| 49-51 | 5.7540E-04 | 4.8532E-04 | 7.0977E-05 | 1.7101E-05 | 1.9137E-06 | 8.0774E-08 |
| 52-55 | 2.6403E-03 | 2.2270E-03 | 3.2569E-04 | 7.8471E-05 | 8.7815E-06 | 3.7065E-07 |
| 56-57 | 3.2927E-03 | 2.7773E-03 | 4.0617E-04 | 9.7861E-05 | 1.0951E-05 | 4.6223E-07 |
| 58-59 | 6.0597E-03 | 5.1111E-03 | 7.4748E-04 | 1.8010E-04 | 2.0154E-05 | 8.5066E-07 |
| 60-62 | 1.9138E-02 | 1.6142E-02 | 2.3607E-03 | 5.6879E-04 | 6.3651E-05 | 2.6866E-06 |
| 63-65 | 4.3825E-02 | 3.6964E-02 | 5.4059E-03 | 1.3025E-03 | 1.4576E-04 | 6.1521E-06 |
| 66-69 | 1.4797E-01 | 1.2481E-01 | 1.8253E-02 | 4.3978E-03 | 4.9214E-04 | 2.0772E-05 |
| Frequency | 4.47 | 5.30 | 36.23 | 150.37 | 1,343.7 | 31,835 |

Return Percentage: 90.48% (1 - 4 credits), 91.99% (5 credits)

FIG. 63

6400

Pay Tables for 5x5 Cards

Coverall

*Pay Table*

| Ball Calls | Probability | 1 credit | 2 credits | 3 credits | 4 credits | 5 credits |
|---|---|---|---|---|---|---|
| 50 or fewer | 0.00000472 | 2,000 | 4,000 | 6,000 | 8,000 | 12,500 |
| 51-52 | 0.00001183 | 1,500 | 3,000 | 4,500 | 6,000 | 10,000 |
| 53-54 | 0.00003787 | 1,000 | 2,000 | 3,000 | 4,000 | 6,000 |
| 55-56 | 0.00011453 | 500 | 1,000 | 1,500 | 2,000 | 2,500 |
| 57-58 | 0.00032884 | 200 | 400 | 600 | 800 | 1,000 |
| 59-60 | 0.00090075 | 100 | 200 | 300 | 400 | 500 |
| 61-62 | 0.00236338 | 40 | 80 | 120 | 160 | 200 |
| 63-64 | 0.00596119 | 15 | 30 | 45 | 60 | 75 |
| 65-66 | 0.01449997 | 5 | 10 | 15 | 20 | 25 |
| 67-68 | 0.03410691 | 2 | 4 | 6 | 8 | 10 |
| 69-71 | 0.14727288 | 1 | 2 | 3 | 4 | 5 |

*Cash Ball Distribution*

| Number of Cash Balls | Count | Probability |
|---|---|---|
| 0 | 35 | 0.70000000 |
| 1 | 8 | 0.16000000 |
| 2 | 4 | 0.08000000 |
| 3 | 2 | 0.04000000 |
| 4 | 1 | 0.02000000 |
| Total | 50 | |

*Probability of Multiplied Win*

| Ball Calls | Any Win | 1x | 2x | 4x | 8x | 10x |
|---|---|---|---|---|---|---|
| 50 or fewer | 4.7151E-06 | 4.0644E-06 | 5.3204E-07 | 1.0413E-07 | 1.3662E-08 | 8.2443E-10 |
| 51-52 | 1.1825E-05 | 1.0193E-05 | 1.3343E-06 | 2.6116E-07 | 3.4263E-08 | 2.0676E-09 |
| 53-54 | 3.7871E-05 | 3.2645E-05 | 4.2733E-06 | 8.3641E-07 | 1.0973E-07 | 6.6218E-09 |
| 55-56 | 1.1453E-04 | 9.8723E-05 | 1.2923E-05 | 2.5294E-06 | 3.3184E-07 | 2.0025E-08 |
| 57-58 | 3.2884E-04 | 2.8347E-04 | 3.7106E-05 | 7.2627E-06 | 9.5282E-07 | 5.7498E-08 |
| 59-60 | 9.0075E-04 | 7.7645E-04 | 1.0164E-04 | 1.9893E-05 | 2.6099E-06 | 1.5750E-07 |
| 61-62 | 2.3634E-03 | 2.0372E-03 | 2.6668E-04 | 5.2196E-05 | 6.8479E-06 | 4.1323E-07 |
| 63-64 | 5.9612E-03 | 5.1386E-03 | 6.7264E-04 | 1.3166E-04 | 1.7273E-05 | 1.0423E-06 |
| 65-66 | 1.4500E-02 | 1.2499E-02 | 1.6361E-03 | 3.2024E-04 | 4.2014E-05 | 2.5353E-06 |
| 67-68 | 3.4107E-02 | 2.9400E-02 | 3.8485E-03 | 7.5327E-04 | 9.8825E-05 | 5.9636E-06 |
| 69-71 | 1.4727E-01 | 1.2695E-01 | 1.6618E-02 | 3.2526E-03 | 4.2672E-04 | 2.5750E-05 |
| Frequency | 4.86 | 5.64 | 43.10 | 220.22 | 1,678.6 | 27,817 |

Return Percentage: 90.08% (1 - 4 credits), 91.98% (5 credits)

FIG. 64

6500

Pay Tables for 3x3 Cards

Single Bingo (any line)

*Pay Table*

| Ball Calls | Probability | 1 credit | 2 credits | 3 credits | 4 credits | 5 credits |
|---|---|---|---|---|---|---|
| 2 or fewer | 0.00919540 | 14 | 28 | 42 | 56 | 75 |
| 3 | 0.01937603 | 6 | 12 | 18 | 24 | 30 |
| 4-5 | 0.07000688 | 3 | 6 | 9 | 12 | 15 |
| 6-8 | 0.17175132 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 85 | 0.49132948 |
| 1 | 22 | 0.12716763 |
| 2 | 22 | 0.12716763 |
| 3 | 22 | 0.12716763 |
| 4 | 22 | 0.12716763 |
| **Total** | 173 | |

*Win Frequency*

| Win With Bonus Balls | Games per Win |
|---|---|
| 0 | 4.06 |
| 1 | 44.03 |
| 2 | 959.23 |
| 3 | 116,197.45 |
| 4 | 40,383,646.73 |
| Any Win | 3.70 |
| Any Bonus Trigger | 42.08 |

Return Percentage: 90.69% (1 - 4 credits), 92.02% (5 credits)

FIG. 65

6600

Pay Tables for 3x3 Cards

Double Bingo (any 2 lines)

*Pay Table*

| Ball Calls | Probability | 1 credit | 2 credits | 3 credits | 4 credits | 5 credits |
|---|---|---|---|---|---|---|
| 4 or fewer | 0.00065681 | 50 | 100 | 150 | 200 | 300 |
| 5 | 0.00245884 | 10 | 20 | 30 | 40 | 60 |
| 6-8 | 0.03314570 | 5 | 10 | 15 | 20 | 25 |
| 9-13 | 0.21174321 | 2 | 4 | 6 | 8 | 10 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 48 | 0.48484848 |
| 1 | 45 | 0.45454545 |
| 2 | 2 | 0.02020202 |
| 3 | 2 | 0.02020202 |
| 4 | 2 | 0.02020202 |
| Total | 99 | |

*Win Frequency*

| Win With Bonus Balls | Games per Win |
|---|---|
| 0 | 4.41 |
| 1 | 48.58 |
| 2 | 1,456.99 |
| 3 | 32,619.61 |
| 4 | 3,008,461.31 |
| Any Win | 4.03 |
| Any Bonus Trigger | 46.94 |

Return Percentage: 90.37% (1 - 4 credits), 91.97% (5 credits)

FIG. 66

6700

Pay Tables for 3x3 Cards

4-Pack

*Pay Table*

| Ball Calls | Probability | 1 credit | 2 credits | 3 credits | 4 credits | 5 credits |
|---|---|---|---|---|---|---|
| 3 or fewer | 0.00098522 | 40 | 80 | 120 | 160 | 250 |
| 4 | 0.00295567 | 20 | 40 | 60 | 80 | 100 |
| 5-6 | 0.01559176 | 7 | 14 | 21 | 28 | 35 |
| 7-9 | 0.05947554 | 3 | 6 | 9 | 12 | 15 |
| 10-14 | 0.21953365 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 37 | 0.74000000 |
| 1 | 1 | 0.02000000 |
| 2 | 1 | 0.02000000 |
| 3 | 2 | 0.04000000 |
| 4 | 9 | 0.18000000 |
| Total | 50 | |

*Win Frequency*

| Win With Bonus Balls | Games per Win |
|---|---|
| 0 | 3.65 |
| 1 | 44.93 |
| 2 | 402.32 |
| 3 | 14,134.60 |
| 4 | 3,182,247.90 |
| Any Win | 3.35 |
| Any Bonus Trigger | 40.30 |

Return Percentage: 90.56% (1 - 4 credits), 92.03% (5 credits)

FIG. 67

6800

Pay Tables for 3x3 Cards

6-Pack

*Pay Table*

| Ball Calls | Probability | 1 credit | 2 credits | 3 credits | 4 credits | 5 credits |
|---|---|---|---|---|---|---|
| 5 or fewer | 0.00002807 | 750 | 1,500 | 2,250 | 3,000 | 5,000 |
| 6 | 0.00014034 | 225 | 450 | 675 | 900 | 1,250 |
| 7 | 0.00041907 | 120 | 240 | 360 | 480 | 600 |
| 8 | 0.00096883 | 30 | 60 | 90 | 120 | 150 |
| 9 | 0.00191118 | 14 | 28 | 42 | 56 | 70 |
| 10 | 0.00337780 | 9 | 18 | 27 | 36 | 45 |
| 11 | 0.00550238 | 6 | 12 | 18 | 24 | 30 |
| 12 | 0.00841140 | 4 | 8 | 12 | 16 | 20 |
| 13-14 | 0.02920484 | 3 | 6 | 9 | 12 | 15 |
| 15-19 | 0.19033206 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 30 | 0.42253521 |
| 1 | 32 | 0.45070423 |
| 2 | 1 | 0.01408451 |
| 3 | 1 | 0.01408451 |
| 4 | 7 | 0.09859155 |
| Total | 71 | |

FIG. 68

*Win Frequency*

| Win With Bonus Balls | Games per Win |
|---|---|
| 0 | 4.86 |
| 1 | 32.23 |
| 2 | 322.75 |
| 3 | 3,669.73 |
| 4 | 146,816.88 |
| Any Win | 4.16 |
| Any Bonus Trigger | 29.06 |

Return Percentage: 90.22% (1 - 4 credits), 92.00% (5 credits)

6900

Pay Tables for 3x3 Cards

Letter X

*Pay Table*

| Ball Calls | Probability | 1 credit | 2 credits | 3 credits | 4 credits | 5 credits |
|---|---|---|---|---|---|---|
| 4 or fewer | 0.00003649 | 250 | 500 | 750 | 1,000 | 2,000 |
| 5-6 | 0.00051086 | 45 | 90 | 135 | 180 | 250 |
| 7-9 | 0.00405036 | 19 | 38 | 57 | 76 | 95 |
| 10-14 | 0.03192848 | 8 | 16 | 24 | 32 | 40 |
| 15-21 | 0.18186462 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 199 | 0.49874687 |
| 1 | 50 | 0.12531328 |
| 2 | 50 | 0.12531328 |
| 3 | 50 | 0.12531328 |
| 4 | 50 | 0.12531328 |
| Total | 399 | |

FIG. 69

*Win Frequency*

| Win With Bonus Balls | Games per Win |
|---|---|
| 0 | 5.39 |
| 1 | 34.08 |
| 2 | 296.18 |
| 3 | 7,644.11 |
| 4 | 1,001,378.70 |
| Any Win | 4.58 |
| Any Bonus Trigger | 30.44 |

Return Percentage: 90.65% (1 - 4 credits), 91.98% (5 credits)

7000

Pay Tables for 3x3 Cards

Stairs

*Pay Table*

| Ball Calls | Probability | 1 credit | 2 credits | 3 credits | 4 credits | 5 credits |
|---|---|---|---|---|---|---|
| 5 or fewer | 0.00001403 | 400 | 800 | 1,200 | 1,600 | 4,000 |
| 6 | 0.00007017 | 125 | 250 | 375 | 500 | 1,000 |
| 7 | 0.00021003 | 60 | 120 | 180 | 240 | 300 |
| 8-9 | 0.00145643 | 18 | 36 | 54 | 72 | 90 |
| 10-15 | 0.03723401 | 6 | 12 | 18 | 24 | 30 |
| 16-20 | 0.14052777 | 2 | 4 | 6 | 8 | 10 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 5 | 0.50000000 |
| 1 | 2 | 0.20000000 |
| 2 | 1 | 0.10000000 |
| 3 | 1 | 0.10000000 |
| 4 | 1 | 0.10000000 |
| **Total** | 10 | |

FIG. 70

*Win Frequency*

| Win With Bonus Balls | Games per Win |
|---|---|
| 0 | 6.68 |
| 1 | 38.73 |
| 2 | 266.25 |
| 3 | 3,982.92 |
| 4 | 197,564.55 |
| Any Win | 5.57 |
| Any Bonus Trigger | 33.52 |

Return Percentage: 90.26% (1 - 4 credits), 92.02% (5 credits)

7100

Pay Tables for 3x3 Cards

Letter U

*Pay Table*

| Ball Calls | Probability | 1 credit | 2 credits | 3 credits | 4 credits | 5 credits |
|---|---|---|---|---|---|---|
| 7 or fewer | 0.00000049 | 2,500 | 5,000 | 7,500 | 10,000 | 25,000 |
| 8 | 0.00000344 | 800 | 1,600 | 2,400 | 3,200 | 10,000 |
| 9 | 0.00001375 | 500 | 1,000 | 1,500 | 2,000 | 2,500 |
| 10-11 | 0.00014441 | 120 | 240 | 360 | 480 | 600 |
| 12-14 | 0.00152373 | 47 | 94 | 141 | 188 | 235 |
| 15-17 | 0.00786718 | 12 | 24 | 36 | 48 | 60 |
| 18-21 | 0.04756459 | 5 | 10 | 15 | 20 | 25 |
| 22-25 | 0.17900580 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 50 | 0.61728395 |
| 1 | 26 | 0.32098765 |
| 2 | 2 | 0.02469136 |
| 3 | 2 | 0.02469136 |
| 4 | 1 | 0.01234568 |
| Total | 81 | |

FIG. 71

*Win Frequency*

| Win With Bonus Balls | Games per Win |
|---|---|
| 0 | 4.75 |
| 1 | 42.19 |
| 2 | 649.27 |
| 3 | 7,358.93 |
| 4 | 268,601.09 |
| Any Win | 4.24 |
| Any Bonus Trigger | 39.39 |

Return Percentage: 91.18% (1 - 4 credits), 91.98% (5 credits)

7200

Pay Tables for 3x3 Cards

Coverall

*Pay Table*

| Ball Calls | Probability | 1 credit | 2 credits | 3 credits | 4 credits | 5 credits |
|---|---|---|---|---|---|---|
| 9 or fewer | 0.00000154 | 2,500 | 5,000 | 7,500 | 10,000 | 25,000 |
| 10 | 0.00000615 | 1,500 | 3,000 | 4,500 | 6,000 | 12,500 |
| 11-12 | 0.00007688 | 600 | 1,200 | 1,800 | 2,400 | 3,000 |
| 13-14 | 0.00042850 | 228 | 456 | 684 | 912 | 1,140 |
| 15-17 | 0.00364040 | 51 | 102 | 153 | 204 | 255 |
| 18-21 | 0.03061375 | 3 | 6 | 9 | 12 | 15 |
| 22-25 | 0.15002499 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 40 | 0.80000000 |
| 1 | 1 | 0.02000000 |
| 2 | 2 | 0.04000000 |
| 3 | 3 | 0.06000000 |
| 4 | 4 | 0.08000000 |
| Total | 50 | |

FIG. 72

*Win Frequency*

| Win With Bonus Balls | Games per Win |
|---|---|
| 0 | 6.15 |
| 1 | 63.82 |
| 2 | 177.08 |
| 3 | 1,223.21 |
| 4 | 26,482.45 |
| Any Win | 5.41 |
| Any Bonus Trigger | 45.10 |

Return Percentage: 90.45% (1 - 4 credits), 91.99% (5 credits)

7300

Pay Tables for 4x4 Cards

Single Bingo (any line)

*Pay Table*

| Ball Calls | Probability | 1 credit | 2 credits | 3 credits | 4 credits | 5 credits |
|---|---|---|---|---|---|---|
| 4 or fewer | 0.00005139 | 250 | 500 | 750 | 1,000 | 2,000 |
| 5 | 0.00020557 | 100 | 200 | 300 | 400 | 600 |
| 6 | 0.00051393 | 50 | 100 | 150 | 200 | 250 |
| 7 | 0.00102742 | 21 | 42 | 63 | 84 | 105 |
| 8 | 0.00179567 | 12 | 24 | 36 | 48 | 60 |
| 9-10 | 0.00714495 | 8 | 16 | 24 | 32 | 40 |
| 11-12 | 0.01434322 | 5 | 10 | 15 | 20 | 25 |
| 13-14 | 0.02480806 | 3 | 6 | 9 | 12 | 15 |
| 15-16 | 0.03848799 | 2 | 4 | 6 | 8 | 10 |
| 17-22 | 0.21591194 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 5 | 0.45454545 |
| 1 | 3 | 0.27272727 |
| 2 | 1 | 0.09090909 |
| 3 | 1 | 0.09090909 |
| 4 | 1 | 0.09090909 |
| Total | 11 | |

FIG. 73

*Win Frequency*

| Win With Bonus Balls | Games per Win |
|---|---|
| 0 | 3.60 |
| 1 | 39.75 |
| 2 | 690.16 |
| 3 | 26,979.83 |
| 4 | 3,792,891.76 |
| Any Win | 3.29 |
| Any Bonus Trigger | 37.53 |

Return Percentage: 90.22% (1 - 4 credits), 92.01% (5 credits)

7400

Pay Tables for 4x4 Cards

Double Bingo (any 2 lines)

*Pay Table*

| Ball Calls | Probability | 1 credit | 2 credits | 3 credits | 4 credits | 5 credits |
|---|---|---|---|---|---|---|
| 9 or fewer | 0.00001593 | 500 | 1,000 | 1,500 | 2,000 | 4,000 |
| 10 | 0.00003746 | 300 | 600 | 900 | 1,200 | 2,000 |
| 11 | 0.00009385 | 100 | 200 | 300 | 400 | 500 |
| 12 | 0.00020604 | 50 | 100 | 150 | 200 | 250 |
| 13 | 0.00040931 | 25 | 50 | 75 | 100 | 125 |
| 14-15 | 0.00204326 | 12 | 24 | 36 | 48 | 60 |
| 16-17 | 0.00537393 | 8 | 16 | 24 | 32 | 40 |
| 18-19 | 0.01188413 | 5 | 10 | 15 | 20 | 25 |
| 20-21 | 0.02289267 | 3 | 6 | 9 | 12 | 15 |
| 22-24 | 0.06670547 | 2 | 4 | 6 | 8 | 10 |
| 25-28 | 0.17136510 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 8 | 0.66666667 |
| 1 | 1 | 0.08333333 |
| 2 | 1 | 0.08333333 |
| 3 | 1 | 0.08333333 |
| 4 | 1 | 0.08333333 |
| Total | 12 | |

FIG. 74

*Win Frequency*

| Win With Bonus Balls | Games per Win |
|---|---|
| 0 | 4.00 |
| 1 | 37.25 |
| 2 | 248.62 |
| 3 | 3,756.90 |
| 4 | 166,695.88 |
| Any Win | 3.56 |
| Any Bonus Trigger | 32.12 |

Return Percentage: 90.54% (1 - 4 credits), 91.95% (5 credits)

7500

Pay Tables for 4x4 Cards

Triple Bingo (any 3 lines)

*Pay Table*

| Ball Calls | Probability | 1 credit | 2 credits | 3 credits | 4 credits | 5 credits |
|---|---|---|---|---|---|---|
| 12 or fewer | 0.00000394 | 2,000 | 4,000 | 6,000 | 8,000 | 16,000 |
| 13 | 0.00000952 | 1,000 | 2,000 | 3,000 | 4,000 | 8,000 |
| 14 | 0.00002571 | 500 | 1,000 | 1,500 | 2,000 | 2,500 |
| 15 | 0.00006160 | 250 | 500 | 750 | 1,000 | 1,250 |
| 16 | 0.00013410 | 125 | 250 | 375 | 500 | 625 |
| 17 | 0.00026971 | 50 | 100 | 150 | 200 | 250 |
| 18 | 0.00050742 | 27 | 54 | 81 | 108 | 135 |
| 19-21 | 0.00488319 | 10 | 20 | 30 | 40 | 50 |
| 22-24 | 0.01778838 | 5 | 10 | 15 | 20 | 25 |
| 25-27 | 0.04824071 | 3 | 6 | 9 | 12 | 15 |
| 28-32 | 0.20883397 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 15 | 0.78947368 |
| 1 | 1 | 0.05263158 |
| 2 | 1 | 0.05263158 |
| 3 | 1 | 0.05263158 |
| 4 | 1 | 0.05263158 |
| Total | 19 | |

*Win Frequency*

| Win With Bonus Balls | Games per Win |
|---|---|
| 0 | 3.91 |
| 1 | 49.32 |
| 2 | 229.07 |
| 3 | 2,268.48 |
| 4 | 62,460.43 |
| Any Win | 3.56 |
| Any Bonus Trigger | 39.84 |

Return Percentage: 90.35% (1 - 4 credits), 91.98% (5 credits)

FIG. 75

Pay Tables for 4x4 Cards

7600

Letter U

*Pay Table*

| Ball Calls | Probability | 1 credit | 2 credits | 3 credits | 4 credits | 5 credits |
|---|---|---|---|---|---|---|
| 17 or fewer | 0.00000297 | 4,000 | 8,000 | 12,000 | 16,000 | 25,000 |
| 18 | 0.00000372 | 2,000 | 4,000 | 6,000 | 8,000 | 12,500 |
| 19 | 0.00000743 | 1,000 | 2,000 | 3,000 | 4,000 | 6,000 |
| 20 | 0.00001412 | 500 | 1,000 | 1,500 | 2,000 | 2,500 |
| 21 | 0.00002568 | 275 | 550 | 825 | 1,100 | 1,375 |
| 22-23 | 0.00012099 | 75 | 150 | 225 | 300 | 375 |
| 24-27 | 0.00111490 | 35 | 70 | 105 | 140 | 175 |
| 28-31 | 0.00549112 | 15 | 30 | 45 | 60 | 75 |
| 32-35 | 0.02128624 | 6 | 12 | 18 | 24 | 30 |
| 36-42 | 0.19689948 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 19 | 0.70370370 |
| 1 | 1 | 0.03703704 |
| 2 | 1 | 0.03703704 |
| 3 | 1 | 0.03703704 |
| 4 | 5 | 0.18518519 |
| Total | 27 | |

FIG. 76

*Win Frequency*

| Win With Bonus Balls | Games per Win |
|---|---|
| 0 | 5.26 |
| 1 | 38.47 |
| 2 | 126.11 |
| 3 | 967.00 |
| 4 | 22,241.01 |
| Any Win | 4.45 |
| Any Bonus Trigger | 28.57 |

Return Percentage: 90.85% (1 - 4 credits), 92.01% (5 credits)

7700

Pay Tables for 4x4 Cards

6-Pack

*Pay Table*

| Ball Calls | Probability | 1 credit | 2 credits | 3 credits | 4 credits | 5 credits |
|---|---|---|---|---|---|---|
| 8 or fewer | 0.00002732 | 500 | 1,000 | 1,500 | 2,000 | 4,000 |
| 9-12 | 0.00084798 | 55 | 110 | 165 | 220 | 300 |
| 13-17 | 0.00988972 | 11 | 22 | 33 | 44 | 55 |
| 18-22 | 0.04546115 | 4 | 8 | 12 | 16 | 20 |
| 23-29 | 0.20411326 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 15 | 0.25862069 |
| 1 | 35 | 0.60344828 |
| 2 | 4 | 0.06896552 |
| 3 | 2 | 0.03448276 |
| 4 | 2 | 0.03448276 |
| Total | 58 | |

FIG. 77

*Win Frequency*

| Win With Bonus Balls | Games per Win |
|---|---|
| 0 | 4.40 |
| 1 | 31.76 |
| 2 | 730.32 |
| 3 | 14,134.08 |
| 4 | 688,979.89 |
| Any Win | 3.84 |
| Any Bonus Trigger | 30.37 |

Return Percentage: 89.99% (1 - 4 credits), 92.00% (5 credits)

7800

Pay Tables for 4x4 Cards

9-Pack

*Pay Table*

| Ball Calls | Probability | 1 credit | 2 credits | 3 credits | 4 credits | 5 credits |
|---|---|---|---|---|---|---|
| 12 or fewer | 0.00000052 | 3,200 | 6,400 | 9,600 | 12,800 | 25,000 |
| 13-15 | 0.00001139 | 1,600 | 3,200 | 4,800 | 6,400 | 12,500 |
| 16-19 | 0.00020549 | 150 | 300 | 450 | 600 | 750 |
| 20-23 | 0.00165232 | 30 | 60 | 90 | 120 | 150 |
| 24-28 | 0.01281415 | 12 | 24 | 36 | 48 | 60 |
| 29-33 | 0.05681122 | 4 | 8 | 12 | 16 | 20 |
| 34-38 | 0.16849543 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 19 | 0.82608696 |
| 1 | 1 | 0.04347826 |
| 2 | 1 | 0.04347826 |
| 3 | 1 | 0.04347826 |
| 4 | 1 | 0.04347826 |
| Total | 23 | |

FIG. 78

*Win Frequency*

| Win With Bonus Balls | Games per Win |
|---|---|
| 0 | 4.50 |
| 1 | 70.51 |
| 2 | 325.84 |
| 3 | 3,080.02 |
| 4 | 75,268.21 |
| Any Win | 4.17 |
| Any Bonus Trigger | 56.85 |

Return Percentage: 90.34% (1 - 4 credits), 91.90% (5 credits)

7900

Pay Tables for 4x4 Cards

Frame

*Pay Table*

| Ball Calls | Probability | 1 credit | 2 credits | 3 credits | 4 credits | 5 credits |
|---|---|---|---|---|---|---|
| 21 or fewer | 0.00000422 | 2,500 | 5,000 | 7,500 | 10,000 | 20,000 |
| 22-24 | 0.00003460 | 800 | 1,600 | 2,400 | 3,200 | 5,000 |
| 25-28 | 0.00039785 | 160 | 320 | 480 | 640 | 800 |
| 29-32 | 0.00280429 | 40 | 80 | 120 | 160 | 200 |
| 33-36 | 0.01472523 | 5 | 10 | 15 | 20 | 25 |
| 37-39 | 0.03816816 | 3 | 6 | 9 | 12 | 15 |
| 40-41 | 0.05724044 | 2 | 4 | 6 | 8 | 10 |
| 42-43 | 0.10679173 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 20 | 0.80000000 |
| 1 | 2 | 0.08000000 |
| 2 | 1 | 0.04000000 |
| 3 | 1 | 0.04000000 |
| 4 | 1 | 0.04000000 |
| Total | 25 | |

FIG. 79

*Win Frequency*

| Win With Bonus Balls | Games per Win |
|---|---|
| 0 | 4.99 |
| 1 | 64.50 |
| 2 | 277.24 |
| 3 | 2,125.51 |
| 4 | 44,635.64 |
| Any Win | 4.54 |
| Any Bonus Trigger | 51.01 |

Return Percentage: 90.08% (1 - 4 credits), 91.99% (5 credits)

8000

Pay Tables for 4x4 Cards

Coverall

*Pay Table*

| Ball Calls | Probability | 1 credit | 2 credits | 3 credits | 4 credits | 5 credits |
|---|---|---|---|---|---|---|
| 25 or fewer | 0.00000091 | 4,000 | 8,000 | 12,000 | 16,000 | 25,000 |
| 26 | 0.00000145 | 3,000 | 6,000 | 9,000 | 12,000 | 20,000 |
| 27-28 | 0.00001114 | 600 | 1,200 | 1,800 | 2,400 | 6,000 |
| 29-30 | 0.00005100 | 200 | 400 | 600 | 800 | 1,000 |
| 31-32 | 0.00020208 | 75 | 150 | 225 | 300 | 375 |
| 33-34 | 0.00071086 | 21 | 42 | 63 | 84 | 105 |
| 35-36 | 0.00226353 | 13 | 26 | 39 | 52 | 65 |
| 37-38 | 0.00662222 | 9 | 18 | 27 | 36 | 45 |
| 39-40 | 0.01801102 | 6 | 12 | 18 | 24 | 30 |
| 41-42 | 0.04597098 | 3 | 6 | 9 | 12 | 15 |
| 43-44 | 0.11096313 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 35 | 0.79545455 |
| 1 | 1 | 0.02272727 |
| 2 | 1 | 0.02272727 |
| 3 | 1 | 0.02272727 |
| 4 | 6 | 0.13636364 |
| Total | 44 | |

*Win Frequency*

| Win With Bonus Balls | Games per Win |
|---|---|
| 0 | 6.35 |
| 1 | 64.47 |
| 2 | 110.03 |
| 3 | 407.02 |
| 4 | 4,242.35 |
| Any Win | 5.41 |
| Any Bonus Trigger | 36.64 |

Return Percentage: 90.39% (1 - 4 credits), 92.02% (5 credits)

FIG. 80

8100

Pay Tables for 5x5 Cards

Single Bingo (any line)

*Pay Table*

| Ball Calls | Probability | 1 credit | 2 credits | 3 credits | 4 credits | 5 credits |
|---|---|---|---|---|---|---|
| 5 or fewer | 0.00001692 | 500 | 1,000 | 1,500 | 2,000 | 4,000 |
| 6 | 0.00003523 | 200 | 400 | 600 | 800 | 1,900 |
| 7 | 0.00007277 | 100 | 200 | 300 | 400 | 500 |
| 8-9 | 0.00034813 | 40 | 80 | 120 | 160 | 200 |
| 10-12 | 0.00152216 | 12 | 24 | 36 | 48 | 60 |
| 13-16 | 0.00599384 | 8 | 16 | 24 | 32 | 40 |
| 17-21 | 0.02072098 | 5 | 10 | 15 | 20 | 25 |
| 22-27 | 0.06169796 | 3 | 6 | 9 | 12 | 15 |
| 28-35 | 0.18151984 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 0 | 0.00000000 |
| 1 | 33 | 0.52380952 |
| 2 | 10 | 0.15873016 |
| 3 | 10 | 0.15873016 |
| 4 | 10 | 0.15873016 |
| Total | 63 | |

*Win Frequency*

| Win With Bonus Balls | Games per Win |
|---|---|
| 0 | 4.14 |
| 1 | 34.00 |
| 2 | 841.04 |
| 3 | 42,879.47 |
| 4 | 7,175,785.12 |
| Any Win | 3.68 |
| Any Bonus Trigger | 32.66 |

Return Percentage: 90.20% (1 - 4 credits), 92.00% (5 credits)

FIG. 81

8200

Pay Tables for 5x5 Cards

Double Bingo (any 2 lines)

*Pay Table*

| Ball Calls | Probability | 1 credit | 2 credits | 3 credits | 4 credits | 5 credits |
|---|---|---|---|---|---|---|
| 15 or fewer | 0.00001241 | 1,000 | 2,000 | 3,000 | 4,000 | 7,500 |
| 16-17 | 0.00003545 | 300 | 600 | 900 | 1,200 | 2,000 |
| 18-19 | 0.00010364 | 100 | 200 | 300 | 400 | 500 |
| 20-21 | 0.00026234 | 40 | 80 | 120 | 160 | 200 |
| 22-23 | 0.00059353 | 25 | 50 | 75 | 100 | 125 |
| 24-25 | 0.00122575 | 20 | 40 | 60 | 80 | 100 |
| 26-27 | 0.00234482 | 12 | 24 | 36 | 48 | 60 |
| 28-29 | 0.00419837 | 7 | 14 | 21 | 28 | 35 |
| 30-34 | 0.02622672 | 4 | 8 | 12 | 16 | 20 |
| 35-39 | 0.06966874 | 2 | 4 | 6 | 8 | 10 |
| 40-44 | 0.14062075 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 58 | 0.55769231 |
| 1 | 4 | 0.03846154 |
| 2 | 6 | 0.05769231 |
| 3 | 12 | 0.11538462 |
| 4 | 24 | 0.23076923 |
| Total | 104 | |

FIG. 82

*Win Frequency*

| Win With Bonus Balls | Games per Win |
|---|---|
| 0 | 4.75 |
| 1 | 33.11 |
| 2 | 230.74 |
| 3 | 3,916.57 |
| 4 | 197,758.89 |
| Any Win | 4.08 |
| Any Bonus Trigger | 28.74 |

Return Percentage: 90.33% (1 - 4 credits), 92.01% (5 credits)

8300

Pay Tables for 5x5 Cards

Triple Bingo (any 3 lines)

*Pay Table*

| Ball Calls | Probability | 1 credit | 2 credits | 3 credits | 4 credits | 5 credits |
|---|---|---|---|---|---|---|
| 22 or fewer | 0.00000931 | 2,000 | 4,000 | 6,000 | 8,000 | 15,000 |
| 23-24 | 0.00002469 | 1,000 | 2,000 | 3,000 | 4,000 | 5,500 |
| 25-26 | 0.00007363 | 250 | 500 | 750 | 1,000 | 1,250 |
| 27-28 | 0.00019538 | 100 | 200 | 300 | 400 | 500 |
| 29-30 | 0.00046957 | 50 | 100 | 150 | 200 | 250 |
| 31-32 | 0.00103589 | 25 | 50 | 75 | 100 | 125 |
| 33-35 | 0.00383164 | 10 | 20 | 30 | 40 | 50 |
| 36-38 | 0.00959000 | 5 | 10 | 15 | 20 | 25 |
| 39-41 | 0.02101378 | 3 | 6 | 9 | 12 | 15 |
| 42-45 | 0.06032984 | 2 | 4 | 6 | 8 | 10 |
| 46-49 | 0.11737977 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 46 | 0.41818182 |
| 1 | 35 | 0.31818182 |
| 2 | 8 | 0.07272727 |
| 3 | 4 | 0.03636364 |
| 4 | 17 | 0.15454545 |
| Total | 110 | |

FIG. 83

*Win Frequency*

| Win With Bonus Balls | Games per Win |
|---|---|
| 0 | 5.60 |
| 1 | 32.68 |
| 2 | 231.55 |
| 3 | 2,478.19 |
| 4 | 71,715.65 |
| Any Win | 4.67 |
| Any Bonus Trigger | 28.30 |

Return Percentage: 89.95% (1 - 4 credits), 91.99% (5 credits)

8400

Pay Tables for 5x5 Cards

Letter X

*Pay Table*

| Ball Calls | Probability | 1 credit | 2 credits | 3 credits | 4 credits | 5 credits |
|---|---|---|---|---|---|---|
| 20 or fewer | 0.00000747 | 3,000 | 6,000 | 9,000 | 12,000 | 20,000 |
| 21-24 | 0.00003613 | 500 | 1,000 | 1,500 | 2,000 | 3,000 |
| 25-28 | 0.00014063 | 100 | 200 | 300 | 400 | 500 |
| 29-32 | 0.00043923 | 50 | 100 | 150 | 200 | 250 |
| 33-36 | 0.00117017 | 20 | 40 | 60 | 80 | 100 |
| 37-40 | 0.00276476 | 12 | 24 | 36 | 48 | 60 |
| 41-44 | 0.00594675 | 8 | 16 | 24 | 32 | 40 |
| 45-48 | 0.01186152 | 5 | 10 | 15 | 20 | 25 |
| 49-52 | 0.02223863 | 3 | 6 | 9 | 12 | 15 |
| 53-56 | 0.03959183 | 2 | 4 | 6 | 8 | 10 |
| 57-62 | 0.11621114 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 0 | 0.00000000 |
| 1 | 48 | 0.51063830 |
| 2 | 13 | 0.13829787 |
| 3 | 13 | 0.13829787 |
| 4 | 20 | 0.21276596 |
| Total | 94 | |

*Win Frequency*

| Win With Bonus Balls | Games per Win |
|---|---|
| 0 | 6.25 |
| 1 | 27.05 |
| 2 | 310.41 |
| 3 | 6,467.80 |
| 4 | 407,212.68 |
| Any Win | 4.99 |
| Any Bonus Trigger | 24.78 |

Return Percentage: 90.01% (1 - 4 credits), 92.00% (5 credits)

FIG. 84

8500

Pay Tables for 5x5 Cards

6-Pack

*Pay Table*

| Ball Calls | Probability | 1 credit | 2 credits | 3 credits | 4 credits | 5 credits |
|---|---|---|---|---|---|---|
| 7 or fewer | 0.00001500 | 600 | 1,200 | 1,800 | 2,400 | 6,000 |
| 8-9 | 0.00007689 | 200 | 400 | 600 | 800 | 1,250 |
| 10-11 | 0.00025020 | 50 | 100 | 150 | 200 | 250 |
| 12-19 | 0.00834600 | 16 | 32 | 48 | 64 | 80 |
| 20-26 | 0.03772145 | 6 | 12 | 18 | 24 | 30 |
| 27-37 | 0.19954869 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 25 | 0.28089888 |
| 1 | 26 | 0.29213483 |
| 2 | 15 | 0.16853933 |
| 3 | 13 | 0.14606742 |
| 4 | 10 | 0.11235955 |
| **Total** | 89 | |

FIG. 85

*Win Frequency*

| Win With Bonus Balls | Games per Win |
|---|---|
| 0 | 4.56 |
| 1 | 39.54 |
| 2 | 688.45 |
| 3 | 24,981.71 |
| 4 | 2,566,763.83 |
| Any Win | 4.07 |
| Any Bonus Trigger | 37.33 |

Return Percentage: 90.07% (1 - 4 credits), 92.01% (5 credits)

8600

Pay Tables for 5x5 Cards

9-Pack

*Pay Table*

| Ball Calls | Probability | 1 credit | 2 credits | 3 credits | 4 credits | 5 credits |
|---|---|---|---|---|---|---|
| 16 or fewer | 0.00000685 | 900 | 1,800 | 2,700 | 3,600 | 10,000 |
| 17-19 | 0.00003328 | 200 | 400 | 600 | 800 | 1,500 |
| 20-25 | 0.00052571 | 100 | 200 | 300 | 400 | 500 |
| 26-30 | 0.00241860 | 20 | 40 | 60 | 80 | 100 |
| 31-39 | 0.02556666 | 9 | 18 | 27 | 36 | 45 |
| 40-51 | 0.19351364 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 40 | 0.34188034 |
| 1 | 33 | 0.28205128 |
| 2 | 4 | 0.03418803 |
| 3 | 27 | 0.23076923 |
| 4 | 13 | 0.11111111 |
| Total | 117 | |

FIG. 86

*Win Frequency*

| Win With Bonus Balls | Games per Win |
|---|---|
| 0 | 5.32 |
| 1 | 32.59 |
| 2 | 315.20 |
| 3 | 6,177.79 |
| 4 | 386,356.39 |
| Any Win | 4.50 |
| Any Bonus Trigger | 29.39 |

Return Percentage: 90.20% (1 - 4 credits), 92.02% (5 credits)

8700

Pay Tables for 5x5 Cards

Frame

*Pay Table*

| Ball Calls | Probability | 1 credit | 2 credits | 3 credits | 4 credits | 5 credits |
|---|---|---|---|---|---|---|
| 38 or fewer | 0.00000260 | 3,500 | 7,000 | 10,500 | 14,000 | 25,000 |
| 39-41 | 0.00000945 | 1,500 | 3,000 | 4,500 | 6,000 | 10,000 |
| 42-44 | 0.00003668 | 400 | 800 | 1,200 | 1,600 | 2,000 |
| 45-48 | 0.00021499 | 100 | 200 | 300 | 400 | 500 |
| 49-52 | 0.00094834 | 30 | 60 | 90 | 120 | 150 |
| 53-56 | 0.00365913 | 10 | 20 | 30 | 40 | 50 |
| 57-61 | 0.01884826 | 3 | 6 | 9 | 12 | 15 |
| 62-66 | 0.07632919 | 2 | 4 | 6 | 8 | 10 |
| 67-69 | 0.12371762 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 107 | 0.53233831 |
| 1 | 65 | 0.32338308 |
| 2 | 20 | 0.09950249 |
| 3 | 7 | 0.03482587 |
| 4 | 2 | 0.00995025 |
| Total | 201 | |

FIG. 87

*Win Frequency*

| Win With Bonus Balls | Games per Win |
|---|---|
| 0 | 9.06 |
| 1 | 43.93 |
| 2 | 366.69 |
| 3 | 3,889.73 |
| 4 | 84,462.65 |
| Any Win | 7.35 |
| Any Bonus Trigger | 38.82 |

Return Percentage: 90.36% (1 - 4 credits), 91.98% (5 credits)

Pay Tables for 5x5 Cards

8800

Coverall

*Pay Table*

| Ball Calls | Probability | 1 credit | 2 credits | 3 credits | 4 credits | 5 credits |
|---|---|---|---|---|---|---|
| 50 or fewer | 0.00000472 | 4,000 | 8,000 | 12,000 | 16,000 | 25,000 |
| 51-52 | 0.00001183 | 2,000 | 4,000 | 6,000 | 8,000 | 12,500 |
| 53-54 | 0.00003787 | 1,500 | 3,000 | 4,500 | 6,000 | 7,500 |
| 55-56 | 0.00011453 | 600 | 1,200 | 1,800 | 2,400 | 3,000 |
| 57-58 | 0.00032884 | 150 | 300 | 450 | 600 | 750 |
| 59-60 | 0.00090075 | 50 | 100 | 150 | 200 | 250 |
| 61-62 | 0.00236338 | 25 | 50 | 75 | 100 | 125 |
| 63-64 | 0.00596119 | 10 | 20 | 30 | 40 | 50 |
| 65-67 | 0.02801982 | 4 | 8 | 12 | 16 | 20 |
| 68-70 | 0.09836037 | 1 | 2 | 3 | 4 | 5 |

*Bonus Free Games and Multipliers*

| Number Used | Free Plays | Multiplier |
|---|---|---|
| 1 | 9 | 2 |
| 2 | 9 | 4 |
| 3 | 9 | 8 |
| 4 | 9 | 10 |

*Bonus Ball Pool*

| Number of Bonus Balls | Count | Probability |
|---|---|---|
| 0 | 107 | 0.53233831 |
| 1 | 65 | 0.32338308 |
| 2 | 20 | 0.09950249 |
| 3 | 7 | 0.03482587 |
| 4 | 2 | 0.00995025 |
| Total | 201 | |

FIG. 88

*Win Frequency*

| Win With Bonus Balls | Games per Win |
|---|---|
| 0 | 9.06 |
| 1 | 43.93 |
| 2 | 366.69 |
| 3 | 3,889.73 |
| 4 | 84,462.65 |
| Any Win | 7.35 |
| Any Bonus Trigger | 38.82 |

Return Percentage: 90.36% (1 - 4 credits), 91.98% (5 credits)

8900

Pay Tables for 3x3 Cards

Single Bingo (any line)

| Ball Calls | Probability | 1 credit | 2 credits | 3 credits | 4 credits | 5 credits |
|---|---|---|---|---|---|---|
| 2 or fewer | 0.00919540 | 24 | 48 | 72 | 96 | 125 |
| 3 | 0.01937603 | 8 | 16 | 24 | 32 | 40 |
| 4 | 0.02988506 | 3 | 6 | 9 | 12 | 15 |
| 5-6 | 0.08968380 | 2 | 4 | 6 | 8 | 10 |
| 7-10 | 0.26365491 | 1 | 2 | 3 | 4 | 5 |

Win Frequency: 2.43

Return Percentage: 90.84% (1 - 4 credits), 91.76% (5 credits)

Standard Deviation: 2.57 (1 - 4 credits), 2.65 (5 credits)

Double Bingo (any 2 lines)

| Ball Calls | Probability | 1 credit | 2 credits | 3 credits | 4 credits | 5 credits |
|---|---|---|---|---|---|---|
| 4 or fewer | 0.00065681 | 100 | 200 | 300 | 400 | 625 |
| 5 | 0.00245884 | 40 | 80 | 120 | 160 | 200 |
| 6 | 0.00571260 | 20 | 40 | 60 | 80 | 100 |
| 7 | 0.01054103 | 5 | 10 | 15 | 20 | 25 |
| 8-9 | 0.04144799 | 4 | 8 | 12 | 16 | 20 |
| 10-11 | 0.07553630 | 3 | 6 | 9 | 12 | 15 |
| 12-14 | 0.17933524 | 1 | 2 | 3 | 4 | 5 |

Win Frequency: 3.17

Return Percentage: 90.27% (1 - 4 credits), 91.91% (5 credits)

Standard Deviation: 3.71 (1 - 4 credits), 4.17 (5 credits)

FIG. 89

9000

Pay Tables for 3x3 Cards

4-Pack

| Ball Calls | Probability | 1 credit | 2 credits | 3 credits | 4 credits | 5 credits |
|---|---|---|---|---|---|---|
| 3 or fewer | 0.00098522 | 150 | 300 | 450 | 600 | 800 |
| 4 | 0.00295567 | 60 | 120 | 180 | 240 | 300 |
| 5-6 | 0.01559176 | 7 | 14 | 21 | 28 | 35 |
| 7-8 | 0.03398913 | 4 | 8 | 12 | 16 | 20 |
| 9-11 | 0.09513597 | 2 | 4 | 6 | 8 | 10 |
| 12-14 | 0.14988408 | 1 | 2 | 3 | 4 | 5 |

Win Frequency: 3.35

Return Percentage: 91.04% (1 - 4 credits), 92.02% (5 credits)

Standard Deviation: 5.82 (1 - 4 credits), 6.07 (5 credits)

6-Pack

| Ball Calls | Probability | 1 credit | 2 credits | 3 credits | 4 credits | 5 credits |
|---|---|---|---|---|---|---|
| 5 or fewer | 0.00002807 | 1,250 | 2,500 | 3,750 | 5,000 | 8,750 |
| 6-7 | 0.00055942 | 100 | 200 | 300 | 400 | 500 |
| 8-11 | 0.01176019 | 25 | 50 | 75 | 100 | 125 |
| 12-14 | 0.03761623 | 6 | 12 | 18 | 24 | 30 |
| 15-16 | 0.05236271 | 3 | 6 | 9 | 12 | 15 |
| 17-19 | 0.13796935 | 1 | 2 | 3 | 4 | 5 |

Win Frequency: 4.16

Return Percentage: 90.58% (1 - 4 credits), 91.98% (5 credits)

Standard Deviation: 7.61 (1 - 4 credits), 10.00 (5 credits)

FIG. 90

9100

Pay Tables for 3x3 Cards

Letter X

| Ball Calls | Probability | 1 credit | 2 credits | 3 credits | 4 credits | 5 credits |
|---|---|---|---|---|---|---|
| 4 or fewer | 0.00003649 | 500 | 1,000 | 1,500 | 2,000 | 4,000 |
| 5-6 | 0.00051086 | 50 | 100 | 150 | 200 | 250 |
| 7-8 | 0.00200693 | 30 | 60 | 90 | 120 | 150 |
| 9-11 | 0.00948732 | 10 | 20 | 30 | 40 | 50 |
| 12-14 | 0.02448458 | 6 | 12 | 18 | 24 | 30 |
| 15-19 | 0.10490786 | 3 | 6 | 9 | 12 | 15 |
| 20-24 | 0.24630542 | 1 | 2 | 3 | 4 | 5 |

Win Frequency: 2.58

Return Percentage: 90.68% (1 - 4 credits), 91.78% (5 credits)

Standard Deviation: 3.80 (1 - 4 credits), 5.35 (5 credits)

Letter T

| Ball Calls | Probability | 1 credit | 2 credits | 3 credits | 4 credits | 5 credits |
|---|---|---|---|---|---|---|
| 4 or fewer | 0.00003649 | 500 | 1,000 | 1,500 | 2,000 | 4,000 |
| 5-6 | 0.00051086 | 100 | 200 | 300 | 400 | 500 |
| 7-8 | 0.00200693 | 50 | 100 | 150 | 200 | 250 |
| 9-10 | 0.00510856 | 24 | 48 | 72 | 96 | 120 |
| 11-12 | 0.01039956 | 10 | 20 | 30 | 40 | 50 |
| 13-14 | 0.01846378 | 7 | 14 | 21 | 28 | 35 |
| 15-18 | 0.07513228 | 3 | 6 | 9 | 12 | 15 |
| 19-22 | 0.15526364 | 1 | 2 | 3 | 4 | 5 |

Win Frequency: 3.75

Return Percentage: 90.62% (1 - 4 credits), 91.71% (5 credits)

Standard Deviation: 4.91 (1 - 4 credits), 6.19 (5 credits)

FIG. 91

9200

Pay Tables for 3x3 Cards

Letter U

| Ball Calls | Probability | 1 credit | 2 credits | 3 credits | 4 credits | 5 credits |
|---|---|---|---|---|---|---|
| 10 or fewer | 0.00005894 | 500 | 1,000 | 1,500 | 2,000 | 4,000 |
| 11-12 | 0.00033009 | 100 | 200 | 300 | 400 | 500 |
| 13-14 | 0.00129679 | 35 | 70 | 105 | 140 | 175 |
| 15-18 | 0.01394636 | 15 | 30 | 45 | 60 | 75 |
| 19 | 0.00911877 | 10 | 20 | 30 | 40 | 50 |
| 20 | 0.01332744 | 7 | 14 | 21 | 28 | 35 |
| 21 | 0.01903920 | 5 | 10 | 15 | 20 | 25 |
| 22-23 | 0.06330533 | 3 | 6 | 9 | 12 | 15 |
| 24-25 | 0.11570046 | 1 | 2 | 3 | 4 | 5 |

Win Frequency: 4.24

Return Percentage: 90.24% (1 - 4 credits), 92.00% (5 credits)

Standard Deviation: 4.97 (1 - 4 credits), 6.90 (5 credits)

Coverall

| Ball Calls | Probability | 1 credit | 2 credits | 3 credits | 4 credits | 5 credits |
|---|---|---|---|---|---|---|
| 10 or fewer | 0.00000769 | 2,000 | 4,000 | 6,000 | 8,000 | 20,000 |
| 11 | 0.00002050 | 500 | 1,000 | 1,500 | 2,000 | 2,500 |
| 12 | 0.00005638 | 250 | 500 | 750 | 1,000 | 1,250 |
| 13-14 | 0.00042850 | 100 | 200 | 300 | 400 | 500 |
| 15-16 | 0.00168582 | 25 | 50 | 75 | 100 | 125 |
| 17-18 | 0.00527736 | 10 | 20 | 30 | 40 | 50 |
| 19-21 | 0.02729097 | 6 | 12 | 18 | 24 | 30 |
| 22-23 | 0.04900524 | 4 | 8 | 12 | 16 | 20 |
| 24-26 | 0.18314962 | 2 | 4 | 6 | 8 | 10 |

Win Frequency: 3.75

Return Percentage: 90.36% (1 - 4 credits), 91.89% (5 credits)

Standard Deviation: 6.85 (1 - 4 credits), 11.80 (5 credits)

FIG. 92

9300

Pay Tables for 3x3 Cards

Stairs

| Ball Calls | Probability | 1 credit | 2 credits | 3 credits | 4 credits | 5 credits |
|---|---|---|---|---|---|---|
| 5 or fewer | 0.00001403 | 1,000 | 2,000 | 3,000 | 4,000 | 10,000 |
| 6 | 0.00007017 | 100 | 200 | 300 | 400 | 750 |
| 7-8 | 0.00069780 | 50 | 100 | 150 | 200 | 250 |
| 9-10 | 0.00269575 | 20 | 40 | 60 | 80 | 100 |
| 11-12 | 0.00724854 | 10 | 20 | 30 | 40 | 50 |
| 13-16 | 0.04495698 | 5 | 10 | 15 | 20 | 25 |
| 17-20 | 0.12382917 | 2 | 4 | 6 | 8 | 10 |

Win Frequency: 2.34

Return Percentage: 90.18% (1 - 4 credits), 91.93% (5 credits)

Standard Deviation: 4.40 (1 - 4 credits), 7.89 (5 credits)

FIG. 93

9400

Pay Tables for 4x4 Cards

Single Bingo (any line)

| Ball Calls | Probability | 1 credit | 2 credits | 3 credits | 4 credits | 5 credits |
|---|---|---|---|---|---|---|
| 4 or fewer | 0.00005139 | 250 | 500 | 750 | 1,000 | 2,500 |
| 5 | 0.00020557 | 125 | 250 | 375 | 500 | 750 |
| 6 | 0.00051393 | 80 | 160 | 240 | 320 | 400 |
| 7-8 | 0.00282309 | 40 | 80 | 120 | 160 | 200 |
| 9-10 | 0.00714495 | 9 | 18 | 27 | 36 | 45 |
| 11-12 | 0.01434322 | 6 | 12 | 18 | 24 | 30 |
| 13-14 | 0.02480806 | 3 | 6 | 9 | 12 | 15 |
| 15-19 | 0.12713362 | 2 | 4 | 6 | 8 | 10 |
| 20-24 | 0.22993233 | 1 | 2 | 3 | 4 | 5 |

Win Frequency: 2.46

Return Percentage: 90.16% (1 - 4 credits), 91.96% (5 credits)

Standard Deviation: 3.93 (1 - 4 credits), 5.15 (5 credits)

Double Bingo (any 2 lines)

| Ball Calls | Probability | 1 credit | 2 credits | 3 credits | 4 credits | 5 credits |
|---|---|---|---|---|---|---|
| 9 or fewer | 0.00001593 | 750 | 1,500 | 2,250 | 3,000 | 7,500 |
| 10-12 | 0.00033736 | 100 | 200 | 300 | 400 | 600 |
| 13-14 | 0.00116051 | 50 | 100 | 150 | 200 | 250 |
| 15-16 | 0.00339631 | 25 | 50 | 75 | 100 | 125 |
| 17-18 | 0.00814533 | 12 | 24 | 36 | 48 | 60 |
| 19-20 | 0.01675429 | 6 | 12 | 18 | 24 | 30 |
| 21-23 | 0.05241438 | 3 | 6 | 9 | 12 | 15 |
| 24-26 | 0.10045992 | 2 | 4 | 6 | 8 | 10 |
| 27-29 | 0.15638657 | 1 | 2 | 3 | 4 | 5 |

Win Frequency: 2.95

Return Percentage: 90.14% (1 - 4 credits), 92.01% (5 credits)

Standard Deviation: 4.40 (1 - 4 credits), 6.90 (5 credits)

FIG. 94

9500

Pay Tables for 4x4 Cards

Triple Bingo (any 3 lines)

| Ball Calls | Probability | 1 credit | 2 credits | 3 credits | 4 credits | 5 credits |
|---|---|---|---|---|---|---|
| 12 or fewer | 0.00000394 | 1,000 | 2,000 | 3,000 | 4,000 | 25,000 |
| 13-14 | 0.00003523 | 400 | 800 | 1,200 | 1,600 | 2,500 |
| 15-16 | 0.00019570 | 100 | 200 | 300 | 400 | 500 |
| 17-18 | 0.00077713 | 50 | 100 | 150 | 200 | 250 |
| 19-20 | 0.00242379 | 20 | 40 | 60 | 80 | 100 |
| 21-22 | 0.00627600 | 9 | 18 | 27 | 36 | 45 |
| 23-24 | 0.01397178 | 5 | 10 | 15 | 20 | 25 |
| 25-26 | 0.02735690 | 4 | 8 | 12 | 16 | 20 |
| 27-29 | 0.08160465 | 3 | 6 | 9 | 12 | 15 |
| 30-32 | 0.14811313 | 2 | 4 | 6 | 8 | 10 |

Win Frequency: 3.56

Return Percentage: 90.17% (1 - 4 credits), 92.10% (5 credits)

Standard Deviation: 4.03 (1 - 4 credits), 10.68 (5 credits)

Letter U

| Ball Calls | Probability | 1 credit | 2 credits | 3 credits | 4 credits | 5 credits |
|---|---|---|---|---|---|---|
| 22 or fewer | 0.00009886 | 100 | 200 | 300 | 400 | 1,250 |
| 23-25 | 0.00040089 | 50 | 100 | 150 | 200 | 300 |
| 26-29 | 0.00256260 | 34 | 68 | 102 | 136 | 170 |
| 30-33 | 0.01108916 | 20 | 40 | 60 | 80 | 100 |
| 34-37 | 0.03910414 | 10 | 20 | 30 | 40 | 50 |
| 38-42 | 0.17171100 | 1 | 2 | 3 | 4 | 5 |

Win Frequency: 4.45

Return Percentage: 90.16% (1 - 4 credits), 92.04% (5 credits)

Standard Deviation: 3.56 (1 - 4 credits), 4.27 (5 credits)

FIG. 95

9600

Pay Tables for 4x4 Cards

6-Pack

| Ball Calls | Probability | 1 credit | 2 credits | 3 credits | 4 credits | 5 credits |
|---|---|---|---|---|---|---|
| 8 or fewer | 0.00002732 | 500 | 1,000 | 1,500 | 2,000 | 4,000 |
| 9-10 | 0.00017543 | 150 | 300 | 450 | 600 | 1,000 |
| 11-13 | 0.00140229 | 30 | 60 | 90 | 120 | 150 |
| 14-15 | 0.00292946 | 20 | 40 | 60 | 80 | 100 |
| 16-17 | 0.00623051 | 10 | 20 | 30 | 40 | 50 |
| 18-23 | 0.06258360 | 5 | 10 | 15 | 20 | 25 |
| 24-25 | 0.04527183 | 3 | 6 | 9 | 12 | 15 |
| 26-27 | 0.06192614 | 2 | 4 | 6 | 8 | 10 |
| 28-30 | 0.12626538 | 1 | 2 | 3 | 4 | 5 |

Win Frequency: 3.26

Return Percentage: 90.18% (1 - 4 credits), 91.88% (5 credits)

Standard Deviation: 3.92 (1 - 4 credits), 5.39 (5 credits)

9-Pack

| Ball Calls | Probability | 1 credit | 2 credits | 3 credits | 4 credits | 5 credits |
|---|---|---|---|---|---|---|
| 16 or fewer | 0.00002718 | 500 | 1,000 | 1,500 | 2,000 | 5,000 |
| 17-18 | 0.00008771 | 400 | 800 | 1,200 | 1,600 | 2,250 |
| 19 | 0.00010251 | 250 | 500 | 750 | 1,000 | 1,250 |
| 20-21 | 0.00046647 | 100 | 200 | 300 | 400 | 500 |
| 22-24 | 0.00227567 | 50 | 100 | 150 | 200 | 250 |
| 25-26 | 0.00392407 | 20 | 40 | 60 | 80 | 100 |
| 27-28 | 0.00780026 | 8 | 16 | 24 | 32 | 40 |
| 29-31 | 0.02516344 | 5 | 10 | 15 | 20 | 25 |
| 32-33 | 0.03164778 | 3 | 6 | 9 | 12 | 15 |
| 34-36 | 0.08256653 | 2 | 4 | 6 | 8 | 10 |
| 37-39 | 0.13954195 | 1 | 2 | 3 | 4 | 5 |

Win Frequency: 3.41

Return Percentage: 90.11% (1 - 4 credits), 91.90% (5 credits)

Standard Deviation: 6.34 (1 - 4 credits), 8.02 (5 credits)

FIG. 96

Pay Tables for 4x4 Cards

9700

Frame

| Ball Calls | Probability | 1 credit | 2 credits | 3 credits | 4 credits | 5 credits |
|---|---|---|---|---|---|---|
| 22 or fewer | 0.00000928 | 1,250 | 2,500 | 3,750 | 5,000 | 10,000 |
| 23 | 0.00001013 | 800 | 1,600 | 2,400 | 3,200 | 6,250 |
| 24-25 | 0.00005524 | 400 | 800 | 1,200 | 1,600 | 2,500 |
| 26-28 | 0.00036202 | 200 | 400 | 600 | 800 | 1,000 |
| 29-30 | 0.00080483 | 100 | 200 | 300 | 400 | 500 |
| 31-32 | 0.00199946 | 50 | 100 | 150 | 200 | 250 |
| 33-34 | 0.00462994 | 21 | 42 | 63 | 84 | 105 |
| 35-36 | 0.01009528 | 10 | 20 | 30 | 40 | 50 |
| 37-38 | 0.02089605 | 5 | 10 | 15 | 20 | 25 |
| 39-40 | 0.04132968 | 2 | 4 | 6 | 8 | 10 |
| 41-44 | 0.22253704 | 1 | 2 | 3 | 4 | 5 |

Win Frequency: 3.30

Return Percentage: 90.25% (1 - 4 credits), 91.96% (5 credits)

Standard Deviation: 7.78 (1 - 4 credits), 9.87 (5 credits)

Coverall

| Ball Calls | Probability | 1 credit | 2 credits | 3 credits | 4 credits | 5 credits |
|---|---|---|---|---|---|---|
| 26 or fewer | 0.00000236 | 2,000 | 4,000 | 6,000 | 8,000 | 25,000 |
| 27-28 | 0.00001114 | 1,200 | 2,400 | 3,600 | 4,800 | 8,000 |
| 29 | 0.00001661 | 800 | 1,600 | 2,400 | 3,200 | 4,000 |
| 30-32 | 0.00023648 | 400 | 800 | 1,200 | 1,600 | 2,000 |
| 33 | 0.00025089 | 200 | 400 | 600 | 800 | 1,000 |
| 34 | 0.00045997 | 100 | 200 | 300 | 400 | 500 |
| 35-36 | 0.00226353 | 40 | 80 | 120 | 160 | 200 |
| 37-39 | 0.01348356 | 10 | 20 | 30 | 40 | 50 |
| 40-41 | 0.02898916 | 5 | 10 | 15 | 20 | 25 |
| 42-43 | 0.07189160 | 2 | 4 | 6 | 8 | 10 |
| 44-45 | 0.16916622 | 1 | 2 | 3 | 4 | 5 |

Win Frequency: 3.49

FIG. 97

Return Percentage: 90.54% (1 - 4 credits), 91.69% (5 credits)

Standard Deviation: 9.69 (1 - 4 credits), 12.48 (5 credits)

9800

Pay Tables for 5x5 Cards

Single Bingo (any line)

| Ball Calls | Probability | 1 credit | 2 credits | 3 credits | 4 credits | 5 credits |
|---|---|---|---|---|---|---|
| 5 or fewer | 0.00001692 | 250 | 500 | 750 | 1,000 | 4,000 |
| 6-7 | 0.00010800 | 40 | 80 | 120 | 160 | 250 |
| 8-12 | 0.00187029 | 25 | 50 | 75 | 100 | 125 |
| 13-17 | 0.00865751 | 8 | 16 | 24 | 32 | 40 |
| 18-20 | 0.01222174 | 6 | 12 | 18 | 24 | 30 |
| 21-22 | 0.01274169 | 4 | 8 | 12 | 16 | 20 |
| 23-28 | 0.07061549 | 3 | 6 | 9 | 12 | 15 |
| 29-33 | 0.10827991 | 2 | 4 | 6 | 8 | 10 |
| 34-40 | 0.23111956 | 1 | 2 | 3 | 4 | 5 |

Win Frequency: 2.24

Return Percentage: 90.84% (1 - 4 credits), 91.88% (5 credits)

Standard Deviation: 2.02 (1 - 4 credits), 3.73 (5 credits)

Double Bingo (any 2 lines)

| Ball Calls | Probability | 1 credit | 2 credits | 3 credits | 4 credits | 5 credits |
|---|---|---|---|---|---|---|
| 16 or fewer | 0.00002509 | 250 | 500 | 750 | 1,000 | 4,000 |
| 17-19 | 0.00012641 | 160 | 320 | 480 | 640 | 1,000 |
| 20-23 | 0.00085587 | 80 | 160 | 240 | 320 | 400 |
| 24-25 | 0.00122575 | 50 | 100 | 150 | 200 | 250 |
| 26-30 | 0.00964859 | 10 | 20 | 30 | 40 | 50 |
| 31-32 | 0.00902689 | 7 | 14 | 21 | 28 | 35 |
| 33-34 | 0.01409443 | 5 | 10 | 15 | 20 | 25 |
| 35-39 | 0.06966874 | 3 | 6 | 9 | 12 | 15 |
| 40-48 | 0.30879621 | 1 | 2 | 3 | 4 | 5 |

Win Frequency: 2.42

Return Percentage: 90.42% (1 - 4 credits), 92.31% (5 credits)

Standard Deviation: 3.90 (1 - 4 credits), 5.61 (5 credits)

FIG. 98

9900

Pay Tables for 5x5 Cards

Triple Bingo (any 3 lines)

| Ball Calls | Probability | 1 credit | 2 credits | 3 credits | 4 credits | 5 credits |
|---|---|---|---|---|---|---|
| 24 or fewer | 0.00003400 | 250 | 500 | 750 | 1,000 | 4,000 |
| 25 | 0.00002747 | 350 | 700 | 1,050 | 1,400 | 2,000 |
| 26-29 | 0.00042794 | 160 | 320 | 480 | 640 | 800 |
| 30-31 | 0.00070447 | 80 | 160 | 240 | 320 | 400 |
| 32-33 | 0.00149468 | 50 | 100 | 150 | 200 | 250 |
| 34-37 | 0.00841133 | 10 | 20 | 30 | 40 | 50 |
| 38-39 | 0.00950678 | 6 | 12 | 18 | 24 | 30 |
| 40-41 | 0.01563722 | 4 | 8 | 12 | 16 | 20 |
| 42-45 | 0.06032984 | 3 | 6 | 9 | 12 | 15 |
| 46-53 | 0.30158336 | 1 | 2 | 3 | 4 | 5 |

Win Frequency: 2.51

Return Percentage: 90.40% (1 - 4 credits), 92.40% (5 credits)

Standard Deviation: 5.11 (1 - 4 credits), 6.84 (5 credits)

Letter X

| Ball Calls | Probability | 1 credit | 2 credits | 3 credits | 4 credits | 5 credits |
|---|---|---|---|---|---|---|
| 23 or fewer | 0.00002906 | 250 | 500 | 750 | 1,000 | 4,000 |
| 24-26 | 0.00006354 | 200 | 400 | 600 | 800 | 1,250 |
| 27-28 | 0.00009163 | 100 | 200 | 300 | 400 | 500 |
| 29-32 | 0.00043923 | 50 | 100 | 150 | 200 | 250 |
| 33-42 | 0.00637256 | 20 | 40 | 60 | 80 | 100 |
| 43-48 | 0.01537064 | 7 | 14 | 21 | 28 | 35 |
| 49-50 | 0.00945582 | 5 | 10 | 15 | 20 | 25 |
| 51-53 | 0.02071264 | 3 | 6 | 9 | 12 | 15 |
| 54-61 | 0.12201402 | 2 | 4 | 6 | 8 | 10 |
| 62-68 | 0.26359835 | 1 | 2 | 3 | 4 | 5 |

Win Frequency: 2.28

Return Percentage: 90.32% (1 - 4 credits), 92.23% (5 credits)

Standard Deviation: 3.17 (1 - 4 credits), 5.31 (5 credits)

FIG. 99

10000

Pay Tables for 5x5 Cards

6-Pack

| Ball Calls | Probability | 1 credit | 2 credits | 3 credits | 4 credits | 5 credits |
|---|---|---|---|---|---|---|
| 8 or fewer | 0.00004044 | 500 | 1,000 | 1,500 | 2,000 | 4,000 |
| 9-10 | 0.00014486 | 150 | 300 | 450 | 600 | 1,000 |
| 11-14 | 0.00131626 | 25 | 50 | 75 | 100 | 125 |
| 15-17 | 0.00314624 | 15 | 30 | 45 | 60 | 75 |
| 18-19 | 0.00404028 | 9 | 18 | 27 | 36 | 45 |
| 20-28 | 0.05874589 | 5 | 10 | 15 | 20 | 25 |
| 29-30 | 0.02714807 | 3 | 6 | 9 | 12 | 15 |
| 31-33 | 0.05369727 | 2 | 4 | 6 | 8 | 10 |
| 34-42 | 0.25861980 | 1 | 2 | 3 | 4 | 5 |

Win Frequency: 2.46

Return Percentage: 89.96% (1 - 4 credits), 91.90% (5 credits)

Standard Deviation: 4.07 (1 - 4 credits), 5.91 (5 credits)

9-Pack

| Ball Calls | Probability | 1 credit | 2 credits | 3 credits | 4 credits | 5 credits |
|---|---|---|---|---|---|---|
| 18 or fewer | 0.00002326 | 500 | 1,000 | 1,500 | 2,000 | 5,000 |
| 19-21 | 0.00008441 | 400 | 800 | 1,200 | 1,600 | 2,500 |
| 22-23 | 0.00015052 | 250 | 500 | 750 | 1,000 | 1,250 |
| 24-26 | 0.00055587 | 100 | 200 | 300 | 400 | 500 |
| 27-30 | 0.00217037 | 50 | 100 | 150 | 200 | 250 |
| 31-33 | 0.00393140 | 20 | 40 | 60 | 80 | 100 |
| 34-37 | 0.01150317 | 8 | 16 | 24 | 32 | 40 |
| 38-40 | 0.01671903 | 5 | 10 | 15 | 20 | 25 |
| 41-44 | 0.03996404 | 3 | 6 | 9 | 12 | 15 |
| 45-48 | 0.06957455 | 2 | 4 | 6 | 8 | 10 |
| 49-53 | 0.14232368 | 1 | 2 | 3 | 4 | 5 |

Win Frequency: 3.48

Return Percentage: 90.27% (1 - 4 credits), 92.28% (5 credits)

Standard Deviation: 6.51 (1 - 4 credits), 8.21 (5 credits)

FIG. 100

10100

Pay Tables for 5x5 Cards

Large Frame

| Ball Calls | Probability | 1 credit | 2 credits | 3 credits | 4 credits | 5 credits |
|---|---|---|---|---|---|---|
| 40 or fewer | 0.00000735 | 1,250 | 2,500 | 3,750 | 5,000 | 10,000 |
| 41-42 | 0.00001212 | 800 | 1,600 | 2,400 | 3,200 | 5,000 |
| 43-46 | 0.00009649 | 400 | 800 | 1,200 | 1,600 | 2,500 |
| 47-49 | 0.00027563 | 250 | 500 | 750 | 1,000 | 1,250 |
| 50-53 | 0.00134461 | 100 | 200 | 300 | 400 | 500 |
| 54-55 | 0.00174323 | 50 | 100 | 150 | 200 | 250 |
| 56-57 | 0.00329272 | 20 | 40 | 60 | 80 | 100 |
| 58-59 | 0.00605969 | 10 | 20 | 30 | 40 | 50 |
| 60-62 | 0.01913786 | 5 | 10 | 15 | 20 | 25 |
| 63-68 | 0.13990873 | 2 | 4 | 6 | 8 | 10 |
| 69 | 0.05188783 | 1 | 2 | 3 | 4 | 5 |

Win Frequency: 4.47

Return Percentage: 90.19% (1 - 4 credits), 91.94% (5 credits)

Standard Deviation: 8.48 (1 - 4 credits), 10.14 (5 credits)

Coverall

| Ball Calls | Probability | 1 credit | 2 credits | 3 credits | 4 credits | 5 credits |
|---|---|---|---|---|---|---|
| 50 or fewer | 0.00000472 | 2,500 | 5,000 | 7,500 | 10,000 | 25,000 |
| 51-52 | 0.00001183 | 1,200 | 2,400 | 3,600 | 4,800 | 7,500 |
| 53-54 | 0.00003787 | 800 | 1,600 | 2,400 | 3,200 | 4,000 |
| 55-56 | 0.00011453 | 400 | 800 | 1,200 | 1,600 | 2,000 |
| 57-58 | 0.00032884 | 200 | 400 | 600 | 800 | 1,000 |
| 59-60 | 0.00090075 | 100 | 200 | 300 | 400 | 500 |
| 61-62 | 0.00236338 | 40 | 80 | 120 | 160 | 200 |
| 63-64 | 0.00596119 | 15 | 30 | 45 | 60 | 75 |
| 65-66 | 0.01449997 | 5 | 10 | 15 | 20 | 25 |
| 67-70 | 0.11188023 | 2 | 4 | 6 | 8 | 10 |
| 71-72 | 0.17230099 | 1 | 2 | 3 | 4 | 5 |

Win Frequency: 3.24

FIG. 101

Return Percentage: 91.04% (1 - 4 credits), 92.58% (5 credits)

Standard Deviation: 10.79 (1 - 4 credits), 14.64 (5 credits)

10200

Pay Tables for 3x3 Cards

Low Volatility

| Credits Bet | Pattern | Pay (credits) | Ball Calls | Probability | 1/Probability | Combined RTP |
|---|---|---|---|---|---|---|
| 1 | Single | 2 | 10 | 0.41179520 | 2.43 | 82.36% |
| 2 | Double | 7 | 11 | 0.13635358 | 7.33 | 88.90% |
| 3 | 4-Pack | 12 | 9 | 0.07900819 | 12.66 | 90.87% |
| 4 | 6-Pack | 18 | 14 | 0.04996391 | 20.01 | 90.64% |
| 5 | Letter X | 25 | 14 | 0.03652618 | 27.38 | 90.77% |
| 6 | Letter T | 36 | 13 | 0.02609013 | 38.33 | 91.30% |
| 7 | Stairs | 55 | 13 | 0.01721949 | 58.07 | 91.79% |
| 8 | Letter U | 165 | 16 | 0.00561941 | 177.95 | 91.90% |
| 9 | Coverall | 425 | 16 | 0.00219890 | 454.77 | 92.07% |

Win Frequency (max bet): 2.23 games per win

Standard Deviation of RTP (max bet): 4.09

Medium Volatility

| Credits Bet | Pattern | Pay (credits) | Ball Calls | Probability | 1/Probability | Combined RTP |
|---|---|---|---|---|---|---|
| 1 | Single | 3 | 8 | 0.27032962 | 3.70 | 81.10% |
| 2 | Double | 10 | 10 | 0.09400684 | 10.64 | 87.55% |
| 3 | 4-Pack | 18 | 8 | 0.05352179 | 18.68 | 90.48% |
| 4 | 6-Pack | 28 | 13 | 0.03297304 | 30.33 | 90.94% |
| 5 | Letter X | 35 | 13 | 0.02609013 | 38.33 | 91.02% |
| 6 | Letter T | 52 | 12 | 0.01806240 | 55.36 | 91.50% |
| 7 | Stairs | 145 | 11 | 0.00632184 | 158.18 | 91.53% |
| 8 | Letter U | 300 | 15 | 0.00316092 | 316.36 | 91.94% |
| 9 | Coverall | 1,800 | 14 | 0.00051308 | 1,949.03 | 91.98% |

Win Frequency (max bet): 3.13 games per win

Standard Deviation of RTP (max bet): 6.43

FIG. 102

10300

Pay Tables for 3x3 Cards

High Volatility

| Credits Bet | Pattern | Pay (credits) | Ball Calls | Probability | 1/Probability | Combined RTP |
|---|---|---|---|---|---|---|
| 1 | Single | 4 | 7 | 0.20591217 | 4.86 | 82.36% |
| 2 | Double | 15 | 9 | 0.06081728 | 16.44 | 89.84% |
| 3 | 4-Pack | 27 | 7 | 0.03387170 | 29.52 | 90.38% |
| 4 | 6-Pack | 45 | 12 | 0.02075907 | 48.17 | 91.14% |
| 5 | Letter X | 76 | 11 | 0.01204160 | 83.05 | 91.21% |
| 6 | Letter T | 122 | 10 | 0.00766284 | 130.50 | 91.59% |
| 7 | Stairs | 265 | 10 | 0.00347775 | 287.54 | 91.67% |
| 8 | Letter U | 550 | 14 | 0.00168582 | 593.18 | 91.80% |
| 9 | Coverall | 4,250 | 13 | 0.00021989 | 4,547.73 | 91.99% |

Win Frequency (max bet): 4.15 games per win

Standard Deviation of RTP (max bet): 9.22

FIG. 103

10400

Pay Tables for 4x4 Cards

Low Volatility

| Credits Bet | Pattern | Pay (credits) | Ball Calls | Probability | 1/Probability | Combined RTP |
|---|---|---|---|---|---|---|
| 1 | Single | 4 | 20 | 0.21532077 | 4.64 | 86.13% |
| 2 | Double | 5 | 26 | 0.18268401 | 5.47 | 88.74% |
| 3 | 6-Pack | 22 | 21 | 0.04229495 | 23.64 | 90.17% |
| 4 | Triple | 40 | 24 | 0.02368357 | 42.22 | 91.31% |
| 5 | Crazy Kite | 77 | 20 | 0.01195957 | 83.62 | 91.47% |
| 6 | 9-Pack | 133 | 26 | 0.00688361 | 145.27 | 91.48% |
| 7 | Letter U | 200 | 30 | 0.00459354 | 217.70 | 91.54% |
| 8 | Frame | 750 | 30 | 0.00124150 | 805.48 | 91.73% |
| 9 | Coverall | 1,800 | 33 | 0.00051746 | 1,932.50 | 91.89% |

Win Frequency (max bet): 3.31 games per win

Standard Deviation of RTP (max bet): 7.01

Medium Volatility

| Credits Bet | Pattern | Pay (credits) | Ball Calls | Probability | 1/Probability | Combined RTP |
|---|---|---|---|---|---|---|
| 1 | Single | 5 | 19 | 0.17702384 | 5.65 | 88.51% |
| 2 | Double | 11 | 23 | 0.08222409 | 12.16 | 89.48% |
| 3 | 6-Pack | 30 | 20 | 0.03116607 | 32.09 | 90.82% |
| 4 | Triple | 60 | 23 | 0.01542216 | 64.84 | 91.25% |
| 5 | Crazy Kite | 110 | 19 | 0.00844051 | 118.48 | 91.57% |
| 6 | 9-Pack | 310 | 24 | 0.00295954 | 337.89 | 91.60% |
| 7 | Letter U | 465 | 28 | 0.00200637 | 498.41 | 91.84% |
| 8 | Frame | 1,240 | 29 | 0.00074490 | 1,342.47 | 91.91% |
| 9 | Coverall | 3,500 | 32 | 0.00026657 | 3,751.33 | 92.06% |

Win Frequency (max bet): 4.70 games per win

Standard Deviation of RTP (max bet): 9.35

FIG. 104

10500

Pay Tables for 4x4 Cards

High Volatility

| Credits Bet | Pattern | Pay (credits) | Ball Calls | Probability | 1/Probability | Combined RTP |
|---|---|---|---|---|---|---|
| 1 | Single | 6 | 18 | 0.14311041 | 6.99 | 85.87% |
| 2 | Double | 22 | 21 | 0.04295659 | 23.28 | 90.19% |
| 3 | 6-Pack | 41 | 19 | 0.02244959 | 44.54 | 90.80% |
| 4 | Triple | 95 | 22 | 0.00971179 | 102.97 | 91.17% |
| 5 | Crazy Kite | 158 | 18 | 0.00581812 | 171.88 | 91.32% |
| 6 | 9-Pack | 500 | 23 | 0.00186971 | 534.84 | 91.68% |
| 7 | Letter U | 1,140 | 26 | 0.00081210 | 1,231.37 | 91.81% |
| 8 | Frame | 2,100 | 28 | 0.00043666 | 2,290.09 | 91.80% |
| 9 | Coverall | 7,000 | 31 | 0.00013329 | 7,502.65 | 91.96% |

Win Frequency (max bet): 6.14 games per win

Standard Deviation of RTP (max bet): 12.7

FIG. 105

10600

Pay Tables for 5x5 Cards

Low Volatility

| Credits Bet | Pattern | Pay (credits) | Ball Calls | Probability | 1/Probability | Combined RTP |
|---|---|---|---|---|---|---|
| 1 | Single | 2 | 40 | 0.44563111 | 2.24 | 89.13% |
| 2 | 6-Pack | 3 | 39 | 0.30572145 | 3.27 | 90.42% |
| 3 | Double | 6 | 41 | 0.15127232 | 6.61 | 90.54% |
| 4 | 9-Pack | 26 | 40 | 0.03513804 | 28.46 | 90.74% |
| 5 | Triple | 84 | 37 | 0.01109989 | 90.09 | 91.24% |
| 6 | Letter X | 132 | 42 | 0.00699602 | 142.94 | 91.43% |
| 7 | Letter T | 256 | 39 | 0.00364670 | 274.22 | 91.70% |
| 8 | Frame | 770 | 52 | 0.00121206 | 825.04 | 91.90% |
| 9 | Coverall | 3,200 | 57 | 0.00029180 | 3,426.96 | 92.07% |

Win Frequency (max bet): 1.81 games per win

Standard Deviation of RTP (max bet): 7.60

Medium Volatility

| Credits Bet | Pattern | Pay (credits) | Ball Calls | Probability | 1/Probability | Combined RTP |
|---|---|---|---|---|---|---|
| 1 | Single | 4 | 33 | 0.21451154 | 4.66 | 85.80% |
| 2 | 6-Pack | 6 | 33 | 0.14827931 | 6.74 | 87.39% |
| 3 | Double | 14 | 37 | 0.06967158 | 14.35 | 90.77% |
| 4 | 9-Pack | 40 | 38 | 0.02302319 | 43.43 | 91.10% |
| 5 | Triple | 83 | 37 | 0.01109989 | 90.09 | 91.31% |
| 6 | Letter X | 255 | 39 | 0.00364670 | 274.22 | 91.59% |
| 7 | Letter T | 667 | 35 | 0.00139504 | 716.82 | 91.80% |
| 8 | Frame | 1,600 | 50 | 0.00057587 | 1,736.51 | 91.84% |
| 9 | Coverall | 3,200 | 57 | 0.00029180 | 3,426.96 | 92.01% |

Win Frequency (max bet): 3.23 games per win

Standard Deviation of RTP (max bet): 8.67

FIG. 106

10700

Pay Tables for 5x5 Cards

High Volatility

| Credits Bet | Pattern | Pay (credits) | Ball Calls | Probability | 1/Probability | Combined RTP |
|---|---|---|---|---|---|---|
| 1 | Single | 6 | 30 | 0.14353947 | 6.97 | 86.12% |
| 2 | 6-Pack | 10 | 30 | 0.09458204 | 10.57 | 90.35% |
| 3 | Double | 25 | 34 | 0.03500303 | 28.57 | 90.57% |
| 4 | 9-Pack | 50 | 37 | 0.01841901 | 54.29 | 90.95% |
| 5 | Triple | 165 | 35 | 0.00564011 | 177.30 | 91.37% |
| 6 | Letter X | 320 | 38 | 0.00289866 | 344.99 | 91.60% |
| 7 | Letter T | 860 | 34 | 0.00107617 | 929.22 | 91.74% |
| 8 | Frame | 3,500 | 48 | 0.00026372 | 3,791.85 | 91.81% |
| 9 | Coverall | 17,500 | 54 | 0.00005441 | 18,378.44 | 92.19% |

Win Frequency (max bet): 4.64 games per win

Standard Deviation of RTP (max bet): 16.7

FIG. 107

10800

Pay Tables for 3x3 Cards

Single Bingo (any line)

*Pay Table*

| Ball Calls | Probability | 1 credit | 2 credits | 3 credits | 4 credits | 5 credits |
|---|---|---|---|---|---|---|
| 1 | 0.00994377 | 40 | 80 | 120 | 160 | 210 |
| 2 | 0.02496828 | 6 | 12 | 18 | 24 | 30 |
| 3 | 0.03781854 | 3 | 6 | 9 | 12 | 15 |
| 4-7 | 0.23912978 | 1 | 2 | 3 | 4 | 5 |

*Wild Ball Pool*

| Number of Wild Balls | Count | Probability |
|---|---|---|
| 0 | 46 | 0.42201835 |
| 1 | 63 | 0.57798165 |
| Total | 109 | |

Return Percentage: 90.01% (1 - 4 credits), 92.00% (5 credits)

Win Frequency: 1 in 3.21

FIG. 108

10900

Pay Tables for 3x3 Cards

Double Bingo (any 2 lines)

*Pay Table*

| Ball Calls | Probability | 1 credit | 2 credits | 3 credits | 4 credits | 5 credits |
|---|---|---|---|---|---|---|
| 3 | 0.00056175 | 60 | 120 | 180 | 240 | 400 |
| 4-5 | 0.00879074 | 30 | 60 | 90 | 120 | 150 |
| 6-8 | 0.05860471 | 7 | 14 | 21 | 28 | 35 |
| 9-12 | 0.20108378 | 1 | 2 | 3 | 4 | 5 |

*Wild Ball Pool*

| Number of Wild Balls | Count | Probability |
|---|---|---|
| 0 | 557 | 0.55811623 |
| 1 | 441 | 0.44188377 |
| Total | 998 | |

Return Percentage: 90.87% (1 - 4 credits), 92.00% (5 credits)

Win Frequency: 1 in 3.72

FIG. 109

Pay Tables for 3x3 Cards

11000

4-Pack

*Pay Table*

| Ball Calls | Probability | 1 credit | 2 credits | 3 credits | 4 credits | 5 credits |
|---|---|---|---|---|---|---|
| 2 | 0.00134456 | 100 | 200 | 300 | 400 | 550 |
| 3 | 0.00457071 | 20 | 40 | 60 | 80 | 100 |
| 4-5 | 0.02425375 | 7 | 14 | 21 | 28 | 35 |
| 6-8 | 0.08440379 | 3 | 6 | 9 | 12 | 15 |
| 9-13 | 0.25764959 | 1 | 2 | 3 | 4 | 5 |

*Wild Ball Pool*

| Number of Wild Balls | Count | Probability |
|---|---|---|
| 0 | 68 | 0.49635036 |
| 1 | 69 | 0.50364964 |
| Total | 137 | |

Return Percentage: 90.65% (1 - 4 credits), 92.00% (5 credits)

Win Frequency: 1 in 2.69

FIG. 110

Pay Tables for 3x3 Cards

11100

6-Pack

*Pay Table*

| Ball Calls | Probability | 1 credit | 2 credits | 3 credits | 4 credits | 5 credits |
|---|---|---|---|---|---|---|
| 5 or fewer | 0.00028739 | 200 | 400 | 600 | 800 | 1,200 |
| 6 | 0.00072175 | 50 | 100 | 150 | 200 | 300 |
| 7 | 0.00164445 | 40 | 80 | 120 | 160 | 200 |
| 8 | 0.00316380 | 30 | 60 | 90 | 120 | 150 |
| 9 | 0.00541670 | 20 | 40 | 60 | 80 | 100 |
| 10 | 0.00850752 | 10 | 20 | 30 | 40 | 50 |
| 11 | 0.01249623 | 7 | 14 | 21 | 28 | 35 |
| 12 | 0.01738952 | 4 | 8 | 12 | 16 | 20 |
| 13-14 | 0.05275700 | 2 | 4 | 6 | 8 | 10 |
| 15-18 | 0.19104154 | 1 | 2 | 3 | 4 | 5 |

*Wild Ball Pool*

| Number of Wild Balls | Count | Probability |
|---|---|---|
| 0 | 66 | 0.60550459 |
| 1 | 43 | 0.39449541 |
| Total | 109 | |

Return Percentage: 90.13% (1 - 4 credits), 92.00% (5 credits)

Win Frequency: 1 in 3.41

FIG. 111

11200

Pay Tables for 3x3 Cards

Letter X

*Pay Table*

| Ball Calls | Probability | 1 credit | 2 credits | 3 credits | 4 credits | 5 credits |
|---|---|---|---|---|---|---|
| 4 or fewer | 0.00018385 | 250 | 500 | 750 | 1,000 | 1,500 |
| 5-6 | 0.00131570 | 45 | 90 | 135 | 180 | 250 |
| 7-9 | 0.00809723 | 19 | 38 | 57 | 76 | 95 |
| 10-14 | 0.05168675 | 8 | 16 | 24 | 32 | 40 |
| 15-21 | 0.23173639 | 1 | 2 | 3 | 4 | 5 |

*Wild Ball Pool*

| Number of Wild Balls | Count | Probability |
|---|---|---|
| 0 | 760 | 0.75924076 |
| 1 | 241 | 0.24075924 |
| Total | 1001 | |

Return Percentage: 90.42% (1 - 4 credits), 92.00% (5 credits)

Win Frequency: 1 in 3.41

FIG. 112

Pay Tables for 3x3 Cards

11300

Stairs

*Pay Table*

| Ball Calls | Probability | 1 credit | 2 credits | 3 credits | 4 credits | 5 credits |
|---|---|---|---|---|---|---|
| 5 or fewer | 0.00010424 | 600 | 1,200 | 1,800 | 2,400 | 3,500 |
| 6 | 0.00027783 | 125 | 250 | 375 | 500 | 750 |
| 7 | 0.00065921 | 60 | 120 | 180 | 240 | 300 |
| 8-9 | 0.00365265 | 18 | 36 | 54 | 72 | 90 |
| 10-15 | 0.06508496 | 5 | 10 | 15 | 20 | 25 |
| 16-20 | 0.18733978 | 2 | 4 | 6 | 8 | 10 |

*Wild Ball Pool*

| Number of Wild Balls | Count | Probability |
|---|---|---|
| 0 | 73 | 0.73000000 |
| 1 | 27 | 0.27000000 |
| Total | 100 | |

Return Percentage: 90.27% (1 - 4 credits), 92.01% (5 credits)

Win Frequency: 1 in 3.89

FIG. 113

Pay Tables for 3x3 Cards

11400

Letter U

*Pay Table*

| Ball Calls | Probability | 1 credit | 2 credits | 3 credits | 4 credits | 5 credits |
|---|---|---|---|---|---|---|
| 7 or fewer | 0.00000464 | 2,500 | 5,000 | 7,500 | 10,000 | 25,000 |
| 8 | 0.00001714 | 800 | 1,600 | 2,400 | 3,200 | 6,000 |
| 9 | 0.00005269 | 500 | 1,000 | 1,500 | 2,000 | 2,500 |
| 10-11 | 0.00042670 | 120 | 240 | 360 | 480 | 600 |
| 12-14 | 0.00350460 | 40 | 80 | 120 | 160 | 200 |
| 15-17 | 0.01486918 | 10 | 20 | 30 | 40 | 50 |
| 18-21 | 0.07282762 | 4 | 8 | 12 | 16 | 20 |
| 22-25 | 0.21853006 | 1 | 2 | 3 | 4 | 5 |

*Wild Ball Pool*

| Number of Wild Balls | Count | Probability |
|---|---|---|
| 0 | 608 | 0.79685452 |
| 1 | 155 | 0.20314548 |
| **Total** | 763 | |

Return Percentage: 90.16% (1 - 4 credits), 92.00% (5 credits)

Win Frequency: 1 in 3.22

FIG. 114

11500

Pay Tables for 3x3 Cards

Coverall

*Pay Table*

| Ball Calls | Probability | 1 credit | 2 credits | 3 credits | 4 credits | 5 credits |
|---|---|---|---|---|---|---|
| 9 or fewer | 0.00000607 | 3,000 | 6,000 | 9,000 | 12,000 | 25,000 |
| 10 | 0.00001745 | 1,500 | 3,000 | 4,500 | 6,000 | 9,000 |
| 11-12 | 0.00017223 | 600 | 1,200 | 1,800 | 2,400 | 3,000 |
| 13-14 | 0.00081149 | 200 | 400 | 600 | 800 | 1,000 |
| 15-17 | 0.00587652 | 50 | 100 | 150 | 200 | 250 |
| 18-21 | 0.04169647 | 3 | 6 | 9 | 12 | 15 |
| 22-25 | 0.17370371 | 1 | 2 | 3 | 4 | 5 |

*Wild Ball Pool*

| Number of Wild Balls | Count | Probability |
|---|---|---|
| 0 | 483 | 0.89114391 |
| 1 | 59 | 0.10885609 |
| Total | 542 | |

Return Percentage: 90.27% (1 - 4 credits), 92.00% (5 credits)

Win Frequency: 1 in 4.50

FIG. 115

11600

Pay Tables for 4x4 Cards

Single Bingo (any line)

*Pay Table*

| Ball Calls | Probability | 1 credit | 2 credits | 3 credits | 4 credits | 5 credits |
|---|---|---|---|---|---|---|
| 4 or fewer | 0.00023711 | 250 | 500 | 750 | 1,000 | 1,500 |
| 5 | 0.00056020 | 100 | 200 | 300 | 400 | 550 |
| 6 | 0.00118630 | 50 | 100 | 150 | 200 | 250 |
| 7 | 0.00212844 | 21 | 42 | 63 | 84 | 105 |
| 8 | 0.00342251 | 12 | 24 | 36 | 48 | 60 |
| 9-10 | 0.01222386 | 8 | 16 | 24 | 32 | 40 |
| 11-12 | 0.02187325 | 5 | 10 | 15 | 20 | 25 |
| 13-14 | 0.03419839 | 3 | 6 | 9 | 12 | 15 |
| 15-16 | 0.04854673 | 2 | 4 | 6 | 8 | 10 |
| 17-22 | 0.23531142 | 1 | 2 | 3 | 4 | 5 |

*Wild Ball Pool*

| Number of Wild Balls | Count | Probability |
|---|---|---|
| 0 | 131 | 0.79878049 |
| 1 | 33 | 0.20121951 |
| Total | 164 | |

Return Percentage: 90.25% (1 - 4 credits), 92.00% (5 credits)

Win Frequency: 1 in 2.78

FIG. 116

11700

Pay Tables for 4x4 Cards

Double Bingo (any 2 lines)

*Pay Table*

| Ball Calls | Probability | 1 credit | 2 credits | 3 credits | 4 credits | 5 credits |
|---|---|---|---|---|---|---|
| 9 or fewer | 0.00009127 | 500 | 1,000 | 1,500 | 2,000 | 3,000 |
| 10 | 0.00015553 | 300 | 600 | 900 | 1,200 | 1,750 |
| 11 | 0.00033067 | 100 | 200 | 300 | 400 | 500 |
| 12 | 0.00063392 | 50 | 100 | 150 | 200 | 250 |
| 13 | 0.00112056 | 25 | 50 | 75 | 100 | 125 |
| 14-15 | 0.00476227 | 12 | 24 | 36 | 48 | 60 |
| 16-17 | 0.01060512 | 8 | 16 | 24 | 32 | 40 |
| 18-19 | 0.02034950 | 5 | 10 | 15 | 20 | 25 |
| 20-21 | 0.03465750 | 3 | 6 | 9 | 12 | 15 |
| 22-24 | 0.08810483 | 2 | 4 | 6 | 8 | 10 |
| 25-28 | 0.19381518 | 1 | 2 | 3 | 4 | 5 |

*Wild Ball Pool*

| Number of Wild Balls | Count | Probability |
|---|---|---|
| 0 | 89 | 0.71774194 |
| 1 | 35 | 0.28225806 |
| **Total** | 124 | |

Return Percentage: 90.28% (1 - 4 credits), 91.97% (5 credits)

Win Frequency: 1 in 2.82

FIG. 117

Pay Tables for 4x4 Cards

11800

Triple Bingo (any 3 lines)

*Pay Table*

| Ball Calls | Probability | 1 credit | 2 credits | 3 credits | 4 credits | 5 credits |
|---|---|---|---|---|---|---|
| 12 or fewer | 0.00001909 | 1,500 | 3,000 | 4,500 | 6,000 | 10,000 |
| 13 | 0.00003508 | 1,000 | 2,000 | 3,000 | 4,000 | 6,000 |
| 14 | 0.00008179 | 500 | 1,000 | 1,500 | 2,000 | 2,500 |
| 15 | 0.00017333 | 250 | 500 | 750 | 1,000 | 1,250 |
| 16 | 0.00033959 | 125 | 250 | 375 | 500 | 625 |
| 17 | 0.00062277 | 50 | 100 | 150 | 200 | 250 |
| 18 | 0.00107900 | 27 | 54 | 81 | 108 | 135 |
| 19-21 | 0.00884549 | 10 | 20 | 30 | 40 | 50 |
| 22-24 | 0.02721668 | 5 | 10 | 15 | 20 | 25 |
| 25-27 | 0.06412752 | 3 | 6 | 9 | 12 | 15 |
| 28-32 | 0.23583710 | 1 | 2 | 3 | 4 | 5 |

*Wild Ball Pool*

| Number of Wild Balls | Count | Probability |
|---|---|---|
| 0 | 785 | 0.78578579 |
| 1 | 214 | 0.21421421 |
| **Total** | 999 | |

Return Percentage: 90.34% (1 - 4 credits), 92.00% (5 credits)

Win Frequency: 1 in 2.96

FIG. 118

Pay Tables for 4x4 Cards

11900

Letter U

*Pay Table*

| Ball Calls | Probability | 1 credit | 2 credits | 3 credits | 4 credits | 5 credits |
|---|---|---|---|---|---|---|
| 17 or fewer | 0.00001230 | 4,000 | 8,000 | 12,000 | 16,000 | 24,000 |
| 18 | 0.00001344 | 2,000 | 4,000 | 6,000 | 8,000 | 12,500 |
| 19 | 0.00002522 | 1,000 | 2,000 | 3,000 | 4,000 | 5,000 |
| 20 | 0.00004519 | 500 | 1,000 | 1,500 | 2,000 | 2,500 |
| 21 | 0.00007781 | 275 | 550 | 825 | 1,100 | 1,375 |
| 22-23 | 0.00033804 | 75 | 150 | 225 | 300 | 375 |
| 24-27 | 0.00267244 | 35 | 70 | 105 | 140 | 175 |
| 28-31 | 0.01113631 | 15 | 30 | 45 | 60 | 75 |
| 32-35 | 0.03646422 | 6 | 12 | 18 | 24 | 30 |
| 36-42 | 0.25327124 | 1 | 2 | 3 | 4 | 5 |

*Wild Ball Pool*

| Number of Wild Balls | Count | Probability |
|---|---|---|
| 0 | 92 | 0.77966102 |
| 1 | 26 | 0.22033898 |
| **Total** | 118 | |

Return Percentage: 90.33% (1 - 4 credits), 91.98% (5 credits)

Win Frequency: 1 in 3.29

FIG. 119

Pay Tables for 4x4 Cards

12000

6-Pack

*Pay Table*

| Ball Calls | Probability | 1 credit | 2 credits | 3 credits | 4 credits | 5 credits |
|---|---|---|---|---|---|---|
| 8 or fewer | 0.00011417 | 500 | 1,000 | 1,500 | 2,000 | 3,200 |
| 9-12 | 0.00213685 | 60 | 120 | 180 | 240 | 300 |
| 13-17 | 0.01854144 | 11 | 22 | 33 | 44 | 55 |
| 18-22 | 0.06813641 | 4 | 8 | 12 | 16 | 20 |
| 23-29 | 0.24215048 | 1 | 2 | 3 | 4 | 5 |

*Wild Ball Pool*

| Number of Wild Balls | Count | Probability |
|---|---|---|
| 0 | 87 | 0.76315789 |
| 1 | 27 | 0.23684211 |
| **Total** | 114 | |

Return Percentage: 90.39% (1 - 4 credits), 91.99% (5 credits)

Win Frequency: 1 in 3.02

FIG. 120

12100

Pay Tables for 4x4 Cards

9-Pack

*Pay Table*

| Ball Calls | Probability | 1 credit | 2 credits | 3 credits | 4 credits | 5 credits |
|---|---|---|---|---|---|---|
| 12 or fewer | 0.00000366 | 2,500 | 5,000 | 7,500 | 10,000 | 25,000 |
| 13-15 | 0.00005318 | 900 | 1,800 | 2,700 | 3,600 | 5,000 |
| 16-19 | 0.00070968 | 80 | 160 | 240 | 320 | 400 |
| 20-23 | 0.00447527 | 20 | 40 | 60 | 80 | 100 |
| 24-28 | 0.02682719 | 8 | 16 | 24 | 32 | 40 |
| 29-33 | 0.09189710 | 3 | 6 | 9 | 12 | 15 |
| 34-38 | 0.21162895 | 1 | 2 | 3 | 4 | 5 |

*Wild Ball Pool*

| Number of Wild Balls | Count | Probability |
|---|---|---|
| 0 | 72 | 0.72000000 |
| 1 | 28 | 0.28000000 |
| Total | 100 | |

Return Percentage: 90.52% (1 - 4 credits), 91.97% (5 credits)

Win Frequency: 1 in 2.98

FIG. 121

Pay Tables for 4x4 Cards

12200

Frame

*Pay Table*

| Ball Calls | Probability | 1 credit | 2 credits | 3 credits | 4 credits | 5 credits |
|---|---|---|---|---|---|---|
| 19 or fewer | 0.00000713 | 2,500 | 5,000 | 7,500 | 10,000 | 20,000 |
| 20-22 | 0.00006383 | 900 | 1,800 | 2,700 | 3,600 | 5,000 |
| 23-26 | 0.00073872 | 200 | 400 | 600 | 800 | 1,000 |
| 27-30 | 0.00488894 | 40 | 80 | 120 | 160 | 200 |
| 31-34 | 0.02267077 | 5 | 10 | 15 | 20 | 25 |
| 35-38 | 0.07911401 | 2 | 4 | 6 | 8 | 10 |
| 39-42 | 0.21272622 | 1 | 2 | 3 | 4 | 5 |

*Wild Ball Pool*

| Number of Wild Balls | Count | Probability |
|---|---|---|
| 0 | 300 | 0.50083472 |
| 1 | 299 | 0.49916528 |
| **Total** | 599 | |

Return Percentage: 90.29% (1 - 4 credits), 92.00% (5 credits)

Win Frequency: 1 in 3.12

FIG. 122

Pay Tables for 4x4 Cards

12300

Coverall

*Pay Table*

| Ball Calls | Probability | 1 credit | 2 credits | 3 credits | 4 credits | 5 credits |
|---|---|---|---|---|---|---|
| 25 or fewer | 0.00000472 | 2,500 | 5,000 | 7,500 | 10,000 | 25,000 |
| 26 | 0.00000659 | 1,500 | 3,000 | 4,500 | 6,000 | 10,000 |
| 27-28 | 0.00004454 | 600 | 1,200 | 1,800 | 2,400 | 3,000 |
| 29-30 | 0.00017748 | 200 | 400 | 600 | 800 | 1,000 |
| 31-32 | 0.00061589 | 75 | 150 | 225 | 300 | 375 |
| 33-34 | 0.00190214 | 21 | 42 | 63 | 84 | 105 |
| 35-36 | 0.00531178 | 13 | 26 | 39 | 52 | 65 |
| 37-38 | 0.01356958 | 9 | 18 | 27 | 36 | 45 |
| 39-40 | 0.03197754 | 6 | 12 | 18 | 24 | 30 |
| 41-42 | 0.06989232 | 3 | 6 | 9 | 12 | 15 |
| 43-44 | 0.14202958 | 1 | 2 | 3 | 4 | 5 |

*Wild Ball Pool*

| Number of Wild Balls | Count | Probability |
|---|---|---|
| 0 | 364 | 0.78448276 |
| 1 | 100 | 0.21551724 |
| Total | 464 | |

Return Percentage: 90.48% (1 - 4 credits), 91.99% (5 credits)

Win Frequency: 1 in 3.77

FIG. 123

12400

Pay Tables for 5x5 Cards

Single Bingo (any line)

*Pay Table*

| Ball Calls | Probability | 1 credit | 2 credits | 3 credits | 4 credits | 5 credits |
|---|---|---|---|---|---|---|
| 5 or fewer | 0.00007045 | 500 | 1,000 | 1,500 | 2,000 | 3,000 |
| 6 | 0.00010883 | 200 | 400 | 600 | 800 | 1,250 |
| 7 | 0.00020392 | 100 | 200 | 300 | 400 | 500 |
| 8-9 | 0.00088381 | 40 | 80 | 120 | 160 | 200 |
| 10-12 | 0.00347485 | 12 | 24 | 36 | 48 | 60 |
| 13-16 | 0.01216471 | 8 | 16 | 24 | 32 | 40 |
| 17-21 | 0.03618193 | 5 | 10 | 15 | 20 | 25 |
| 22-27 | 0.08884193 | 3 | 6 | 9 | 12 | 15 |
| 28-35 | 0.20830416 | 1 | 2 | 3 | 4 | 5 |

*Wild Ball Pool*

| Number of Wild Balls | Count | Probability |
|---|---|---|
| 0 | 145 | 0.72500000 |
| 1 | 55 | 0.27500000 |
| **Total** | 200 | |

Return Percentage: 90.75% (1 - 4 credits), 92.00% (5 credits)

Win Frequency: 1 in 2.86

FIG. 124

12500

Pay Tables for 5x5 Cards

Double Bingo (any 2 lines)

*Pay Table*

| Ball Calls | Probability | 1 credit | 2 credits | 3 credits | 4 credits | 5 credits |
|---|---|---|---|---|---|---|
| 15 or fewer | 0.00005712 | 1,000 | 2,000 | 3,000 | 4,000 | 6,000 |
| 16-17 | 0.00013504 | 250 | 500 | 750 | 1,000 | 1,500 |
| 18-19 | 0.00034833 | 100 | 200 | 300 | 400 | 500 |
| 20-21 | 0.00078521 | 40 | 80 | 120 | 160 | 200 |
| 22-23 | 0.00159105 | 25 | 50 | 75 | 100 | 125 |
| 24-25 | 0.00295552 | 20 | 40 | 60 | 80 | 100 |
| 26-27 | 0.00510549 | 12 | 24 | 36 | 48 | 60 |
| 28-29 | 0.00828852 | 7 | 14 | 21 | 28 | 35 |
| 30-34 | 0.04347487 | 4 | 8 | 12 | 16 | 20 |
| 35-39 | 0.09491745 | 2 | 4 | 6 | 8 | 10 |
| 40-44 | 0.16256987 | 1 | 2 | 3 | 4 | 5 |

*Wild Ball Pool*

| Number of Wild Balls | Count | Probability |
|---|---|---|
| 0 | 85 | 0.70247934 |
| 1 | 36 | 0.29752066 |
| **Total** | 121 | |

Return Percentage: 90.16% (1 - 4 credits), 91.98% (5 credits)

Win Frequency: 1 in 3.12

FIG. 125

12600

Pay Tables for 5x5 Cards

Triple Bingo (any 3 lines)

*Pay Table*

| Ball Calls | Probability | 1 credit | 2 credits | 3 credits | 4 credits | 5 credits |
|---|---|---|---|---|---|---|
| 22 or fewer | 0.00003732 | 1,800 | 3,600 | 5,400 | 7,200 | 10,500 |
| 23-24 | 0.00008242 | 900 | 1,800 | 2,700 | 3,600 | 5,000 |
| 25-26 | 0.00021734 | 250 | 500 | 750 | 1,000 | 1,250 |
| 27-28 | 0.00051464 | 100 | 200 | 300 | 400 | 500 |
| 29-30 | 0.00111251 | 50 | 100 | 150 | 200 | 250 |
| 31-32 | 0.00222244 | 25 | 50 | 75 | 100 | 125 |
| 33-35 | 0.00728427 | 10 | 20 | 30 | 40 | 50 |
| 36-38 | 0.01606608 | 5 | 10 | 15 | 20 | 25 |
| 39-41 | 0.03135390 | 3 | 6 | 9 | 12 | 15 |
| 42-45 | 0.07935185 | 2 | 4 | 6 | 8 | 10 |
| 46-49 | 0.13633219 | 1 | 2 | 3 | 4 | 5 |

*Wild Ball Pool*

| Number of Wild Balls | Count | Probability |
|---|---|---|
| 0 | 122 | 0.74846626 |
| 1 | 41 | 0.25153374 |
| Total | 163 | |

Return Percentage: 90.06% (1 - 4 credits), 92.00% (5 credits)

Win Frequency: 1 in 3.64

FIG. 126

Pay Tables for 5x5 Cards

12700

Letter X

*Pay Table*

| Ball Calls | Probability | 1 credit | 2 credits | 3 credits | 4 credits | 5 credits |
|---|---|---|---|---|---|---|
| 20 or fewer | 0.00002425 | 3,000 | 6,000 | 9,000 | 12,000 | 17,500 |
| 21-24 | 0.00010207 | 750 | 1,500 | 2,250 | 3,000 | 4,000 |
| 25-28 | 0.00036046 | 100 | 200 | 300 | 400 | 500 |
| 29-32 | 0.00103209 | 50 | 100 | 150 | 200 | 250 |
| 33-36 | 0.00253306 | 20 | 40 | 60 | 80 | 100 |
| 37-40 | 0.00552215 | 12 | 24 | 36 | 48 | 60 |
| 41-44 | 0.01095311 | 8 | 16 | 24 | 32 | 40 |
| 45-48 | 0.02010195 | 5 | 10 | 15 | 20 | 25 |
| 49-52 | 0.03455072 | 3 | 6 | 9 | 12 | 15 |
| 53-56 | 0.05610551 | 2 | 4 | 6 | 8 | 10 |
| 57-62 | 0.14463557 | 1 | 2 | 3 | 4 | 5 |

*Wild Ball Pool*

| Number of Wild Balls | Count | Probability |
|---|---|---|
| 0 | 79 | 0.75961538 |
| 1 | 25 | 0.24038462 |
| **Total** | 104 | |

Return Percentage: 90.25% (1 - 4 credits), 91.98% (5 credits)

Win Frequency: 1 in 3.62

FIG. 127

12800

Pay Tables for 5x5 Cards

6-Pack

*Pay Table*

| Ball Calls | Probability | 1 credit | 2 credits | 3 credits | 4 credits | 5 credits |
|---|---|---|---|---|---|---|
| 7 or fewer | 0.00005228 | 600 | 1,200 | 1,800 | 2,400 | 4,000 |
| 8-9 | 0.00019744 | 275 | 550 | 825 | 1,100 | 1,500 |
| 10-11 | 0.00055704 | 50 | 100 | 150 | 200 | 250 |
| 12-19 | 0.01447073 | 16 | 32 | 48 | 64 | 80 |
| 20-26 | 0.05431035 | 6 | 12 | 18 | 24 | 30 |
| 27-37 | 0.23380755 | 1 | 2 | 3 | 4 | 5 |

*Wild Ball Pool*

| Number of Wild Balls | Count | Probability |
|---|---|---|
| 0 | 94 | 0.77685950 |
| 1 | 27 | 0.22314050 |
| Total | 121 | |

Return Percentage: 90.47% (1 - 4 credits), 92.01% (5 credits)

Win Frequency: 1 in 3.30

FIG. 128

Pay Tables for 5x5 Cards

12900

9-Pack

*Pay Table*

| Ball Calls | Probability | 1 credit | 2 credits | 3 credits | 4 credits | 5 credits |
|---|---|---|---|---|---|---|
| 16 or fewer | 0.00002314 | 1,600 | 3,200 | 4,800 | 6,400 | 10,000 |
| 17-19 | 0.00009532 | 200 | 400 | 600 | 800 | 1,500 |
| 20-25 | 0.00125580 | 100 | 200 | 300 | 400 | 500 |
| 26-30 | 0.00496646 | 20 | 40 | 60 | 80 | 100 |
| 31-39 | 0.04229859 | 9 | 18 | 27 | 36 | 45 |
| 40-51 | 0.23954476 | 1 | 2 | 3 | 4 | 5 |

*Wild Ball Pool*

| Number of Wild Balls | Count | Probability |
|---|---|---|
| 0 | 107 | 0.79259259 |
| 1 | 28 | 0.20740741 |
| **Total** | 135 | |

Return Percentage: 90.12% (1 - 4 credits), 92.00% (5 credits)

Win Frequency: 1 in 3.47

FIG. 129

Pay Tables for 5x5 Cards

13000

Frame

*Pay Table*

| Ball Calls | Probability | 1 credit | 2 credits | 3 credits | 4 credits | 5 credits |
|---|---|---|---|---|---|---|
| 38 or fewer | 0.00001236 | 3,000 | 6,000 | 9,000 | 12,000 | 20,000 |
| 39-41 | 0.00003930 | 1,500 | 3,000 | 4,500 | 6,000 | 8,000 |
| 42-44 | 0.00013730 | 400 | 800 | 1,200 | 1,600 | 2,000 |
| 45-48 | 0.00070712 | 100 | 200 | 300 | 400 | 500 |
| 49-52 | 0.00270430 | 30 | 60 | 90 | 120 | 150 |
| 53-56 | 0.00896645 | 10 | 20 | 30 | 40 | 50 |
| 57-61 | 0.03792152 | 3 | 6 | 9 | 12 | 15 |
| 62-66 | 0.12030958 | 2 | 4 | 6 | 8 | 10 |
| 67-69 | 0.15705950 | 1 | 2 | 3 | 4 | 5 |

*Wild Ball Pool*

| Number of Wild Balls | Count | Probability |
|---|---|---|
| 0 | 63 | 0.71590909 |
| 1 | 25 | 0.28409091 |
| Total | 88 | |

Return Percentage: 90.39% (1 - 4 credits), 92.02% (5 credits)

Win Frequency: 1 in 3.05

FIG. 130

Pay Tables for 5x5 Cards

13100

Coverall

*Pay Table*

| Ball Calls | Probability | 1 credit | 2 credits | 3 credits | 4 credits | 5 credits |
|---|---|---|---|---|---|---|
| 50 or fewer | 0.00001051 | 4,000 | 8,000 | 12,000 | 16,000 | 25,000 |
| 51-52 | 0.00002413 | 2,000 | 4,000 | 6,000 | 8,000 | 11,000 |
| 53-54 | 0.00007256 | 1,500 | 3,000 | 4,500 | 6,000 | 7,500 |
| 55-56 | 0.00020613 | 600 | 1,200 | 1,800 | 2,400 | 3,000 |
| 57-58 | 0.00055597 | 150 | 300 | 450 | 600 | 750 |
| 59-60 | 0.00142998 | 50 | 100 | 150 | 200 | 250 |
| 61-62 | 0.00352015 | 25 | 50 | 75 | 100 | 125 |
| 63-64 | 0.00831981 | 10 | 20 | 30 | 40 | 50 |
| 65-67 | 0.03575708 | 4 | 8 | 12 | 16 | 20 |
| 68-70 | 0.11298108 | 1 | 2 | 3 | 4 | 5 |

*Wild Ball Pool*

| Number of Wild Balls | Count | Probability |
|---|---|---|
| 0 | 89 | 0.91752577 |
| 1 | 8 | 0.08247423 |
| Total | 97 | |

Return Percentage: 90.50% (1 - 4 credits), 92.03% (5 credits)

Win Frequency: 1 in 6.14

FIG. 131

13200

3x3 Coverall

| | Win Balls | Probability | 1/Probability | Starting | Increment | Avg When Hit | Cost | Target | Target Cost |
|---|---|---|---|---|---|---|---|---|---|
| Mega Jackpot | 8 or fewer | 1.7085474E-07 | 5,852,925.0 | 400,000 | 4.00% | 634,117 | 10.83% | 4,000,000 | 68.34% |
| Grand Jackpot | 9 exactly | 1.3668379E-06 | 731,615.6 | 30,000 | 4.00% | 59,265 | 8.10% | 160,000 | 21.87% |
| Midi Jackpot | 10 exactly | 6.1507708E-06 | 162,581.3 | 5,000 | 4.00% | 11,503 | 7.08% | 40,000 | 24.60% |
| Mini Jackpot | 11 exactly | 2.0502569E-05 | 48,774.4 | 1,500 | 4.00% | 3,451 | 7.08% | 4,000 | 8.20% |
| Fixed Pay | 12 to 13 | 1.9169902E-04 | 5,216.5 | 500 | 0.00% | 500 | 9.58% | | |
| Fixed Pay | 14 to 15 | 8.7956022E-04 | 1,136.9 | 100 | 0.00% | 100 | 8.80% | | |
| Fixed Pay | 16 to 18 | 6.3768116E-03 | 156.8 | 15 | 0.00% | 15 | 9.57% | | |
| Fixed Pay | 19 to 21 | 2.7290970E-02 | 36.6 | 8 | 0.00% | 8 | 21.83% | | |
| Fixed Pay | 22 to 24 | 9.0891477E-02 | 11.0 | 1 | 0.00% | 1 | 9.09% | | |
| Fixed Pay | | 0.0000000E+00 | - | | | 0 | 0.00% | | |
| | | 1.2565871E-01 | 8.0 | | | | 91.95% | | 123.02% |

FIG. 132

13300

4x4 Coverall

| | Win Balls | Probability | 1/Probability | Starting | Increment | Avg When Hit | Cost | Target | Target Cost |
|---|---|---|---|---|---|---|---|---|---|
| Mega Jackpot | 22 or fewer | 3.3090022E-08 | 30,220,590.4 | 1,500,000 | 4.00% | 2,708,824 | 8.96% | 4,000,000 | 13.24% |
| Grand Jackpot | 23 to 24 | 2.9308305E-07 | 3,412,002.1 | 150,000 | 4.00% | 286,480 | 8.40% | 160,000 | 4.69% |
| Midi Jackpot | 25 to 26 | 2.0295213E-06 | 492,727.0 | 20,000 | 4.00% | 39,709 | 8.06% | 40,000 | 8.12% |
| Mini Jackpot | 27 to 28 | 1.1136010E-05 | 89,798.8 | 3,000 | 4.00% | 6,592 | 7.34% | 4,000 | 4.45% |
| Fixed Pay | 29 to 31 | 1.1979447E-04 | 8,347.6 | 500 | 0.00% | 500 | 5.99% | | |
| Fixed Pay | 32 to 34 | 8.4414580E-04 | 1,184.6 | 100 | 0.00% | 100 | 8.44% | | |
| Fixed Pay | 35 to 37 | 4.7328285E-03 | 211.3 | 24 | 0.00% | 24 | 11.36% | | |
| Fixed Pay | 38 to 40 | 2.2163936E-02 | 45.1 | 7 | 0.00% | 7 | 15.51% | | |
| Fixed Pay | 41 to 43 | 8.9731089E-02 | 11.1 | 2 | 0.00% | 2 | 17.95% | | |
| Fixed Pay | | 0.0000000E+00 | - | | | 0 | 0.00% | | |
| | | 1.1760529E-01 | 8.5 | | | | 92.01% | | 30.50% |

FIG. 133

13400

5x5 Coverall

| | Win Balls | Probability | 1/Probability | Starting | Increment | Avg When Hit | Cost | Target | Target Cost |
|---|---|---|---|---|---|---|---|---|---|
| Mega Jackpot | 43 or fewer | 3.1051699E-08 | 32,204,356.5 | 2,000,000 | 6.00% | 3,932,261 | 12.21% | 4,000,000 | 12.42% |
| Grand Jackpot | 44 to 46 | 2.7502934E-07 | 3,635,975.7 | 100,000 | 4.00% | 245,439 | 6.75% | 160,000 | 4.40% |
| Midi Jackpot | 47 to 49 | 2.1457612E-06 | 466,035.1 | 20,000 | 4.00% | 38,641 | 8.29% | 40,000 | 8.58% |
| Mini Jackpot | 50 to 52 | 1.4088363E-05 | 70,980.6 | 2,000 | 3.00% | 4,129 | 5.82% | 4,000 | 5.64% |
| Fixed Pay | 53 to 57 | 2.7526379E-04 | 3,632.9 | 500 | 0.00% | 500 | 13.76% | | |
| Fixed Pay | 58 to 62 | 3.4701132E-03 | 288.2 | 33 | 0.00% | 33 | 11.45% | | |
| Fixed Pay | 63 to 67 | 3.3981016E-02 | 29.4 | 7 | 0.00% | 7 | 23.79% | | |
| Fixed Pay | 68 to 70 | 9.8360371E-02 | 10.2 | 1 | 0.00% | 1 | 9.84% | | |
| Fixed Pay | | 0.0000000E+00 | - | | | 0 | 0.00% | | |
| Fixed Pay | | 0.0000000E+00 | - | | | 0 | 0.00% | | |
| | | 1.3610330E-01 | 7.3 | | | | 91.91% | | 31.04% |

FIG. 134

13500

3x3 Coverall

| | Win Balls | Probability | 1/Probability | Starting | Increment | Avg When Hit | Cost | Target | Target Cost |
|---|---|---|---|---|---|---|---|---|---|
| Grand Jackpot | 10 or fewer | 7.6884635E-06 | 130,065.0 | 6,000 | 4.00% | 11,203 | 8.61% | 15,000 | 11.53% |
| Midi Jackpot | 11 to 12 | 7.6884635E-05 | 13,006.5 | 1,000 | 4.00% | 1,520 | 11.69% | 1,500 | 11.53% |
| Mini Jackpot | 13 to 14 | 4.2850370E-04 | 2,333.7 | 120 | 5.00% | 237 | 10.14% | 250 | 10.71% |
| Fixed Pay | 15 to 16 | 1.6858238E-03 | 593.2 | 75 | 0.00% | 75 | 12.64% | | |
| Fixed Pay | 17 to 19 | 1.0714643E-02 | 93.3 | 14 | 0.00% | 14 | 15.00% | | |
| Fixed Pay | 20 to 22 | 4.1720678E-02 | 24.0 | 5 | 0.00% | 5 | 20.86% | | |
| Fixed Pay | 23 to 25 | 1.3015800E-01 | 7.7 | 1 | 0.00% | 1 | 13.02% | | |
| Fixed Pay | | 0.0000000E+00 | - | | | 0 | 0.00% | | |
| Fixed Pay | | 0.0000000E+00 | - | | | 0 | 0.00% | | |
| Fixed Pay | | 0.0000000E+00 | - | | | 0 | 0.00% | | |
| | | 1.8479222E-01 | 5.4 | | | | 91.96% | | 33.78% |

FIG. 135

13600

4x4 Coverall

| | Win Balls | Probability | 1/Probability | Starting | Increment | Avg When Hit | Cost | Target | Target Cost |
|---|---|---|---|---|---|---|---|---|---|
| Grand Jackpot | 27 or fewer | 5.7821590E-06 | 172,945.8 | 7,200 | 4.00% | 14,118 | 8.16% | 15,000 | 8.67% |
| Midi Jackpot | 28 to 30 | 5.8711153E-05 | 17,032.5 | 1,000 | 4.00% | 1,681 | 9.87% | 1,500 | 8.81% |
| Mini Jackpot | 31 to 33 | 4.5297068E-04 | 2,207.6 | 160 | 4.00% | 248 | 11.25% | 250 | 11.32% |
| Fixed Pay | 34 to 36 | 2.7234947E-03 | 367.2 | 70 | 0.00% | 70 | 19.06% | | |
| Fixed Pay | 37 to 40 | 2.4633238E-02 | 40.6 | 5 | 0.00% | 5 | 12.32% | | |
| Fixed Pay | 41 to 44 | 1.5693411E-01 | 6.4 | 2 | 0.00% | 2 | 31.39% | | |
| Fixed Pay | | 0.0000000E+00 | - | | | 0 | 0.00% | | |
| Fixed Pay | | 0.0000000E+00 | - | | | 0 | 0.00% | | |
| Fixed Pay | | 0.0000000E+00 | - | | | 0 | 0.00% | | |
| Fixed Pay | | 0.0000000E+00 | - | | | 0 | 0.00% | | |
| | | 1.8480831E-01 | 5.4 | | | | 92.05% | | 28.80% |

FIG. 136

13700

5x5 Coverall

| | Win Balls | Probability | 1/Probability | Starting | Increment | Avg When Hit | Cost | Target | Target Cost |
|---|---|---|---|---|---|---|---|---|---|
| Grand Jackpot | 50 or fewer | 4.7150811E-06 | 212,085.4 | 10,000 | 4.00% | 18,483 | 8.72% | 20,000 | 9.43% |
| Midi Jackpot | 51 to 54 | 4.9696491E-05 | 20,122.1 | 1,000 | 4.00% | 1,805 | 8.97% | 2,000 | 9.94% |
| Mini Jackpot | 55 to 57 | 2.3739242E-04 | 4,212.4 | 200 | 4.00% | 368 | 8.75% | 400 | 9.50% |
| Fixed Pay | 58 to 60 | 1.1067300E-03 | 903.6 | 100 | 0.00% | 100 | 11.07% | | |
| Fixed Pay | 61 to 62 | 2.3633832E-03 | 423.1 | 50 | 0.00% | 50 | 11.82% | | |
| Fixed Pay | 63 to 65 | 1.1652768E-02 | 85.8 | 13 | 0.00% | 13 | 15.15% | | |
| Fixed Pay | 66 to 68 | 4.2915302E-02 | 23.3 | 3 | 0.00% | 3 | 12.87% | | |
| Fixed Pay | 69 to 71 | 1.4727288E-01 | 6.8 | 1 | 0.00% | 1 | 14.73% | | |
| Fixed Pay | | 0.0000000E+00 | - | | | 0 | 0.00% | | |
| Fixed Pay | | 0.0000000E+00 | - | | | 0 | 0.00% | | |
| | | 2.0560286E-01 | 4.9 | | | | 92.07% | | 28.87% |

FIG. 137

SYSTEMS AND METHODS FOR PLAYING A GAME OF CHANCE WITH BONUS FEATURE

CROSS REFERENCE TO RELATED APPLICATIONS

This application claims the benefit of U.S. Provisional Application Ser. No. 61/698,963 filed Sep. 10, 2012, entitled "System and Method for Playing an Electronic Single Player Pattern Game", the disclosure of which is hereby incorporated by reference in its entirety.

BACKGROUND

Embodiments of the present disclosure relate to systems and methods for playing bingo, keno, and other games of chance.

Bingo is a game of chance played with randomly drawn articles typically having numbers or other indicia that players match against corresponding indicia on a player card or ticket. Traditional bingo games have numbers pre-arranged in a table, grid, matrix, or array, with winners determined by making a predetermined winning pattern with called numbers. The numbers may be printed on paper or cardstock, or electronically represented on a display with the subset of numbers for each play generally referred to as cards or tickets. When a single paper or other playing piece includes multiple cards, each may be referred to as a card face with the group of card faces referred to as a card or ticket. Players try to obtain the winning pattern or number of matches on their faces by covering or marking numbers on their cards as numbers are randomly selected or preselected from a predetermined group of numbers, such as 75 or 90 numbers, for example. Once a winning pattern is achieved or a predetermined number of calls are made, the game ends.

In contrast to keno, lotto, and related odds-based numbers games, regulations for bingo and related games generally include some requirement that the game must be played to conclusion. Although requirements may vary considerably by jurisdiction, this requirement is generally interpreted as requiring one or more winners. As such, if there are no winners in the prescribed number of calls, players continue to play for a consolation prize. Consolation prizes may be a fixed amount or a pari-mutuel prize based on the total or aggregate number and price of cards or tickets purchased by all players for that game. Payment of consolation prizes may be a significant operating expense for bingo gaming establishments. In addition, because of the uncertainty in the number of calls that may be required for a consolation prize winner, the use of consolation prizes to meet the requirement that the game be played to conclusion may reduce the total number of games that can be played in a given time period and thereby adversely affect scheduling of games and overall revenue for the operator.

Alternative methods of play have been developed to increase participation by creating excitement. Since its invention in 1934, modern bingo has evolved into multiple variations, with each jurisdiction's gambling laws regulating how the game is played. There are also nearly unlimited winning criteria that may be specified for playing a particular game. Some patterns only require one number to be matched whereas coverall games require an entire card to be matched or covered to award the jackpot. Other games may award prizes to players for matching no numbers or achieving none of the specified patterns.

There are many variations of bingo games and even bingo cards. For example, double-action cards have two numbers in each square. However, the most common bingo cards are flat pieces of cardboard or paper that contain 25 squares arranged in five vertical columns and five horizontal rows. More recently, computer generated visual representations of bingo cards and related game cards or tickets may be presented on a screen or display. Each space in the grid contains a single number, except there may be one or more "Free" spaces, which typically include at least the center space. The "Free" spaces are considered covered or filled from the beginning of the game. For games played utilizing 75 numbers or another multiple of 5 numbers, the letters B, I, N, G, and O may be pre-printed above the five vertical columns with one letter appearing above each column to assist players in more quickly locating a called number on their card(s). Players often play multiple cards for each game. For 75 number games, the numbers printed on the card are commonly arranged as follows: 1 to 15 in the B column, 16 to 30 in the I column, 31 to 45 in the N column, 46 to 60 in the G column, and 61 to 75 in the O column. Depending on how many numbers are in each column for a particular game, the numbers are generally randomly selected from the number ranges above for each column. For example, a standard bingo game may include 25 spaces with 5 randomly selected numbers between 1 and 15 assigned to the B column, and so on. However, one variation randomly assigns the numbers to the available columns. In another variation, sometimes referred to as "U-Pic'Em" bingo, players may be issued three cards each having ⅓ of the total available numbers with all numbers that may be called or drawn included. Players then identify or mark which numbers they wish to play and then cover or mark the selected numbers when a corresponding number is called or drawn. Rather than a predetermined pattern, a predetermined number (such as 5 or 10) of matches to the called numbers determines a winning card.

With the expansion of Tribal gaming across the U.S., there are numerous versions of bingo that emulate the fast action of casino-like table games, but utilize the principals of bingo where players mark and monitor grid or matrix cards. Casino games like Roulette, Acey Duecy, and Money Wheel have bingo counterparts, which are permitted to be played under bingo licenses in many parts of the country. Similarly, U Pic'Em-style bingo is played in many markets, including in Native American bingo halls across the United States, and has been federally recognized as Class II gaming pursuant to the Indian Gaming Regulatory Act codified at 25 U.S.C. §2703. It is similar to keno in that players are seeking to match a specific set of numbers rather than a set of numbers that form a specific pattern on a bingo card. In keno, 20 numbers are drawn from a pool of 80 numbers. Players select 1 to 20 numbers and prizes are awarded based on the probabilities of matching a specific set or sets of numbers. Keno is strictly odds-based with a known theoretical chance to win. In contrast, U-Pic'Em bingo games generally have a pool of 75 or 90 available numbers or indicia rather than the 80 used in keno, and the number of indicia drawn is generally 24 rather than the 20 numbers drawn in keno. Unlike keno, a U-Pic'Em game may be combined or offered as a bonus in combination with a more traditional bingo game having a winning criterion associated with a pattern formed on a player card or ticket by the matched numbers in addition to the number of matched indicia, and played to conclusion, i.e. until at least one player wins a prize.

In some variants of U-Pic'em Bingo, a specific set of numbers (usually three or five) are not chosen by the player, but instead are pre-printed at the top of a bingo card. In other variations, players choose their numbers (usually six to eight) and write them down on two-part paper, depositing one part in a locked box and keeping the other part to track their numbers. This method generally requires manual verification and is rather time consuming and labor intensive for the operators. There may also be variations on the way(s) to win with the numbers. For example, one common method is if the first n numbers (usually in the three to five number variant) drawn during the course of the bingo game match the numbers a player has, the player wins a bonus prize that is above and beyond the prize for completing the winning bingo pattern(s). Other variations (more commonly found in the six to eight number variant) include awarding a prize to the player who matches the greatest number of indicia, or to all players who match specific numbers of indicia. The latter variant does not require the indicia be called as part of a session-based bingo game. Rather, the latter variant is odds-based similar to keno, and facilitates play in locations that may not offer bingo, as well as those facilities that have more traditional bingo games.

Some jurisdictions do not recognize odds-based games as being bingo, though many do. However, odds-based games may still be classified as bingo or Class II gaming when players are competing against one another for a prize, or where a winner is determined and a prize awarded for every game as previously described. In addition to prize awards based on the number of player indicia matching called indicia (also referred to as house or game indicia), various patterns may be used to determine a winner for a particular game. In addition to a straight horizontal, vertical, or diagonal line, many bingo halls consider other patterns as a valid bingo, usually in special games. For example, a 2×2 square in the upper right-hand corner would be considered a "postage stamp." Another common special game requires players to cover each of the four corner squares. Games may also require two lines (double) or three lines (triple) to win. Combination games may have multiple bingos and/or winners based on different winning criteria, such as matching numbers or patterns of numbers. For example, the players initially play to achieve a first winning pattern, such as a single line, to determine a first winner and then continue playing with the same cards and numbers to achieve a second winning pattern, such as a double line or coverall for another prize.

The called numbers may be randomly selected using various methods for any of the variations of the game. With the expansion of computer technology, electronic random number generators (RNG) are now commonplace in many jurisdictions. However, some jurisdictions require physical draws that may utilize a randomly shuffled deck of bingo or other calling cards, a mechanical ball blower that mixes balls with blown air, or a cage that is turned to mix small wooden balls, for example. All methods essentially generate a sequence and/or group of random numbers for players to match to their card(s) or ticket(s).

In another version of play sometimes referred to as "Quick Shot," numbers are pre-drawn and players purchase sealed cards that are then matched against the pre-drawn numbers. If a specified pattern is achieved, then the player usually wins a prize according to a prize table. This is an odds-based, keno-like game that may be found on various Class II gaming devices manufactured by companies such as GameTech, Video King, Lightning Games, and others. Some versions are played until a player achieves a top level prize, and then new numbers are drawn and the game begins anew. This type of bingo may be played over days, weeks, or months depending on the difficulty of achieving a top level prize.

In "Bonanza Bingo" played with 75 numbers, typically 45 numbers are pre-drawn at the beginning of a bingo session. Players purchase sealed cards that are then matched against the pre-drawn numbers. At a designated time, the caller asks if anyone has a winning pattern or bingo. If no winners are identified, the caller then draws one more ball. This game is commonly played as a "progressive" game, where the jackpot increases as more cards are sold. If no one has achieved bingo after the single ball has been drawn, players then hold their cards for the next session of bingo, which may take place the following day or following week, for example. During each session thereafter, a single ball is drawn and players may continue to purchase additional sealed cards until someone achieves a cover-all.

Many bingo gaming establishments have a call board or flashboard with called numbers illuminated or displayed for the players to see previously called numbers. In U.S. style bingo using 75 numbers, the flashboard is often arranged in 5 rows of 15 columns with the numbers arranged in sequence from left to right. In a version referred to as "Horse Racing Bingo," up to 15 players are randomly issued a number from 1 to 15 corresponding to the top row of numbers on the flashboard. Numbers are then drawn and the first person to match all five numbers in their assigned column wins. This is a fast paced and exciting form of bingo typically played in fraternal organizations.

As previously described, various types of bingo games may use different types of progressive prizes. The first involves increasing a prize amount based on contributing a portion (either fixed amount or percentage) of each ticket sold to the progressive prize pool. Some progressive prize pools are increased per unit of time, such as a day, week, etc. Progressive prize pools may be grouped in different ways, including by winning pattern, days of the week, bingo session (time of day), etc. Some progressive prize games may change the contribution amount after the game starts and/or stop contributions once the prize reaches a certain value.

In virtually all keno, lottery, bingo, and slot machines, the progressive portion of the prize is split when there are multiple winners. The progressive portion is the current amount of the progressive meter less the amount of the base jackpot. The progressive portion grows by allocating a portion of every wager to the progressive meter. Thus, when there are multiple winners, the progressive amount is generally split evenly among all winners. For example, a game starts with a base jackpot of $10,000. As players make wagers, a portion of each wager is added to the progressive meter causing it to grow to $14,000. If two people were to win the progressive jackpot or prize during the same game, they would each be paid the base amount of $10,000 in addition to half of the progressive amount of $4,000 for a total prize award of $12,000. Additionally, in many instances the progressive prize is paid on an aggregate basis and would be split evenly among the winners for $7,000 each in this example.

The various styles of bingo and related games generally have some common features. For example, a particular game (i.e. winning criterion) ends when the first winner satisfies the winning criterion. In combined games, play may continue after a first winner has been identified, but the winning criterion and/or prize are changed for a second or subsequent winner. For example, a group of player selected numbers is matched first, and the game play is continued to match one or more patterns, such as a single line followed by double line, or a double line followed by a coverall. Similarly, because many jurisdictions require bingo and related games to be played to conclusion (in contrast to keno or lotto type games where it is acceptable to not have a winner), if there is no winner matching the winning criterion within the required number of calls, the winning criterion and/or prize may be changed for a consolation game that is played until a winner is determined, for example. Another common feature of the various games, including keno, lotto, and progressive style games, is that multiple winners generally split or share the prize.

BRIEF SUMMARY

In one embodiment, a system is provided that includes a memory device configured to store instructions that are executable by a processor to provide a game of chance in which a plurality of house indicia is selected from a pool of house indicia and in which one or more player indicia is provided, and a processor coupled to the memory device for executing the instructions. When the processor executes the instructions, the processor is programmed to randomly select a predetermined number of house indicia from the pool of house indicia, provide a random chance of selecting a bonus indicia, determine whether a winning number of matching indicia has been achieved by identifying each player indicia that matches one of the selected predetermined number of house indicia, and present a bonus to the player upon a determination that the bonus indicia matches a player indicia and that a winning number of matching indicia has been achieved.

In another embodiment, a method provides a game of chance in which a predetermined number of house indicia is selected from a pool of house indicia and in which one or more player indicia is provided. The method includes randomly selecting a predetermined number of house indicia from the pool of house indicia, providing, by a processor, a random chance of selecting a bonus indicia, determining, by the processor, whether a winning number of matching indicia has been achieved by identifying each player indicia that matches one of the selected predetermined number of house indicia, and presenting, by the processor, a bonus to the player upon a determination that the bonus indicia matches a player indicia within the player indicia and that a winning number of matching indicia has been achieved.

BRIEF DESCRIPTION OF THE DRAWINGS

FIG. 39 is a pay table that may be used with the systems and methods described herein.

FIG. 40 is another pay table that may be used with the systems and methods described herein.

FIGS. 41-137 are additional pay tables that may be used with the systems and methods described herein.

DETAILED DESCRIPTION

Figure 1:
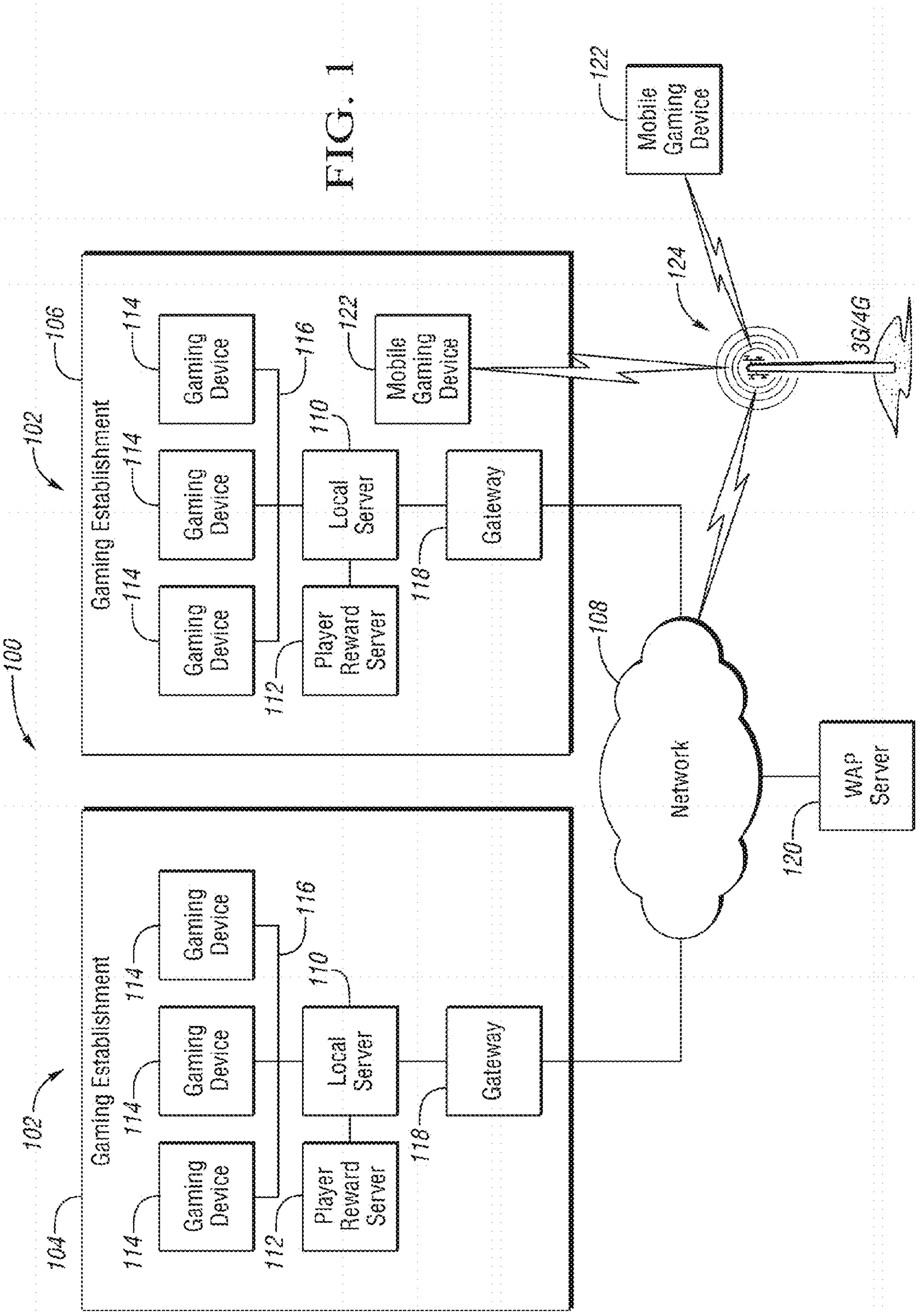
FIG. 1 is a block diagram of a system that may be used to play a game of chance.

Systems and methods for playing a game of chance, which may be played as a standalone game of chance or in combination with another game of chance are described herein. In one embodiment, a plurality of gaming devices are connected to one or more servers over a network, such as a wide area network (WAN) and/or a local area network (LAN). The gaming devices may include, for example, cellular phones, laptop or desktop computers, gaming kiosks or terminals, and/or any other suitable devices. The servers may include one or more local servers within a gaming establishment and/or one or more wide area progressive (WAP) servers connected to the local servers and/or to the gaming devices through the network.

In one embodiment, each gaming device presents a plurality of games of chance to a player to enable the player to select and play the games of chance. In addition, each gaming device includes a randomization device, such as a random number generator (RNG) and/or a permutation generator, that is used to play a selected game on the gaming device. For example, if the player selects a game of bingo to be played on a gaming device, the gaming device uses the randomization device to select a plurality of house indicia to be used during the game. In another embodiment, at least some aspects of the game are provided by one or more servers, such as the local server or the WAP server. For example, the server may include a randomization device for randomly selecting the house indicia in the bingo game.

In the example of the bingo game, the house indicia are compared to a plurality of player indica that are included within a pattern selected for one or more player cards. If the player indicia within the pattern are matched by the house indicia, the player may win a prize based on the number of house indicia that have been selected and an associated pay table.

In the example of a keno game of chance, the gaming device uses the randomization device to randomly select a plurality of house indicia in a similar manner as described with respect to the game of bingo. However, the house indicia are typically randomly selected, or called, from a pool of 80 house indicia, although other sizes of house indicia pools may be used. The called house indicia are compared to a plurality of player indicia to determine how many player indicia are matched by the house indicia and may be irrespective of a pattern of the player indicia. The embodiments described herein may include allowing the player to select the number of and specific player indicia to be utilized for a keno game or may include an automated or quick pick selection. For example, a player may select one player indicia or spot to play a 1 spot game, 2 player indicia or spots for a 2 spot game, 3 player indicia or spots for a 3 spot game, etc. Embodiments may also require a minimum number of player indicia or spots for a game. For example, a 10 player indicia or 10 spot game may require a minimum of 5 player indicia or spots or a 5 spot game. Embodiments may also include a maximum number of player indicia or spots that are playable. For example, in an 80 number game, the maximum number of house indicia or spots selectable by the player may be confined to 20 numbers or less or a 20 number game or less. Accordingly, in an 80 number game, the minimum number of player indicia or spots may be 5 and the maximum player indicia or spots may be 20. The player may win one or more prizes based on the number of player indicia matched by the called house indicia.

In one embodiment, the prize is one of a plurality of progressive prizes that are administered by the WAP server. A plurality of players may compete for the progressive prizes and if two or more players win a progressive prize, the prize may be shared between the winning players, or the players may each receive the same progressive prize or a portion thereof, for example.

Each gaming device may also enable a player to switch between games that are provided on the gaming device. For example, in one embodiment, a plurality of games are provided on each gaming device and a player may select a different game to be played by selecting an appropriate icon displayed on a user interface of the gaming device. The gaming device transfers gameplay data associated with the player, such as a number of credits, a number of games played, etc., from a game most recently played to the newly selected game. The player may then play the newly selected game as described herein.

A technical effect of the systems and methods described herein includes one or more of: (a) randomly selecting a predetermined number of house indicia from the pool of house indicia; (b) providing, by a processor, a random chance of selecting a bonus indicia; (c) determining, by the processor, whether a winning number of matching indicia has been achieved by identifying each player indicia that matches one of the selected predetermined number of house indicia; and (d) presenting, by the processor, a bonus to the player upon a determination that the bonus indicia matches a player indicia within the player indicia and that a winning number of matching indicia has been achieved.

As used herein, a "game of chance" or "game" refers to an electronic game that is played by a player in which an outcome of the game of chance is at least partially based on chance or a random selection of game components. It should be recognized by those of ordinary skill in the art that the term "random" is not limited to true randomness, such as truly random numbers. Rather, pseudorandom numbers and pseudorandom algorithms are included within the meaning of "random." In addition, those of ordinary skill in the art will recognize that permutation generators may additionally or alternatively be used to generate player card indicia.

Gaming devices described herein may use real money for play, or may utilize a credit-based system in which the credits used for the games do not have a cash value. Similarly, prizes for the games may be in the form of credits, cash, and/or physical prizes such as televisions, automobiles, or the like.

The play of a game, or the game play, includes the drawing or selection of a plurality of house indicia after one or more player cards have been selected. The house indicia are drawn or selected until a game ending criteria is met. The game ending criteria may include, for example, the matching of a pattern on the player card, or the drawing or selection of a predetermined maximum number of house indicia. It should be recognized that other suitable game ending criteria may be used to end the play of the game.

As used herein, the term "player indicia" refers to indicia, such as objects, graphics, symbols, numbers, letters, or the like, that are printed on, displayed on, or otherwise associated with a player card used by the player to play a game of chance. In at least some embodiments, the player may select one or more player indicia for each player card.

The term "house indicia" or "game indicia" refers to indicia generated, called, or otherwise selected by a gaming establishment or an operator of the game. In one embodiment, house indicia are compared to player indicia on each player card to determine if each player card satisfies one or more winning conditions.

The term "ball call" refers to a random selection of house indicia in connection with a game of chance. The terms "select," "draw," "call," "determine," and "generate" are used interchangeably with respect to the selection of house indicia, numbers, or balls in a game. A ball call may include drawing or receiving a random ball with a number indicated on the ball, or may more generally refer to a random selection of a number or another suitable house indicia using a randomization device. A "ball," as used herein, may be a round plastic, wood, or glass spherical object with a number or other indicia displayed thereon, or may be an electronic representation of a spherical object with a number or other indicia displayed thereon. It should be recognized that the term "ball" may also include non-spherical objects or electronic representations, such as cubes, electronic images, and/or the numbers or indicia by themselves.

As used herein, the term "pattern" refers to a predetermined combination of spaces of a player card. In at least some embodiments, a winning combination is satisfied if player indicia included within the spaces associated with a pattern are matched to house indicia called during the game.

As used herein, the term "the house" refers to a game operator or a gaming establishment operator. For example, if a game is operated within or by a casino, the casino may be referred to as the house. Alternatively, the house may refer to a software application contained within a mobile device, such as a cell phone or a tablet computing device, that operates the game on the mobile device.

"Gameplay data," as used herein, refers to data associated with a player that is also associated with the results of one or more games that the player has played or is in the process of playing. Gameplay data may include, for example, a number of credits or an amount of currency available to the player, a number of games played, a number of games won or lost, a winning or losing streak, and/or any other suitable data.

As used herein, the term "fixed prize" or "fixed payout" refers to a prize or payout that is a predetermined multiple of an amount wagered on the game, or that is a fixed amount regardless of the amount wagered. The fixed prizes or payouts are typically listed on a pay table associated with the game.

In contrast, progressive prizes or payouts are prizes or payouts in which at least a portion of the payout or prize increases or changes based on the amounts wagered by the players who are playing the game to win the progressive prize.

A "local game" is a game that is played by players within a predetermined location, such as within a single gaming establishment, or players playing the game across a local area network. A "local prize" or a "local payout" (including a local progressive prize or a local progressive payout) is a prize that may be won during a local game.

In some embodiments, different groups of players may qualify to compete to win different prizes. For example, a first group of players positioned in a gaming establishment may be able to compete to win one or more local prizes (e.g., progressive prizes and/or pari-mutuel prizes) while a second group of players may not be able to compete to win those prizes, for example, if the second group of players is positioned outside of the gaming establishment. However, the first group of players and the second group of players may be able to compete to win one or more other shared or common prize, such as one or more progressive and/or pari-mutuel prizes administered over a wide area network.

An "individual prize" is a prize that is only awarded to a player of an individual gaming device. For example, if a group of players are playing a game over a network, the game may provide one or more individual prizes that are tied to a single gaming device such that the individual prizes are only able to be won by the player of the gaming device. Individual prizes are sometimes referred to as gaming device specific player prizes because the individual prizes are specific to a player's gaming device. Accordingly, while a plurality of players may play to win one or more shared or common progressive prizes and/or pari-mutuel prizes, each player is prevented from winning individual prizes associated with, or "tied to," any other player's gaming device.

As used herein, the terms "connect" and "couple" are not limited to only including direct connections. Rather, unless otherwise specified, indirect connections are included within the definitions of "connect" and "couple." For example, two devices may be considered to be connected together even if there are other devices or components connected between the two devices. Any suitable means to connect or couple devices or components together may be used.

A player reward card refers to a physical or electronic card, token, or other device or data that enables a system to identify a player in connection with, among other things, a reward program or campaign. Accordingly, the player reward card may serve to identify the player and may enable game play, credits, funds, or other data to be associated with the player.

A player card refers to a card that may be used by the player to play bingo or another game of chance. The player card typically includes a plurality of spaces that may display or include player indicia. The player card may be an electronic card that is transmitted to a device or generated by a device that the player is using to play the game of chance. Alternatively, the player card may be manufactured from paper, cardboard, cardstock, plastic, and/or any other suitable material.

Methods described herein may be embodied within a plurality of instructions stored within a memory device of a computing device. Moreover, a processor of the computing device, or of a computing device coupled to the memory device, executes the instructions to perform the functions described herein and/or to cause the functions described herein to be performed. The instructions may be grouped together to form one or more computer-readable program modules.

Computing devices typically include at least one processor and at least one memory device. The processor may be, without limitation, an x86-based logic circuit, an ARM-based logic circuit, and/or a system-on-a-chip circuit. It should be recognized that these examples are non-limiting, and a variety of other programmable circuits may be included within the definition of "processor." The memory device may include random access memory (RAM), flash memory, read-only memory (ROM), hard disk drives, magnetic-based memory, and/or any other form of computer-readable memory.

A desktop computer is one example of a computing device. Other examples of computing devices include, without limitation, electronic gaming machines (also known as slot machines), cell phones, tablets, PDAs, laptop computers, and smart watches. It should be recognized that computers or computing devices may be implemented as one or more virtual machines, virtual servers, and/or any other virtual device. A server is another type of computer that may receive network connections from a computer or a plurality of computers or other computing devices.

As used herein, the term "module" or "program module" refers to a computer program, dataset, and/or instruction set that, when executed by a processor, performs the functions described herein. In one embodiment, the module may be included within a computer program, or may be connected to a computer program in any suitable manner. Any computer readable instructions may be programmed or hard-coded in a device, such as a gaming device, in any suitable manner.

FIG. 1 is a block diagram of a system 100 that may be used to execute methods described herein to play one or more games of chance, such as bingo or keno. The games of chance may be played by a player against other players, or may be played by the player against the house.

System 100 is operated using components and devices within one or more gaming establishments 102, such as a first gaming establishment 104 and a second gaming establishment 106. It should be recognized that any suitable number of gaming establishments 102 may be provided within system 100. Accordingly, system 100 is not limited to including two gaming establishments 102 as illustrated in FIG. 1. In one embodiment, gaming establishments 102 are locations in which devices (e.g., gaming devices) that play or operate at least a portion of the game of chance are located. For example, gaming establishments 102 may be casinos, racetracks, bingo halls, or any other establishments. In another example, gaming establishments 102 may be residences or businesses in which one or more devices are located for playing or operating the game of chance. Gaming establishments 102 may additionally or alternatively include any combination of the examples described herein.

In one embodiment, gaming establishments 102 are physically remote from each other and are communicatively connected to at least one network 108, such as a wide area network (WAN), a metropolitan area network (MAN), and/or the Internet, for example. Alternatively, gaming establishments 102 may be separate rooms or sections of a casino or another facility that are communicatively connected together by network 108.

In one embodiment, each gaming establishment 102 includes a local game server 110 (referred to herein as a "local server") and a player reward server 112. Local server 110 is coupled to a plurality of gaming devices 114 through an internal network 116, such as a private local area network (LAN) within gaming establishment 102, for example. Gaming devices 114 may be located in separate gaming establishments 102, or within the same gaming establishment 102. In one embodiment, a gateway 118 is provided to enable local server 110 of each gaming establishment 102 to securely connect to network 108.

In one embodiment, local server 110 is a server computer (or "server") that monitors and controls the games played on gaming devices 114, including local games. In one embodiment, the local games include games that are played against the house and/or that are played against other players within gaming establishment 102.

In addition, local server 110 may administer other background tasks that enable games to be played on gaming devices 114. For example, local server 110 may facilitate authenticating gaming devices 114 and the players using gaming devices 114, and may facilitate allocating payments or credits between players and the house. Local server 110 may include payment processing capabilities to enable players to receive electronic funds from a bank or another financial institution or to deposit electronic funds to the bank or financial institution. Alternatively, the payment processing capabilities may be included in a separate server or another device that is communicatively connected to local server 110. In addition, local server 110 may interface with player reward server 112 to facilitate tracking and administering player rewards. Each gaming device 114, group of gaming devices 114, local servers 110, remote servers 112, or the like may collect and/or generate data desired for accounting purposes, such as for use in slot accounting systems.

In one embodiment, local server 110 may enable gaming devices 114 within gaming establishment 102 to participate in one or more games that share one or more progressive or pari-mutuel prizes with other gaming establishments 102 and/or gaming devices 114. For convenience, progressive and pari-mutual prizes will be collectively referred to as "progressive prizes" unless otherwise specified. In such an embodiment, each local server 110 may be coupled to a wide area progressive (WAP) server 120 that administers the prizes. For example, WAP server 120 receives data from each local server 110 and/or from gaming devices 114 regarding an amount wagered by each player playing the game. WAP server 120 may allocate a portion of each wager to the prizes and may communicate the current prize amounts to local servers 110 and/or to gaming devices 114.

Gaming devices 114 include one or more kiosks or electronic gaming machines (EGMs) (also known as "slot machines"). Gaming devices 114 may also include one or more mobile gaming devices 122, such as, without limitation, cellular phones, tablet computing devices, and/or laptops. Mobile gaming devices 122 may connect to local server 110, WAP server 120, and network 108 via a wireless data network represented by cell tower 124. For example, mobile gaming devices 122 may connect to any suitable network 108 (and thereby to local servers 110 and/or WAP server 120) via a "3G" or a "4G" wireless data network. For convenience, gaming devices 114 described herein may also include mobile gaming devices 122.

During operation, the player utilizes or selects a gaming device 114 and initiates a gaming session for playing one or more games of chance ("games"). Optionally, player enters a player reward number or other identification information into gaming device 114. If the identification information is entered, gaming device 114 transmits the identification information to local server 110 for authentication, or authentication may be accomplished locally within gaming device 114. Local server 110 communicates with player reward server 112 to establish the player's identity and to associate the gameplay with the player account. Local server 110 authenticates the player and gaming device 114 and authorizes the player to play the game or games on gaming device 114 if desired or required.

When play of the game is initiated, during selection of the game, or during play of the game, the player may be required to purchase or generate credits. The player may purchase or generate credits by inserting cash or a ticket-in-ticket-out voucher into gaming device 114 or another device. Alternatively or additionally, the player may transfer credits or cash to gaming device 114 from banking accounts, credit accounts, gaming establishment accounts, and/or gaming company accounts. In one embodiment, computer-generated credits may be used with gaming device 114, for example, as part of a free-to-play game.

The player selects a game to play and enters a wager on gaming device 114. Gaming device 114 transmits data representative of the selected game and the wager to local server 110. If the player selects a game that is at least partially operated by WAP server 120 or that includes one or more progressive prizes administered by WAP server 120, local server 110 transmits the wager and game information and/or selection to WAP server 120. WAP server 120 may increment the progressive prizes based on the wager received from the player and may communicate the updated prize amounts via network 108 to all other players (via associated gaming devices 114) playing to win the progressive prizes.

The player plays the game on gaming device 114. The following gameplay is described as being administered by WAP server 120. However, it should be recognized that the gameplay (i.e., the play of the game of chance) may be alternatively or additionally administered by local server 110 and/or gaming device 114. For example, if gaming device 114 is a cellular phone or a tablet computing device, the gameplay may be administered through an application installed on gaming device 114.

In one embodiment, the player may play a game of bingo by selecting a game or game type, one or more player cards, selecting one or more winning patterns for the player cards, and/or selecting one or more numbers or other player indicia for the player cards using gaming device 114. The selected player cards, winning patterns, and player indicia are transmitted to WAP server 120. The player cards are included within one or more game tickets issued by WAP server 120, and the game tickets are communicated to gaming device 114 via network 108 and local server 110. WAP server 120 selects or receives randomly generated house indicia and compares the house indicia to the player indicia and the pattern or patterns selected for the player cards. Alternatively, the functions described herein (e.g., comparing the house indicia to the player indicia and the pattern or patterns selected for the player card) may be performed in gaming device 114. It should be recognized that the house indicia may be randomly generated using a randomization device, such as hardware, firmware, and/or software-based random number generator (RNG), a ball blower or console, a ball cage, and/or any other suitable device or machine that enables numbers or other house indicia to be randomly generated. In an alternative embodiment, WAP server 120 (or another device) may designate a server, computer, or another device to provide randomly selected house indicia during the game, and may receive the house indicia from the designated device.

WAP server 120 determines whether the player wins a prize based on the comparison of the house indicia to the player indicia. For example, WAP server 120 determines whether the player indicia within the pattern or patterns selected for each card match the house indicia that were randomly determined (sometimes also referred to as the house indicia that were "called"). If the player indicia within a pattern match the called house indicia, the player wins a prize based on a pay table associated with the game. The prize may be one of the progressive prizes or the prize may be a fixed prize identified in the pay table. WAP server 120 determines the appropriate payout to be paid to the player based on the pay table and transmits data representative of the payout to local server 110.

Local server 110 receives the payout data and credits the player account accordingly. In addition, local server 110 may transmit the gameplay data and/or payout data to player reward server 112 to enable player reward server 112 to update the player history and other gameplay data for the player. When the player is done playing, the player may "cash out" some or all of the credits in the player account or may deposit the credits into the player account. The player account may be stored on gaming device 114, local server 110, or player reward server 112, for example.

In one embodiment, the player may enter the wager and/or may initiate play of the game on a first gaming device 114 and may complete the gameplay on a second gaming device 114. Alternatively, the player plays the game on first gaming device 114 and receives the results of the gameplay (e.g., whether the player won and how much the winnings are) on second gaming device 114. For example, the player may begin playing the game on a kiosk or electronic gaming machine, and may complete the game or view the results of the game on a cell phone. In such an embodiment, WAP server 120 and/or local server 110 may transmit the player's gameplay data from the 1st gaming device 114 to the second gaming device 114.

Figure 2:
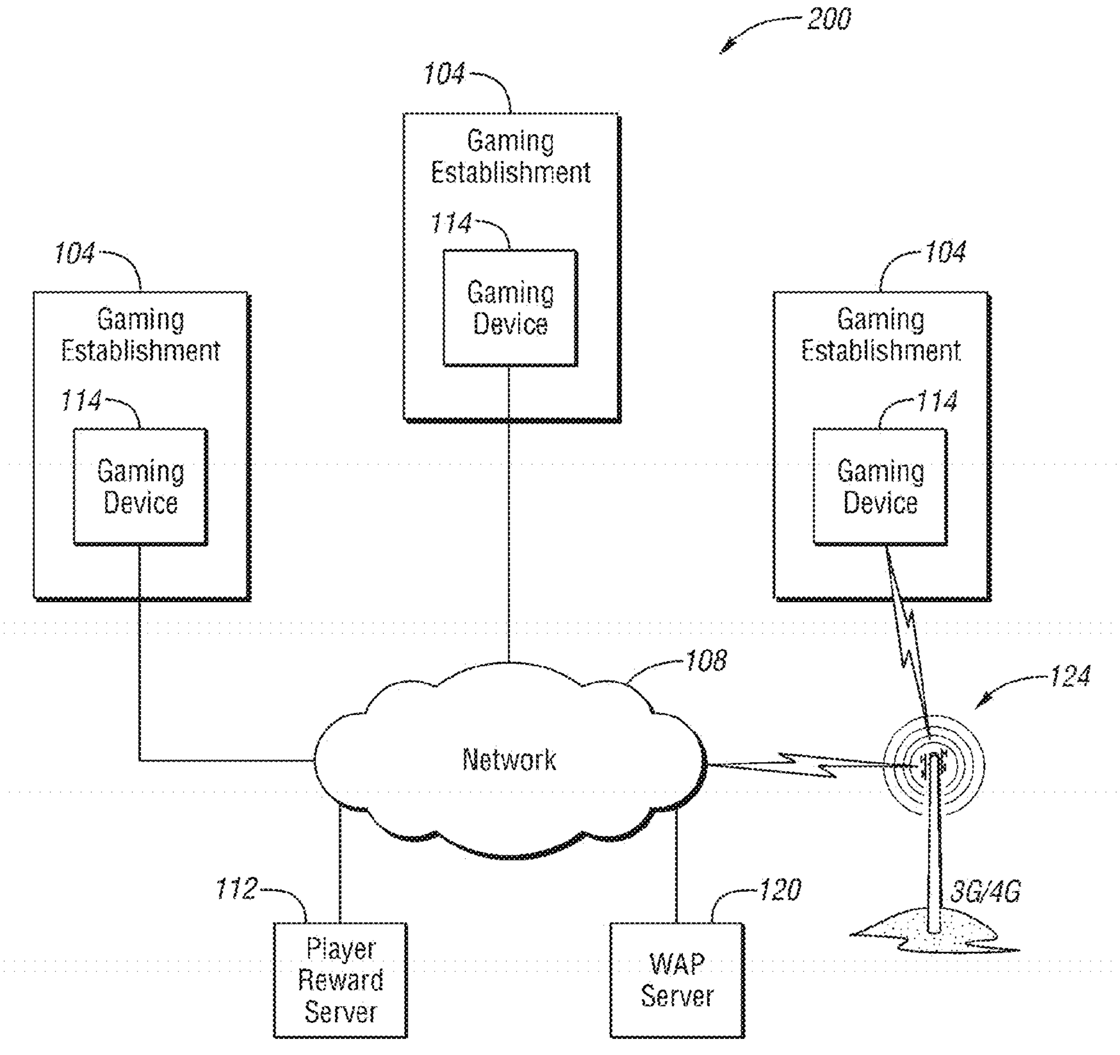
FIG. 2 is a block diagram of another system that may be used to play a game of chance.

FIG. 2 is a block diagram of another system 200 that may be used to execute methods described herein to play one or more games of chance, such as bingo or keno. Unless otherwise specified, system 200 is similar to system 100 (shown in FIG. 1) and similar components are labeled in FIG. 2 with the same reference numerals used in FIG. 1.

In the embodiment shown in FIG. 2, system 200 includes a plurality of gaming devices 114 that are positioned in a plurality of gaming establishments 102. Gaming devices 114 may connect to network 108 without using a local server 110 (shown in FIG. 1), and may connect to WAP server 120 and/or to player reward server 112 through network 108. For example, gaming devices 114 may be playing one or more Internet-based games that connect to WAP server 120 through a web server. In some embodiments, one or more gaming devices 114 may connect to WAP server 120 and/or to player reward server 112 through a wireless data network as described above. Accordingly, gaming devices 114 interact with WAP server 120 to play the game, and WAP server 120 performs the game administration and other tasks handled by local server 110 as described above in FIG. 1. In other respects, system 200 performs in a similar manner as described above.

During operation, the player utilizes or selects a gaming device 114 and initiates a gaming session to play one or more games on gaming device 114. Player enters a player reward number or other identification information into gaming device 114. Gaming device 114 transmits the identification information to player reward server 112 to establish the player's identity and to associate the gameplay with the player account. Player reward server 112 authenticates the player and gaming device 114 and authorizes the player to play the game on gaming device 114. In one embodiment, gaming device 114 also transmits the identification information to WAP server 120 to enable WAP server 120 to associate the player with the game to be played. As previously described, player identification or authentication may be optional.

In another embodiment, WAP server 120 authenticates the player using the player identification information in addition to, or instead of, the authentication performed by player reward server 112. In some embodiments, player reward server 112 is omitted and the functions of player reward server 112 are incorporated within WAP server 120.

The player selects a game to play and enters a wager using gaming device 114. If the player selects a game that is operated by WAP server 120 or that includes one or more progressive prizes administered by WAP server 120, gaming device 114 transmits the wager and game selection to WAP server 120. WAP server 120 may increment the progressive prizes based on the wager received from the player and may communicate the updated prize amounts via network 108 to all other players (via associated gaming devices 114) playing to win the progressive prizes.

The player plays the game on gaming device 114. The following gameplay is described as being administered by WAP server 120. However, it should be recognized that the gameplay may be alternatively or additionally administered by gaming device 114. For example, if gaming device 114 is a cellular phone or a tablet computing device, the gameplay may be administered through an application installed on gaming device 114. It should be recognized that gameplay may be alternatively or additionally administered by gaming device 114 if desired.

In one embodiment, the player may play a game of bingo by selecting one or more player cards, selecting one or more winning patterns for the player cards, and/or selecting one or more numbers or other player indicia for the player cards using gaming device 114. In another embodiment, the player may play a game of keno by selecting one or more player cards and selecting one or more numbers or other player indicia for the player cards using gaming device 114. The selected player cards, winning patterns (for example, in the bingo embodiment), and player indicia are transmitted to WAP server 120. The player cards are included within one or more game tickets issued by WAP server 120, and the game tickets are communicated to gaming device 114 via network 108 and local server 110. WAP server 120 selects or receives randomly generated house indicia and compares the house indicia to the player indicia and the pattern or patterns selected for the player cards. It should be recognized that the house indicia may be randomly generated using a randomization device, such as hardware, firmware, and/or software-based random number generator (RNG), a ball blower or console, a ball cage, and/or any other suitable device or machine that enables numbers or other house indicia to be randomly generated.

WAP server 120 determines whether the player wins a prize based on the comparison of the house indicia to the player indicia. For example, in an embodiment in which the player plays a game of bingo, WAP server 120 determines whether the player indicia within the pattern or patterns selected for each card match the house indicia that were randomly determined. If the player indicia within a pattern match the called house indicia, the player wins a prize based on a pay table associated with the game. In an embodiment in which the player plays a game of keno, WAP server 120 determines whether the player indicia selected for each card match the house indicia that were randomly determined. If a predetermined number of the player indicia match the called house indicia, the player wins a prize based on a pay table associated with the game. The prize may be one of the progressive prizes or the prize may be a fixed prize identified in the pay table. WAP server 120 determines the appropriate payout to be paid to the player based on the pay table and transmits data representative of the payout to gaming device 114 for display to the player.

WAP server 120 also credits the player account to reflect the prize that was won by the player. In addition, WAP server 120 may transmit the gameplay or payout data to player reward server 112 to enable player reward server 112 to update the player history and other gameplay data for the player. When the player is done playing, the player may "cash out" some or all of the credits in the player account and/or gaming device 114 or may deposit the credits in the player's account.

In one embodiment, the player may enter the wager and/or may initiate play of the game on a first gaming device 114 and may complete the gameplay on a second gaming device 114. Alternatively, the player plays the game on first gaming device 114 and receives the results of the gameplay (e.g., whether the player won and how much the winnings are) on second gaming device 114. For example, the player may begin playing the game on a kiosk or electronic gaming machine, and may complete the game or view the results of the game on a cell phone. The game completion may be for a game currently being played, or may be for one or more future games (i.e., one or more games that have not yet started. For example, the player may enter sufficient credits or other consideration into gaming device 114 to purchase gameplay for a plurality of future games that use the same player card or that use other preselected or random player cards. The player may then complete one or more of the future games on another gaming device 114 (or any other suitable device) and/or may receive the result of one or more of the future games on another gaming device 114 (or any other suitable gaming device).

In one embodiment, the player may purchase any number of future games (i.e., games to be played in the future) by entering a wager, a number of cards to play for each game, and a number of games to play. After inserting sufficient cash or credits to pay for the games, WAP server 120 or another device or machine that is administering the game (such as gaming device 114) may automatically display the called house indicia for each game and a result of each game to the player. The player may watch the results of the game in real time, or may view the results at a later time, for example, by viewing a summary of the game results. The player may view the results (in real time or later) on the same gaming device 114 used to initiate the games and enter the wagers, on another gaming device 114, or on any other suitable device.

In another embodiment, such as an embodiment in which the game is administered through an application installed on a cell phone, a tablet computing device, or another gaming device 114, WAP server 120 only administers the progressive prizes, or some or all prizes associated with the game being played. In such an embodiment, gaming device 114 randomly selects the house indicia using a randomization device included within, or connected to, gaming device 114. In addition, gaming device 114 may determine whether the player indicia within the player selected pattern match the house indicia, thus determining whether the player wins a prize. Gaming device 114 may transmit the results of the game to WAP server 120. The results of the game may include, for example, an indication whether the player won, the house indicia randomly selected, the player indicia selected, the player pattern selected, the number of ball calls that were required to match the house indicia to the player indicia, and/or any other aspect of the game.

In one embodiment, WAP server 120 confirms the result of the game before awarding the prize to the player. For example, WAP server 120 may determine whether the house indicia match the player indicia within the player selected pattern independently of the game result reported by gaming device 114.

Figure 3:
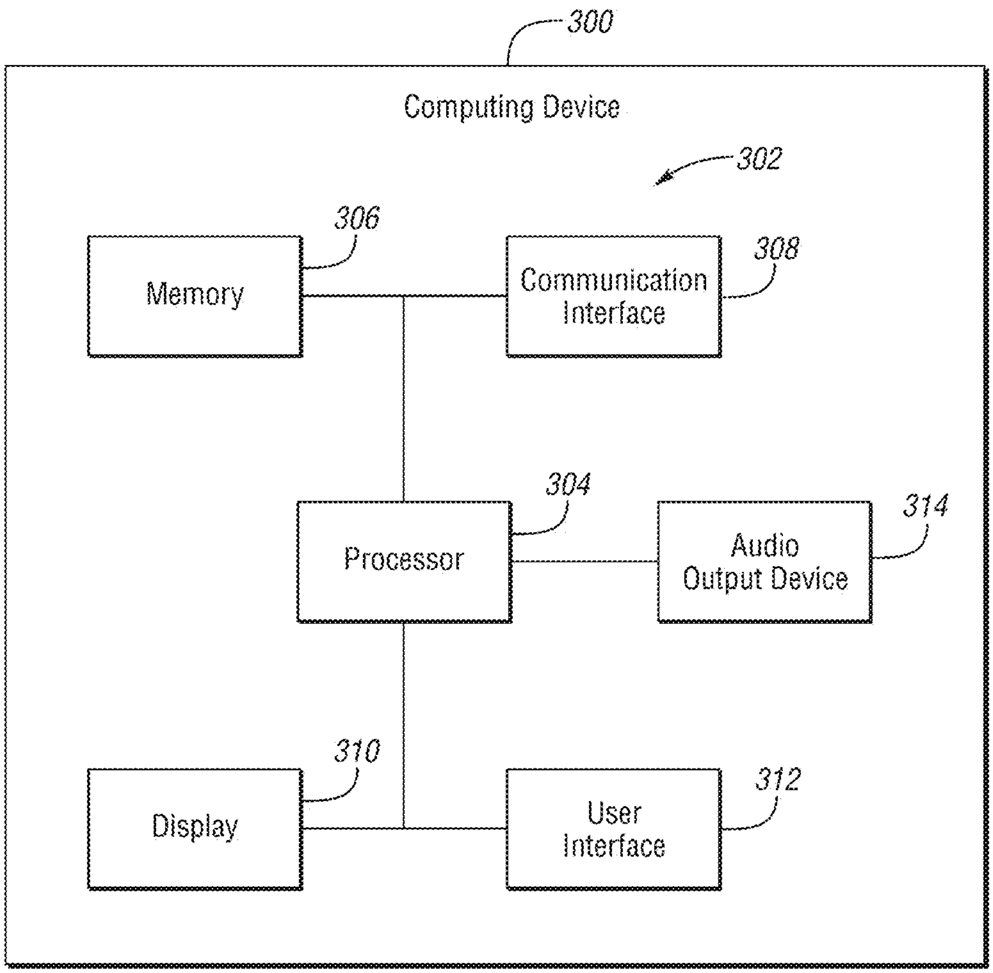
FIG. 3 is a block diagram of a computing device that may be used with the system shown in FIG. 1 or the system shown in FIG. 2.

FIG. 3 is a block diagram of a computing device 300 that may be used with system 100 (shown in FIG. 1) or system 200 (shown in FIG. 2). More specifically, one or more gaming devices, servers, or other devices described in system 100 or system 200 may be implemented as a computing device 300. For example, local server 110, WAP server 120, player reward server 112, gaming devices 114, and/or mobile gaming devices 122 may be computing devices 300.

Computing device 300 includes a plurality of computing device components 302, such as a processor 304, a computer-readable memory device 306, and a communication interface 308. In one embodiment, computing device 300 may also include a display 310, a user interface 312, and/or an audio output device 314. It should be recognized that memory device 306, communication interface 308, display 310, and user interface 312 (if provided) may be connected to processor 304 and/or to each other via any suitable bus or busses, interfaces, or other mechanisms.

Processor 304 includes any suitable programmable circuit including one or more microcontrollers, microprocessors, application specific integrated circuits (ASICs), systems on a chip (SoCs), programmable logic circuits (PLCs), field programmable gate arrays (FPGAs), and/or any other circuit capable of executing the functions described herein. The above examples are exemplary only, and thus are not intended to limit in any way the definition and/or meaning of the term "processor."

Memory device 306 includes transitory or non-transitory computer readable medium, such as, without limitation, random access memory (RAM), flash memory, a hard disk drive, a solid state drive, a compact disc, a digital video disc, and/or any suitable memory. Memory device 306 may include data as well as instructions that are executable by processor 304 to program processor 304 to perform functions described herein. For example, the methods described herein may be performed by one or more processors 304 executing instructions stored within one or more memory devices 306.

Communication interface 308 may include, without limitation, a network interface controller (NIC) or adapter, a radio frequency (RF) transceiver, a public switched telephone network (PSTN) interface controller, or any other communication device that enables computing device 300 to operate as described herein. In one embodiment, communication interface 308 may connect to communication interfaces 308 of other computing devices 300 of system 100 or system 200 through network 108 or another network using any suitable wireless or wired communication protocol.

Display 310 may include, without limitation, a liquid crystal display (LCD), a vacuum fluorescent display (VFD), a cathode ray tube (CRT), a plasma display, a light-emitting diode (LED) display, a projection display, and/or any suitable visual output device capable of displaying graphical data and text to a user. For example, display 310 may be used to display a graphical user interface to a player or an administrator, one or more images associated with a game such as bingo, keno, or another game of chance, player statistics, gameplay data, and/or any other suitable data.

User interface 312 may include, without limitation, a keyboard, a keypad, a touch screen, a mouse, a scroll wheel, a pointing device, an audio input device employing speech-recognition software, a video input device that registers movement of a user, and/or any other suitable device that enables the user to input data into computing device 300 and/or retrieve data from computing device 300.

Audio output device 314 may include, without limitation, one or more speakers, or any other device that enables data to be audibly output from computing device 300. For example, gameplay data and/or music may be audibly output from audio output device 314. In addition, if the player wins a prize, audio output device 314 may be used to alert the player and/or others about the win.

While the foregoing computing device components 302 have been described as being included within a computing device 300, it should be recognized that at least some computing devices 300 may not include each component 302. For example, a computing device 300 may not include audio output device 314. In addition, a computing device 300 may include any suitable number of each individual computing device component 302. For example, a computing device 300 may include a plurality of processors 304 or processor cores, a plurality of memory devices 306 (of the same or different types, sizes, etc.), and/or a plurality of displays 310.

Figure 4:
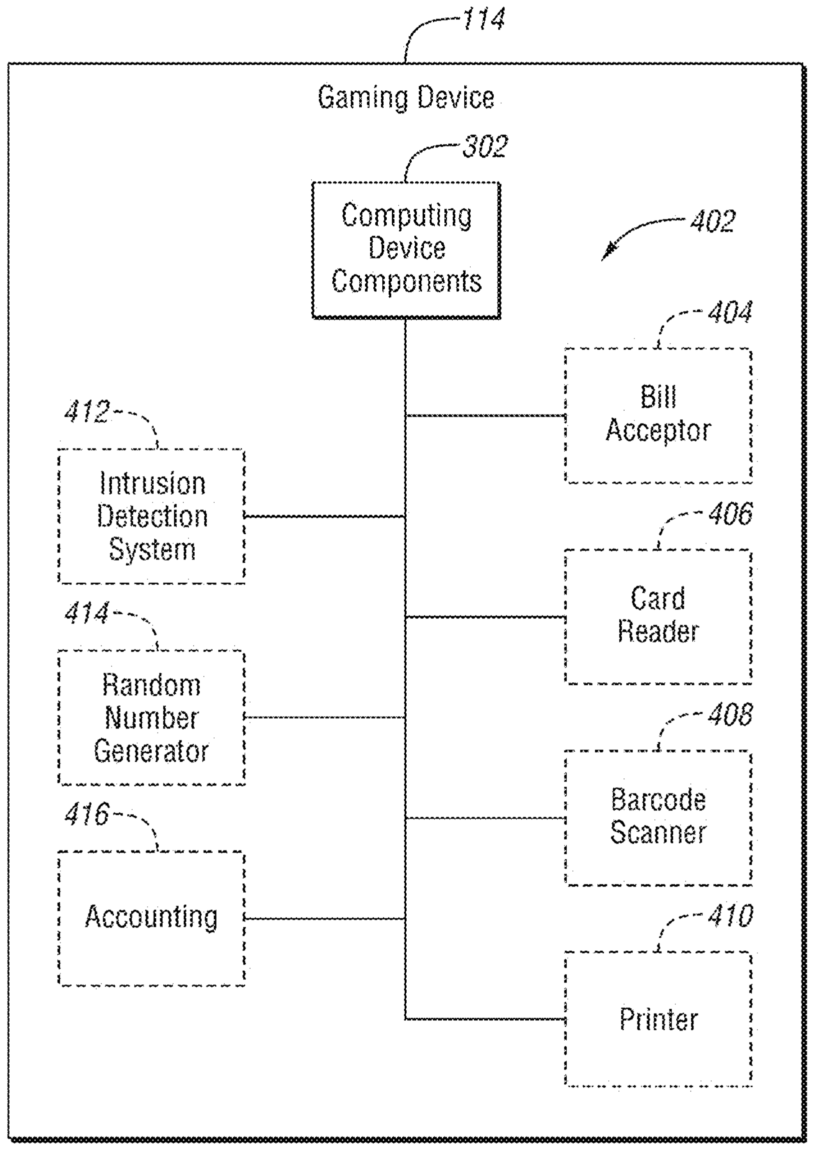
FIG. 4 is a block diagram of a gaming device that may be used with the system shown in FIG. 1 or the system shown in FIG. 2.

FIG. 4 is a block diagram of an exemplary gaming device 114 that may be used with system 100 (shown in FIG. 1) or system 200 (shown in FIG. 2). As described above, gaming device 114 is a computing device 300 that includes a plurality of computing device components 302. In addition, gaming device 114 may include a plurality of gaming device components 402 including a bill acceptor 404, a card reader 406, a barcode scanner 408, a printer 410, an intrusion detection system 412, a randomization device 414, and an accounting interface 416.

It should be recognized that in some embodiments, a gaming device 114 may not include each gaming device component 402 illustrated in FIG. 4. For example, if gaming device 114 is a cellular phone, gaming device 114 may not include bill acceptor 404, card reader 406, barcode scanner 408, and/or printer 410. Rather, in some embodiments, the functions of each omitted gaming device component 402 may be replaced by equivalent software, hardware, and/or firmware if desired. Optional components may be designated using dashed lines in the figures.

Bill acceptor 404 is a device that enables gaming device 114 to receive and identify paper currency. For example, bill acceptor 404 may receive and identify dollar bills that are inserted into bill acceptor 404. In one embodiment, bill acceptor 404 includes a scanner that scans paper currency inserted therein. Bill acceptor 404 may also include optical character recognition (OCR) capabilities that enable bill acceptor 404 to identify the amount of currency inserted into bill acceptor 404 from a scanned image of the currency. Bill acceptor 404 may transmit data representative of the amount of currency inserted into gaming device 114 to processor 304, for example. Processor 304 may cause the amount of currency to be converted into credits usable with the game, and may add the credits to the player's account.

Card reader 406 is a device that "reads," or obtains data encoded in, player reward cards or other cards or media that are inserted into reader 406. In one embodiment, card reader 406 is a magnetic card reader that reads barcodes or magnetic strips included within a player reward card. In another embodiment, card reader 406 wirelessly reads data encoded within the player reward card by accessing a chip, such as a radio frequency identification (RFID) chip, embedded within the card. Card reader 406 decodes the data obtained from the cards and transmits the decoded data to processor 304. In one embodiment, card reader 406 is used to read player identification information encoded within player reward cards. Processor 304 may transmit the player identification information to player reward server 112 to identify the player, to allow for the transfer of funds or credits, to facilitate authenticating the player, and/or to authorize the player to play a game on gaming device 114. In one embodiment, the player may "log in" to gaming device 114 by swiping the player reward card or otherwise passing the player reward card through, or inserting the player reward card within, card reader 406. In another embodiment, the player may enter a number or other identifier associated with the player reward card into gaming device 114, through user interface 312 for example, instead of using card reader 406. In another embodiment, the insertion of the player reward card and player entering the identifier into user interface 312 may be combined. In yet another embodiment, the player may use a near field communication (NFC) device, such as an NFC device incorporated within communication interface 308, to read the player reward card or data representative of the player card.

In one embodiment, barcode scanner 408 is an optical or a magnetic scanner that is optimized to read barcodes on media positioned proximate to scanner 408. For example, barcode scanner 408 may be optimized to read barcodes printed on paper receipts (sometimes referred to as "tickets," not to be confused with game or bingo tickets that may include player selected patterns, player indicia, and the like) and/or barcodes displayed electronically on a cell phone or tablet computing device. It should be recognized that the barcodes read by barcode scanner 408 may be linear or one-dimensional barcodes, two-dimensional barcodes, or may even include data represented in a form other than a barcode. For example, barcode scanner 408 may read images and/or text indicative of data, such as currency or credits, usable with gaming device 114. Barcode scanner 408 extracts the data from the barcode and transmits the data to processor 304. For example, barcode scanner 408 may scan a paper receipt or voucher that includes an amount of currency or credits usable by the player with a gaming device 114 and may transmit the amount of credits to processor 304. Processor 304 may cause the amount of currency or credits to be displayed to the player on display 310 to inform the player how many credits or currency is available to be used in playing a game.

Printer 410 may be used to print paper receipts (also known as tickets as described above) that indicate an amount of currency or credits available to the player. In many locations, the tickets or receipts may alternatively be referred to as vouchers. In one embodiment, printer 410 is a thermal printer that is fed by a roll of paper or any suitable paper stock. In a further embodiment, the roll of paper includes one or more watermarks that are visible when printer 410 has printed the receipt on the paper. Alternatively, printer 410 may print the watermark on the receipt, or may include another security mechanism to facilitate preventing counterfeit receipts from being made. For example, printer 410 may include an image or a code on the receipt that identifies gaming device 114, printer 410, or another component of gaming device 114 along with a time that the receipt was printed. Other suitable security mechanisms may be used as well. It should be recognized that barcode scanner 408 and printer 410 may cooperate such that a security mechanism printed on the receipt may be received and validated by barcode scanner 408, in conjunction with processor 304, for example. Barcode scanner 408 may be located remotely from gaming device 114, such as within a redemption kiosk, a casino cage, or the like.

Intrusion detection system 412 notifies processor 304 if a case, cabinet, or other housing enclosing components of gaming device 114 is opened or modified without authorization. In one embodiment, intrusion detection system 412 includes a pair of contacts that transmit an electronic signal to processor 304 if the housing of gaming device 114 is opened (e.g., if the opening of the housing separates the contacts). In another embodiment, intrusion detection system 412 may include a light sensor that detects a change in the light within the housing of gaming device 114. Intrusion detection system 412 may also include a key or another mechanism for disabling the transmission of the signal to processor 304 in the event that maintenance or other authorized access to gaming device 114 components is desired.

In one embodiment, intrusion detection system 412 includes a software program (a "monitoring program") that monitors one or more applications installed on gaming device 114. For example, if gaming device 114 is a cell phone that includes an application for playing the game thereon, the monitoring program may monitor the application to determine whether the application is modified without authorization. In one embodiment, the monitoring program stores a hash value or a digital fingerprint of the application when the application is installed and/or when the application undergoes authorized modification (e.g., if the application is updated or patched). However, if the monitoring program determines that the application has been modified without authorization, the monitoring program may cause a signal or another notification to be transmitted to processor 304. For example, the monitoring program may periodically calculate a new hash value of the application and/or create a new digital fingerprint of the application. The monitoring program then compares the new hash value and/or digital fingerprint to the stored hash value and/or digital fingerprint. If the hash values or fingerprints are different, the monitoring program may determine that the application has been modified without authorization. It should be understood that the hash value, the monitoring program, and/or the digital fingerprint may be generated by any suitable means and may be encrypted for additional security.

In response to the signal or notification from intrusion detection system 412 and/or the modification program, processor 304 may perform one or more actions. For example, processor 304 may alert an administrator within gaming establishment 102 by transmitting a message via communication interface 308, may cause audio output device 314 to emit an alarm or another audible alert, may cause display 310 to display an error or a warning, and/or may disable the application and/or gaming device 114 such that the game is unable to be played on gaming device 114.

In one embodiment, randomization device 414 is an electronic random number generator (RNG) 414 or a permutation generator that may be implemented by a dedicated hardware device with associated embedded software. Alternatively, RNG 414 or the permutation generator may be implemented entirely in software executing on gaming device 114. In one embodiment, RNG 414 or the permutation generator provides house or game draws of between 1 and n numbers, where n may be a suitable number based on the game type selected to be played by the player. RNG 414 or the permutation generator may be programmed via hardware, software, or firmware to provide a particular range of numbers (or other indicia) and numbers of draws for a particular application. For example, in one embodiment of bingo according to the present disclosure, RNG 414 or the permutation generator initially provides 24 randomly generated numbers having values between 1 and 75 for each game. Additional draws or numbers may be provided to play the game to conclusion depending on the particular implementation as described in greater detail herein. In addition, RNG 414 or the permutation generator may be used to randomly select a plurality of player indicia to be used with one or more player cards. In embodiments in which a processor, such as processor 304, is described as randomly selecting indicia, it should be recognized that processor 304 may interface with randomization device 414 or the permutation generator to select the indicia. In other embodiments, processor 304 may include randomization device 414 or the permutation generator, or may execute instructions to perform the functions of randomization device 414 or the permutation generator.

Accounting interface 416 is used to interface with an accounting system, such as a slot accounting system, at or operated by a gaming establishment 104. Accounting interface 416 may include or be connected to a network interface, such as communication interface 308 for use in communicating gameplay data, player identification information, and/or other data to the accounting system for accounting and/or auditing purposes.

Figure 5:
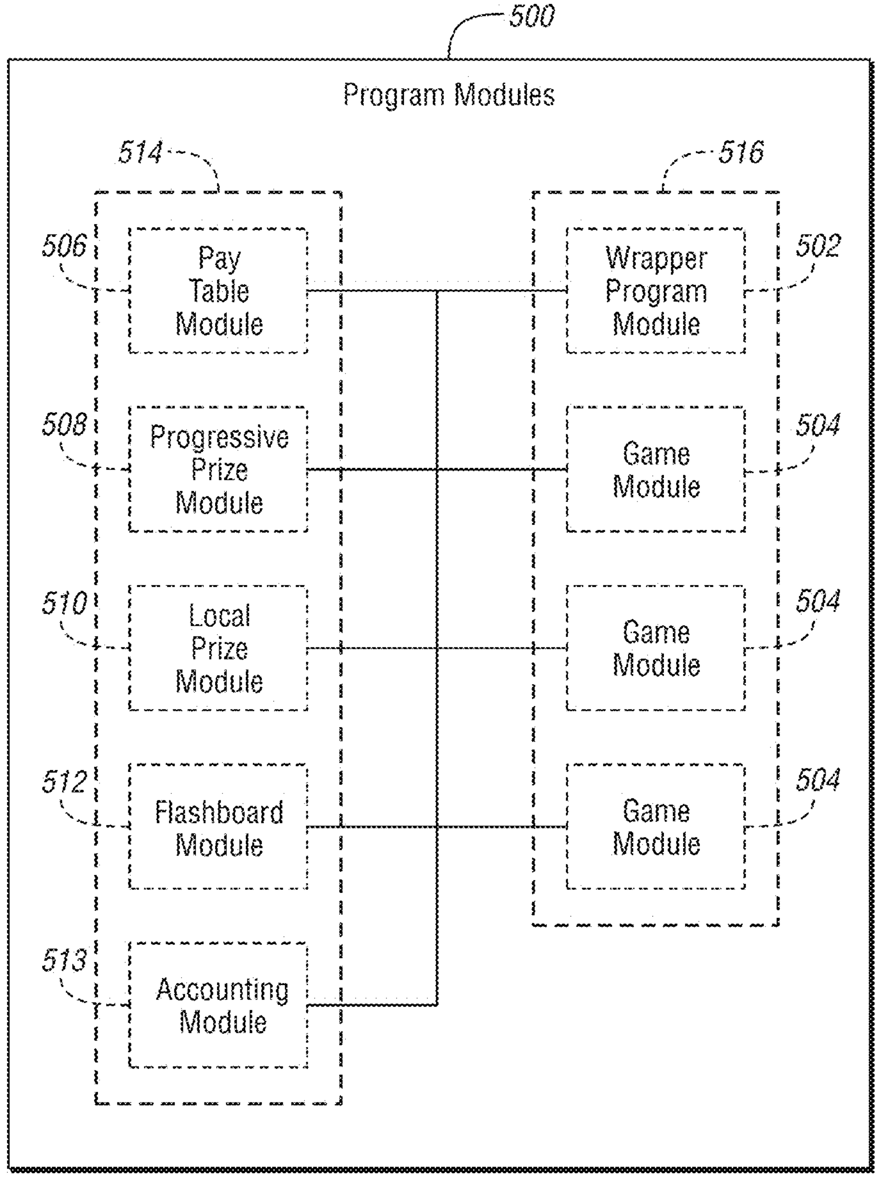
FIG. 5 is a block diagram of a plurality of program modules that may be used with the system shown in FIG. 1 or the system shown in FIG. 2 to administer a game of chance.

FIG. 5 is a block diagram of a plurality of program modules 500 that may be used with system 100 (shown in FIG. 1) or system 200 (shown in FIG. 2) to administer one or more games of chance, such as bingo or keno. In one embodiment, program modules 500 are installed and/or stored within local server 110, WAP server 120, and/or gaming devices 114. For example, program modules 500 may be stored in memory device 306 of local server 110, WAP server 120, and/or gaming devices 114.

Program modules 500 are hardware, firmware, or software programs or applications that, when executed by processor 304 of local server 110, WAP server 120, and/or gaming device 114, cause processor 304 to perform the functions described herein. In one embodiment, program modules 500 include a wrapper program module 502, a plurality of game modules 504, a pay table module 506, a progressive prize module 508, a local prize module 510, a flashboard module 512, and/or an accounting module 513. A first plurality 514 of program modules 500 may be installed within each local server 110 and/or WAP server 120 and a second plurality 516 of program modules 500 may be installed within each gaming device 114. It should be recognized that in embodiments in which the game of chance is administered by gaming device 114 (e.g., when a cell phone or a tablet computing device is used as gaming device 114), some or all of the first plurality 514 of program modules 500 may be incorporated within gaming device 114 and executed by processor 304 of gaming device 114. Alternatively, some or all of the second plurality 516 of program modules 500 may be incorporated within local server 110 and/or WAP server 120. Together, wrapper program module 502, game modules 504, and other program modules 500 that present and/or administer one or more games may be referred to herein as a game application, or an application.

In one embodiment, wrapper program module 502 is used at least in part to provide a graphical user interface (GUI) on display 310 of gaming device 114. Wrapper program module 502 operates to provide an entry point or a game entry interface for a player to access gaming device 114, and to enable the player to select a game of chance to be played on gaming device 114. For example, the games of chance may be categorized into a plurality of game sizes and a plurality of game variations. Wrapper program module 502 may present the game sizes and the game variations to the player, using display 310, and may enable the player to select a game to play by selecting a game size and game variation through user interface 312.

In one embodiment, wrapper program module 502 may present a list of player card sizes (i.e., game sizes or matrices), such as 3×3, 4×4, and 5×5, to the player for selection on display 310. In addition, wrapper program module 502 may present a list of bingo games or game variations to the player for selection on display 310. Alternatively, the game size and game variation may be combined into one selectable icon, such as an icon representing a first variation of 3×3 bingo or a second variation of 5×5 bingo variation. If the player selects a size and variation, wrapper program module 502 calls or branches to a game module 504 that provides the selected game size and variation.

In one embodiment, game modules 504 each provide a game associated with the selected game size and game variation to the player using gaming device 114, local server 110, and/or WAP server 120. Accordingly, in one embodiment, each game is provided by a separate game module 504. Alternatively, each game module 504 may provide more than one game to the player.

Pay table module 506 provides a pay table associated with each game such that one or more pay tables may be associated with each game module 504. In one embodiment, pay table module 506 provides a pay table associated with a game when game module 504 requests the pay table and/or when a predetermined event occurs during the game. Pay tables associated with a game may be changed as desired by a game operator by any suitable means. The predetermined event may include, for example, the player selecting a "See Pays" or another icon displayed on display 310 that represents a request to view the pay table for the game. The predetermined event may also include reaching a point in the game in which the house indicia are matched to the player indicia within a selected pattern to determine whether the player wins a prize.

Progressive prize module 508 may be used to administer aspects of one or more progressive prizes, such as one or more progressive prizes offered to players playing across network 108. For example, progressive prize module 508 may receive information regarding an amount wagered by each player playing a game that has a chance to win the progressive prize. Progressive prize module 508 may allocate a first portion of each wager to a first progressive prize to increase the size of the progressive prize. Progressive prize module 508 may allocate a second portion of each wager to a second progressive prize, and may continue in a similar manner for any additional progressive prizes, if desired or applicable. Accordingly, a plurality of progressive prizes may be provided for each game and may be at least partially funded by each wager.

Local prize module 510 may be used to administer aspects of one or more local prizes, such as one or more prizes that may be won by players playing against each other within a gaming establishment 102. In addition, local prize module 510 may administer aspects of one or more fixed prizes, such as prizes that may be won only by individual players playing on respective gaming devices 114. Accordingly, fixed prizes may be awarded to a player based on the gameplay of the player against randomization device 414 of gaming device 114, rather than based on winning against other players.

In one embodiment, flashboard module 512 may be used to display called bingo numbers or other house indicia within one or more gaming establishments. In another embodiment, flashboard module 512 may be used to display called bingo number, keno numbers, or other house indicia on gaming devices 114 themselves, for example, on display 310 during play of the game. Flashboard module 512 may cause the house indicia to be displayed as a rectangular matrix of spaces (sometimes referred to as a "flashboard"). For bingo games played utilizing 75 numbers or indicia, the letters B, I, N, G, and O may be pre-printed above five vertical columns of the matrix with one letter appearing above each column to assist players in more quickly locating a called number on their card(s). For 75 number bingo games, the numbers printed on the card are commonly arranged as follows: 1 to 15 in the B column, 16 to 30 in the I column, 31 to 45 in the N column, 46 to 60 in the G column, and 61 to 75 in the O column. However, other arrangements of the flashboard may be used instead of the arrangement described herein.

Accounting module 513 may be used to interface with an accounting system, such as a slot accounting system, at or operated by a gaming establishment 104. In one embodiment, accounting module 513 is incorporated within, or executed by, accounting interface 416. Any suitable data, such as gameplay data, player identification information, an amount of prizes won by a player, and/or any other suitable data may be collected and transmitted by accounting module 513.

For keno games played utilizing 80 number or indicia, the numbers may be arranged sequentially in a matrix such that numbers 1-10 appear sequentially in a first row, the numbers 11-20 appear sequentially in a second row below the first row, the numbers 21-30 appear sequentially in a third row below the second row, and so on. It should be recognized that embodiments of keno games having a different number of player indicia (or spots) may be used, such as 49 or 25 spots.

It should be recognized that two or more program modules 500 may be combined together such that the functionality of each program module 500 is incorporated into the combined module. Likewise, each program module 500 may be split into two or more sub-modules that each perform a portion of the functionality of the program module 500 being split. Accordingly, while the above-described program modules 500 are described individually, each may be combined or split into other sub-modules as desired.

Figure 6:
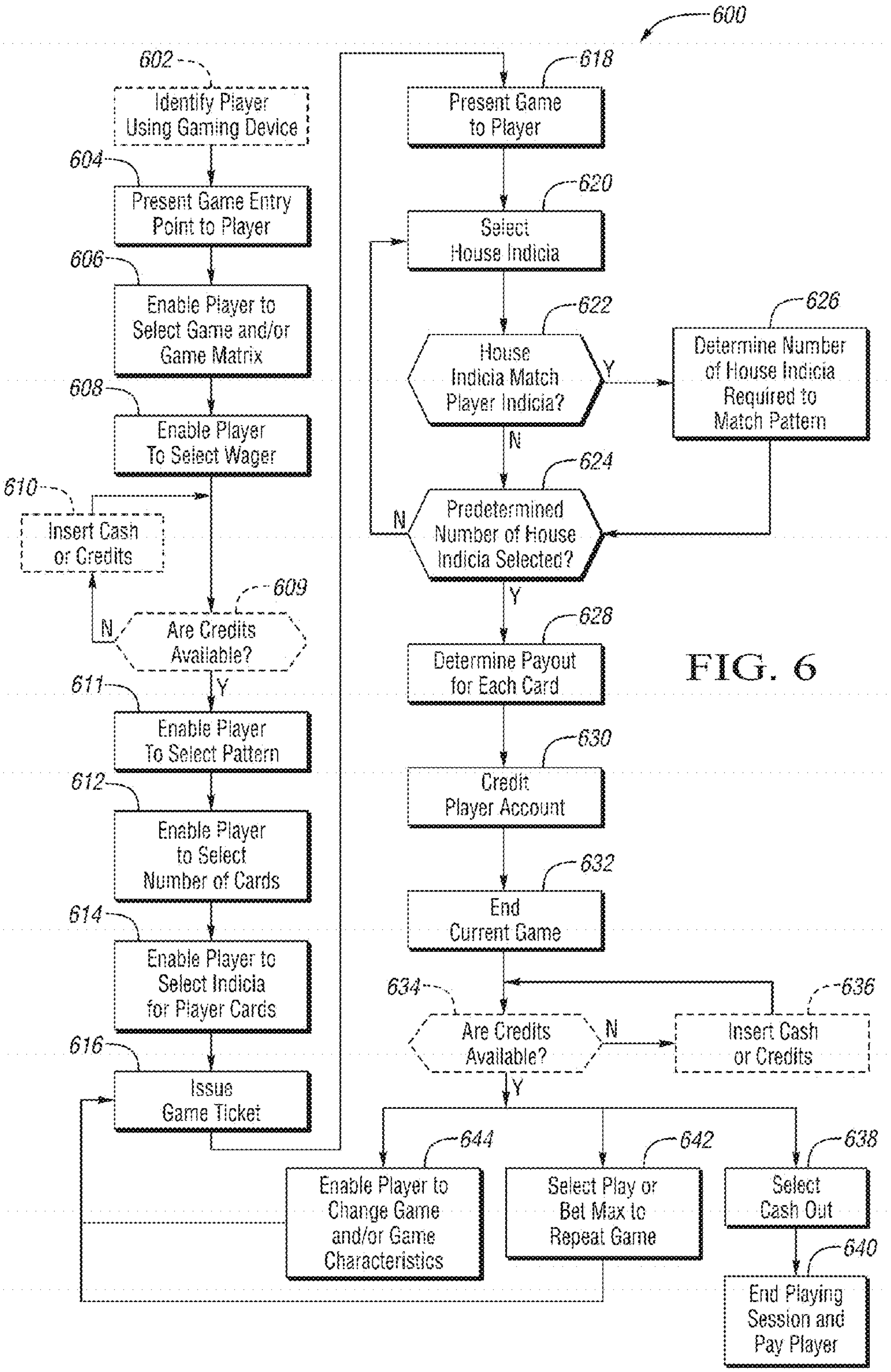
FIG. 6 is a method of playing a game of chance that may be used with the system shown in FIG. 1 or the system shown in FIG. 2.

FIG. 6 illustrates a method 600 of playing a game of chance that may be used with system 100 (shown in FIG. 1) or system 200 (shown in FIG. 2). In one embodiment, method 600 is implemented by one or more processors of a computing device 300 (shown in FIG. 3), such as local server 110, WAP server 120, and/or gaming device 114 (shown in FIG. 1). It should be recognized that any steps of the embodiments and methods described herein may be optional, and the order of the steps may be changed as desired.

A player who desires to play a game of chance on a gaming device 114 enters player identification information into gaming device 114. The player identification information may include, for example, a player rewards card number, a username and password, a driver's license number, and/or any other information that enables the player to be identified by a gaming establishment 102 operating or providing the game. The gaming operator or gaming establishment may allow play without entering or providing player identification to allow play with voided, malfunctioning, or unreadable player identification information, or with malfunctioning card readers. Alternatively, the gaming operator or gaming establishment may decide that no player identification information is required. The player is identified 602 by a server, such as local server 110, player reward server 112, and/or WAP server 120, using gaming device 114. For example, gaming device 114 transmits the player identification information to the server and the server compares the player identification information with a list of known or approved players that may be indexed or categorized by player identification information. If the server identifies the player as a known or approved player, the server transmits a message to gaming device 114 authorizing gaming device 114 to present the game to the player. In one embodiment, the server identifying the player and authorizing the presentation of the game (e.g., local server 110 or player reward server 112) is a different server than the server providing the game (e.g., WAP server 120). In such an embodiment, the server identifying the player transmits a message to the server providing the game to enable or authorize the game to be played on gaming device 114.

A game entry interface or entry point is presented 604 to the player on gaming device 114. For example, gaming device 114 loads wrapper program module 502 from memory device 306 and presents a graphical user interface (GUI) to the player on display 310 of gaming device 114 using wrapper program module 502. Wrapper program module 502 enables 606 the player to select a game to be played from a plurality of games presented on the game entry interface. In addition, wrapper program module 502 may enable 606 the player to select one or more game matrices to be used in the game. In one embodiment, the player selects a game by selecting a game size and a game variety that the player wishes to play. For example, the player may select a game by selecting an icon representative of a 4×4 Super Wild Bingo game, where 4×4 is the size of the bingo game card and Super Wild Bingo is the game variety. As another example, the player may select a game by selecting an icon representative of an 80 number (or spot) keno game such as Super Wild Keno. It should be recognized that the player may select the number and/or arrangement of spots or player indicia to be included in the card or cards used in the game or this may be accomplished automatically via a quick pick selection. In addition, more complex games and indicia selection may be available in advance or "way" ticket embodiments.

When play of the game is initiated, during selection of the game, or during play of the game, the player may be required to purchase or generate credits. The player may purchase or generate credits by inserting cash or a ticket-in-ticket-out voucher into gaming device 114 or another device. Alternatively or additionally, the player may transfer credits or cash to gaming device 114 from banking accounts, credit accounts, gaming establishment accounts, and/or gaming company accounts. In one embodiment, computer-generated credits may be used with gaming device 114, for example, as part of a free-to-play game.

The player is enabled 608 to select a wager for the selected game. For example, the player may select an amount of $1 as a wager for the selected game. The wager represents an amount of money to be wagered for each player card used or "played" by the player during the game. Gaming device 114 may determine 609 whether sufficient credits are available in the player account for the selected wager. If sufficient credits are not available, the player is prompted to insert 610 cash or credits into the player account.

If sufficient credits are available in the player account, in bingo embodiments, the player is enabled 611 to select a pattern (also referred to as a "winning pattern") and is enabled 612 to select a number of cards to be played during the game. In other embodiments, such as embodiments in which a keno game is played, the player does not select a pattern, but is enabled 612 to select a number of cards to be played and/or the number of player indicia to be played during the game.

In one embodiment, the player is also enabled 614 to select some or all of the player indicia for each player card. In keno embodiments, the player may select each player indicia to be matched during the game, or the player may request that some or all of the player indicia be randomly selected by randomization device 414 or another suitable device via a quick pick selection. In bingo embodiments, the player may select the player indicia to be matched within the pattern selected by the player, and/or the player may select only a portion of the player indicia within the pattern selected by the player or the player may request an entirely new card to be obtained or generated by randomization device 414. If the player does not select all the player indicia for a card, any remaining spaces of the player card are filled with randomly selected player indicia. The player selections of the wager, the winning pattern, the number of cards, and the player indicia may be communicated from gaming device 114 to another computing device 300, such as local server 110 and/or WAP server 120, through network 108, for example.

A game ticket for the player is issued 616 to gaming device 114 by local server 110 or WAP server 120 for use in playing the selected game. The game ticket includes the player cards selected by the player and the amount wagered for each card for the game. As described above, the game ticket may be electronic or paper-based, for example. The game is presented 618 to the player by gaming device 114 on display 310. In one embodiment, wrapper program module 502 selects and loads a game module 504 associated with the selected game, and the selected game module 504 presents 618 the selected game to the player.

During play of the game, a plurality of house indicia is selected 620 using randomization device 414 of local server 110 or WAP server 120. Alternatively, in an embodiment in which the game is administered by gaming device 114, randomization device 414 of gaming device 114 is used to select the house indicia. The house indicia that have been selected are compared with the player indicia on each player card to determine 622 whether the house indicia match the player indicia within the selected pattern. If a pattern is not matched for a player card (i.e., if each player indicia within the pattern has not been matched by house indicia that have been selected), the game continues unless it is determined 624 that a predetermined number of house indicia has been selected. In one embodiment, the predetermined number of house indicia is 60 such that the game ends after 60 house indicia have been selected.

In one embodiment, a first plurality of house indicia, such as 24 numbers, is initially determined (e.g., called or randomly selected) and the first plurality of house indicia are compared with the player indicia within the selected pattern to determine if the pattern is matched. If no match occurs, or if the game continues after a match has occurred, additional house indicia are selected and the player indicia within the pattern are compared to the house indicia (e.g., the first plurality of house indicia and the additional selected house indicia) after each additional house indicia is selected. The game may end after a second plurality of house indicia, such as 60 numbers, is determined or selected. In one embodiment, the payout starts at a predetermined first value, and the payout is reduced after each additional house indicia is selected after the first plurality of house indicia has been selected.

If a pattern is matched for a player card, the number of house indicia that have been called is determined 626 (i.e., the number of house indicia that were required to be called to match the pattern). For example, if 26 house indicia have been called before the pattern is matched, the determined number of house indicia is 26. Even though at this point, a pattern has been matched, the game continues until a predetermined number of house indicia are selected. Alternatively, the game may end after the first pattern has been matched.

If the predetermined number of house indicia has not been selected, the game continues and new house indicia are selected 620 as described above. However, once the predetermined number of house indicia have been selected, a payout for each card is determined 628. The payout is based on the number of house indicia that were required to be selected or called to match each pattern. To determine the payout for a card, the number of house indicia selections or calls required to match a pattern is compared to a pay table associated with the pattern. The pay table may be stored in memory device 306 of local server 110 or of WAP server 120, or may be stored within any suitable device. Once the payout for each player card is determined, the player account is credited 630 with the payout amount. The game ends 632 and the player may cash out or may use any credits or payouts to play additional games as described herein.

After the game ends 632, gaming device 114 determines 634 whether sufficient credits are available to continue playing (i.e., to play another game). If sufficient credits are not available, the player is prompted to insert 636 additional cash or credits to continue. If sufficient credits are available, the player is presented with several options. The player may select 638 a cash out button or icon in which case the playing session or the game session ends 640 and the player is paid any remaining credits or money. The player may also select 642 a play button or icon, or a bet max button or icon, to repeat the game using the same game selections (e.g., the same player cards, the same wager amount, etc.). Accordingly, a game ticket is issued 616 and method 600 continues as described above. Alternatively, the player is enabled 644 to change the game and/or the game characteristics after the game ends (and before a new game is started). For example, the player may select a new game, a new game size, and/or a new game variation to play. The player may additionally or alternatively select a new wager amount, a different number of player cards to be played, and/or different player indicia to be used in the game in a similar manner as described above. A new game ticket may be issued 616 and method 600 may continue as described above.

In an alternative embodiment, a number of player indicia within the selected pattern that match the house indicia is determined after all house indicia have been selected or called. Accordingly, in such an embodiment, the payout is determined 628 based on how many player indicia within the selected pattern have been matched by the house indicia. Therefore, the player may receive a payout even if the pattern has not been completely matched.

Keno embodiments may operate in a similar manner as the bingo embodiments described herein unless otherwise specified. For example, the player may select the game to be played from the game entry point and may select the player card or matrix to be used during the game. The player may select the size of the game and/or matrix, such as an 80 number, a 49 number, a 25 number, or any other size of game and/or matrix that is included as a selectable game. It should be understood that the size of the game and/or game matrix in any keno, bingo, or other game embodiments may include any regular or irregular shapes or forms such a square, rectangular, diamond, stair step, or any regular or irregular geometric shape. The player may enter a wager and may select the number of cards or matrices to be used during the game, may select the player indicia to be displayed on each card or matrix, and may select the number of player indicia to be played during the game. The cards or matrices may be played in one game, and/or in one or more future games. In addition, the keno games may be played on any gaming device 114 described herein and/or may be played across a local area network, a wide area network, and/or any other suitable network as described herein with one or more fixed and/or progressive prizes. Both single or "straight" game tickets and advanced or "way" game tickets may be used.

During play of the keno game, a predetermined number of house indicia are called based on the keno game variety selected. For example, in a game in which numbers are selected from a pool of 80 numbers (i.e., an 80 number or 80 spot game), 20 house indicia may be called. However, it should be recognized that any suitable number of house indicia may be called during the game. After the predetermined number of house indicia are called, the game ends. The player may win one or more prizes based on a number of called house indicia that match the player indicia on the player cards according to a pay table associated with the game being played. For example, the player may win 10 credits if 6 player indicia within a card are matched by the house indicia called during the game.

In one embodiment in which the keno game is played with multiple players competing for a common prize, such as a progressive prize, the player or players that achieve a predetermined number of matches such as matching or "catching" 10 player indicia in a 10 spot game, win or split the prize and/or the player who has the highest number of player indicia matched wins a separate common prize. If two or more players tie for the highest number of matches (i.e., the players have the same number of player indicia matched by the called house indicia), the prize is split between the players who tied. The common prize may be in addition to a normal or fixed prize that each player may win based on the number of player indicia matched during the game and/or progressive prize jackpots for a player matching selected winning or win criteria.

Figure 7A:
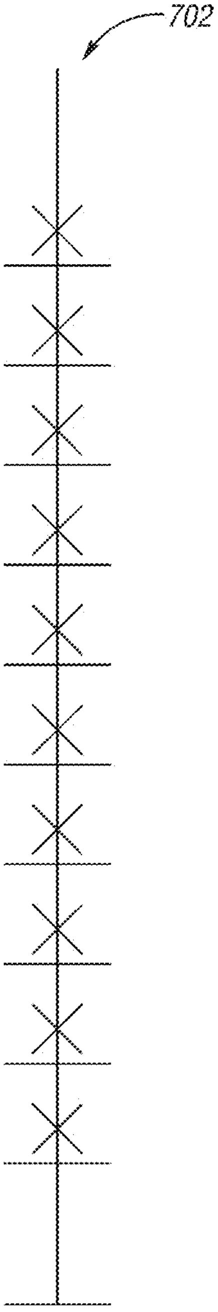
FIGS. 7A-7C illustrate a plurality of ball call timelines that may be used with the systems and methods described herein.
Figure 7B:
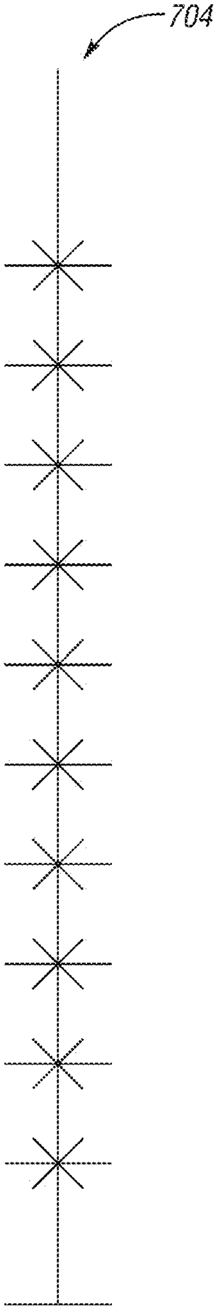
Figure 7C:
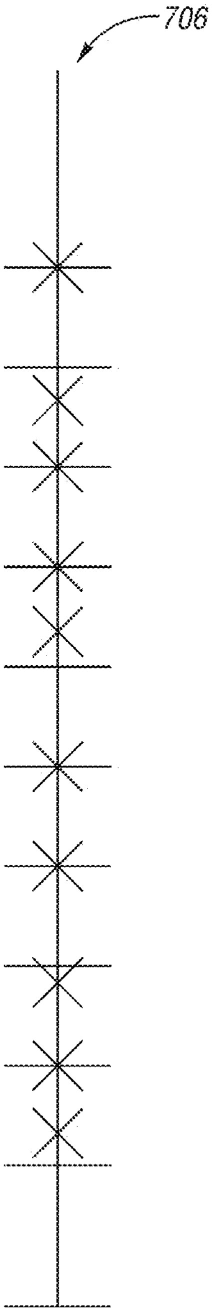

FIGS. 7A-7C illustrate a plurality of ball call timelines that may be used with the systems and methods described herein. When a plurality of players are playing a game on separate gaming devices 114, the ball calls for each player's gaming device 114 may either be synchronized with each other or may occur asynchronously.

FIG. 7A illustrates an example asynchronous ball call timeline 702 in which ball calls for a first player are illustrated with a single vertical line | and ball calls for a second player are illustrated with an X symbol. In the embodiment shown in FIG. 7A, the ball calls for the first player (or for the first player's gaming device 114) occur at a different time than, or asynchronous with respect to, the ball calls for the second player (or for the second player's gaming device 114). While the ball calls for the first player are illustrated as occurring before the ball calls for the second player, it should be recognized that the first player's ball calls, individually or collectively, may alternatively occur simultaneously with or after the second player's ball calls have occurred. If the first player wins a progressive prize that the second player is also playing to win, the first player may be notified of the win before the second player's ball draw occurs. However, the amount of the prize to be awarded to the first player may not be communicated to the first player until the second player's ball call occurs. Accordingly, if the second player also wins the progressive prize, the progressive prize may be split between the first player and the second player. Alternatively, all winning players may receive all or a portion of the progressive prize. The amount of the prize that will be awarded to the first player and to the second player is communicated to the first player and the second player by WAP server 120, for example, after the second player's ball call occurs. It should be recognized that the asynchronous nature of the ball calls described above may also apply to any other players and gaming devices 114 playing the game.

FIG. 7B illustrates an example synchronous ball call timeline 704 in which ball calls for the first player are illustrated with a single vertical line | and ball calls for the second player are illustrated with an X symbol. In the embodiment shown herein, the ball calls for the first player (or for the first player's gaming device 114) occur at substantially the same time as, or are synchronized with, the ball calls for the second player (or for the second player's gaming device 114). In a similar manner, the ball calls for each other player or gaming device 114 playing the game are synchronized with the ball calls of the first and second players or gaming devices 114. In one embodiment, WAP server 120 transmits a synchronization signal or a ball call signal to each gaming device 114 playing the game to indicate that a new ball call should occur. Each gaming device 114 initiates a ball call in response to the signal from the server.

Because each ball call is synchronized, WAP server 120 does not delay notification of the progressive prize amount won by one or more players until the ball calls have occurred. Rather, when WAP server 120 is notified that one or more players won the progressive prize, WAP server 120 transmits to the progressive prize winners the amount of the prize that each player won.

FIG. 7C illustrates an example ball call timeline 706 in which ball calls for a plurality of players occur synchronously and asynchronously during the game. Ball calls for a first player are illustrated with a single vertical line | and ball calls for a second player are illustrated with an X symbol. In the embodiment shown herein, some ball calls for the first player (or for the first player's gaming device 114) occur at substantially the same time as, or are synchronized with, the ball calls for the second player (or for the second player's gaming device 114), and some ball calls for the first player occur at a different time than, or asynchronous with respect to, the ball calls for the second player. In one embodiment, the ball calls are randomly chosen to be either synchronous or asynchronous. In a similar manner, some ball calls for each other player or gaming device 114 playing the game may be synchronized with the ball calls of the first and second players or gaming devices 114 and some ball calls for each other player or gaming device 114 playing the game may occur asynchronously with respect to the ball calls of the first and second players or gaming devices 114.

Figure 8A:
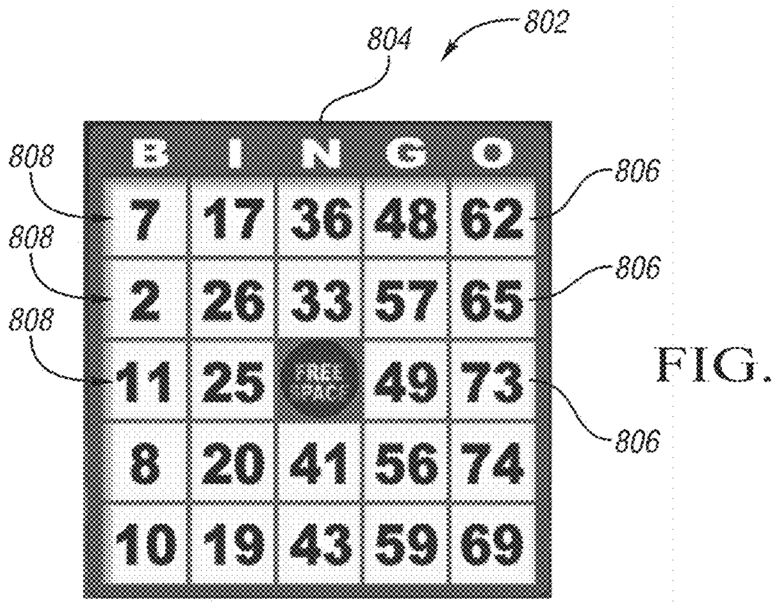
FIGS. 8A-8C illustrate a plurality of player card sizes or matrices that may be used with a game of chance provided by the systems and methods described herein.
Figure 8B:
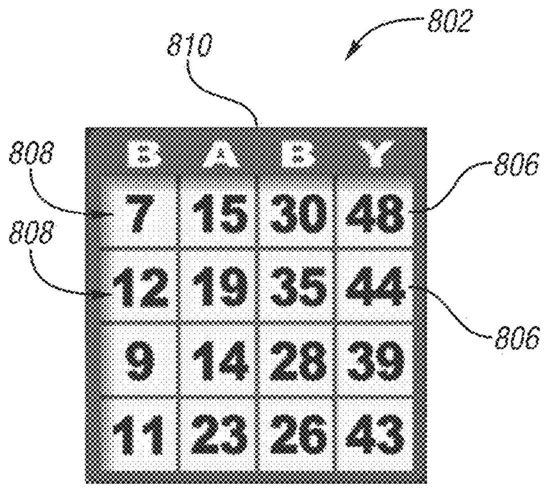
Figure 8C:
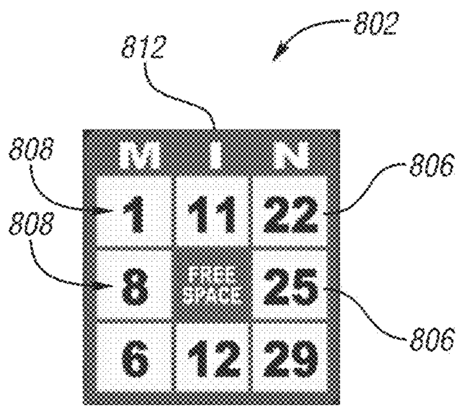

FIGS. 8A-8C illustrate a plurality of player cards 802 (also referred to as player card sizes, game sizes, or game matrices) that may be used with a game of chance provided by the systems and methods described herein. In one embodiment, player cards 802 are bingo cards.

FIG. 8A illustrates a 5×5 player card 804 that may be used in a game of bingo. Accordingly, player card 804 includes a matrix of 5 rows and 5 columns that define 25 spaces 806. Each space 806 may include and display one or more player indicia 808. In one embodiment, a free space indicator is displayed in the center space 806 of player card 802 and the remaining 24 spaces 806 are filled with player indicia 808. In another embodiment, the free space indicator is displayed in the center space 806 and only the spaces 806 within a selected pattern are filled with player indicia 808. Center space 806 including the free space indicator is considered to be automatically filled or matched at the start of the game, and may include a "daub" or another marker to indicate that center space 806 has been filled.

FIG. 8B illustrates a 4×4 player card 810 that may be used in a game of bingo. Accordingly, player card 810 includes a matrix of 4 rows and 4 columns that define 16 spaces 806. Each space 806 may include and display one or more player indicia 808 as described above. In one embodiment, only the spaces 806 within the selected pattern are filled with player indicia 808. In the example shown in FIG. 8B, player card 810 does not include a free space.

FIG. 8C illustrates a 3×3 player card 812 that may be used in a game of bingo. Accordingly, player card 812 includes a matrix of 3 rows and 3 columns that define 9 spaces 806. Each space 806 may include and display one or more player indicia 808 as described above. In one embodiment, a free space indicator is displayed in the center space 806 of player card 812 and the remaining 8 spaces 806 are filled with player indicia 808. In another embodiment, the free space indicator is displayed in the center space 806 and only the spaces 806 within the selected pattern are filled with player indicia 808. Center space 806 including the free space indicator is considered to be automatically filled or matched at the start of the game as described above.

FIGS. 9A-9H illustrate a plurality of game patterns 902 (also referred to as winning patterns or player card patterns) that may be selected by the player and used with a game of chance provided by the systems and methods described herein. In the embodiments shown in FIGS. 9A-9H, game patterns 902 are used with 5×5 player cards 804. While FIGS. 9A-9H illustrate a plurality of example game patterns 902, it should be recognized that other patterns may be used with the systems and methods described herein.

Figure 9A:
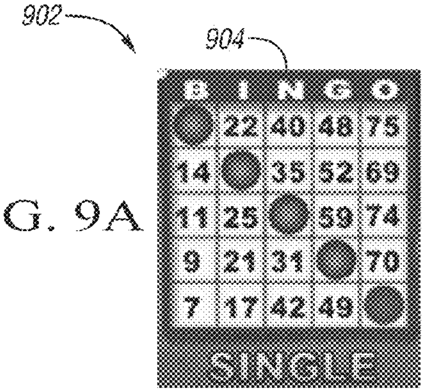
FIGS. 9A-9H illustrate a plurality of game patterns that may be used with a 5×5 player card matrix for a game of chance provided by the systems and methods described herein.

FIG. 9A illustrates a "single" pattern 904 having one line of spaces 806 extending from a top left corner of player card 802 to a bottom right corner of player card 802. It should be recognized that single pattern 904 may alternatively extend from a bottom left corner of player card 802 to a top right corner of player card 802. In another embodiment, single pattern 904 may extend in a horizontal line from a left side of player card 802 to a right side of player card 802, or may extend in a vertical line from a top side of player card 802 to a bottom side of player card 802.

Figure 9B:
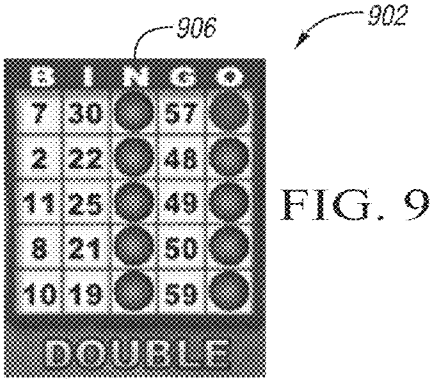

FIG. 9B illustrates a "double" pattern 906 having two parallel lines of spaces 806 extending from the top side of player card 802 to the bottom side of player card 802. It should be recognized that double pattern 906 may alternatively extend horizontally from the left side of player card 802 to the right side of player card 802. In addition, it should be recognized that double pattern 906 may include any pair of parallel lines of spaces 806 within player card 802 and is not limited to the identified spaces 806 illustrated in FIG. 9B. For example, double pattern 906 may include diagonal lines that may constitute a winning pattern when completed.

Figure 9C:
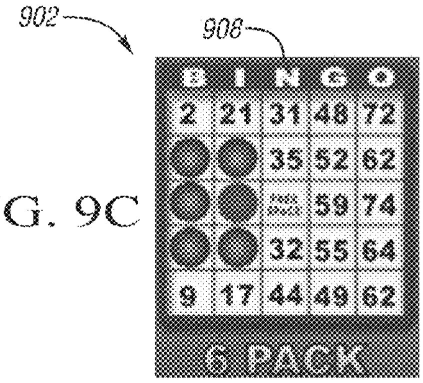

FIG. 9C illustrates a "6 pack" pattern 908 that includes a rectangular arrangement of 6 spaces 806 within player card 802. It should be recognized that 6 pack pattern 908 may include any suitable rectangular arrangement of 6 spaces 806 within player card 802 and is not limited to the identified spaces 806 illustrated in FIG. 9C.

Figure 9D:
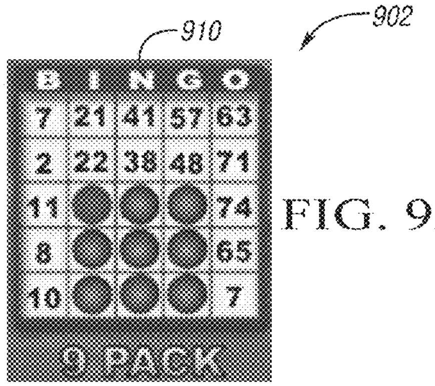

FIG. 9D illustrates a "9 pack" pattern 910 that includes a square arrangement of 9 spaces 806 within player card 802. It should be recognized that 9 pack pattern 910 may include any suitable square arrangement of 9 spaces 806 within player card 802 and is not limited to the identified spaces 806 illustrated in FIG. 9D.

Figure 9E:
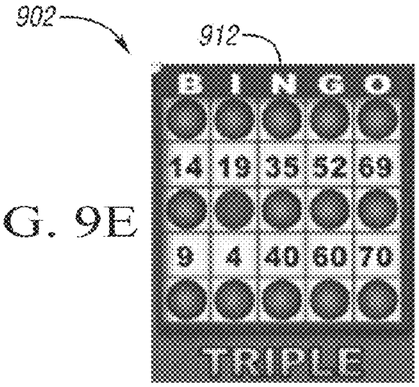

FIG. 9E illustrates a "triple" pattern 912 having three parallel lines of spaces 806 extending from the left side of player card 802 to the right side of player card 802. It should be recognized that triple pattern 912 may alternatively extend from the top side of player card 802 to the bottom side of player card 802. In addition, it should be recognized that triple pattern 912 may include any group of three parallel lines of spaces 806 within player card 802 and is not limited to the identified spaces 806 illustrated in FIG. 9E. For example, triple pattern 912 may include diagonal lines that may constitute a winning pattern when completed.

Figure 9F:
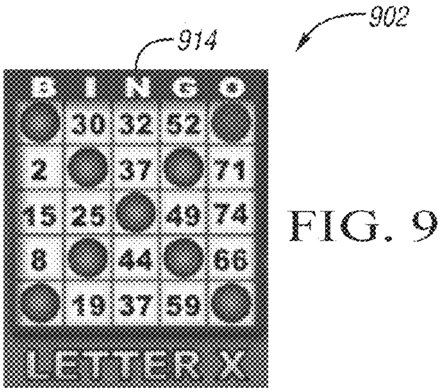

FIG. 9F illustrates a "letter X" pattern 914 having one line of spaces 806 extending from the top left corner of player card 802 to the bottom right corner of player card 802, and one line of spaces 806 extending from the bottom left corner of player card 802 to the top right corner of player card 802. The two lines of spaces 806 intersect at center space 806.

Figure 9G:
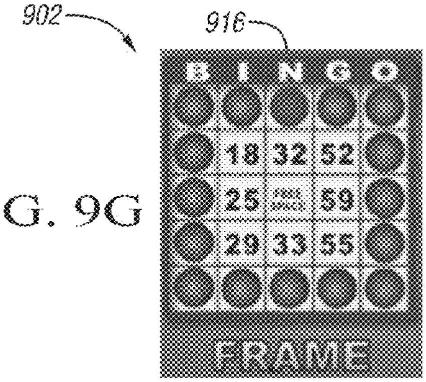

FIG. 9G illustrates a "frame" pattern 916 that includes each space 806 along the top side, the right side, the bottom side, and the left side of player card 802. While center space 806 is considered to be automatically filled, it is not used with frame pattern 916.

Figure 9H:
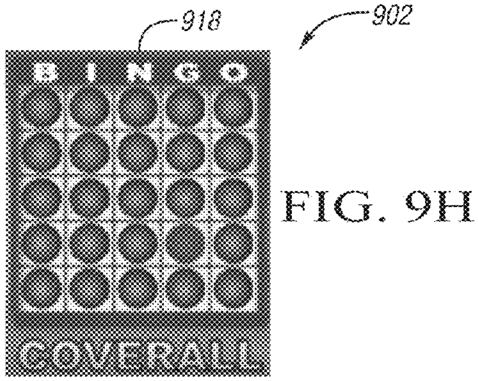

FIG. 9H illustrates a "coverall" or "blackout" pattern 918 that includes every space 806 within player card 802. While the patterns illustrated in FIGS. 9A-9H require each player indicia 808 within each space 806 of a selected pattern 902 to be matched by called house indicia, in one embodiment, a prize may be won if not every player indicia 808 within each space 806 of a selected pattern 902 is matched. Rather, as described more fully herein, a prize may be won based on a number of player indicia 808 within a selected pattern 902 that are matched by called house indicia.

FIGS. 10A-10H illustrate a plurality of game patterns 902 that may be selected by the player and used with a game of chance provided by the systems and methods described herein. In the embodiments shown in FIGS. 10A-10H, game patterns 902 are used with 4×4 player cards 810. While FIGS. 10A-10H illustrate a plurality of example game patterns 902, it should be recognized that other patterns may be used with the systems and methods described herein.

Figure 10A:
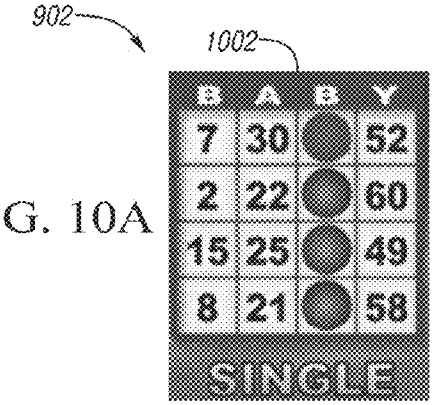
FIGS. 10A-10H illustrate a plurality of game patterns that may be used with a 4×4 player card matrix for a game of chance provided by the systems and methods described herein.

FIG. 10A illustrates a "single" pattern 1002 having one vertical line of spaces 806 extending from the top side of player card 802 to the bottom side of player card 802. In another embodiment, single pattern 1002 may extend in a horizontal line from the left side of player card 802 to the right side of player card 802, or may extend in a different vertical line from the top side of player card 802 to the bottom side of player card 802. It should be recognized that single pattern 1002 may alternatively extend from the bottom left corner of player card 802 to the top right corner of player card 802 or from the top left corner of player card 802 to the bottom right corner of player card 802.

Figure 10B:
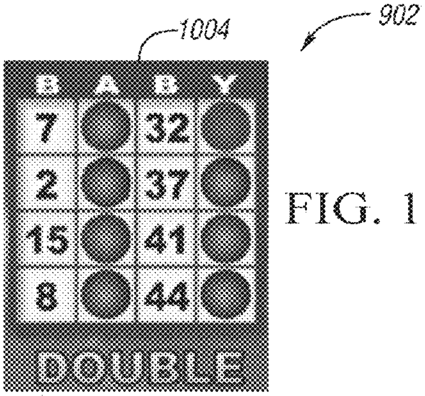

FIG. 10B illustrates a "double" pattern 1004 having two parallel lines of spaces 806 extending from the top side of player card 802 to the bottom side of player card 802. It should be recognized that double pattern 1004 may alternatively extend horizontally from the left side of player card 802 to the right side of player card 802. In addition, it should be recognized that double pattern 1004 may include any pair of parallel lines of spaces 806 within player card 802 and is not limited to the identified spaces 806 illustrated in FIG. 10B. For example, double pattern 1004 may include diagonal lines that may constitute a winning pattern when completed.

Figure 10C:
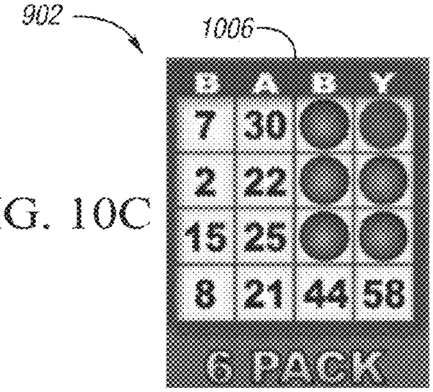

FIG. 10C illustrates a "6 pack" pattern 1006 that includes a rectangular arrangement of 6 spaces 806 within player card 802. It should be recognized that 6 pack pattern 1006 may include any suitable rectangular arrangement of 6 spaces 806 within player card 802 and is not limited to the identified spaces 806 illustrated in FIG. 10C.

Figure 10D:
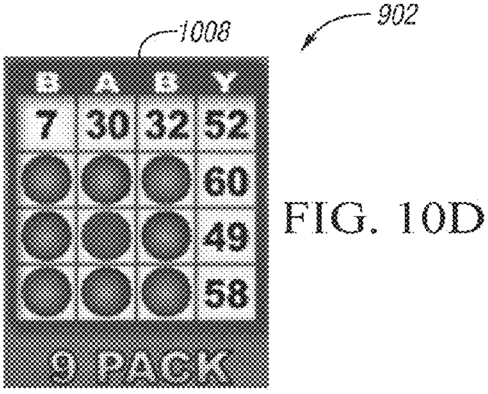

FIG. 10D illustrates a "9 pack" pattern 1008 that includes a square arrangement of 9 spaces 806 within player card 802. It should be recognized that 9 pack pattern 1008 may include any suitable square arrangement of 9 spaces 806 within player card 802 and is not limited to the identified spaces 806 illustrated in FIG. 10D.

Figure 10E:
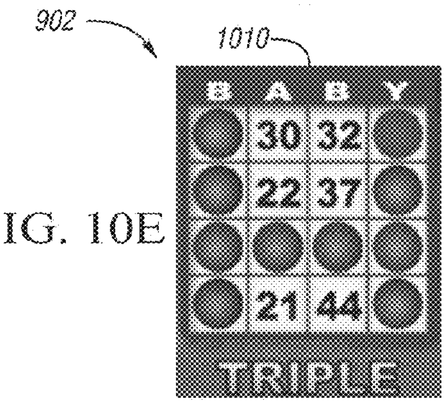

FIG. 10E illustrates a "triple" pattern 1010 having three lines of spaces 806. In the embodiment shown in FIG. 10E, two lines extend from the top side of player card 802 to the bottom side of player card 802, and one line extends from the left side of player card 802 to the right side of player card 802. It should be recognized that triple pattern 1010 may include any group of three lines of spaces 806 within player card 802 and is not limited to the identified spaces 806 illustrated in FIG. 10E. For example, triple pattern 1010 may include diagonal lines that may constitute a winning pattern when completed.

Figure 10F:
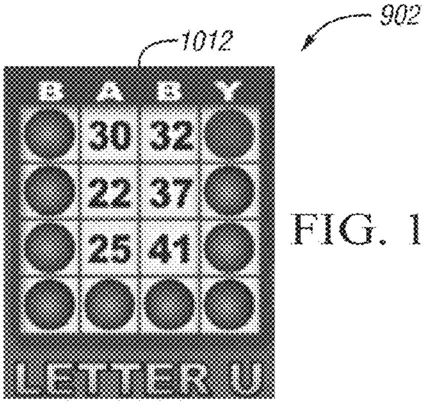

FIG. 10F illustrates a "letter U" pattern 1012 having three connected lines of spaces 806 extending along three sides of player card 802. A first line of spaces 806 extends from the top left corner to the bottom left corner of player card 802. A second line of spaces 806 extends from the bottom left corner to the bottom right corner of player card 802. A third line of spaces extends from the bottom right corner to the top right corner of player card 802.

Figure 10G:
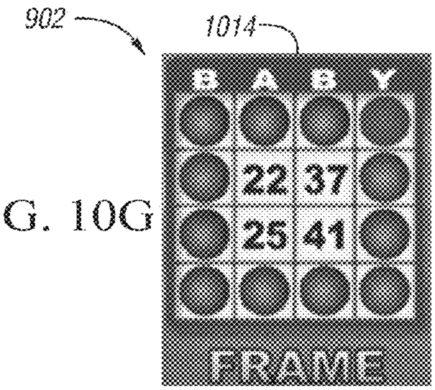

FIG. 10G illustrates a "frame" pattern 1014 that includes each space 806 along the top side, the right side, the bottom side, and the left side of player card 802.

Figure 10H:
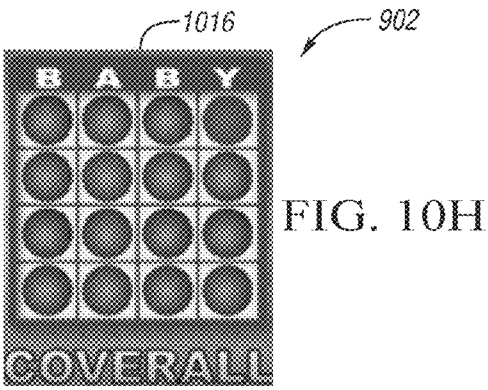

FIG. 10H illustrates a "coverall" or "blackout" pattern 1016 that includes every space 806 within player card 802. While the patterns illustrated in FIGS. 10A-10H require each player indicia 808 within each space 806 of a selected pattern 902 to be matched by called house indicia, in one embodiment, a prize may be won if not every player indicia 808 within each space 806 of a selected pattern 902 is matched. Rather, as described more fully herein, a prize may be won based on a number of player indicia 808 within a selected pattern 902 that are matched by called house indicia.

FIGS. 11A-11H illustrate a plurality of game patterns 902 that may be selected by the player and used with a game of chance provided by the systems and methods described herein. In the embodiments shown in FIGS. 11A-11H, game patterns 902 are used with 3×3 player cards 812. While FIGS. 11A-11H illustrate a plurality of example game patterns 902, it should be recognized that other patterns may be used with the systems and methods described herein.

Figure 11A:
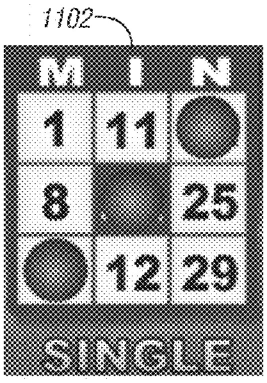
FIGS. 11A-11H illustrate a plurality of game patterns that may be used with a 3×3 player card matrix for a game of chance provided by the systems and methods described herein.

FIG. 11A illustrates a "single" pattern 1102 having one line of spaces 806 extending from the top right corner of player card 802 to the bottom left corner of player card 802. It should be recognized that single pattern 1102 may alternatively extend from the top left corner of player card 802 to the bottom right corner of player card 802. In another embodiment, single pattern 1102 may extend in a horizontal line from the left side of player card 802 to the right side of player card 802, or may extend in a vertical line from the top side of player card 802 to the bottom side of player card 802.

Figure 11B:
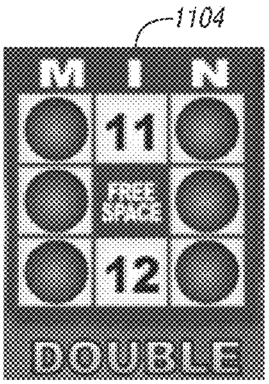

FIG. 11B illustrates a "double" pattern 1104 having two parallel lines of spaces 806 extending from the top side of player card 802 to the bottom side of player card 802. It should be recognized that double pattern 1104 may alternatively extend horizontally from the left side of player card 802 to the right side of player card 802. For example, double pattern 1104 may include diagonal lines that may constitute a winning pattern when completed.

Figure 11C:
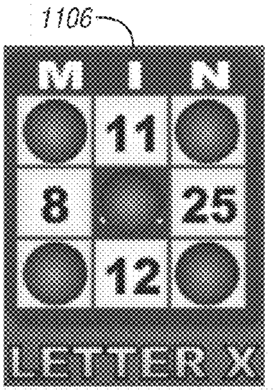

FIG. 11C illustrates a "letter X" pattern 1106 having one line of spaces 806 extending from the top left corner of player card 802 to the bottom right corner of player card 802, and one line of spaces 806 extending from the bottom left corner of player card 802 to the top right corner of player card 802. The two lines of spaces 806 intersect at center space 806.

Figure 11D:
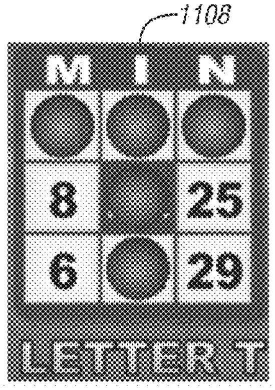

FIG. 11D illustrates a "letter T" pattern 1108 that includes a first line of spaces 806 extending along the top side of player card 802. A second line of spaces 806 extends vertically from a middle of the top side of player card 802 to the bottom side of player card 802.

Figure 11E:
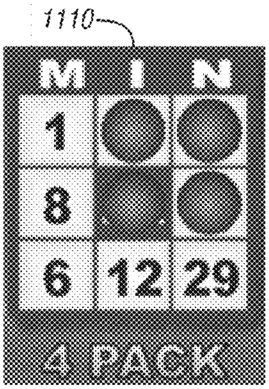

FIG. 11E illustrates a "4 pack" pattern 1110 that includes a square arrangement of 4 spaces 806 within player card 802. It should be recognized that 4 pack pattern 1110 may include any suitable square arrangement of 4 spaces 806 within player card 802 and is not limited to the identified spaces 806 illustrated in FIG. 11E.

Figure 11F:
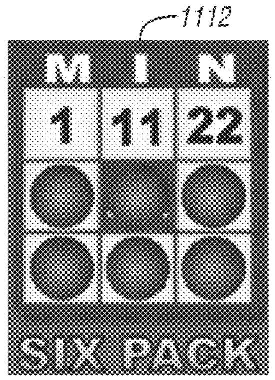

FIG. 11F illustrates a "6 pack" pattern 1112 that includes a rectangular arrangement of 6 spaces 806 within player card 802. It should be recognized that 6 pack pattern 1112 may include any suitable rectangular arrangement of 6 spaces 806 within player card 802 and is not limited to the identified spaces 806 illustrated in FIG. 11F.

Figure 11G:
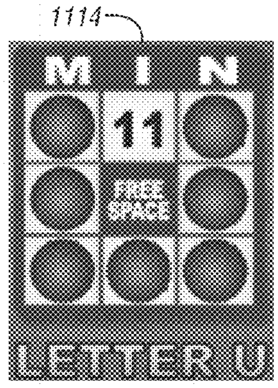

FIG. 11G illustrates a "letter U" pattern 1114 having three connected lines of spaces 806 extending along three sides of player card 802. A first line of spaces 806 extends from the top left corner to the bottom left corner of player card 802. A second line of spaces 806 extends from the bottom left corner to the bottom right corner of player card 802. A third line of spaces extends from the bottom right corner to the top right corner of player card 802.

Figure 11H:
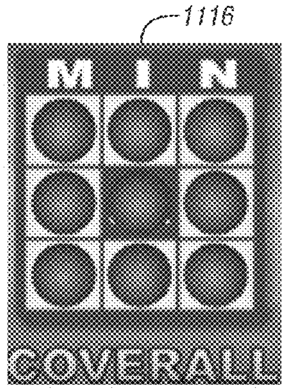

FIG. 11H illustrates a "coverall" or "blackout" pattern 1116 that includes every space 806 within player card 802. While the patterns illustrated in FIGS. 11A-11H require each player indicia 808 within each space 806 of a selected pattern 902 to be matched by called house indicia, in one embodiment, a prize may be won if not every player indicia 808 within each space 806 of a selected pattern 902 is matched. Rather, as described more fully herein, a prize may be won based on a number of player indicia 808 within a selected pattern 902 that are matched by called house indicia.

Figure 12:
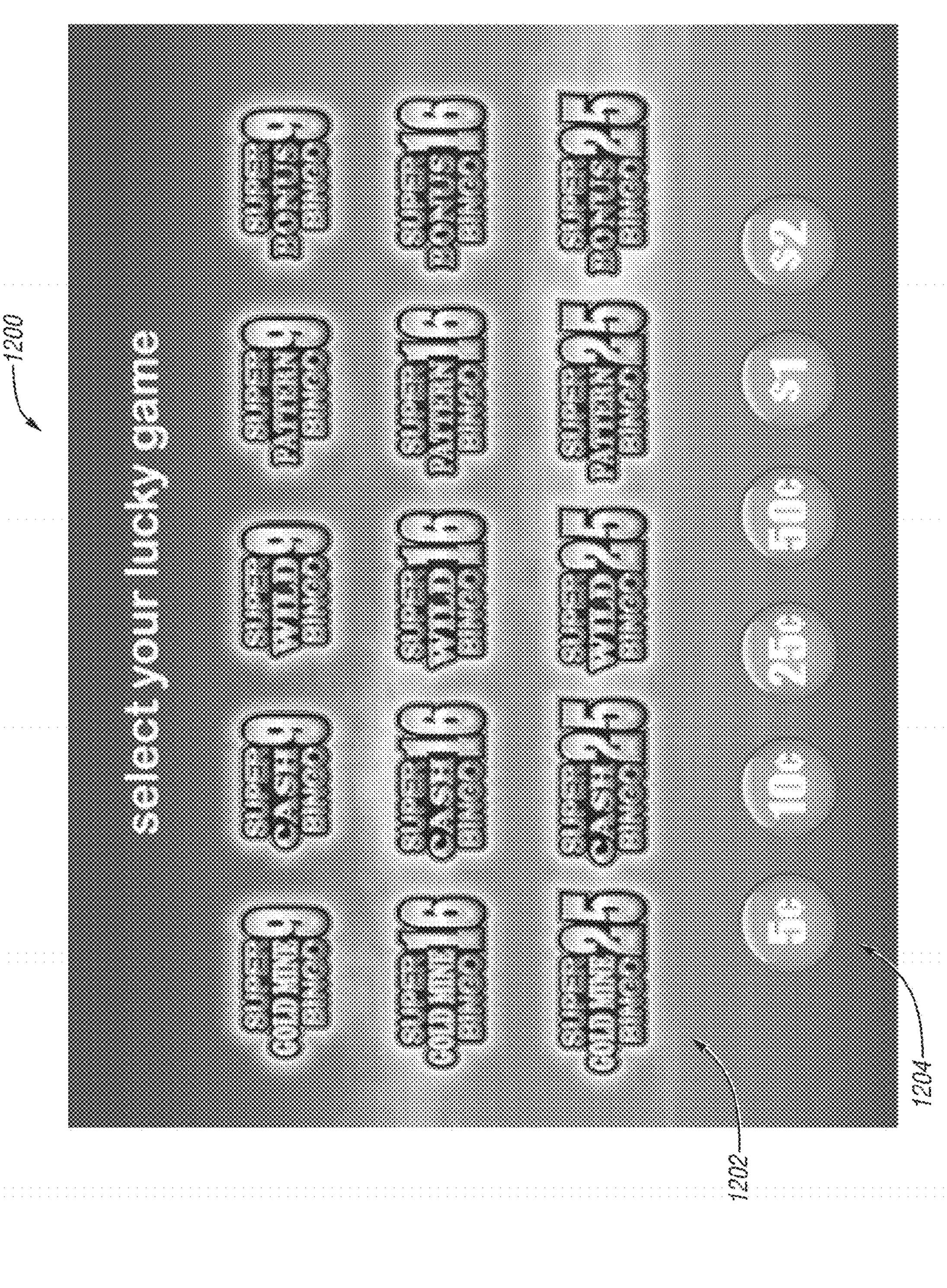
FIG. 12 is a screenshot of a game entry interface that may be used with the systems and methods described herein.

FIG. 12 is a screenshot of an example game entry interface 1200 that may be used with the systems and methods described herein. Game entry interface 1200 may be presented by wrapper program module 502, for example, when a player operates gaming device 114.

A plurality of game selection buttons or icons 1202 are presented to the player. In addition, a plurality of wager selection buttons or icons 1204 are presented to the player on game entry interface 1200.

Game selection icons 1202 enable the player to select a game to be played and/or one or more game matrices to be used during the game. The games available to be played may be categorized by game size (e.g., using 3×3 player cards 802 having 9 spaces, 4×4 player cards 802 having 16 spaces, 5×5 player cards 802 having 25 spaces, etc.) and by game variety (e.g., Super Gold Mine Bingo, Super Cash Bingo, Super Wild Bingo, Super Pattern Bingo, Super Bonus Bingo, etc.). Accordingly, the player may select the game selection icon 1202 labeled "Super Cash Bingo 25" to play a Super Cash Bingo game using a player card 802 having 25 spaces 806.

Wager selection icons 1204 enable the player to select an amount of money or credits to be wagered on the game selected. For example, if the player selects a wager selection icon 1204 labeled "$1," an amount of $1 in credits or currency will be wagered on each player card 802 used during the play of the selected game. It should be recognized that the game and the wager may be changed or reselected after each game is completed or prior to the start of the game.

Figure 13:
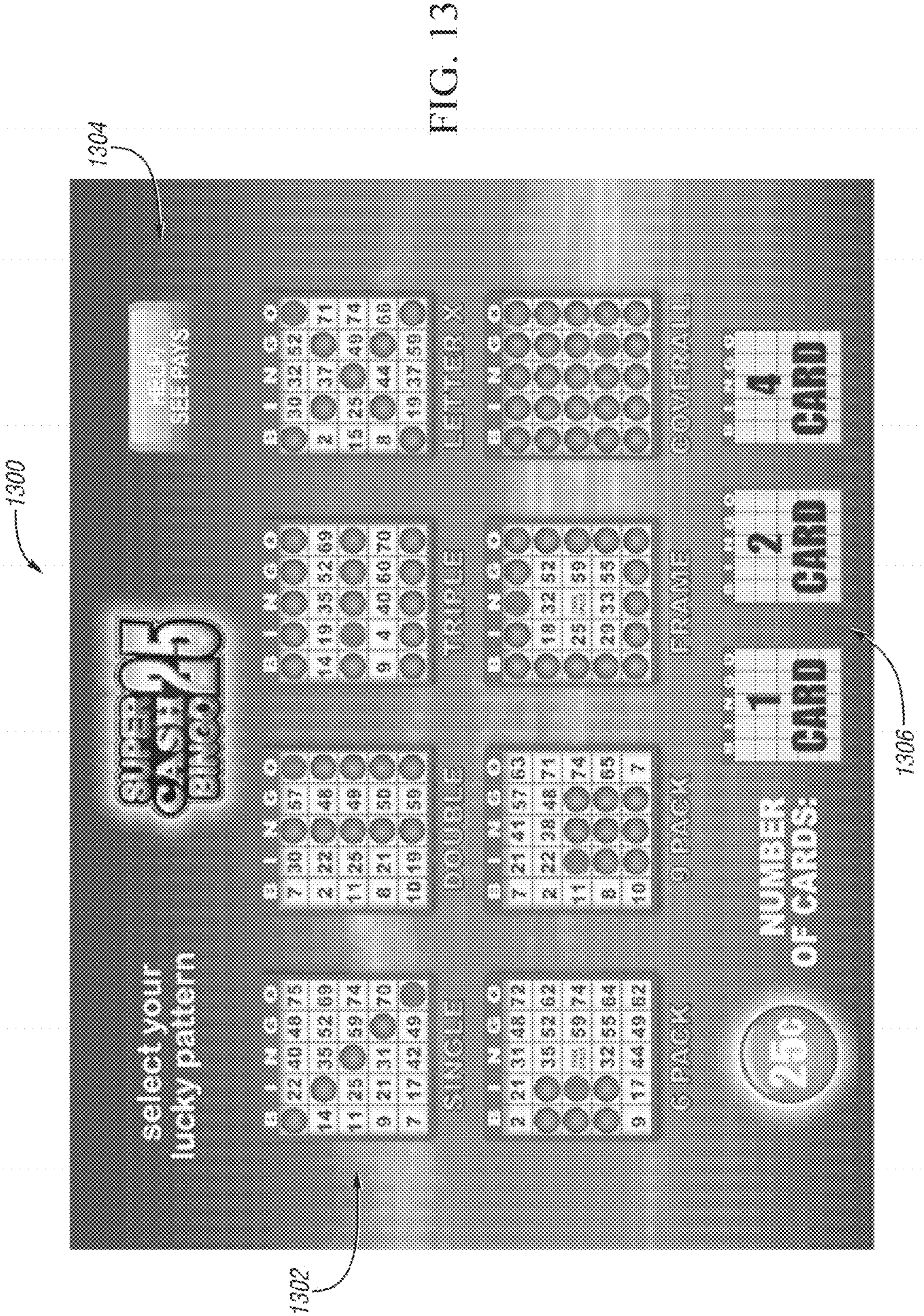
FIG. 13 is a screenshot of a pattern selection interface that may be used with the systems and methods described herein.

FIG. 13 is a screenshot of a pattern selection interface 1300 that may be used with the systems and methods described herein. In one embodiment, wrapper program module 502 presents pattern selection interface 1300 to the player on display 310 of gaming device 114 after the player has selected the game to be played and has selected the wager for the game. Alternatively, wrapper program module 502 may call a game module 504 associated with the selected game when the player selects the game and the wager, and game module 504 may present pattern selection interface 1300 to the player on display 310 of gaming device 114. It should be understood that the graphical user interface (GUI) shown in the various embodiments need not contain all functions, components, and/or functional elements illustrated therein. Additionally or alternatively, the functions, components, and/or functional elements illustrated in the various embodiments may be included within one or more other GUIs.

Pattern selection interface 1300 includes a plurality of pattern selection icons 1302, a pay table icon 1304, and a plurality of card number selection icons 1306. Pattern selection interface 1300 also displays the selected game and the selected wager from game entry interface 1200.

Pattern selection icons 1302 enable the player to select a pattern 902 for each player card 802. A different pattern 902 may be selected for each player card 802. In one embodiment, the player is enabled to create a new pattern to be used for one or more player cards 802 by selecting a suitable pattern creation icon (not shown). Additionally or alternatively, player indicia 808 may be selected by the player for each card and/or each pattern 902 using user interface 312.

Pay table icon 1304 enables the player to view the pay table for the selected pattern 902 based on the selected game and the selected wager. In addition, selecting pay table icon 1304 may cause the game to display information, such as a help screen, regarding how to play the game.

Card number selection icons 1306 enable the player to select the number of player cards 802 to be used during the game. If more than one player card 802 is selected, the game will end after the pattern 902 for each player card 802 is matched and/or after all ball calls have completed, as described more fully herein.

Figure 14:
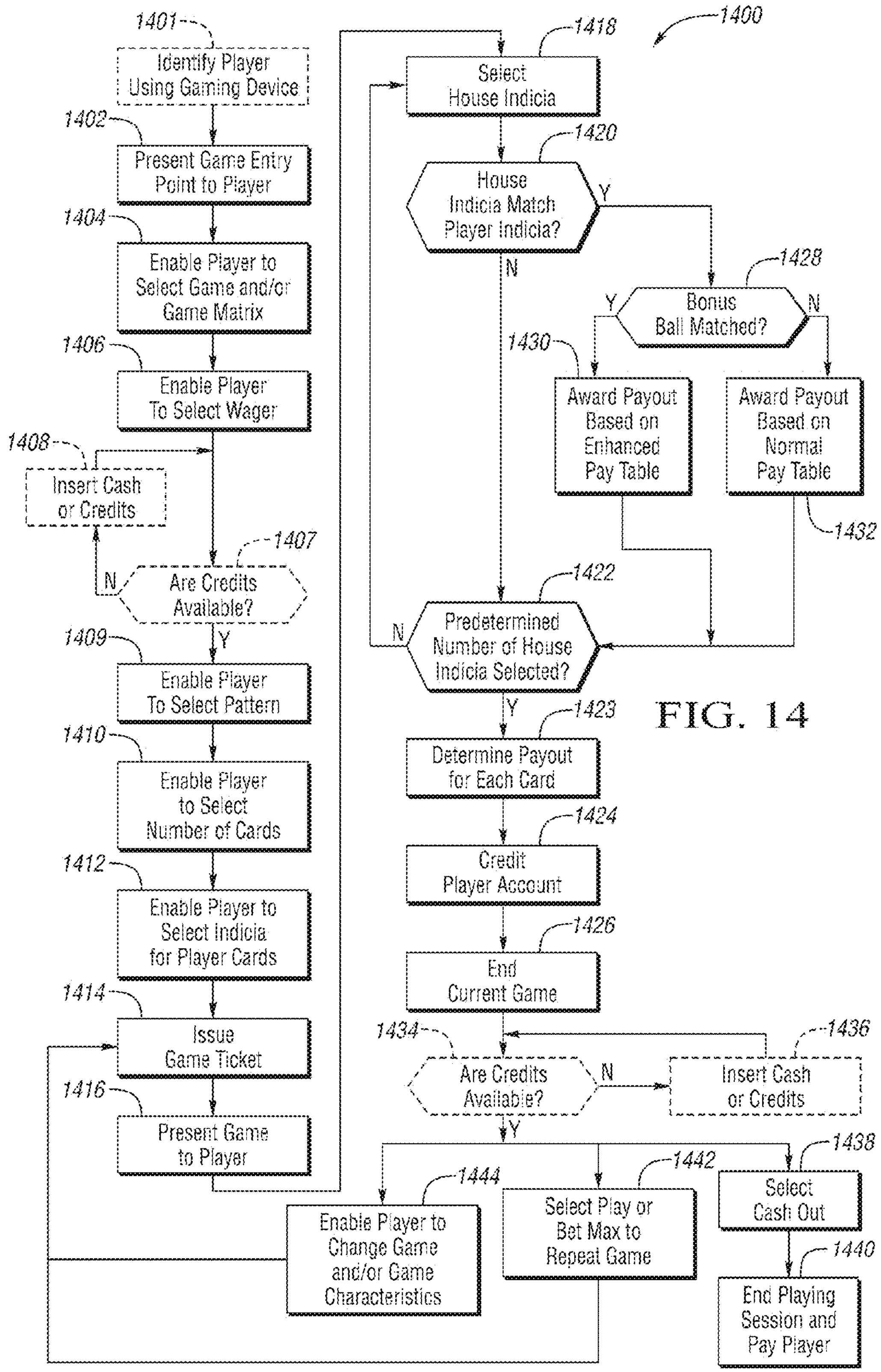
FIG. 14 is a flow diagram of a method of playing a game of chance that may be used with the systems and methods described herein.

FIG. 14 is a flow diagram of a method 1400 of playing a game of chance that may be used with the systems and methods described herein. FIGS. 15-18 are example screenshots of the game that may be presented to the player during play of the game when method 1400 is executed. In one embodiment, wrapper program module 502 calls a game module 504 associated with the game of chance when the player selects the game using user interface 312. Game module 504 presents the game of chance to the player on display 310.

In one embodiment, the player may be identified 1401 using gaming device 114 as described above. A game entry interface or entry point (such as game entry interface 1200) is presented 1402 to the player on gaming device 114 using wrapper program module 502, for example, as described above with reference to FIG. 6. Wrapper program module 502 enables 1404 the player to select a game to be played from a plurality of games presented on the game entry interface 1200. In addition, wrapper program module 502 may enable 1404 the player to select one or more game matrices to be used in the game. In one embodiment, the player selects the game by selecting a game size and a game variety associated with the game that the player wishes to play. For example, the player may select the game to be a Super Cash Bingo 25 game that is played on a 5×5 player card 804. In the Super Cash Bingo game, if the player matches a pattern and a bonus ball is included within the pattern, the player may be awarded a payout based on an enhanced pay table.

The player is enabled 1406 to select a wager for the selected game. For example, the player may select an amount of $0.25 as a wager for the selected game. Gaming device 114 may determine 1407 whether sufficient credits are available in the player account for the selected wager. If sufficient credits are not available, gaming device 114 prompts the player to insert 1408 cash or credits, for example, into gaming device 114 for the selected wager.

If sufficient credits are available in the player account for the selected wager, the player is enabled 1409 to select a pattern 902 and is enabled 1410 to select a number of player cards 802 to be played during the game. In one embodiment, the player is also enabled 1412 to select some or all of the player indicia 808 for each player card 802 as described above with reference to FIG. 6. The player selections of the wager, the winning pattern 902, the number of cards 802, and the player indicia 808 may be communicated from gaming device 114 to another computing device 300, such as local server 110 and/or WAP server 120, through network 108, for example. Optionally, the gaming device may have default values as desired so that the player may simply select an icon or button to initiate play of the game after inserting or applying credits as described herein.

A game ticket for the player is issued 1414 to gaming device 114 by local server 110 or WAP server 120 for use in playing the selected game. The game ticket may include each player card 802 selected and the wagered amount for each player card 802. The game is presented 1416 to the player by gaming device 114 on display 310. In one embodiment, wrapper program module 502 selects and loads a game module 504 associated with the selected game, and the selected game module 504 presents 1416 the selected game to the player. As illustrated in FIGS. 15-18, the presentation of the game may include displaying a bingo flashboard, one or more player cards 802, and a ball call display on display 310 of gaming device 114.

During play of the game, a plurality of house indicia is selected 1418 using randomization device 414 of local server 110 or WAP server 120. Alternatively, in an embodiment in which the game is administered by gaming device 114, randomization device 414 of gaming device 114 is used to select the house indicia. The house indicia are randomly selected from a pool of numbers between 1 and 75, and one or more of the selected house indicia may be designated or randomly selected to be a bonus ball. The house indicia that have been selected are compared with player indicia 808 on each player card 802 to determine 1420 whether the house indicia match player indicia 808 within the selected pattern 902. If a pattern 902 is not matched for a player card 802 (i.e., if each player indicia 808 within pattern 902 has not been matched by house indicia that have been selected), the game continues unless it is determined 1422 that a predetermined number of house indicia has been selected. In one embodiment of Super Cash Bingo 25, the predetermined number of house indicia is 22 such that the game ends after 22 house indicia have been selected. If the predetermined number of house indicia has been selected, a payout for each card is determined 1423 and is credited 1424 to the player account. The game ends 1426, and another game may be selected by the player as described herein. In one embodiment, the predetermined number of house indicia may be equal to the total number of house indicia available, or may be equal to any number of house indicia in excess of the last indicia eligible to win a prize as identified on a pay table (i.e., the number of house indicia identified on the last line of the pay table).

In all embodiments described herein, the house indicia selected may be displayed on display 310 with the same time interval between selections, e.g., a 0.5 second interval between each selected house indicia. Alternatively, the house indicia selected may be displayed on display 310 in an accelerated manner at the beginning of the game and may be displayed in a decelerated manner towards the end of the game. For example, a partial series of time intervals for displaying house indicia as the game progresses may include 0.5 seconds, 0.35 seconds, 0.2 seconds, 0.1 seconds, 0.05 seconds, 0.05 seconds for a predetermined number of called house indicia, 0.1 seconds, 0.2 seconds, 0.35 seconds, and 0.5 seconds. The above time intervals are merely for illustration, and any suitable time intervals or sequence of time intervals may be used. House indicia selection and/or the matching of house indicia with player indicia may be accompanied by audio and/or video effects to signify these or other game events.

If a pattern 902 is matched for a player card 802, gaming device 114, local server 110, or WAP server 120 determines 1428 whether a bonus ball was matched within pattern 902 (i.e., whether the house indicia associated with the bonus ball matches a player indicia 808 included within pattern 902). If the bonus ball was matched (and if the remaining player indicia 808 within pattern 902 are matched by the selected house indicia), a payout or prize is awarded 1430 to the player based on an enhanced or differing pay table. In one embodiment, the enhanced or differing pay table includes payouts or prizes that are 4 times the payouts or prizes of a normal, or non-enhanced, pay table. Alternatively, the enhanced or differing pay table includes payouts or prizes that are increased in any other fashion with respect to the payouts or prizes of the normal pay table. If the bonus ball was not matched (but each player indicia 808 within pattern 902 was matched by selected house indicia), a payout or prize is awarded 1432 to the player based on the normal pay table.

If the predetermined number of house indicia has not been selected, the game continues and new house indicia are selected 1418 as described above. However, once the predetermined number of house indicia have been selected, the game ends 1426.

After the game ends 1426, gaming device 114 determines 1434 whether sufficient credits are available to continue playing (i.e., to play another game). If sufficient credits are not available, the player is prompted to insert 1436 additional cash or credits to continue. If sufficient credits are available, the player is presented with several options. The player may select 1438 a cash out button or icon in which case the playing session or the game session ends 1440 and the player is paid any remaining credits or money. The player may also select 1442 a play button or icon, or a bet max button or icon, to repeat the game using the same game selections (e.g., the same player cards, the same wager amount, etc.). Accordingly, a game ticket is issued 1414 and method 1400 continues as described above. Alternatively, the player is enabled 1444 to change the game and/or the game characteristics after the game ends (and before a new game is started). For example, the player may select a new game, a new game size, and/or a new game variation to play. The player may additionally or alternatively select a new wager amount, a different number of player cards 802 to be played, and/or different player indicia 808 to be used in the game in a similar manner as described above. A new game ticket may be issued 1414 and method 1400 may continue as described above.

If the player selects a keno game, such as a Super Cash Keno game, the game may operate in a similar manner as described above unless otherwise specified. For example, the player may select the game to be played from the game entry point and may select the player card or matrix to be used during the game. The player may select the size of the game and/or matrix, such as an 80 number, a 49 number, a 25 number, or any other size of game and/or matrix. The player may enter a wager and may select the number of cards or matrices to be used during the game, may select the player indicia to be displayed on each card or matrix, and the number of player indicia or spots on each card or matrix. The cards or matrices may be played in one game, and/or in one or more future games. In addition, the keno games may be played on any gaming device 114 described herein and/or may be played across a local area network, a wide area network, and/or any other suitable network as described herein with one or more fixed and/or progressive prizes. Both "straight" game tickets and "way" game tickets may be used.

During play of the Super Cash Keno game, a predetermined number of house indicia are called based on the keno game variety selected. For example, in a game in which numbers are selected from a pool of 80 numbers (i.e., an 80 number or 80 spot game), 20 house indicia may be called. However, it should be recognized that any suitable number of house indicia may be called during the game. In addition, a random chance is provided for one or more house indicia to be selected to be a bonus ball or bonus indicia (also referred to as cash ball or cash indicia). If the player indicia matches one or more bonus balls, and if the player matches enough other house indicia with the player indicia to qualify for a prize or payout, the player may win an increased payout as compared to a payout awarded if no bonus balls were matched. The payout may be further increased for each bonus ball matched by the player indicia. The payout may be doubled for each bonus ball matched, or may be increased or changed in any other suitable manner.

After the predetermined number of house indicia are called, the game ends. The player may win one or more prizes based on a number of called house indicia that match the player indicia on the player cards according to a pay table associated with the game being played in a similar manner as described above.

In one embodiment in which the Super Cash Keno game is played with multiple players competing for a common prize, such as a progressive prize, the player or players that achieve a predetermined number of matches such as matching or "catching" 10 player indicia in a 10 spot game, win or split the prize and/or the player who has the highest number of player indicia matched wins a separate common prize. If two or more players tie for the highest number of matches (i.e., the players have the same number of player indicia matched by the called house indicia), the prize is split between the players who tied. The common prize may be in addition to a normal or fixed prize that each player may win based on the number of player indicia matched during the game and/or progressive prizes as previously described.

Figure 15:
FIG. 15 is a screenshot of a user interface that may be presented during execution of the method described in FIG. 14.

Referring to FIG. 15, a screenshot 1500 of a user interface 1501 that may be presented during execution of method 1400 is illustrated. User interface 1501 may include a bingo flashboard 1502, a player card icon 1504, and a ball call display 1506. In addition, user interface 1501 may include a plurality of user interface icons 1508 that may be selected to interact with the game and/or to change the game or the characteristics of the game.

Bingo flashboard 1502 displays the house indicia that are available to be selected during play of the game. In addition, in one embodiment, bingo flashboard 1502 displays a marker (or "daub") on the house indicia that are selected during the game. Bingo flashboard 1502 is displayed with the numbers 1-15 in the column below the letter "B," the numbers 16-30 in the column below the letter "I," the numbers 31-45 in the column below the letter "N," the numbers 46-60 in the column below the letter "G," and the numbers 61-75 under the letter "O." Alternatively, any suitable house indicia may be used instead of numbers.

In one embodiment, player card 802 is displayed as a selectable player card icon 1504 having a 5×5 matrix of spaces 806. Each space 806 of player card icon 1504 (other than center space 806) includes a player indicia 808 that has been selected by the player and/or selected by gaming device 114, local server 110, or WAP server 120. Alternatively, only the spaces 806 covered by the selected pattern 902 are filled with player indicia 808. In one embodiment, the player may select player card icon 1504 to change player card 802, to select new player indicia 808, and/or to select a new pattern 902 for player card 802.

Ball call display 1506 illustrates the number of balls (or other house indicia) that have been selected or called during the play of the game. In addition, the total number of balls that may be called during the game may be displayed. As each new ball is called, the number displayed in ball call display 1506 is incremented.

User interface icons 1508 may include a pay table icon 1510 (also referred to as a "see pays" or "help" icon), an add cards icon 1512, a bet 1 icon 1514, a wager icon 1516, a bet max icon 1518, a change game icon 1520, and a play icon 1522. Alternatively, one or more user interface icons 1508 may be omitted and/or replaced by other suitable icons.

Figure 18:
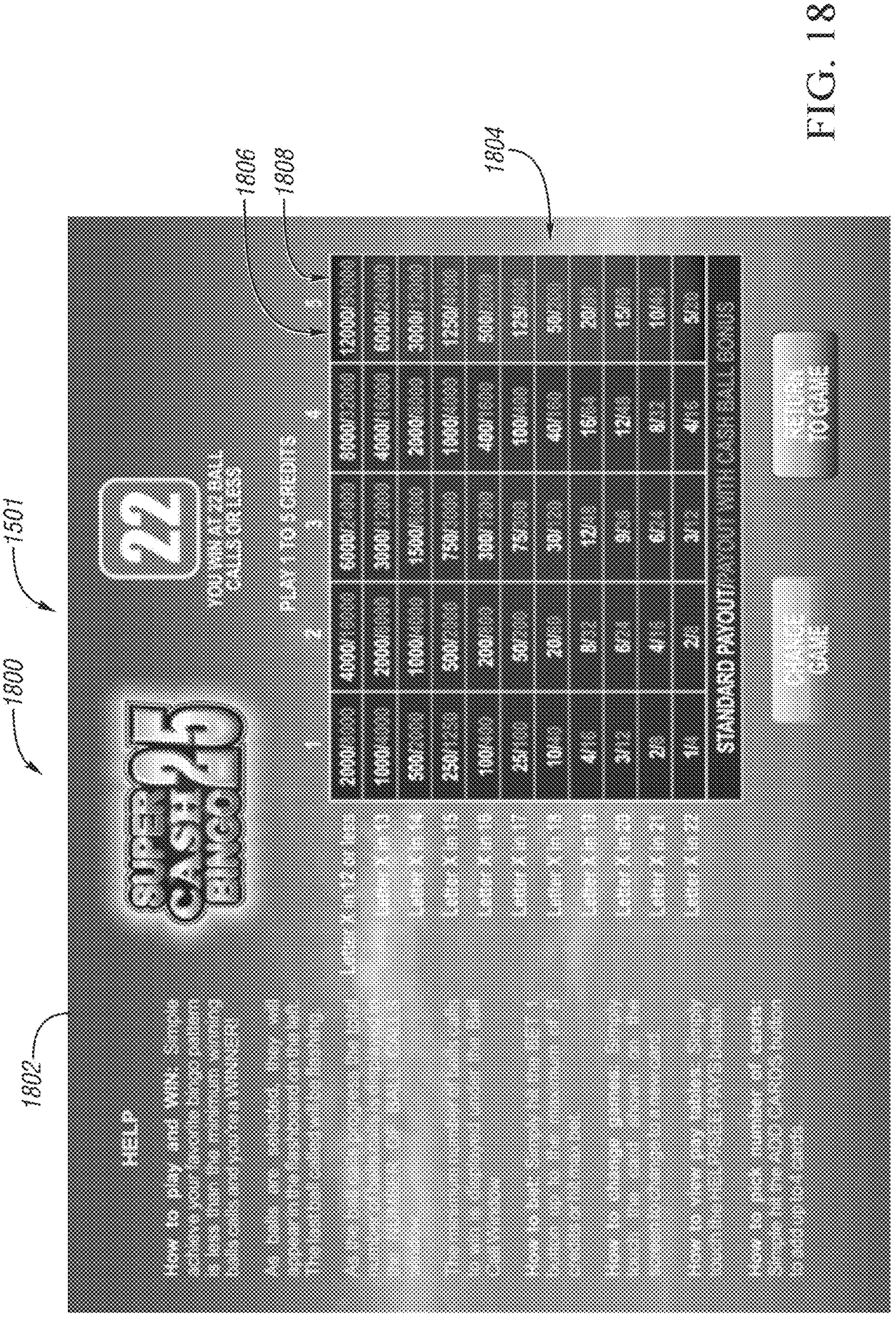
FIG. 18 is another screenshot of the user interface shown in FIG. 15 that may be presented during execution of the method described in FIG. 14.

Pay table icon 1510 enables the player to view a help screen or a pop-up window that describes how the game is played and/or other help topics. In addition, a pay table associated with the game and the selected pattern may be displayed in the help screen or pop-up window. One example help screen 1802 is shown in FIG. 18.

Add cards icon 1512 enables the player to add more player cards 802 to the game. In one embodiment, each player card 802 added uses the same pattern 902 that the player selected for the first player card 802, and each new player card 802 is filled with randomly selected player indicia 808. In addition, the same wager is used for each new player card 802. Alternatively, the player may select pattern 902, player indicia 808, and/or the wager for each new player card 802 added using the add cards icon 1512.

Bet 1 icon 1514 enables the player to wager one credit for each player card 802 in the game to be played. In one embodiment, each credit represents one unit or increment of the wager amount. For example, if the wager amount is $0.25, each credit represents $0.25. In one embodiment, if the player changes the wager amount, the number of credits available to the player is automatically adjusted accordingly. For example, if the player has 100 credits available while wagering in $0.10 increments, the number of credits will automatically be adjusted to 10 credits if the player changes the wager amount to $1. The player may continue to select the bet 1 icon 1514 to increase the wagered amount (e.g., the number of credits wagered for each player card 802) until a predetermined maximum number of credits is wagered.

Wager icon 1516 enables the player to change the wager amount or increment for each player card 802 to be used in the game. For example, the player may select wager icon 1516 to change the wager amount from $0.25 to $1 or to any suitable amount. In one embodiment, the player may enter a wager amount to be used for player cards 802 in the game. For example, the player may enter a non-standard amount such as $0.23, $1.12, or any other suitable amount that is between a predetermined minimum wager amount and a predetermined maximum wager amount.

Bet max icon 1518 enables the player to wager a maximum amount of credits for each player card 802 in the game to be played. For example, if the predetermined maximum number of credits is 5 credits, the player may select bet max icon 1518 to wager 5 credits for each player card 802 to be used in the game.

Change game icon 1520 enables the player to change the game to be played. For example, the player may select change game icon 1520 to select a new game, such as a Super Wild Bingo 25 game that is played on a 5×5 player card 804, for example. In one embodiment, wrapper program module 502 is called when change game icon 1520 is selected. Wrapper program module 502 presents a list of the available games to be played to the player. When the player selects a game from the list of available games, wrapper program module 502 calls the game module 504 associated with the selected game, and game module 504 presents the new game to the player.

Play icon 1522 enables the player to start the play of the game. For example, when the player selects play icon 1522, the house indicia are selected and are compared to player indicia 808 within pattern 902, as described above. In one embodiment, once the game is started, user interface icons 1508 become grayed out and/or become unable to be selected by the player until the game ends.

Figure 16:
FIG. 16 is another screenshot of the user interface shown in FIG. 15 that may be presented during execution of the method described in FIG. 14.

Referring to FIG. 16, another screenshot 1600 of user interface 1501 that may be presented during execution of method 1400 is illustrated. More specifically, FIG. 16 illustrates user interface 1501 while the game is being played. For example, 15 house indicia have been called out of a maximum of 22 house indicia. As illustrated on bingo flashboard 1502, a bonus ball has been received as ball 57.

In the example shown in FIG. 16, the player has matched the selected pattern 902 within 15 house indicia (or within 15 ball calls) by matching the called house indicia to player indicia 808 within the selected letter X pattern 914. Since the bonus ball (or cash ball) 57 has been received within the letter X pattern, the player is enabled to receive a payout or prize using the enhanced pay table, as described above. Accordingly, the player will receive a payout or a prize that is greater than the payout or prize that the player would otherwise receive using the normal pay table if the bonus ball (or cash ball) had not been received or matched within pattern 902.

Figure 17:
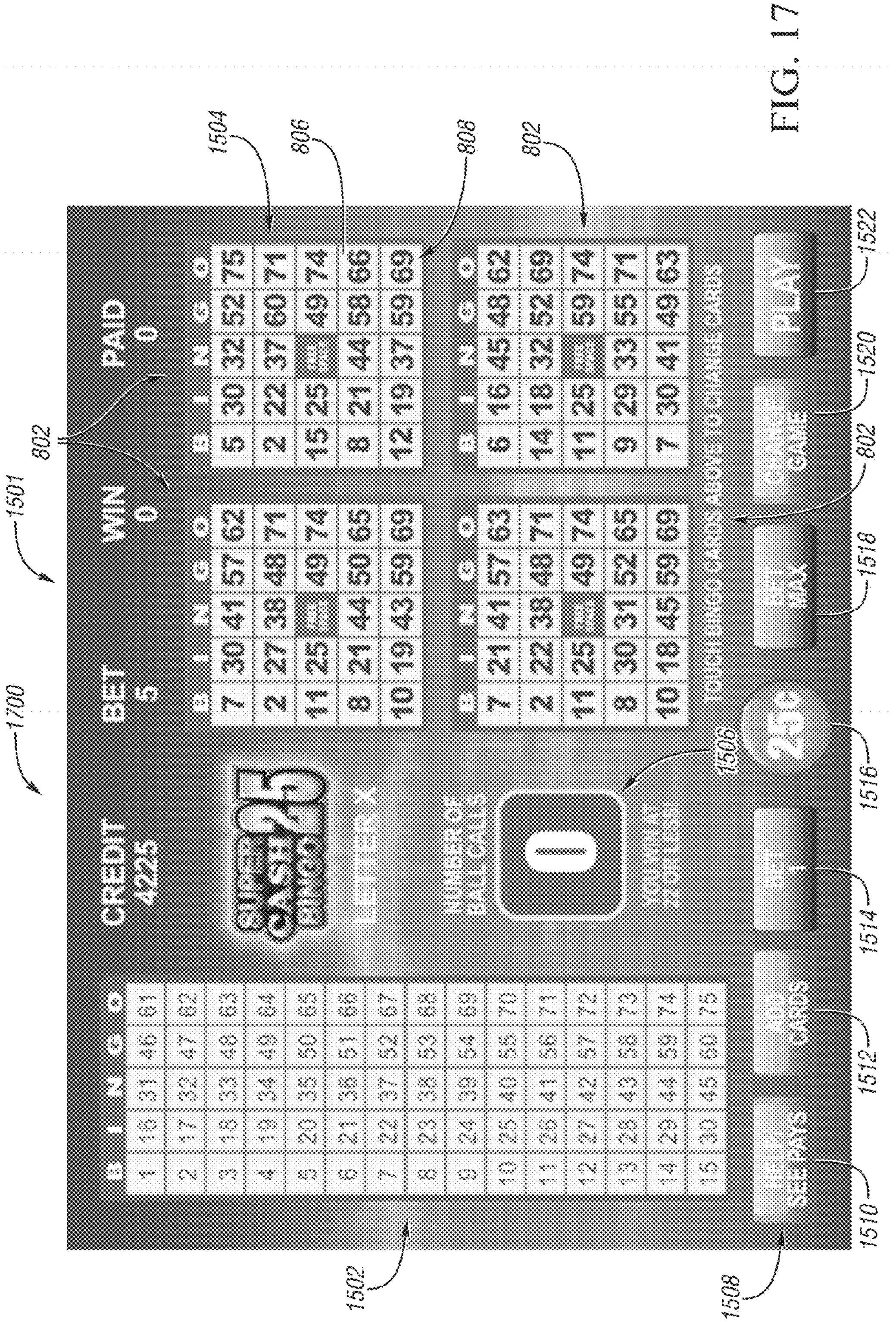
FIG. 17 is another screenshot of the user interface shown in FIG. 15 that may be presented during execution of the method described in FIG. 14.

Referring to FIG. 17, another screenshot 1700 of user interface 1501 that may be presented during execution of method 1400 is illustrated. More specifically, FIG. 17 illustrates a scenario in which the player has selected 4 player cards 802 to be used during the play of the game. In one embodiment, the same pattern 902 (e.g., the letter X pattern) is used for each player card 802. Alternatively, a different pattern 902 may be selected for each player card 802. When house indicia are called during the play of the game, the called house indicia are compared to player indicia 808 within each pattern 902 for each player card 802 to determine whether each pattern 902 is matched. A payout or prize is awarded to the player based on each pattern 902 that is matched for each player card 802. It should be recognized that the game is played until all patterns 902 have been matched or until the maximum number of house indicia have been called as previously described.

Referring to FIG. 18, another screenshot 1800 of user interface 1501 that may be presented during execution of method 1400 is illustrated. More specifically, FIG. 18 illustrates a screenshot 1800 of an example help screen 1802 that may be presented to the player when the player selects pay table icon 1510 (shown in FIG. 15). Help screen 1802 includes instructions regarding how to play the game and may also include a pay table 1804 for the selected pattern and the selected game.

In one embodiment, pay table 1804 is split into a normal pay table 1806 and an enhanced pay table 1808. Normal pay table 1806 is represented by the payouts or prizes listed on the left side of each column (e.g., the payouts to the left of the "/" sign) and enhanced pay table 1808 is represented by the payouts or prizes listed on the right side of each column (e.g., the payouts to the right of the "/" sign).

As illustrated in FIG. 18, the pay table includes a listing of the winning payouts if the pattern is matched within a prescribed or predetermined number of ball or house indicia calls. The payout increases as the number of credits increases as shown in the columns under the "Play 1 to 5 Credits" caption. The increase may be directly proportional to the increased amount bet. Alternatively, as the amount bet increases, the payout may exceed a direct proportional increase as shown in column 5. The payout for specific ball or house indicia calls may be for the exact ball or house indicia, e.g., 4 credits for a pattern match at 19 ball calls, 3 credits for a pattern match at 20 ball calls, 2 credits for a pattern match at 21 ball calls, and 1 credit for a pattern match at 22 ball calls. Alternatively, payouts may be based on groupings of ball calls, such as a payout of 2 credits for a pattern match at any ball call between 19 and 22 ball calls. The above examples are illustrative only, and it should be recognized that any suitable payout and pay table may be used as desired. It should also be understood that the drawing figures included herein illustrate interfaces that may be displayed to a player and do not necessarily reflect correct or accurate pay table or payout information as they are for illustration purposes only. The included pay table drawings for various embodiments described should be understood to reflect acceptable mathematical models which may be altered or adjusted as desired. While the underlying mathematics used to calculate payout information is represented within the pay tables, only a portion of the information may be displayed to a player such as the payout for a specific pattern match.

Figure 19:
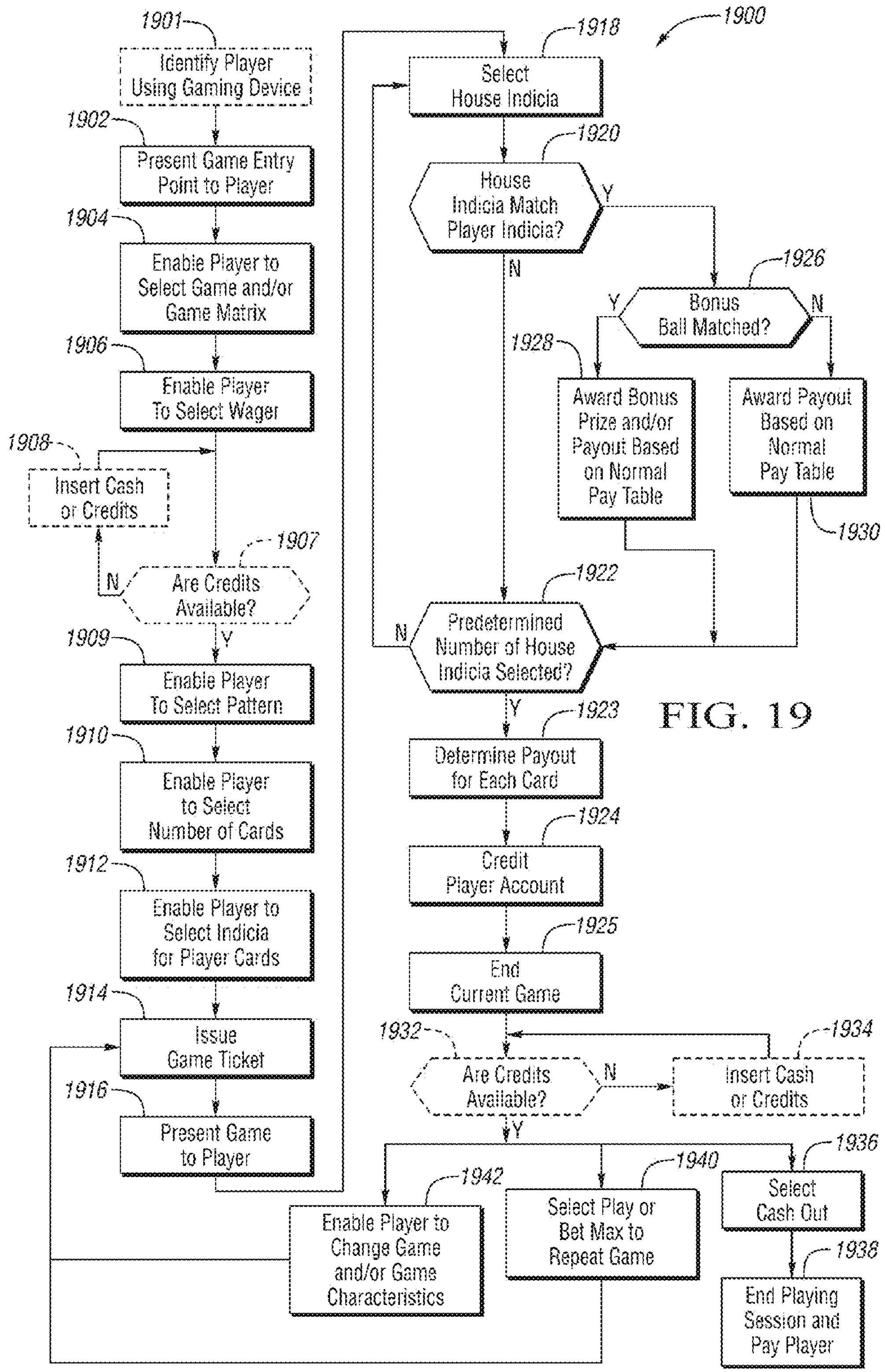
FIG. 19 is a flow diagram of a method of playing another game of chance that may be used with the systems and methods described herein.
Figure 20:
FIG. 20 is a screenshot of a user interface that may be presented during execution of the method described in FIG. 19.
Figure 21:
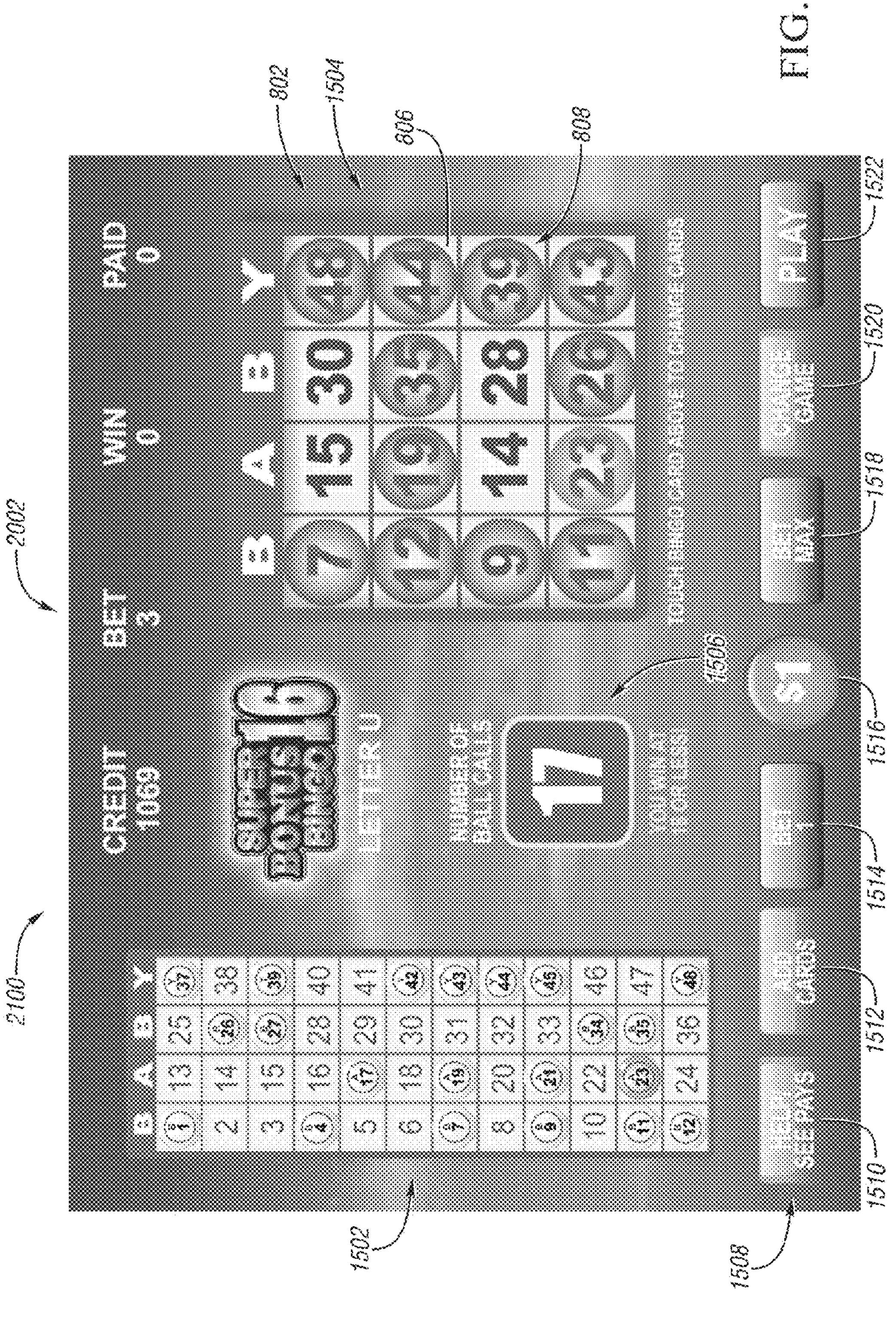
FIG. 21 is another screenshot of the user interface shown in FIG. 20 that may be presented during execution of the method described in FIG. 19.
Figure 22:
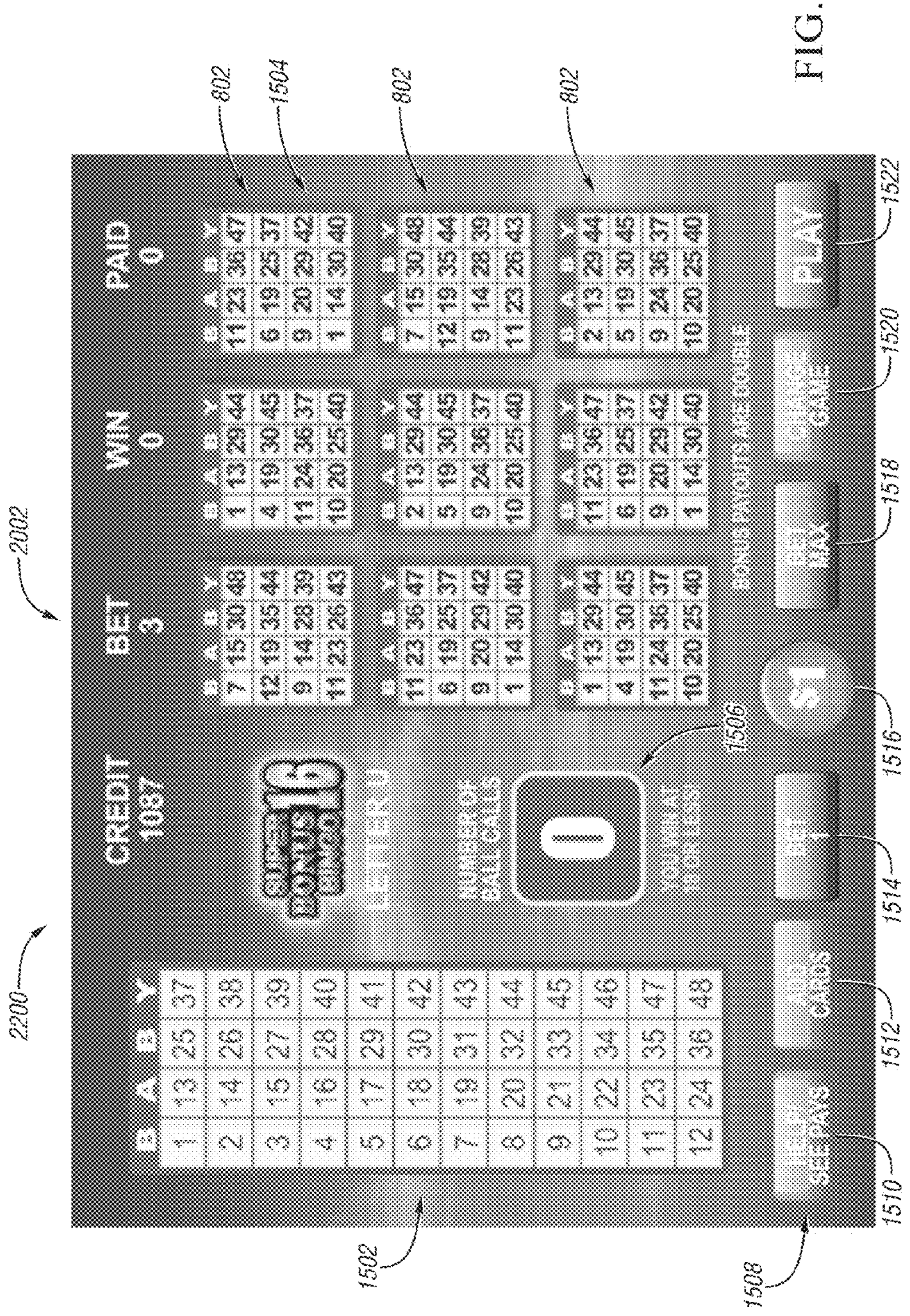
FIG. 22 is another screenshot of the user interface shown in FIG. 20 that may be presented during execution of the method described in FIG. 19.

FIG. 19 is a flow diagram of a method 1900 of playing another game of chance that may be used with the systems and methods described herein. FIGS. 20-22 are example screenshots of the game that may be presented to the player during play of the game when method 1900 is executed. In one embodiment, wrapper program module 502 calls a game module 504 associated with the game of chance when the player selects the game using user interface 312. Game module 504 presents the game of chance to the player on display 310.

In one embodiment, the player is identified 1901 using gaming device 114 as described above. A game entry interface or entry point is presented 1902 to the player on gaming device 114 using wrapper program module 502, for example, as described above with reference to FIG. 6. Wrapper program module 502 enables 1904 the player to select a game to be played from a plurality of games presented on the game entry interface. In addition, wrapper program module 502 may enable 1904 the player to select one or more game matrices to be used in the game. In one embodiment, the player selects the game by selecting a game size and a game variety associated with the game that the player wishes to play. For example, the player may select the game to be a Super Bonus Bingo 16 game that is played on a 4×4 player card 810. In the Super Bonus Bingo game, if the player matches a pattern and a bonus ball is included within the pattern, the player may be awarded a predetermined number of free player cards in a bonus game (also known as a feature) that pays double (or another suitably increased payout) if the selected pattern is matched during the bonus game.

When play of the game is initiated, during selection of the game, or during play of the game, the player may be required to purchase or generate credits. The player may purchase or generate credits by inserting cash or a ticket-in-ticket-out voucher into gaming device 114 or another device. Alternatively or additionally, the player may transfer credits or cash to gaming device 114 from banking accounts, credit accounts, gaming establishment accounts, and/or gaming company accounts. In one embodiment, computer-generated credits may be used with gaming device 114, for example, as part of a free-to-play game.

The player is enabled 1906 to select a wager for the selected game. For example, the player may select an amount of $0.25 as a wager for the selected game. Gaming device 114 may determine 1907 whether sufficient credits are available in the player account for the selected wager. If sufficient credits are not available, gaming device 114 prompts the player to insert 1908 cash or credits, for example, into gaming device 114 for the selected wager.

If sufficient credits are available in the player account for the selected wager, the player is enabled 1909 to select a pattern 902 and is enabled 1910 to select a number of cards 802 to be played during the game. In one embodiment, the player is also enabled 1912 to select some or all of the player indicia 808 for each player card 802 as described above with reference to FIG. 6. The player selections of the wager, the winning pattern 902, the number of cards 802, and the player indicia 808 may be communicated from gaming device 114 to another computing device 300, such as local server 110 and/or WAP server 120, through network 108, for example.

A game ticket for the player is issued 1914 to gaming device 114 by local server 110 or WAP server 120 for use in playing the selected game. The game is presented 1916 to the player by gaming device 114 on display 310. In one embodiment, wrapper program module 502 selects and loads a game module 504 associated with the selected game, and the selected game module 504 presents 1916 the selected game to the player. As illustrated in FIGS. 20-22, the presentation of the game may include displaying a bingo flashboard, one or more player cards 802, and a ball call display on display 310 of gaming device 114.

During play of the game, a plurality of house indicia is selected 1918 using randomization device 414 of local server 110 or WAP server 120. Alternatively, in an embodiment in which the game is administered by gaming device 114, randomization device 414 of gaming device 114 is used to select the house indicia. The house indicia are randomly selected from a pool of numbers between 1 and 48, and one or more of the selected house indicia may be designated or randomly selected to be a bonus ball. The house indicia that have been selected are compared with player indicia 808 on each player card 802 to determine 1920 whether the house indicia match player indicia 808 within the selected pattern 902. If a pattern 902 is not matched for a player card 802 (i.e., if each player indicia 808 within pattern 902 has not been matched by house indicia that have been selected), the game continues unless it is determined 1922 that a predetermined number of house indicia has been selected. In one embodiment of Super Bonus Bingo 16, the predetermined number of house indicia is 18 such that the game ends after 18 house indicia have been selected. If the predetermined number of house indicia has been selected, a payout for each card is determined 1923 and is credited 1924 to the player account. The game ends 1925, and another game may be selected by the player as described herein.

If a pattern 902 is matched for a player card 802, gaming device 114, local server 110, or WAP server 120 determines 1926 whether a bonus ball was matched within pattern 902 (i.e., whether the house indicia associated with the bonus ball matches a player indicia 808 included within pattern 902). If the bonus ball was matched (and if the remaining player indicia 808 within pattern 902 are matched by the selected house indicia), a bonus prize is awarded 1928 to the player. In one embodiment, a "normal" payout or prize is awarded 1928 to the player in addition to the bonus prize. The normal payout or prize is based on the normal, or non-enhanced, pay table associated with the selected game and the selected pattern.

In one embodiment, the bonus prize includes a predetermined number of free player cards 802 to be used with a bonus game, such as 9 free player cards 802. The payout for the bonus game is increased with respect to the normal payout, such as double the normal payout. Accordingly, in one embodiment, the bonus game uses an enhanced pay table that has increased payouts with respect to a normal, non-enhanced pay table. In one embodiment, the free player cards 802 are issued to the player during the bonus game with the same pattern 902 used in the normal game, and with randomly selected player indicia 808. The bonus game may be played in a similar manner as the normal game with the exception of the increased payout and the use of the predetermined number of player cards 802. It should be recognized that the bonus game may start after the normal game completes.

During the normal game, if no bonus ball is matched (but the called house indicia match each player indicia 808 within pattern 902), a payout is awarded 1930 to the player based on the normal pay table (i.e., not the bonus or enhanced pay table). If the predetermined number of house indicia has not been selected, the game continues and new house indicia are selected 1918 as described above. However, once the predetermined number of house indicia have been selected, the game ends 1925.

After the game ends 1925, gaming device 114 determines 1932 whether sufficient credits are available to continue playing (i.e., to play another game). If sufficient credits are not available, the player is prompted to insert 1934 additional cash or credits to continue. If sufficient credits are available, the player is presented with several options. The player may select 1936 a cash out button or icon in which case the playing session or the game session ends 1938 and the player is paid any remaining credits or money. The player may also select 1940 a play button or icon, or a bet max button or icon, to repeat the game using the same game selections (e.g., the same player cards, the same wager amount, etc.). Accordingly, a game ticket is issued 1914 and method 1900 continues as described above. Alternatively, the player is enabled 1942 to change the game and/or the game characteristics after the game ends (and before a new game is started). For example, the player may select a new game, a new game size, and/or a new game variation to play. The player may additionally or alternatively select a new wager amount, a different number of player cards 802 to be played, and/or different player indicia 808 to be used in the game in a similar manner as described above. A new game ticket may be issued 1914 and method 1900 may continue as described above.

If the player selects a keno game, such as a Super Bonus Keno game, the game may operate in a similar manner as described above unless otherwise specified. For example, the player may select the game to be played from the game entry point and may select the player card or matrix to be used during the game. The player may select the size of the game and/or matrix, such as an 80 number, a 49 number, a 25 number, or any other size of game and/or matrix. The player may enter a wager and may select the number of cards or matrices to be used during the game, and may select the number of player indicia and the specific player indicia to be displayed on each card or matrix. The cards or matrices may be played in one game, and/or in one or more future games. In addition, the keno games may be played on any gaming device 114 described herein and/or may be played across a local area network, a wide area network, and/or any other suitable network as described herein with one or more fixed and/or progressive prizes. Both "straight" game tickets and "way" game tickets may be used.

During play of the Super Bonus Keno game, a predetermined number of house indicia are called based on the keno game variety selected. For example, in a game in which numbers are selected from a pool of 80 numbers (i.e., an 80 number or 80 spot game), 20 house indicia may be called. However, it should be recognized that any suitable number of house indicia may be called during the game. In addition, a random chance is provided for one or more house indicia to be selected to be a bonus ball or bonus indicia. If the player indicia matches one or more bonus balls, and if the player matches enough other house indicia with the player indicia to qualify for a prize or payout, the player may win one or more free games that include an increased payout as compared to a payout awarded if no bonus balls were matched. The payout and the number of free games may be further increased for each bonus ball matched by the player indicia. For example, if one bonus ball was matched within a winning card (i.e., a card that includes a suitable number of player indicia that match the called house indicia), the player may win 9 free games that have payouts that are the same as or double a normal payout. If two bonus balls are matched in a winning card, the player may win 20 free games that pay double the normal payout or may win 9 free games or 9 free games that pay 4 times the normal payout. The above examples are merely illustrative, and any suitable number of free games and/or any suitable increased payout may be awarded for each bonus ball matched within a winning card.

After the predetermined number of house indicia are called, the game ends. The player may win one or more prizes based on a number of called house indicia that match the player indicia on the player cards according to a pay table associated with the game being played in a similar manner as described above.

In one embodiment in which the Super Bonus Keno game is played with multiple players competing for a common prize, such as a progressive prize, the player or players that achieve a predetermined number of matches such as matching or "catching" 10 player indicia in a 10 spot game, win or split the prize and/or the player who has the highest number of player indicia matched wins a separate common prize. If two or more players tie for the highest number of matches (i.e., the players have the same number of player indicia matched by the called house indicia), the prize is split between the players who tied. The common prize may be in addition to a normal or fixed prize that each player may win based on the number of player indicia matched during the game and/or progressive prizes as previously described.

Referring to FIG. 20, a screenshot 2000 of a user interface 2002 that may be presented during execution of method 1900 is illustrated. User interface 2002 is similar to user interface 1501 (shown in FIG. 15), and similar components are labeled in FIG. 20 with the same reference numerals used in FIG. 15. User interface 2002 may include a bingo flashboard 1502, a player card icon 1504, and a ball call display 1506. In addition, user interface 2002 may include a plurality of user interface icons 1508 that may be selected to interact with the game and/or to change the game or the characteristics of the game.

Bingo flashboard 1502 is displayed with the numbers 1-12 in the first column below the first letter "B," the numbers 13-24 in the second column below the letter "A," the numbers 25-36 in the third column below the second letter "B," and the numbers 37-48 in the fourth column below the letter "Y." Alternatively, any suitable indicia may be used instead of numbers. As each house indicia is selected during the play of the game, a corresponding number (or other indicia) of bingo flashboard 1502 is highlighted or at least partially covered by a symbol indicative of the selected house indicia.

In one embodiment, player card 802 is displayed as a selectable player card icon 1504 having a 4×4 matrix of spaces 806. Each space 806 of player card icon 1504 includes a player indicia 808 that has been selected by the player and/or selected by gaming device 114, local server 110, or WAP server 120. Alternatively, only the spaces 806 covered by the selected pattern are filled with player indicia 808. In one embodiment, the player may select player card icon 1504 to change player card 802, to select new player indicia 808, and/or to select a new pattern 902 for player card 802.

Ball call display 1506 illustrates the number of balls (or other house indicia) that have been selected or called during the play of the game. In addition, the total number of balls that may be called during the game may be displayed. As each new ball is called, the number displayed in ball call display 1506 is incremented.

User interface icons 1508 may include a pay table icon 1510 (also referred to as a "see pays" or "help" icon), an add cards icon 1512, a bet 1 icon 1514, a wager icon 1516, a bet max icon 1518, a change game icon 1520, and a play icon 1522. Alternatively, one or more user interface icons 1508 may be omitted and/or replaced by other suitable icons. User interface icons 1508 are described above with reference to FIG. 15 and operate similarly thereto.

Referring to FIG. 21, another screenshot 2100 of user interface 2002 that may be presented during execution of method 1900 is illustrated. More specifically, FIG. 21 illustrates user interface 2002 while the game is being played. For example, 17 house indicia have been called out of a maximum of 18 house indicia. As illustrated on bingo flashboard 1502, a bonus ball has been received as ball 23.

In the example shown, the player has matched the selected pattern 902 within 17 house indicia (or within 17 ball calls) by matching the called house indicia to player indicia 808 within the selected letter U pattern 1012. The bonus ball has also been received within the selected pattern 902 (i.e., the bonus ball 23 is within the letter U pattern) which enables the player to receive a payout or prize using the enhanced pay table, as described above. Accordingly, in one embodiment, the player will receive a bonus prize in addition to the payout or prize that the player receives using the normal pay table. The bonus prize may include a bonus game with a predetermined number of free player cards for use during the bonus game. Any suitable bonus may be awarded such as enhanced payouts, different bonus games such as a slot game, "you pick" symbol games, and the like.

Referring to FIG. 22, another screenshot 2200 of user interface 2002 that may be presented during execution of method 1900 is illustrated. More specifically, FIG. 22 illustrates a bonus game awarded to the player for matching a pattern with the bonus ball included.

In the example shown, the player is awarded 9 free player cards 802 during the free bonus game. In one embodiment, each player card 802 includes different player indicia 808 than each other player card 802, but each player card 802 uses the same pattern. An increased payout is awarded to the player for each player card 802 that matches pattern 902. The increased payout may include, for example, double the payout that a pattern match would otherwise receive during the normal game. In other respects, the bonus game is played similarly to the normal game except that a bonus ball is not able to be drawn in the bonus game. Alternatively, the bonus games may be presented individually, such as 9 consecutive individual bonus games.

Figure 23:
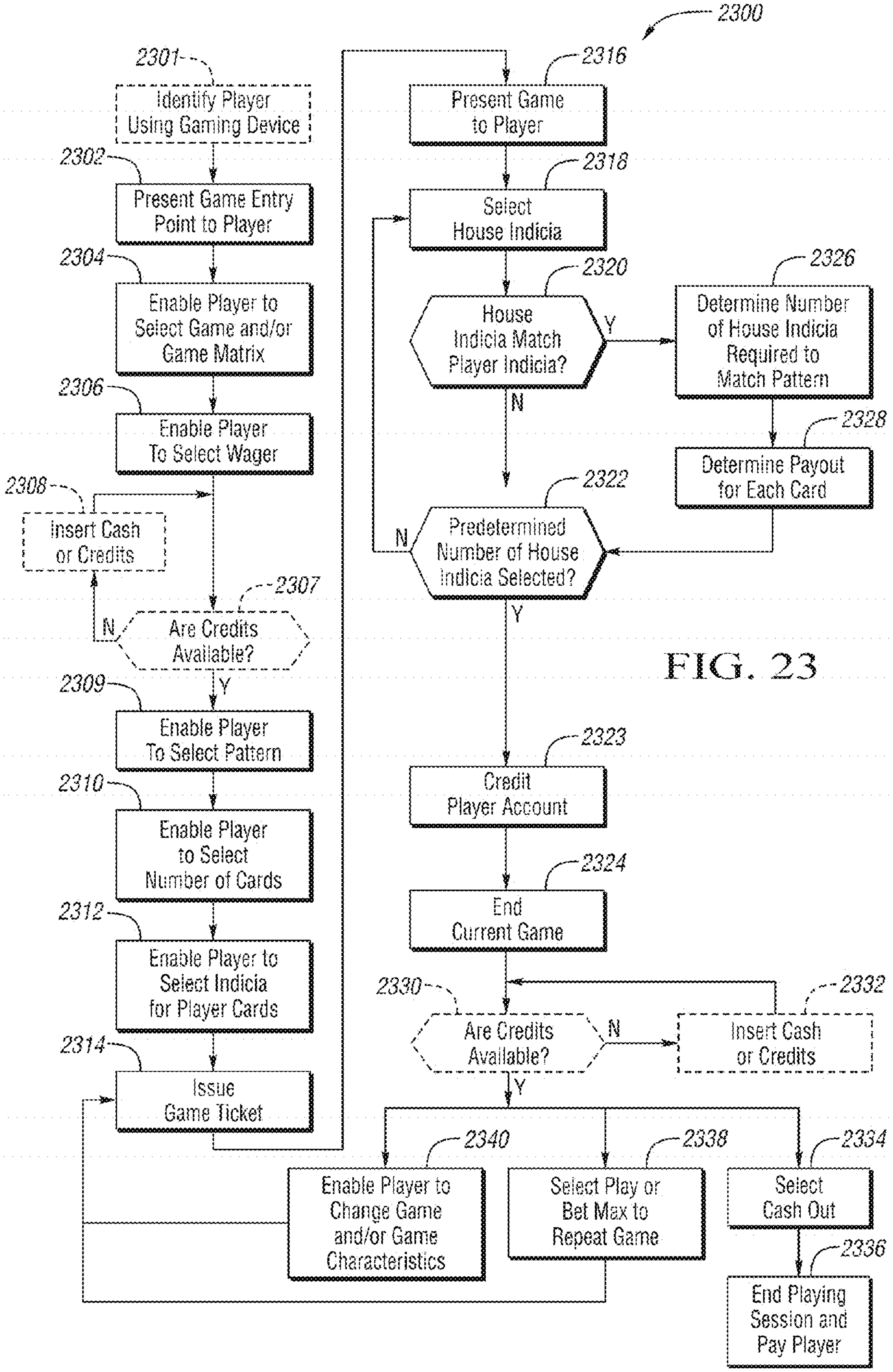
FIG. 23 is a flow diagram of a method of playing another game of chance that may be used with the systems and methods described herein.
Figure 24:
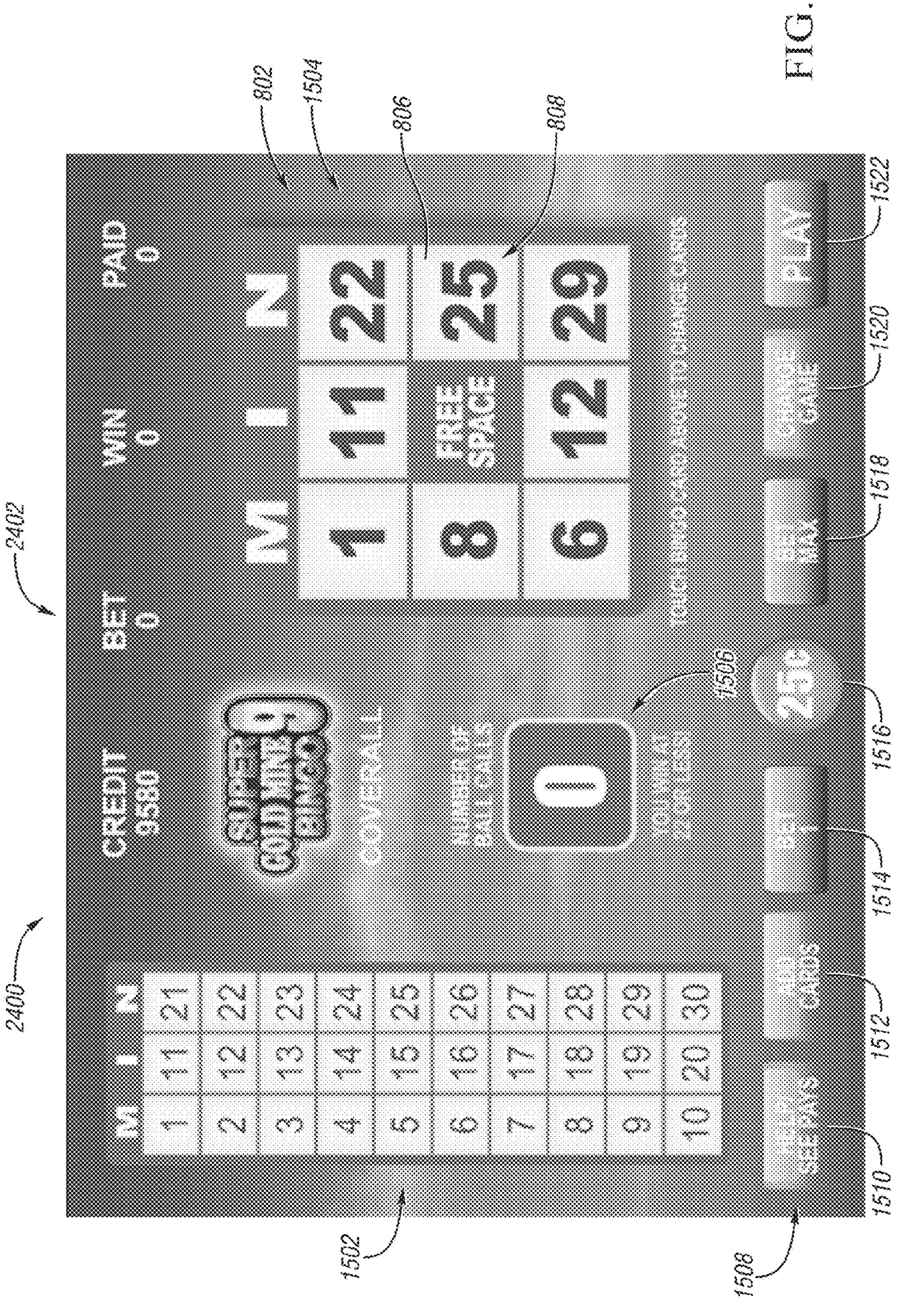
FIG. 24 is a screenshot of a user interface that may be presented during execution of the method described in FIG. 23.
Figure 25:
FIG. 25 is another screenshot of the user interface shown in FIG. 24 that may be presented during execution of the method described in FIG. 23.

FIG. 23 is a flow diagram of a method 2300 of playing another game of chance that may be used with the systems and methods described herein. FIGS. 24 and 25 are example screenshots of the game that may be presented to the player during play of the game when method 2300 is executed. In one embodiment, wrapper program module 502 calls a game module 504 associated with the game of chance when the player selects the game using user interface 312. Game module 504 presents the game of chance to the player on display 310.

In one embodiment, the player is identified 2301 using gaming device 114 as described above. A game entry interface or entry point is presented 2302 to the player on gaming device 114 using wrapper program module 502, for example, as described above with reference to FIG. 6. Wrapper program module 502 enables 2304 the player to select a game to be played from a plurality of games presented on the game entry interface. In addition, wrapper program module 502 may enable 2304 the player to select one or more game matrices to be used in the game. In one embodiment, the player selects the game by selecting a game size and a game variety associated with the game that the player wishes to play. For example, the player may select the game to be a Super Gold Mine Bingo 9 game that is played on a 3×3 player card 812. In the Super Gold Mine Bingo game, if the player matches a pattern within a predetermined number of ball calls, the player is awarded a payout or a prize. The payout or prize is increased as the number of ball calls required to match the pattern decreases.

The player is enabled 2306 to select a wager for the selected game. For example, the player may select an amount of $0.25 as a wager for the selected game. Gaming device 114 may determine 2307 whether sufficient credits are available in the player account for the selected wager. If sufficient credits are not available, gaming device 114 prompts the player to insert 2308 cash or credits, for example, into gaming device 114 for the selected wager.

If sufficient credits are available in the player account for the selected wager, the player is enabled 2309 to select a pattern 902 and is enabled 2310 to select a number of cards 802 to be played during the game. In one embodiment, the player is also enabled 2312 to select some or all of the player indicia 808 for each player card 802 as described above with reference to FIG. 6. The player selections of the wager, the winning pattern 902, the number of cards 802, and the player indicia 808 may be communicated from gaming device 114 to another computing device 300, such as local server 110 and/or WAP server 120, through network 108, for example.

A game ticket for the player is issued 2314 to gaming device 114 by local server 110 or WAP server 120 for use in playing the selected game. The game is presented 2316 to the player by gaming device 114 on display 310. In one embodiment, wrapper program module 502 selects and loads a game module 504 associated with the selected game, and the selected game module 504 presents 2316 the selected game to the player. As illustrated in FIGS. 24 and 25, the presentation of the game may include displaying a bingo flashboard, one or more player cards 802, and a ball call display on display 310 of gaming device 114.

During play of the game, a plurality of house indicia is selected 2318 using randomization device 414 of local server 110 or WAP server 120. Alternatively, in an embodiment in which the game is administered by gaming device 114, randomization device 414 of gaming device 114 is used to select the house indicia. The house indicia are randomly selected from a pool of numbers between 1 and 30. The house indicia that have been selected are compared with player indicia 808 on each player card 802 to determine 2320 whether the house indicia match player indicia 808 within the selected pattern 902. If a pattern 902 is not matched for a player card 802 (i.e., if each player indicia 808 within pattern 902 has not been matched by house indicia that have been selected), the game continues unless it is determined 2322 that a predetermined number of house indicia has been selected. In one embodiment of Super Gold Mine Bingo 9, the predetermined number of house indicia is 22 such that the game ends after 22 house indicia have been selected. If the predetermined number of house indicia has been selected, a payout for each card and/or the game is credited 2323 to the player account, the game ends 2324, and another game may be selected by the player as described herein. Alternatively, the game may end in any suitable manner as described above.

If a pattern 902 is matched for a player card 802, the number of house indicia that have been called is determined 2326. For example, if 20 house indicia have been called before pattern 902 is matched, the determined number of house indicia is 20. A payout or a prize is determined 2328 based on the number of house indicia called. The payout or prize may be determined using a pay table associated with the selected game and the selected pattern 902.

If the predetermined number of house indicia has not been selected, the game continues and new house indicia are selected 2318 as described above. However, once the predetermined number of house indicia have been selected, the game ends 2324.

After the game ends 2324, gaming device 114 determines 2330 whether sufficient credits are available to continue playing (i.e., to play another game). If sufficient credits are not available, the player is prompted to insert 2332 additional cash or credits to continue. If sufficient credits are available, the player is presented with several options. The player may select 2334 a cash out button or icon in which case the playing session or the game session ends 2336 and the player is paid any remaining credits or money. The player may also select 2338 a play button or icon, or a bet max button or icon, to repeat the game using the same game selections (e.g., the same player cards, the same wager amount, etc.). Accordingly, a game ticket is issued 2314 and method 2300 continues as described above. Alternatively, the player is enabled 2340 to change the game and/or the game characteristics after the game ends (and before a new game is started). For example, the player may select a new game, a new game size, and/or a new game variation to play. The player may additionally or alternatively select a new wager amount, a different number of player cards 802 to be played, and/or different player indicia 808 to be used in the game in a similar manner as described above. A new game ticket may be issued 2314 and method 2300 may continue as described above.

If the player selects a keno game, such as a Super Gold Mine Keno game, the game may operate in a similar manner as described above unless otherwise specified. For example, the player may select the game to be played from the game entry point and may select the player card or matrix to be used during the game. The player may select the size of the game and/or matrix, such as an 80 number, a 49 number, a 25 number, or any other size of game and/or matrix. The player may enter a wager and may select the number of cards or matrices to be used during the game, and may select the number of player indicia and the specific player indicia to be displayed on each card or matrix. The cards or matrices may be played in one game, and/or in one or more future games. In addition, the keno games may be played on any gaming device 114 described herein and/or may be played across a local area network, a wide area network, and/or any other suitable network as described herein with one or more fixed and/or progressive prizes. Both "straight" game tickets and "way" game tickets may be used.

During play of the Super Gold Mine Keno game, a predetermined number of house indicia are called based on the keno game variety selected. For example, in a game in which numbers are selected from a pool of 80 numbers (i.e., an 80 number or 80 spot game), 20 house indicia may be called. However, it should be recognized that any suitable number of house indicia may be called during the game. After the predetermined number of house indicia are called, the game ends. The player may win one or more prizes based on a number of called house indicia that match the player indicia on the player cards according to a pay table associated with the game being played. For example, the player may win 10 credits if 6 player indicia within a card are matched by the house indicia called during the game.

In one embodiment in which the Super Gold Mine Keno game is played with multiple players competing for a common prize, such as a progressive prize, the player or players that achieve a predetermined number of matches such as matching or "catching" 10 player indicia in a 10 spot game, win or split the prize and/or the player who has the highest number of player indicia matched wins a separate common prize. If two or more players tie for the highest number of matches (i.e., the players have the same number of player indicia matched by the called house indicia), the prize is split between the players who tied. The common prize may be in addition to a normal or fixed prize that each player may win based on the number of player indicia matched during the game and/or progressive prizes as previously described.

Referring to FIG. 24, a screenshot 2400 of a user interface 2402 that may be presented during execution of method 2300 is illustrated. User interface 2402 may include a bingo flashboard 1502, a player card icon 1504, and a ball call display 1506. In addition, user interface 2402 may include a plurality of user interface icons 1508 that may be selected to interact with the game and/or to change the game or the characteristics of the game. User interface 2402 is similar to user interface 1501 (shown in FIG. 15), and similar components are labeled in FIG. 24 with the same reference numerals used in FIG. 15.

Bingo flashboard 1502 is displayed with the numbers 1-10 in the first column below the letter "M," the numbers 11-20 in the second column below the letter "I," and the numbers 21-30 in the third column below the letter "N." Alternatively, any suitable indicia may be used instead of numbers. As each house indicia is selected during the play of the game, a corresponding number (or other indicia) of bingo flashboard 1502 is highlighted or at least partially covered by a symbol indicative of the selected house indicia.

In one embodiment, player card 802 is displayed as a selectable player card icon 1504 having a 3×3 matrix of spaces 806. Each space 806 of player card icon 1504 includes a player indicia 808 that has been selected by the player and/or selected by gaming device 114, local server 110, or WAP server 120. Alternatively, only the spaces 806 covered by the selected pattern are filled with player indicia 808. In one embodiment, the player may select player card icon 1504 to change player card 802, to select new player indicia 808, and/or to select a new pattern 902 for player card 802.

Ball call display 1506 illustrates the number of balls (or other house indicia) that have been selected or called during the play of the game. In addition, the total number of balls that may be called during the game may be displayed. As each new ball is called, the number displayed in ball call display 1506 is incremented.

User interface icons 1508 may include a pay table icon 1510 (also referred to as a "see pays" or "help" icon), an add cards icon 1512, a bet 1 icon 1514, a wager icon 1516, a bet max icon 1518, a change game icon 1520, and a play icon 1522. Alternatively, one or more user interface icons 1508 may be omitted and/or replaced by other suitable icons. User interface icons 1508 are described above with reference to FIG. 15 and operate similarly thereto.

Referring to FIG. 25, another screenshot 2500 of user interface 2402 that may be presented during execution of method 2300 is illustrated. More specifically, FIG. 25 illustrates user interface 2402 while the game is being played. For example, 21 house indicia have been called out of a maximum of 22 house indicia.

In the example shown, the player has matched the selected pattern 902 within 21 house indicia (or within 21 ball calls) by matching the called house indicia to player indicia 808 within the selected coverall pattern 1116. Accordingly, the player will receive a payout or a prize based on an associated pay table. The payout or prize may be increased since less than 22 house indicia were required to be called for pattern 902 to be matched.

Figure 26:
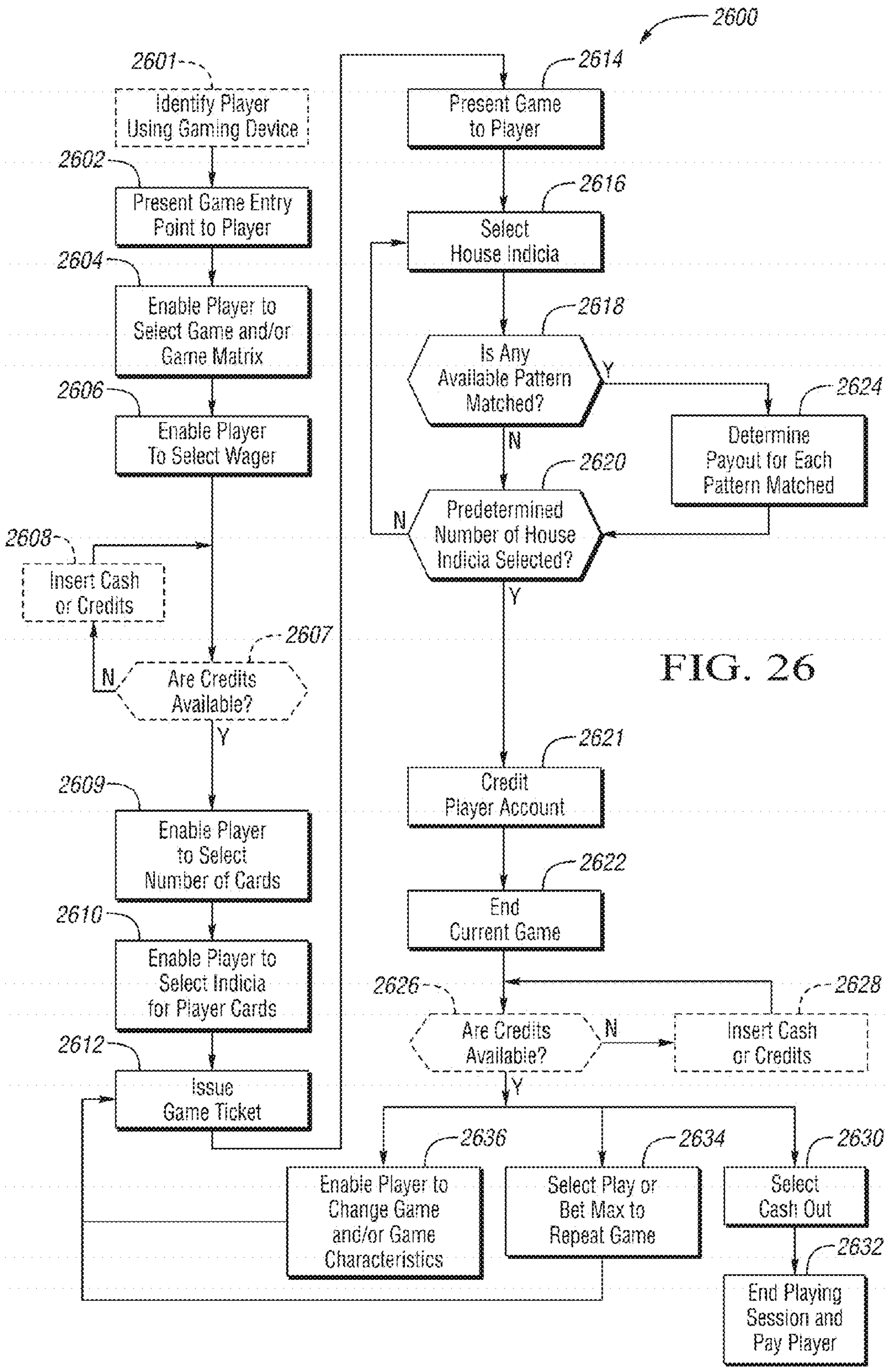
FIG. 26 is a flow diagram of a method of playing another game of chance that may be used with the systems and methods described herein.
Figure 27:
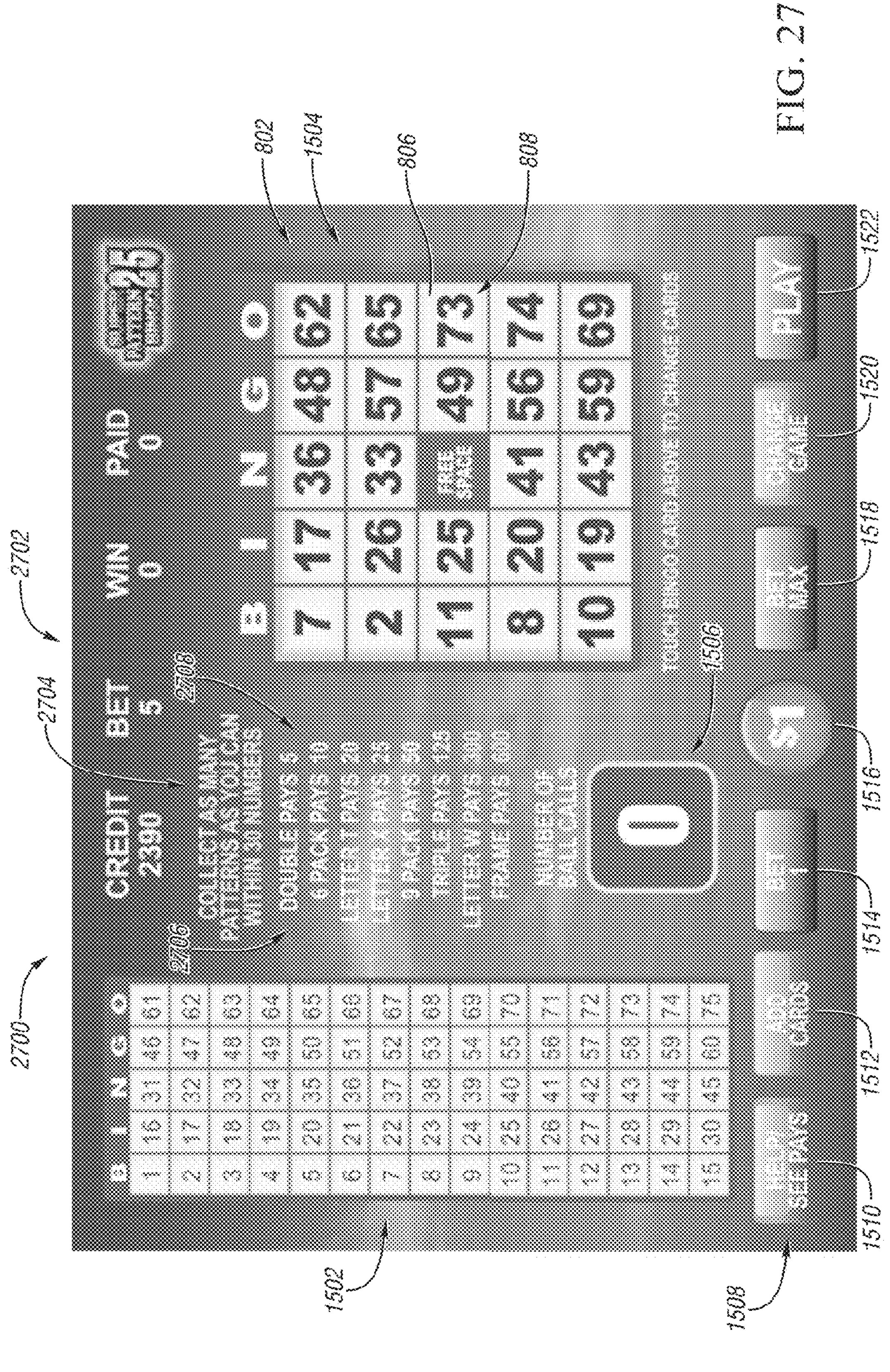
FIG. 27 is a screenshot of a user interface that may be presented during execution of the method described in FIG. 26.
Figure 28:
FIG. 28 is another screenshot of the user interface shown in FIG. 27 that may be presented during execution of the method described in FIG. 26.

FIG. 26 is a flow diagram of a method 2600 of playing another game of chance that may be used with the systems and methods described herein. FIGS. 27 and 28 are example screenshots of the game that may be presented to the player during play of the game when method 2600 is executed. In one embodiment, wrapper program module 502 calls a game module 504 associated with the game of chance when the player selects the game using user interface 312. Game module 504 presents the game of chance to the player on display 310.

In one embodiment, the player is identified 2601. A game entry interface or entry point is presented 2602 to the player on gaming device 114 using wrapper program module 502, for example, as described above with reference to FIG. 6. Wrapper program module 502 enables 2604 the player to select a game to be played from a plurality of games presented on the game entry interface. In addition, wrapper program module 502 may enable 2604 the player to select one or more game matrices to be used in the game. In one embodiment, the player selects the game by selecting a game size and a game variety associated with the game that the player wishes to play. For example, the player may select the game to be a Super Pattern Bingo 25 game that is played on a 5×5 player card 804. In the Super Pattern Bingo game, a list of available patterns is provided. The player receives a payout for each pattern in the list of available patterns that is matched by the called house indicia during a game. Accordingly, the player is not limited to only matching a single pattern and receiving a single payout during the game.

The player is enabled 2606 to select a wager for the selected game. For example, the player may select an amount of $1 as a wager for the selected game. Gaming device 114 may determine 2607 whether sufficient credits are available in the player account for the selected wager. If sufficient credits are not available, gaming device 114 prompts the player to insert 2608 cash or credits, for example, into gaming device 114 for the selected wager.

If sufficient credits are available in the player account for the selected wager, the player is enabled 2609 to select a number of cards 802 to be played during the game. In one embodiment, the player is also enabled 2610 to select some or all of the player indicia 808 for each player card 802 as described above with reference to FIG. 6. The player selections of the wager, the number of cards 802, and the player indicia 808 may be communicated from gaming device 114 to another computing device 300, such as local server 110 and/or WAP server 120, through network 108, for example. It should be noted that, as described above, the player does not pick winning pattern 902 to be matched. Rather, a list of predetermined patterns 902 are provided, and each pattern 902 is able to be matched during the game. Alternatively, the player may select one or more patterns 902 and/or may create one or more patterns 902 to be used during the game in addition to, or alternative to, the predetermined patterns 902 provided. In such an embodiment, an additional amount of money or credits may be required to be received from the player to play the game.

A game ticket for the player is issued 2612 to gaming device 114 by local server 110 or WAP server 120 for use in playing the selected game. The game is presented 2614 to the player by gaming device 114 on display 310. In one embodiment, wrapper program module 502 selects and loads a game module 504 associated with the selected game, and the selected game module 504 presents 2614 the selected game to the player. As illustrated in FIGS. 24 and 25, the presentation of the game may include displaying a bingo flashboard, one or more player cards 802, and a ball call display on display 310 of gaming device 114. In one embodiment, a pay table is displayed during the presentation of the game.

During play of the game, a plurality of house indicia is selected 2616 using randomization device 414 of local server 110 or WAP server 120. Alternatively, in an embodiment in which the game is administered by gaming device 114, randomization device 414 of gaming device 114 is used to select the house indicia. The house indicia are randomly selected from a pool of numbers between 1 and 75. The house indicia that have been selected are compared with player indicia 808 on each player card 802 to determine 2618 whether the house indicia match player indicia 808 within any available pattern 902.

If a pattern 902 is not matched for a player card 802 (i.e., if each player indicia 808 within each available pattern 902 has not been matched by house indicia that have been selected), the game continues unless it is determined 2620 that a predetermined number of house indicia has been selected. In one embodiment of Super Pattern Bingo 25, the predetermined number of house indicia is 30 such that the game ends after 30 house indicia have been selected. If the predetermined number of house indicia has been selected, a payout for each player card and/or the game is credited 2621 to the player account, the game ends 2622, and another game may be selected by the player or the player may change the game characteristics or criteria as described herein.

If one or more patterns 902 are matched for a player card 802, a payout or a prize is determined 2624 for each matched pattern 902 based on the associated pay table. For example, if both a double pattern and a letter U pattern are matched, a payout is determined and awarded to the player for each of the double pattern and the letter U pattern.

If the predetermined number of house indicia has not been selected, the game continues and new house indicia are selected 2616 as described above. However, once the predetermined number of house indicia have been selected, the game ends 2622.

After the game ends 2622, gaming device 114 determines 2626 whether sufficient credits are available to continue playing (i.e., to play another game). If sufficient credits are not available, the player is prompted to insert 2628 additional cash or credits to continue. If sufficient credits are available, the player is presented with several options. The player may select 2630 a cash out button or icon in which case the playing session or the game session ends 2632 and the player is paid any remaining credits or money. The player may also select 2634 a play button or icon, or a bet max button or icon, to repeat the game using the same game selections (e.g., the same player cards, the same wager amount, etc.). Accordingly, a game ticket is issued 2612 and method 2600 continues as described above. Alternatively, the player is enabled 2636 to change the game and/or the game characteristics after the game ends (and before a new game is started). For example, the player may select a new game, a new game size, and/or a new game variation to play. The player may additionally or alternatively select a new wager amount, a different number of player cards 802 to be played, and/or different player indicia 808 to be used in the game in a similar manner as described above. A new game ticket may be issued 2612 and method 2600 may continue as described above.

If the player selects a keno game, such as a Super Multi-Step Keno game, the game may operate in a similar manner as described above unless otherwise specified. For example, the player may select the game to be played from the game entry point and may select the player card or matrix to be used during the game. The player may select the size of the game and/or matrix, such as an 80 number, a 49 number, a 25 number, or any other size of game and/or matrix. The player may enter a wager and may select the number of cards or matrices to be used during the game, and may select the player indicia to be played and displayed on each card or matrix. The cards or matrices may be played in one game, and/or in one or more future games. In addition, the keno games may be played on any gaming device 114 described herein and/or may be played across a local area network, a wide area network, and/or any other suitable network as described herein with one or more fixed and/or progressive prizes.

The amount wagered by the player may determine the number and/or combination of player indicia to be matched during the game. More specifically, the player may play a plurality of concurrent multi-spot cards based on the number of credits wagered. For example, if a player wagers 10 credits and selects or "quick picks" the numbers 11, 12, 13, 14, 15, 16, 17, 18, 19, and 20 for the player indicia to be used during the game, the player may play a 1 credit 1-spot game using number 11, a 2 credit 2-spot game using numbers 11 and 12, a 3 credit 3-spot game using numbers 11, 12, and 13, and so forth up to and including a 10 credit 10-spot game using numbers 11-20. The player may therefore win a plurality of prizes if sufficient numbers are matched.

During play of the Super Multi-Step Keno game, a predetermined number of house indicia are called based on the keno game variety selected. For example, in a game in which numbers are selected from a pool of 80 numbers (i.e., an 80 number or 80 spot game), 20 house indicia may be called. However, it should be recognized that any suitable number of house indicia may be called during the game. After the predetermined number of house indicia are called, the game ends. As described above, the player may win one or more prizes based on a number of called house indicia that match the player indicia on the player cards according to one or more pay tables associated with the game being played in a similar manner as described above.

In one embodiment in which the Super Multi-Step Keno game is played with multiple players competing for a common prize, such as a progressive prize, the player or players that achieve a predetermined number of matches such as matching or "catching" 7 player indicia in a 7 spot game within a 49 number matrix, win or split the prize and/or the player who has the highest number of player indicia matched wins a separate common prize. If two or more players tie for the highest number of matches (i.e., the players have the same number of player indicia matched by the called house indicia), the prize is split between the players who tied. The common prize may be in addition to a normal or fixed prize that each player may win based on the number of player indicia matched during the game and/or progressive prizes as previously described.

Referring to FIG. 27, a screenshot 2700 of a user interface 2702 that may be presented during execution of method 2600 is illustrated. User interface 2702 may include a bingo flashboard 1502, a player card icon 1504, and a ball call display 1506. In addition, user interface 2702 may include a pay table 2704 and a plurality of user interface icons 1508 that may be selected to interact with the game and/or to change the game or the characteristics of the game. User interface 2702 is similar to user interface 1501 (shown in FIG. 15), and similar components are labeled in FIG. 27 with the same reference numerals used in FIG. 15.

Bingo flashboard 1502 is displayed with the numbers 1-15 in the column below the letter "B," the numbers 16-30 in the column below the letter "I," the numbers 31-45 in the column below the letter "N," the numbers 46-60 in the column below the letter "G," and the numbers 61-75 under the letter "O." Alternatively, any suitable indicia may be used instead of numbers. In one embodiment, any suitable matrices may be used, or no matrices may be used. As each house indicia is selected during the play of the game, a corresponding number (or other indicia) of bingo flashboard 1502 is highlighted or at least partially covered by a symbol indicative of the selected house indicia.

In one embodiment, player card 802 is displayed as a selectable player card icon 1504 having a 5×5 matrix of spaces 806. Each space 806 of player card icon 1504 includes a player indicia 808 that has been selected by the player and/or selected by gaming device 114, local server 110, or WAP server 120. Alternatively, only the spaces 806 covered by the selected pattern are filled with player indicia 808. In one embodiment, the player may select player card icon 1504 to change player card 802 and/or to select new player indicia 808 for player card 802.

Ball call display 1506 illustrates the number of balls (or other house indicia) that have been selected or called during the play of the game. In addition, the total number of balls that may be called during the game may be displayed. As each new ball is called, the number displayed in ball call display 1506 is incremented.

User interface icons 1508 may include a pay table icon 1510 (also referred to as a "see pays" or "help" icon), an add cards icon 1512, a bet 1 icon 1514, a wager icon 1516, a bet max icon 1518, a change game icon 1520, and a play icon 1522. Alternatively, one or more user interface icons 1508 may be omitted and/or replaced by other suitable icons. User interface icons 1508 are described above with reference to FIG. 15 and operate similarly thereto.

Pay table 2704 displays a list 2706 of available patterns 902 and a payout 2708 for each pattern 902. In one embodiment, payout 2708 for each pattern 902 is automatically adjusted (e.g., increased) when the player selects bet 1 icon 1514 or bet max icon 1518. In one embodiment, payouts 2708 are predetermined multiples of the wagered amount. If a pattern 902 is matched during the play of the game, in one embodiment, a corresponding line in pay table 2704 is highlighted to indicate that the player won the highlighted payout 2708. In the alternative, the payouts may be increased as higher numbers of credits are bet or higher denominations or increments of bets are made.

Referring to FIG. 28, another screenshot 2800 of user interface 2702 that may be presented during execution of method 2600 is illustrated. More specifically, FIG. 28 illustrates user interface 2702 while the game is being played. For example, all 30 house indicia have been called out of a maximum of 30 house indicia.

In the example shown, the player has matched three patterns 902: a double pattern, a 6 pack pattern, and a letter X pattern. Accordingly, the player receives a payout for each pattern 902 matched. In the example shown, the player receives 5 credits for matching the double pattern, 10 credits for matching the 6 pack pattern, and 25 credits for matching the letter X pattern.

In another embodiment, various patterns 902 are activated or "unlocked" for play as additional credits are bet. Each activated pattern wins a payout if the pattern is matched during the play of the game. For example, in the example shown in FIG. 28, a bet of 1 credit may activate the double pattern, a bet of 2 credits activates the 6 pack pattern in addition to the double pattern, a bet of 3 credits activates the letter T pattern in addition to the double pattern and the 6 pack pattern, and so on until a number of maximum credits bet activates a maximum number of patterns. It should be recognized that any suitable amount of credits may activate each pattern, or a group of patterns may be activated by any suitable number of credits.

Figure 29:
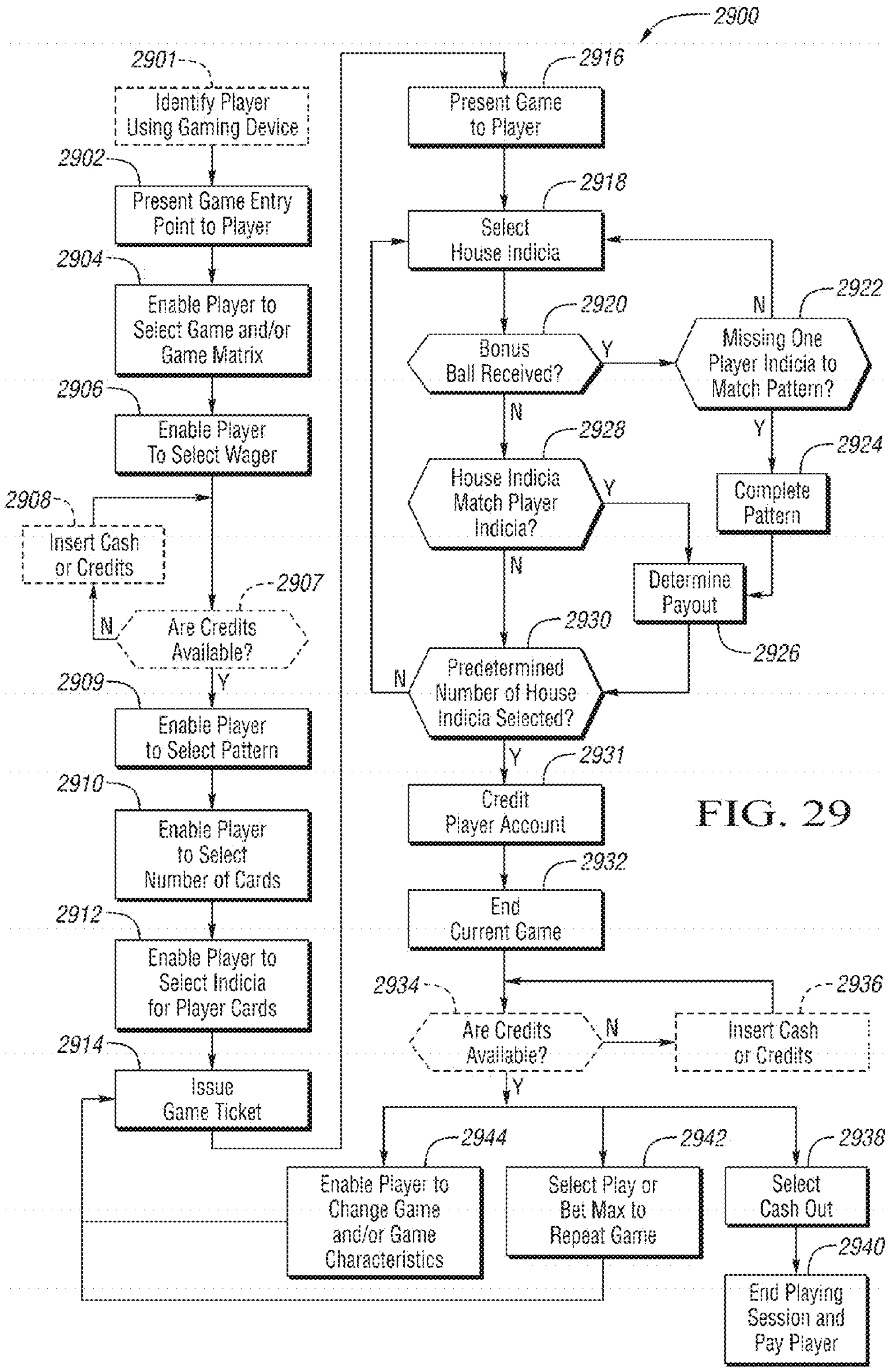
FIG. 29 is a flow diagram of a method of playing another game of chance that may be used with the systems and methods described herein.
Figure 30:
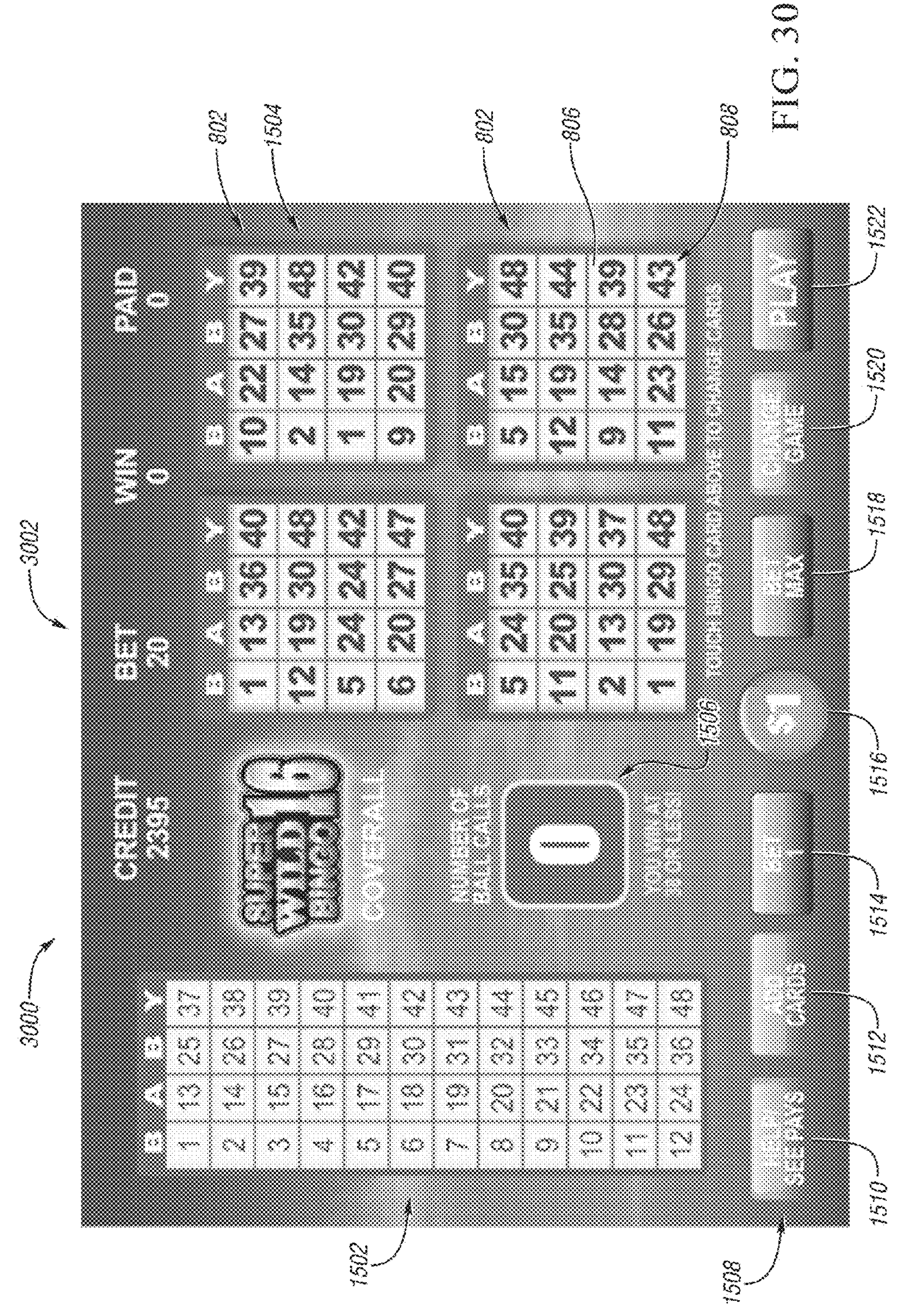
FIG. 30 is a screenshot of a user interface that may be presented during execution of the method described in FIG. 29.
Figure 31:
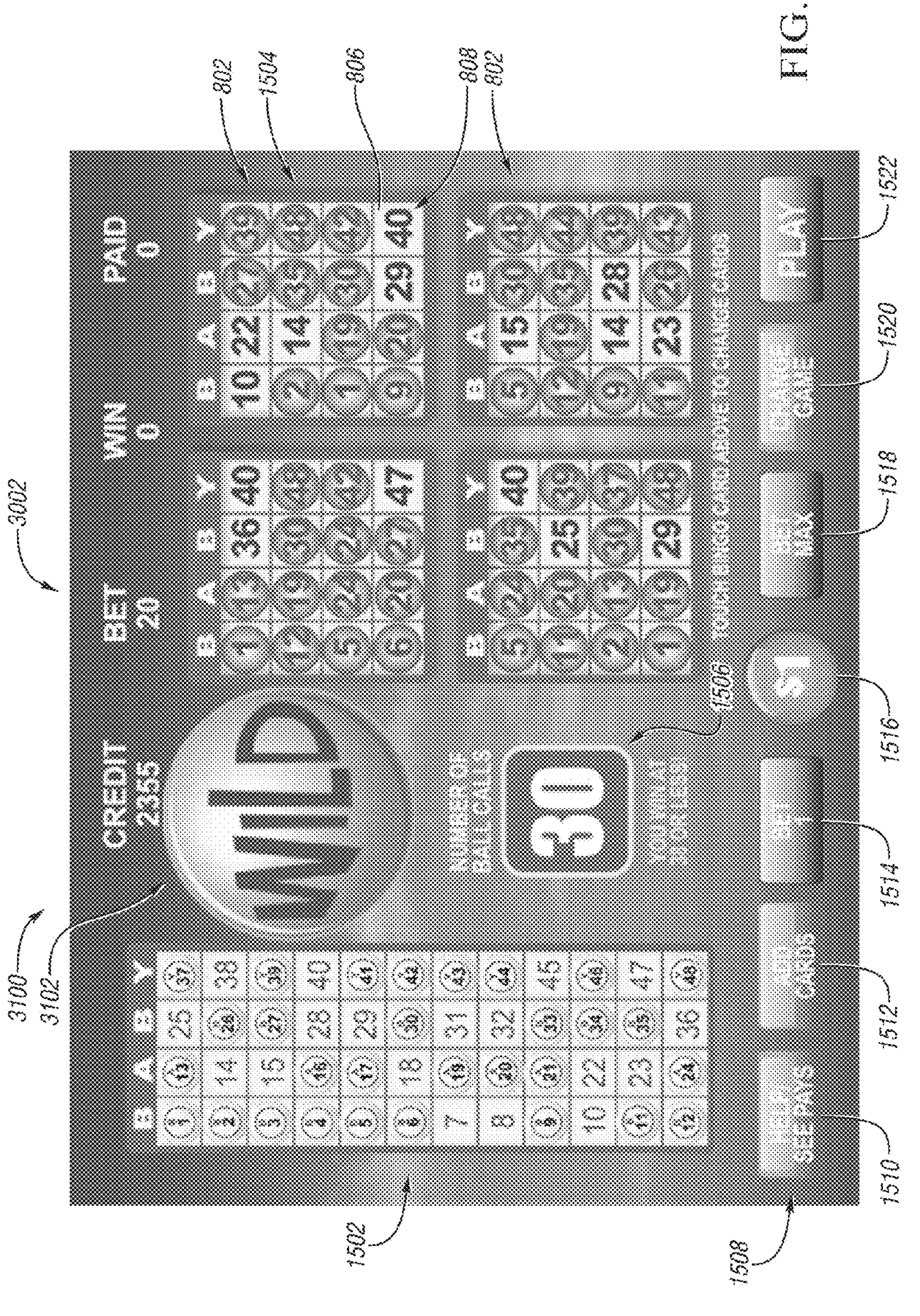
FIG. 31 is another screenshot of the user interface shown in FIG. 30 that may be presented during execution of the method described in FIG. 29.
Figure 32:
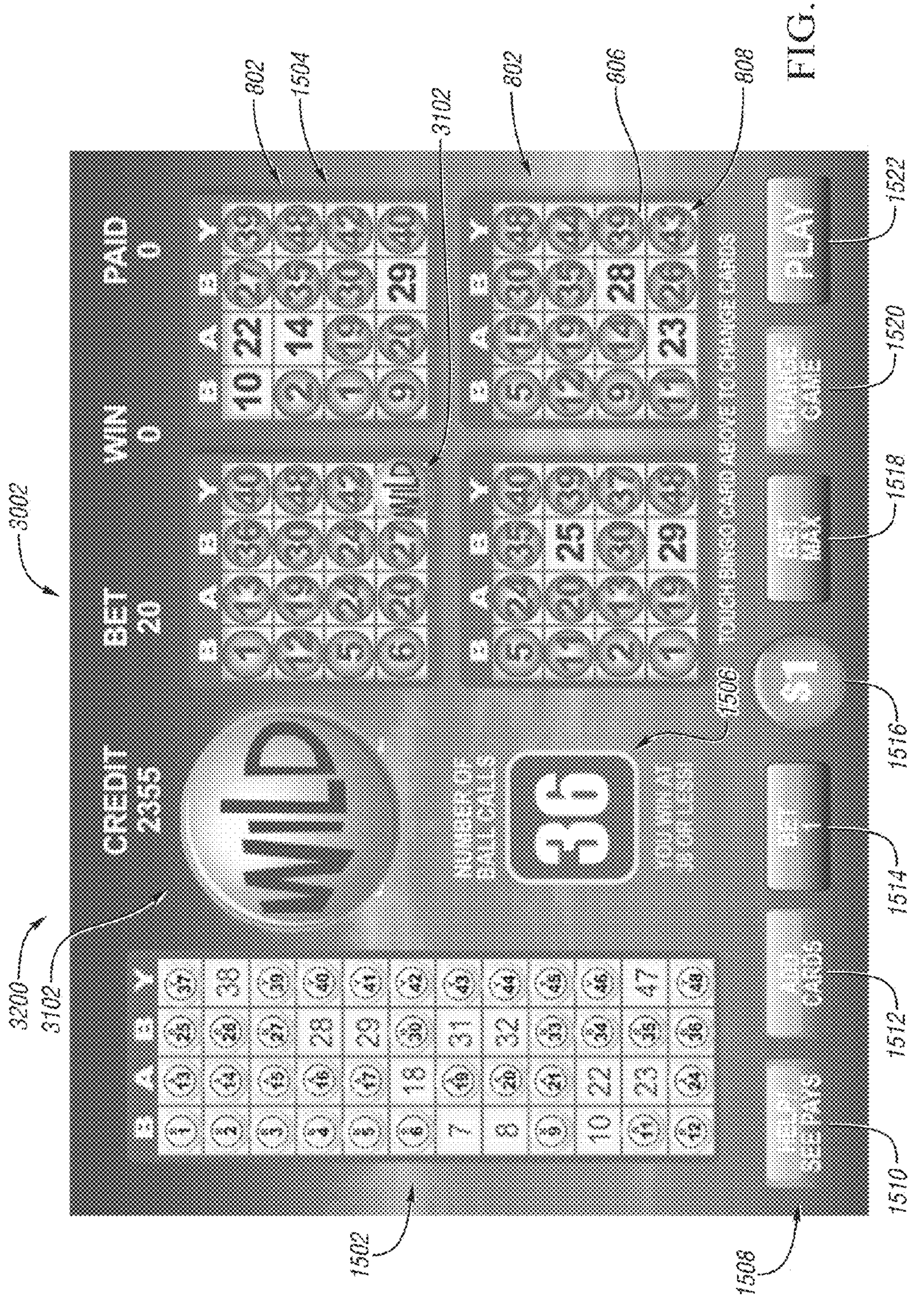
FIG. 32 is another screenshot of the user interface shown in FIG. 30 that may be presented during execution of the method described in FIG. 29.

FIG. 29 is a flow diagram of a method 2900 of playing another game of chance that may be used with the systems and methods described herein. FIGS. 30-32 are example screenshots of the game that may be presented to the player during play of the game when method 2900 is executed. In one embodiment, wrapper program module 502 calls a game module 504 associated with the game of chance when the player selects the game using user interface 312. Game module 504 presents the game of chance to the player on display 310.

In one embodiment, the player is identified 2901 using gaming device 114 as described above. A game entry interface or entry point is presented 2902 to the player on gaming device 114 using wrapper program module 502, for example, as described above with reference to FIG. 6. Wrapper program module 502 enables 2904 the player to select a game to be played from a plurality of games presented on the game entry interface. In addition, wrapper program module 502 may enable 2904 the player to select one or more game matrices to be used in the game. In one embodiment, the player selects the game by selecting a game size and a game variety associated with the game that the player wishes to play. For example, the player may select the game to be a Super Wild Bingo 16 game that is played on a 4×4 player card 810. In the Super Wild Bingo game, if the player receives a wild or bonus ball, a pattern 902 will automatically be completed if just one ball remains to be matched within pattern 902.

The player is enabled 2906 to select a wager for the selected game. For example, the player may select an amount of $1 as a wager for the selected game. Gaming device 114 may determine 2907 whether sufficient credits are available in the player account for the selected wager. If sufficient credits are not available, gaming device 114 prompts the player to insert 2908 cash or credits, for example, into gaming device 114 for the selected wager.

If sufficient credits are available in the player account for the selected wager, the player is enabled 2909 to select a pattern 902 and is enabled 2910 to select a number of cards 802 to be played during the game. In one embodiment, the player is also enabled 2912 to select some or all of the player indicia 808 for each player card 802 as described above with reference to FIG. 6. The player selections of the wager, the winning pattern 902, the number of cards 802, and the player indicia 808 may be communicated from gaming device 114 to another computing device 300, such as local server 110 and/or WAP server 120, through network 108, for example.

A game ticket for the player is issued 2914 to gaming device 114 by local server 110 or WAP server 120 for use in playing the selected game. The game is presented 2916 to the player by gaming device 114 on display 310. In one embodiment, wrapper program module 502 selects and loads a game module 504 associated with the selected game, and the selected game module 504 presents 2916 the selected game to the player. As illustrated in FIGS. 30-32, the presentation of the game may include displaying a bingo flashboard, one or more player cards 802, and a ball call display on display 310 of gaming device 114.

During play of the game, a plurality of house indicia is selected 2918 using randomization device 414 of local server 110 or WAP server 120. Alternatively, in an embodiment in which the game is administered by gaming device 114, randomization device 414 of gaming device 114 is used to select the house indicia. The house indicia are randomly selected from a pool of numbers between 1 and 48, and one or more of the selected house indicia may be designated or randomly selected to be a bonus ball (also referred to as a wild ball).

Gaming device 114, local server 110, or WAP server 120 determines 2920 whether a bonus ball has been received during the calling of the house indicia. If a bonus ball has been received, gaming device 114, local server 110, or WAP server 120 determines 2922 whether all but 1 player indicia have been matched within pattern 902 by the called house indicia (i.e., whether only 1 house indicia is missing to match the pattern). If only 1 player indicia 808 remains to be matched, pattern 902 is automatically matched or completed 2924 using the bonus ball and a payout is determined 2926 for the completed pattern 902. However, if more than 1 player indicia 808 remains to be matched within pattern 902, method 2900 returns to selecting 2918 a new house indicia.

If no bonus ball was received, the house indicia that have been selected are compared with player indicia 808 on each player card 802 to determine 2928 whether the house indicia match each player indicia 808 within the selected pattern 902. If a pattern 902 is not matched for a player card 802 (i.e., if each player indicia 808 within pattern 902 has not been matched by house indicia that have been selected), the game continues unless it is determined 2930 that a predetermined number of house indicia has been selected. In one embodiment of Super Wild Bingo 16, the predetermined number of house indicia is 38 such that the game ends after 38 house indicia have been selected. If the predetermined number of house indicia has been selected, a payout for each player card and/or the game is credited 2931 to the player account, the game ends 2932, and another game may be selected by the player as described herein.

If a pattern 902 is matched for a player card 802, a payout or prize is determined 2926 and is awarded to the player. The payout or prize is based on a pay table associated with the selected game and the selected pattern.

If the predetermined number of house indicia has not been selected, the game continues and new house indicia are selected 2918 as described above. However, once the predetermined number of house indicia have been selected, the game ends 2932. In one embodiment, the house indicia may be selected until all house indicia have been exhausted (i.e., all house indicia from the total pool of available house indicia have been selected) which will unavoidably complete the selected pattern 902. In such an embodiment, the player may receive 0 credits, or may receive a prize based on exhausting all house indicia.

After the game ends 2932, gaming device 114 determines 2934 whether sufficient credits are available to continue playing (i.e., to play another game). If sufficient credits are not available, the player is prompted to insert 2936 additional cash or credits to continue. If sufficient credits are available, the player is presented with several options. The player may select 2938 a cash out button or icon in which case the playing session or the game session ends 2940 and the player is paid any remaining credits or money. The player may also select 2942 a play button or icon, or a bet max button or icon, to repeat the game using the same game selections (e.g., the same player cards, the same wager amount, etc.). Accordingly, a game ticket is issued 2914 and method 2900 continues as described above. Alternatively, the player is enabled 2944 to change the game and/or the game characteristics after the game ends (and before a new game is started). For example, the player may select a new game, a new game size, and/or a new game variation to play. The player may additionally or alternatively select a new wager amount, a different number of player cards 802 to be played, and/or different player indicia 808 to be used in the game in a similar manner as described above. A new game ticket may be issued 2914 and method 2900 may continue as described above.

If the player selects a keno game, such as a Super Wild Keno game, the game may operate in a similar manner as described above unless otherwise specified. For example, the player may select the game to be played from the game entry point and may select the player card or matrix to be used during the game. The player may select the size of the game and/or matrix, such as an 80 number, a 49 number, a 25 number, or any other size of game and/or matrix. The player may enter a wager and may select the number of cards or matrices to be used during the game, and may select the number of player indicia and the specific player indicia to be displayed on each card or matrix. The cards or matrices may be played in one game, and/or in one or more future games. In addition, the keno games may be played on any gaming device 114 described herein and/or may be played across a local area network, a wide area network, and/or any other suitable network as described herein with one or more fixed and/or progressive prizes. Both "straight" game tickets and "way" game tickets may be used.

During play of the Super Wild Keno game, a predetermined number of house indicia are called based on the keno game variety selected. For example, in a game in which numbers are selected from a pool of 80 numbers (i.e., an 80 number or 80 spot game), 20 house indicia may be called. However, it should be recognized that any suitable number of house indicia may be called during the game. In addition, a random chance is provided to select a bonus ball or bonus indicia that is separate from the called house indicia.

If the player indicia matches one or more bonus balls, one or more player indicia that have not yet been matched by the called house indicia may automatically be matched. In one embodiment, the number of player indicia matched is enough to qualify the player to win a prize according to an associated pay table. For example, if the player has only matched 3 spots or player indicia on a card and 4 spots or player indicia are needed for a win, an additional player indicia may be matched if a bonus ball is received. In another embodiment, if the player has matched enough spots or player indicia to qualify for a prize, the prize will be increased to the next level if a bonus ball is received. For example, if the player has matched 6 player indicia or spots to qualify for a win (e.g., 10 credits), receiving a bonus ball will automatically match one more player indicia to qualify the player to win a prize (e.g., 20 credits) as if the player had matched 7 player indicia or spots.

After the predetermined number of house indicia are called, the game ends. The player may win one or more prizes based on a number of called house indicia that match the player indicia on the player cards according to a pay table associated with the game being played in a similar manner as described above.

In one embodiment in which the Super Wild Keno game is played with multiple players competing for a common prize, such as a progressive prize, the player or players that achieve a predetermined number of matches such as matching or "catching" 7 player indicia in a 7 spot game within a 49 number matrix, win or split the prize and/or the player who has the highest number of player indicia matched wins a separate common prize. If two or more players tie for the highest number of matches (i.e., the players have the same number of player indicia matched by the called house indicia), the prize is split between the players who tied. The common prize may be in addition to a normal or fixed prize that each player may win based on the number of player indicia matched during the game and/or progressive prizes as previously described.

Referring to FIG. 30, a screenshot 3000 of a user interface 3002 that may be presented during execution of method 2900 is illustrated. User interface 3002 may include a bingo flashboard 1502, a player card icon 1504, and a ball call display 1506. In addition, user interface 3002 may include a plurality of user interface icons 1508 that may be selected to interact with the game and/or to change the game or the characteristics of the game. User interface 3002 is similar to user interface 1501 (shown in FIG. 15), and similar components are labeled in FIG. 30 with the same reference numerals used in FIG. 15.

Bingo flashboard 1502 is displayed with the numbers 1-12 in the first column below the first letter "B," the numbers 13-24 in the second column below the letter "A," the numbers 25-36 in the third column below the second letter "B," and the numbers 37-48 in the fourth column below the letter "Y." Alternatively, any suitable indicia may be used instead of numbers and any suitable matrices may be used or no matrices may be used. As each house indicia is selected during the play of the game, a corresponding number (or other indicia) of bingo flashboard 1502 is highlighted or at least partially covered by a symbol indicative of the selected house indicia.

In one embodiment, player card 802 is displayed as a selectable player card icon 1504 having a 4×4 matrix of spaces 806. Each space 806 of player card icon 1504 includes a player indicia 808 that has been selected by the player and/or selected by gaming device 114, local server 110, or WAP server 120. Alternatively, only the spaces 806 covered by the selected pattern are filled with player indicia 808. In one embodiment, the player may select player card icon 1504 to change player card 802 and/or to select new player indicia 808 and/or a new pattern 902 for player card 802.

Ball call display 1506 illustrates the number of balls (or other house indicia) that have been selected or called during the play of the game. In addition, the total number of balls that may be called during the game may be displayed. As each new ball is called, the number displayed in ball call display 1506 is incremented. In one embodiment, if a bonus ball is received or selected, an image representative of the bonus ball is displayed within ball call display 1506 or within another portion of user interface 3002.

User interface icons 1508 may include a pay table icon 1510 (also referred to as a "see pays" or "help" icon), an add cards icon 1512, a bet 1 icon 1514, a wager icon 1516, a bet max icon 1518, a change game icon 1520, and a play icon 1522. Alternatively, one or more user interface icons 1508 may be omitted and/or replaced by other suitable icons. User interface icons 1508 are described above with reference to FIG. 15 and operate similarly thereto.

Referring to FIG. 31, another screenshot 3100 of user interface 3002 that may be presented during execution of method 2900 is illustrated. More specifically, FIG. 31 illustrates user interface 3002 while the game is being played. For example, 30 house indicia have been called out of a maximum of 38 house indicia. As illustrated, a bonus ball 3102 has been received during the ball calls. In one embodiment, bonus ball 3102 does not take the place of a selected house indicia. Accordingly, if bonus ball 3102 is received or selected on the 30th ball call, 30 house indicia will have been called in addition to bonus ball 3102. Therefore, in one embodiment, while each house indicia is randomly determined, there is a random chance of receiving bonus ball 3102 at each ball call.

In the example shown, the player has not matched the selected pattern 902 on any player card 802 within 30 house indicia (or within 30 ball calls). While bonus ball 3102 was received at the 30th ball call, each pattern 902 is missing more than one player indicia 808 to be matched by house indicia. Accordingly, no pattern 902 is automatically completed by bonus ball 3102 and the game continues.

Referring to FIG. 32, another screenshot 3200 of user interface 3002 that may be presented during execution of method 2900 is illustrated. More specifically, FIG. 32 illustrates user interface 3002 while the game is continued after the point shown in FIG. 31.

In the example shown, 36 house indicia have been called out of a maximum of 38 house indicia. As illustrated, at ball call 36, the top left player card 802 matched a newly drawn house indicia such that only 1 player indicia 808 remained to be matched within pattern 902. As bonus ball 3102 had previously been received, bonus ball 3102 automatically completes pattern 902 in the top left player card 802 by matching the player indicia 808 that had not been matched by called house indicia. Accordingly, the player receives a payout or a prize for the matched pattern 902 of the top left player card 802.

Figure 33:
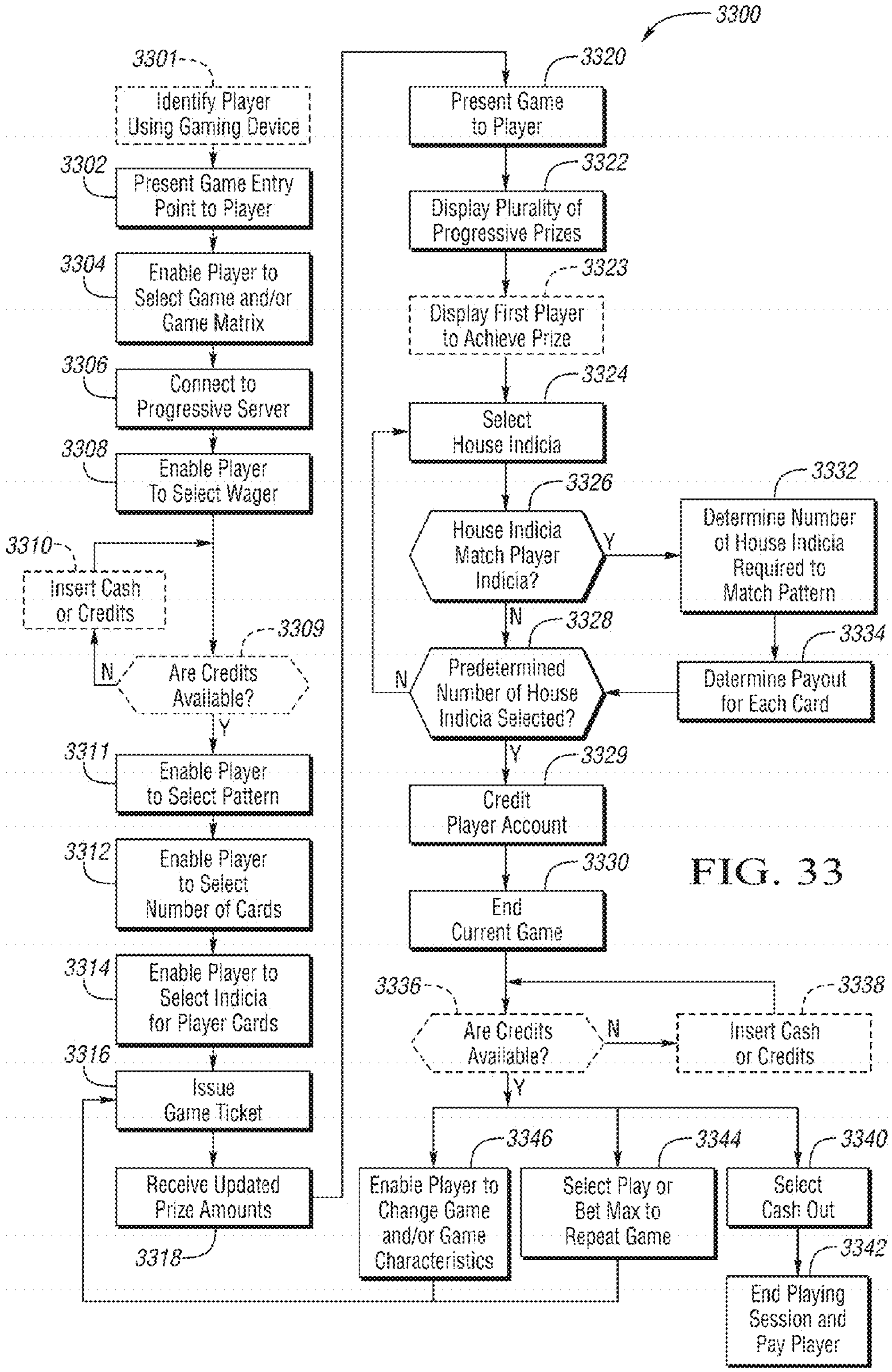
FIG. 33 is a flow diagram of a method of playing yet another game of chance that may be used with the systems and methods described herein.
Figure 34:
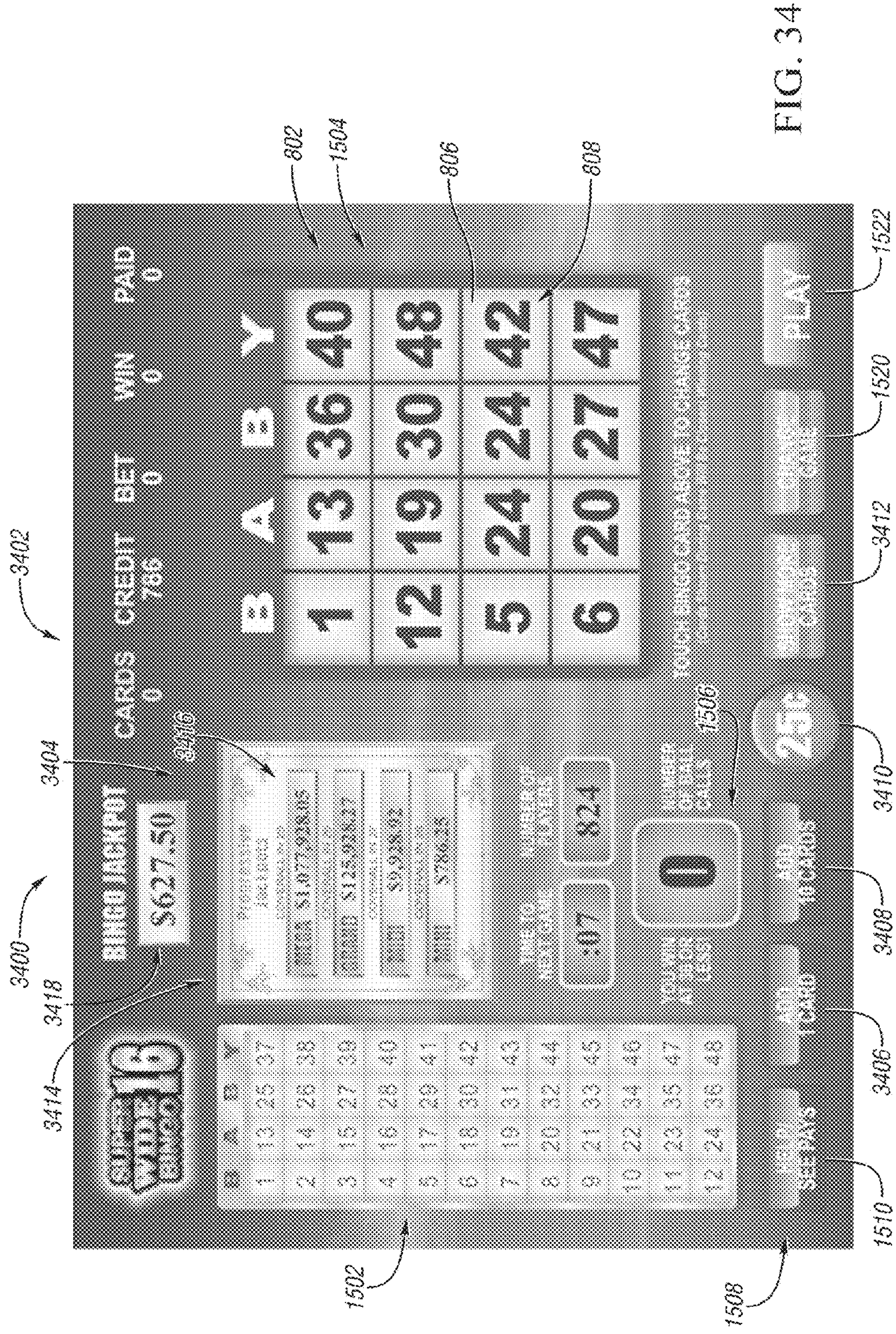
FIG. 34 is a screenshot of a user interface that may be presented during execution of the method described in FIG. 33.
Figure 35:
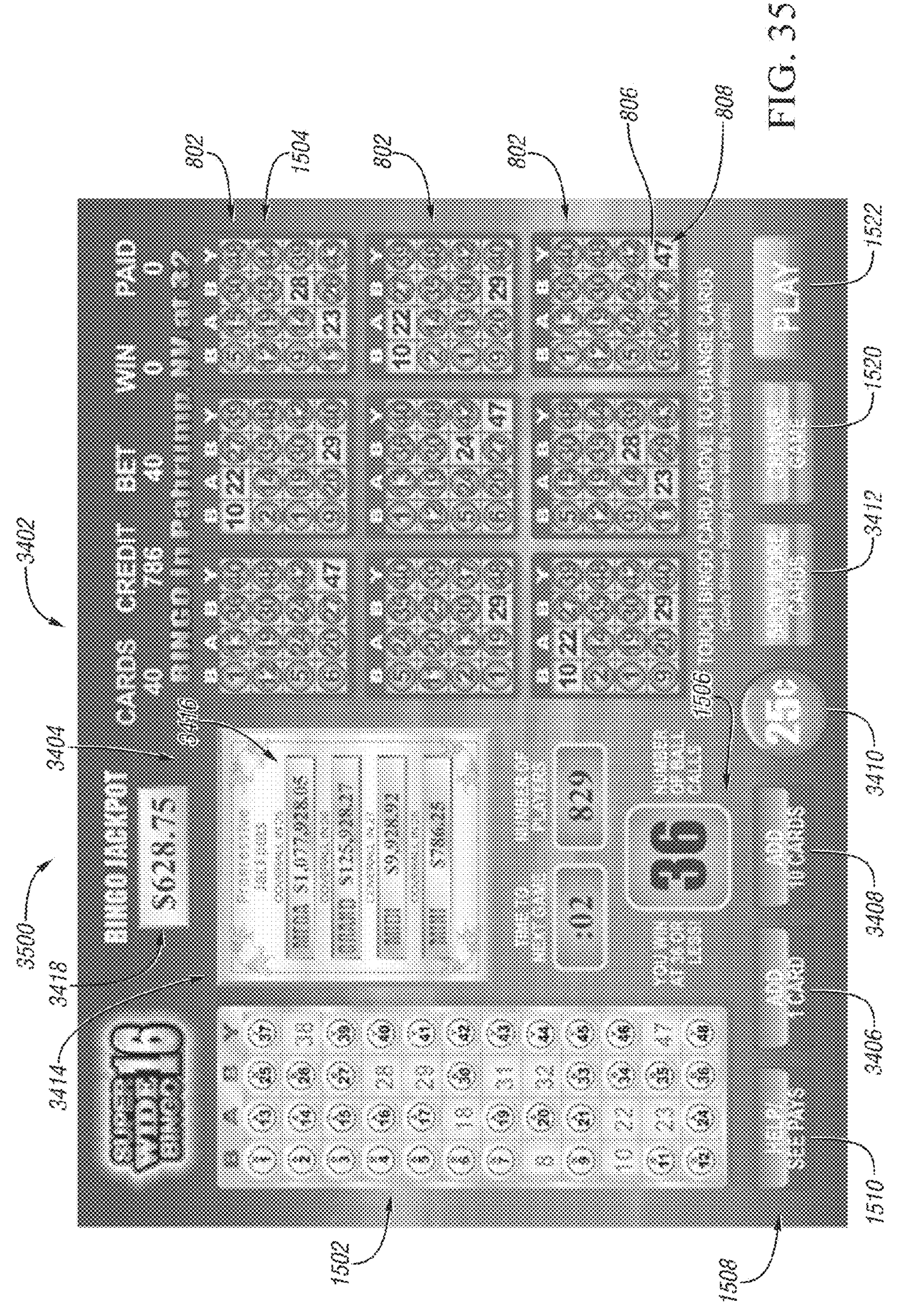
FIG. 35 is another screenshot of the user interface shown in FIG. 34 that may be presented during execution of the method described in FIG. 33.

FIG. 33 is a flow diagram of a method 3300 of playing yet another game of chance that may be used with the systems and methods described herein. FIGS. 34 and 35 are example screenshots of the game that may be presented to the player during play of the game when method 3300 is executed. In one embodiment, wrapper program module 502 calls a game module 504 associated with the game of chance when the player selects the game using user interface 312. Game module 504 presents the game of chance to the player on display 310.

In one embodiment, the player is identified 3301 using gaming device 114 as described above. A game entry interface or entry point is presented 3302 to the player on gaming device 114 using wrapper program module 502, for example, as described above with reference to FIG. 6. Wrapper program module 502 enables 3304 the player to select a game to be played from a plurality of games presented on the game entry interface. In addition, wrapper program module 502 may enable 3304 the player to select one or more game matrices to be used in the game. In one embodiment, the player selects the game by selecting a game size and a game variety associated with the game that the player wishes to play. For example, the player may select the game to be a Super Wide Bingo 16 game that is played on a 4×4 player card 810. In the Super Wide Bingo game, the player competes with other players across a wide area network (or another suitable network) to win one or more progressive prizes. The player may also compete locally with other players across a local area network to win one or more local prizes and may compete individually against gaming device 114 to win one or more individual prizes.

Gaming device 114 connects 3306 to a progressive server, such as WAP server 120, to enable the progressive server to at least partially administer the game. For example, the progressive server may administer the incrementing and distribution of the progressive prizes. In one embodiment, the progressive server also administers the game itself.

The player is enabled 3308 to select a wager for the selected game. For example, the player may select an amount of $0.25 as a wager for the selected game. Gaming device 114 may determine 3309 whether sufficient credits are available in the player account for the selected wager. If sufficient credits are not available, gaming device 114 prompts the player to insert 3310 cash or credits, for example, into gaming device 114 for the selected wager.

If sufficient credits are available in the player account for the selected wager, in one embodiment, the player is enabled 3311 to select a pattern 902 to be used during the game. Alternatively, a predetermined pattern, such as a coverall pattern, is used for the game. The player is enabled 3312 to select a number of cards 802 to be played during the game. In one embodiment, the player is also enabled 3314 to select some or all of the player indicia 808 for each player card 802 as described above with reference to FIG. 6. The player selections of the wager, the winning pattern 902, the number of cards 802, and/or the player indicia 808 may be communicated from gaming device 114 to another computing device 300, such as local server 110 and/or WAP server 120, through network 108, for example.

A game ticket for the player is issued 3316 to gaming device 114 by local server 110 or WAP server 120 for use in playing the selected game. In addition, gaming device 114 receives 3318 updated prize amounts from the progressive server to be displayed to the player. For example, a portion of the player's wager may be apportioned to one or more progressive prizes, as well as a portion of the wagers of each other player competing for the progressive prizes. The progressive server may transmit the updated progressive prize amounts to gaming device 114 of each player competing for the progressive prize when all wagers have been received or when another suitable event occurs. In another embodiment, the updated progressive prize amounts may be displayed in any suitable manner remotely from gaming devices 114.

The game is presented 3320 to the player by gaming device 114 on display 310. In one embodiment, wrapper program module 502 selects and loads a game module 504 associated with the selected game, and the selected game module 504 presents 3320 the selected game to the player. As illustrated in FIGS. 34 and 35, the presentation of the game may include displaying a bingo flashboard, one or more player cards 802, and a ball call display on display 310 of gaming device 114. The presentation of the game may also include displaying 3322 a plurality of progressive prizes, such as the updated amounts of the progressive prizes described above. In addition, a bingo jackpot prize may be displayed when the game includes a plurality of players. When one or more of the plurality of players completes pattern 902, the bingo jackpot prize is awarded as desired similar to conventional forms of bingo. The bingo jackpot prize may be in the form of a pari-mutuel, progressive, fixed, or any other suitable form of prize. In one embodiment, the first player to achieve or win the bingo jackpot prize is displayed 3323 to all players or gaming devices 114 of players who are playing to win the prize.

During play of the game in which the game is administered by gaming device 114, a plurality of house indicia is selected 3324 by randomization device 414 of each gaming device 114. In such an embodiment, each player competing for the progressive prizes uses a separate randomization device 414, such as an RNG 414 of each player's gaming device 114, rather than using a centralized server, such as local server 110 or WAP server 120, to select the house indicia. Therefore, each gaming device 114 may select 3324 a different set of house indicia for the same game. In one embodiment, each gaming device 114 conducts ball draws (i.e., selects house indicia) asynchronously with respect to each other gaming device 114, as described above with reference to FIG. 7. Alternatively, each gaming device 114 conducts ball draws synchronously with respect to each other gaming device 114, such as by conducting the ball draws upon receipt of a synchronizing signal from WAP server 120, as described above with reference to FIG. 7. Alternatively, the house indicia may be selected 3324 using randomization device 414 of local server 110 or WAP server 120. The house indicia are randomly selected from a pool of numbers between 1 and 48.

The house indicia that have been selected are compared with player indicia 808 on each player card 802 to determine 3326 whether the house indicia match player indicia 808 within the selected pattern 902. If a pattern 902 is not matched for a player card 802 (i.e., if each player indicia 808 within pattern 902 has not been matched by house indicia that have been selected), the game continues unless it is determined 3328 that a predetermined number of house indicia has been selected. In one embodiment of Super Wide Bingo 16, the predetermined number of house indicia is 36 such that the game ends after 36 house indicia have been selected. If the predetermined number of house indicia has been selected, a payout for each player card and/or the game is credited 3329 to the player account, the game ends 3330, and another game may be selected by each player as described herein.

If a pattern 902 is matched for a player card 802 for a particular player, the number of house indicia that have been called is determined 3332 (i.e., the number of house indicia that were required to be called to match the pattern). For example, if 28 house indicia have been called before pattern 902 is matched, the determined number of house indicia is 28. A payout or a prize is determined 3334 based on the number of house indicia called. The payout or prize may be determined using a pay table associated with the selected game and the selected pattern 902.

If the predetermined number of house indicia has not been selected, the game continues and new house indicia are selected 3324 as described above. Accordingly, if one player has won a prize, each other player continues to play to win other prizes until the predetermined number of house indicia has been selected. If two or more players match the required pattern to win the same prize with the same number of ball calls, the prize may be split between the players, or each player who matched the pattern may receive the full or partial prize. In one embodiment, if a player wins a progressive prize, WAP server 120 may transmit a message or another notification to gaming device 114 of each other player identifying the progressive prize won, the number of ball calls that occurred before the prize was won, and/or a city and state in which the winner is playing the game.

Once the predetermined number of house indicia have been selected, the game ends 3330. After the game ends 3330, gaming device 114 determines 3336 whether sufficient credits are available to continue playing (i.e., to play another game). If sufficient credits are not available, the player is prompted to insert 3338 additional cash or credits to continue. If sufficient credits are available, the player is presented with several options. The player may select 3340 a cash out button or icon in which case the playing session or the game session ends 3342 and the player is paid any remaining credits or money. The player may also select 3344 a play button or icon, or a bet max button or icon, to repeat the game using the same game selections (e.g., the same player cards, the same wager amount, etc.). Accordingly, a game ticket is issued 3316 and method 3300 continues as described above. Alternatively, the player is enabled 3346 to change the game and/or the game characteristics after the game ends (and before a new game is started). For example, the player may select a new game, a new game size, and/or a new game variation to play. The player may additionally or alternatively select a new wager amount, a different number of player cards 802 to be played, and/or different player indicia 808 to be used in the game in a similar manner as described above. A new game ticket may be issued 3316 and method 3300 may continue as described above.

Referring to FIG. 34, a screenshot 3400 of a user interface 3402 that may be presented during execution of method 3300 is illustrated. User interface 3402 may include a bingo flashboard 1502, a player card icon 1504, and a ball call display 1506. In addition, user interface 3402 may include a pay table 3404 and a plurality of user interface icons 1508 that may be selected to interact with the game and/or to change the game or the characteristics of the game. User interface 3402 is similar to user interface 1501 (shown in FIG. 15) and user interface 2702 (shown in FIG. 27), and similar components are labeled in FIG. 34 with the same reference numerals used in FIG. 15 and FIG. 27.

Bingo flashboard 1502 is displayed with the numbers 1-12 in the first column below the first letter "B," the numbers 13-24 in the second column below the letter "A," the numbers 25-36 in the third column below the second letter "B," and the numbers 37-48 in the fourth column below the letter "Y." Alternatively, any suitable indicia may be used instead of numbers. As each house indicia is selected during the play of the game, a corresponding number (or other indicia) of bingo flashboard 1502 is highlighted or at least partially covered by a symbol indicative of the selected house indicia.

In one embodiment, player card 802 is displayed as a selectable player card icon 1504 having a 4×4 matrix of spaces 806. Each space 806 of player card icon 1504 includes a player indicia 808 that has been selected by the player and/or selected by gaming device 114, local server 110, or WAP server 120. Alternatively, only the spaces 806 covered by the selected pattern are filled with player indicia 808. In one embodiment, the player may select player card icon 1504 to change player card 802 and/or to select new player indicia 808 and/or a new pattern 902 for player card 802.

Ball call display 1506 illustrates the number of balls (or other house indicia) that have been selected or called during the play of the game. In addition, the total number of balls that may be called during the game may be displayed. As each new ball is called, the number displayed in ball call display 1506 is incremented. Ball call display 1506 may also show the number of players competing for the progressive prize or prizes as well as a time remaining until the next game begins.

User interface icons 1508 may include a pay table icon 1510 (also referred to as a "see pays" or "help" icon), an add 1 card icon 3406, an add 10 cards icon 3408, a wager icon 3410, a show more cards icon 3412, a change game icon 1520, and a play icon 1522. Alternatively, one or more user interface icons 1508 may be omitted and/or replaced by other suitable icons.

Pay table icon 1510 enables the player to view a help screen or a pop-up window that describes how the game is played and/or other help topics. In addition, a pay table associated with the game and the selected pattern may be displayed in the help screen or pop-up window.

Add 1 card icon 3406 enables the player to add 1 more player card 802 to the game to be played. Add 10 cards icon 3408 enables the player to add 10 more player cards 802 to the game to be played. It should be recognized that add 1 card icon 3406 and/or add 10 cards icon 3408 may be changed to add any suitable number of player cards 802 to the game. In one embodiment, each player card 802 added uses the same pattern 902 that the player selected for the first player card 802, and each new player card 802 is filled with randomly selected player indicia 808. In addition, the same wager is used for each new player card 802. Alternatively, the player may select player indicia 808 and/or the wager for each new player card 802 added using the add 1 card icon 3406 and the add 10 cards icon 3408.

Wager icon 3410 enables the player to change the wager amount or increment for each player card 802 to be used in the game in a similar manner as described above with reference to FIG. 15. For example, the player may select wager icon 3410 to change the wager amount from $0.25 to $1 or to any suitable amount. In one embodiment, the player may enter a wager amount to be used for player cards 802 in the game. For example, the player may enter a non-standard amount such as $0.23, $1.12, or any other suitable amount that is between a predetermined minimum wager amount and a predetermined maximum wager amount.

In one embodiment, local server 110 or WAP server 120 may adjust the probability of winning when one player bets in different denominations or increments than other players. The adjustment may be achieved in any suitable manner such as using additional background cards 802 for the player with the higher denomination bet.

Show more cards icon 3412 enables the player to display additional player cards 802 within user interface 3402. For example, if one player card 802 is shown in user interface 3402, the player may select show more cards icon 3412 to display a greater number of player cards 802, such as 9 player cards 802 as shown in FIG. 35. In one embodiment, the player may enter a number of player cards 802 to be displayed in user interface 3402 when the player selects show more cards icon 3412.

Change game icon 1520 enables the player to change the game to be played. For example, the player may select change game icon 1520 to select a new game, such as a Super Wild Bingo 25 game that is played on a 5×5 player card 804. In one embodiment, wrapper program module 502 is called when change game icon 1520 is selected. Wrapper program module 502 presents a list of the available games to be played to the player. When the player selects a game from the list of available games, wrapper program module 502 calls the game module 504 associated with the selected game, and game module 504 presents the new game to the player. It should be understood that the embodiments illustrated and described herein do not require the availability of each game or game type on gaming device 114. Rather, any number of games or game types, such as one game or game type, may be included within a gaming device 114.

Play icon 1522 enables the player to start the play of the game. For example, when the player selects play icon 1522, the house indicia are selected and are compared to player indicia 808 within pattern 902, as described above. In one embodiment, once the game is started, user interface icons 1508 become grayed out and/or become unable to be selected by the player until the game ends.

Pay table 3404 displays a list 3414 of payouts 3416 for each prize in the game, which may include, for example a bingo jackpot prize 3418. In one embodiment, payout 3416 for each prize is automatically adjusted (e.g., increased) when the player enters a wager for the game and/or adds more player cards 802 to the game. For example, bingo jackpot prize 3418 may be displayed in the form of a pari-mutuel, progressive, fixed, or any other suitable form of prize. Bingo jackpot prize 3418 may be awarded to the first player or group of players that achieve (or match) the winning pattern associated with bingo jackpot prize 3418, regardless of the number of ball calls needed to achieve the winning pattern. If a pattern 902 is matched during the play of the game, in one embodiment, a corresponding line in pay table 3404 may be highlighted to indicate that the player won the highlighted payout 3416.

Referring to FIG. 35, another screenshot 3500 of user interface 3402 that may be presented during execution of method 3300 is illustrated. More specifically, FIG. 35 illustrates user interface 3402 while the game is being played. For example, 36 house indicia have been called out of a maximum of 36 house indicia.

In the example shown, the player has not matched the selected coverall pattern 918 of any player card 802 within 36 house indicia (or within 36 ball calls). However, as indicated in a message at the top of user interface 3402, a player competing for the same prizes in a remote gaming establishment 102 (e.g., in Pahrump, Nev.) has matched a pattern 902 within 32 ball calls to win a bingo prize. It should be recognized that the game continued after the remote player won the bingo prize and additional ball calls were conducted until the maximum number of house indicia had been selected (e.g., 36 house indicia). Accordingly, a plurality of players competing for the same prizes may each win one or more of the prizes during the play of the game.

Figure 36:
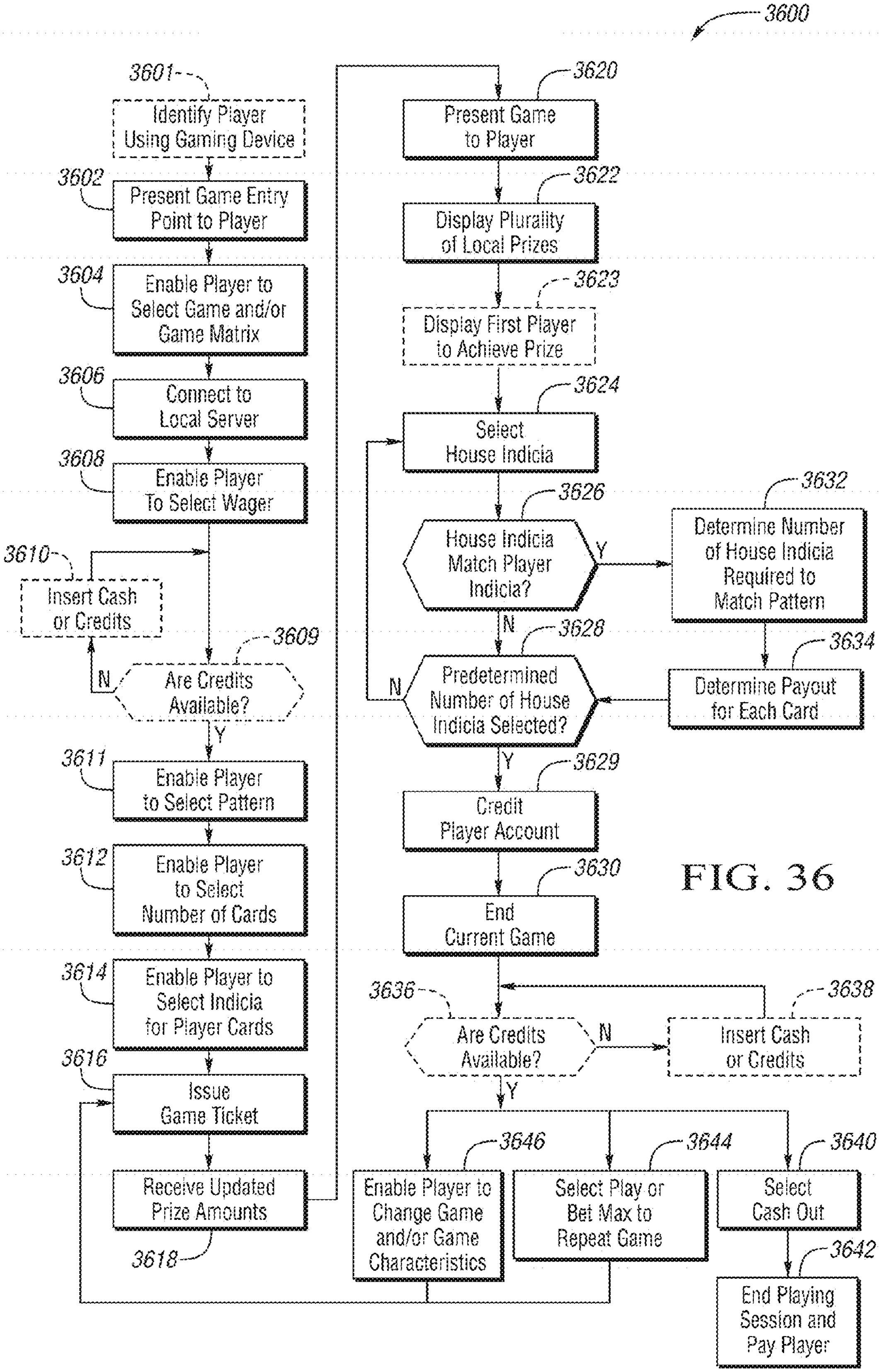
FIG. 36 is a flow diagram of a method of playing yet another game of chance that may be used with the systems and methods described herein.
Figure 37:
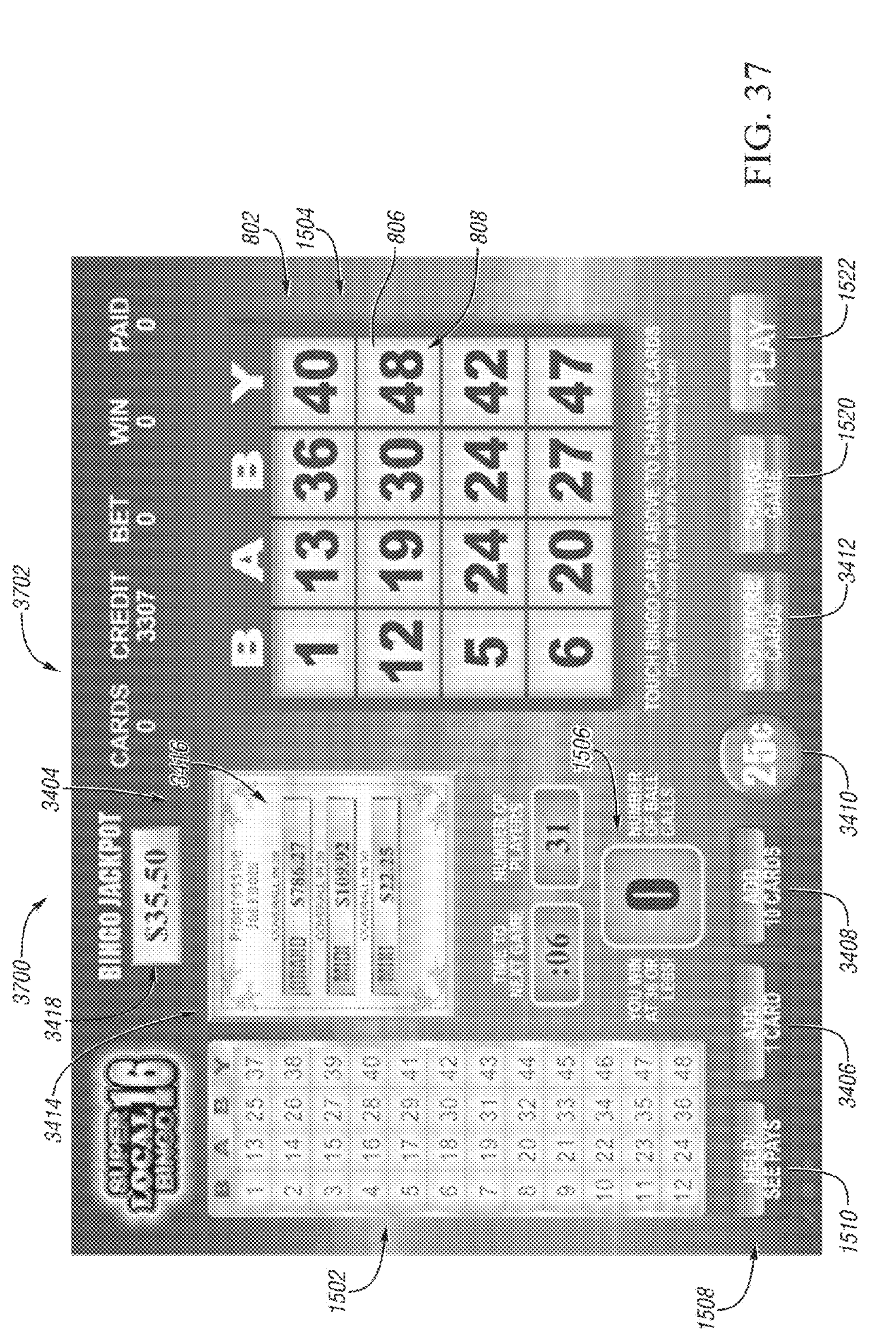
FIG. 37 is a screenshot of a user interface that may be presented during execution of the method described in FIG. 36.
Figure 38:
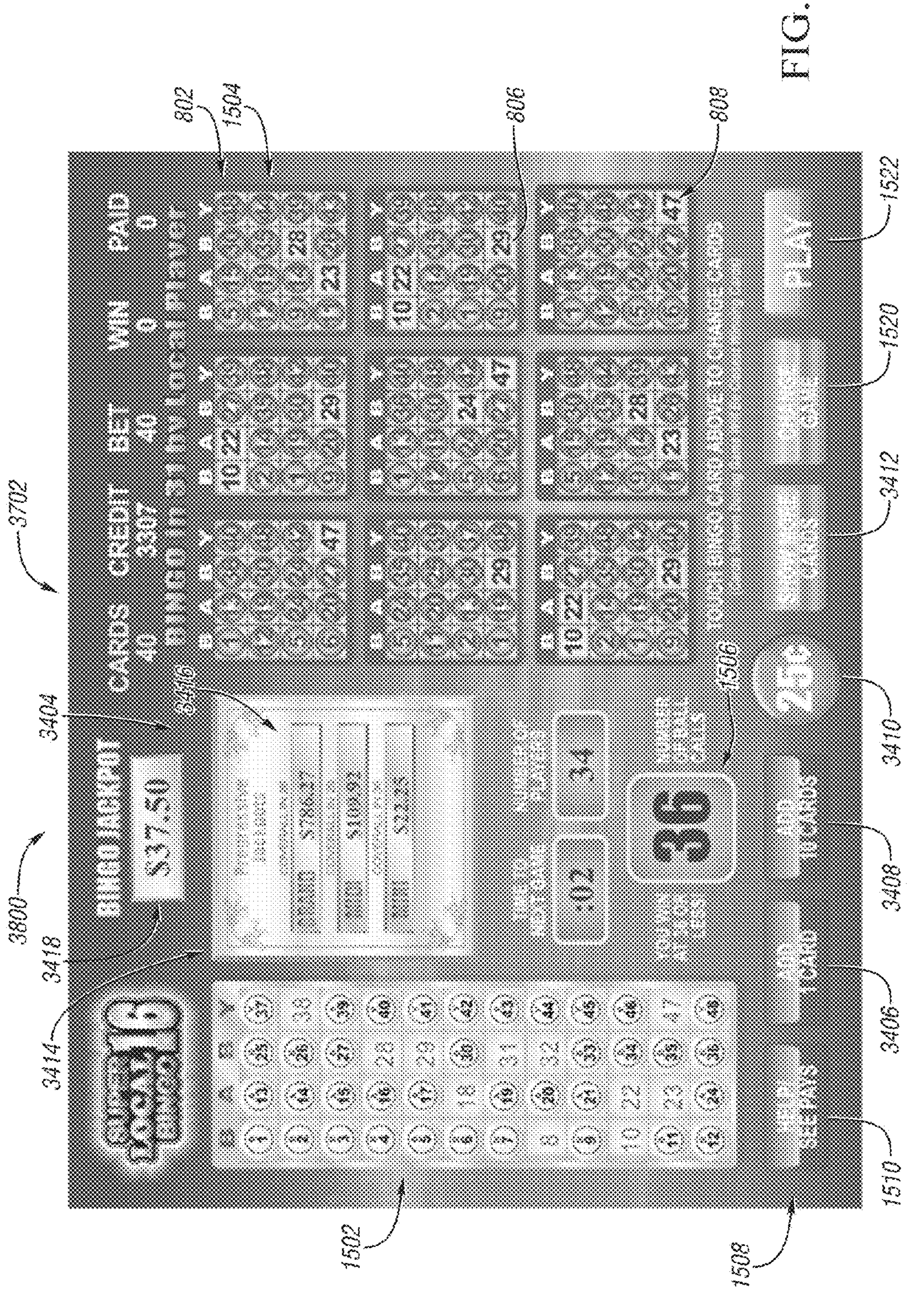
FIG. 38 is another screenshot of the user interface shown in FIG. 37 that may be presented during execution of the method described in FIG. 36.

FIG. 36 is a flow diagram of a method 3600 of playing yet another game of chance that may be used with the systems and methods described herein. FIGS. 37 and 38 are example screenshots of the game that may be presented to the player during play of the game when method 3600 is executed. In one embodiment, wrapper program module 502 calls a game module 504 associated with the game of chance when the player selects the game using user interface 312. Game module 504 presents the game of chance to the player on display 310.

When play of the game is initiated, during selection of the game, or during play of the game, the player may be required to purchase or generate credits. The player may purchase or generate credits by inserting cash or a ticket-in-ticket-out voucher into gaming device 114 or another device. Alternatively or additionally, the player may transfer credits or cash to gaming device 114 from banking accounts, credit accounts, gaming establishment accounts, and/or gaming company accounts. In one embodiment, computer-generated credits may be used with gaming device 114, for example, as part of a free-to-play game.

In one embodiment, the player is identified 3601 using gaming device 114. A game entry interface or entry point is presented 3602 to the player on gaming device 114 using wrapper program module 502, for example, as described above with reference to FIG. 6. Wrapper program module 502 enables 3604 the player to select a game to be played from a plurality of games presented on the game entry interface. In addition, wrapper program module 502 may enable 3604 the player to select one or more game matrices to be used in the game. In one embodiment, the player selects the game by selecting a game size and a game variety associated with the game that the player wishes to play. For example, the player may select the game to be a Super Local Bingo 16 game that is played on a 4×4 player card 810. In the Super Local Bingo game, the player competes with other players across a local area network (or another suitable network), such as an internal network 116 within a gaming establishment 102, to win one or more local prizes.

Gaming device 114 connects 3606 to a local server, such as local server 110, to enable the local server to at least partially administer the game. For example, the local server may administer a plurality of fixed and/or local progressive prizes including incrementing and distribution of the local progressive prizes. In one embodiment, the local server also administers the game itself.

The player is enabled 3608 to select a wager for the selected game. For example, the player may select an amount of $0.25 as a wager for the selected game. Gaming device 114 may determine 3609 whether sufficient credits are available in the player account for the selected wager. If sufficient credits are not available, gaming device 114 prompts the player to insert 3610 cash or credits, for example, into gaming device 114 for the selected wager.

If sufficient credits are available in the player account for the selected wager, in one embodiment, the player is enabled 3611 to select a pattern 902 to be used during the game. Alternatively, a predetermined pattern, such as a coverall pattern, is used for the game. The player is enabled 3612 to select a number of cards 802 to be played during the game. In one embodiment, the player is also enabled 3614 to select some or all of the player indicia 808 for each player card 802 as described above with reference to FIG. 6. The player selections of the wager, the winning pattern 902, the number of cards 802, and/or the player indicia 808 may be communicated from gaming device 114 to the local server through network 108, for example.

In one embodiment, a game ticket for the player is issued 3616 to gaming device 114 by the local server for use in playing the selected game. In addition, gaming device 114 receives 3618 updated prize amounts from the local server to be displayed to the player. For example, a portion of the player's wager is apportioned to one or more local progressive prizes, as well as a portion of the wagers of each other player competing for the local progressive prizes. The local server may transmit the updated local progressive prize amounts to gaming device 114 of each player competing for the local progressive prize when all wagers have been received or when another suitable event occurs.

The game is presented 3620 to the player by gaming device 114 on display 310. In one embodiment, wrapper program module 502 selects and loads a game module 504 associated with the selected game, and the selected game module 504 presents 3620 the selected game to the player. As illustrated in FIGS. 36 and 37, the presentation of the game may include displaying a bingo flashboard, one or more player cards 802, and a ball call display on display 310 of gaming device 114. The presentation of the game may also include displaying 3622 a plurality of prizes, such as the updated amounts of the local progressive prizes described above and/or a plurality of fixed prizes based on an associated pay table. As described above, a prize that may be displayed 3622 is a bingo jackpot prize that a plurality of players may play to win during the game. In one embodiment, the first player to achieve or win the bingo jackpot prize is displayed 3623 to all players or gaming devices 114 of players who are playing to win the prize.

During play of the game in which the game is administered by gaming device 114, a plurality of house indicia is selected 3624 by randomization device 414 of each gaming device 114 competing for the local prizes. In such an embodiment, each player competing for the local prizes uses a separate randomization device 414, such as an RNG 414 of each player's gaming device 114, rather than using a centralized server, such as local server 110, to select the house indicia. Therefore, each gaming device 114 may select a different set of house indicia for the same game. In one embodiment, each gaming device 114 conducts ball draws (i.e., selects house indicia) asynchronously with respect to each other gaming device 114, as described above with reference to FIG. 7. Alternatively, each gaming device 114 conducts ball draws synchronously with respect to each other gaming device 114, such as by conducting the ball draws upon receipt of a synchronizing signal from the local server as described above with reference to FIG. 7. It should be understood that neither synchronous nor asynchronous ball draws need be continuous throughout the ball draw cycle or process. Rather, a mixture of synchronous and asynchronous ball draws may be provided during a game. Alternatively, the house indicia may be selected using randomization device 414 of the local server. The house indicia are randomly selected from a pool of numbers between 1 and 48.

The house indicia that have been selected are compared with player indicia 808 on each player card 802 to determine 3626 whether the house indicia match player indicia 808 within the selected pattern 902. If a pattern 902 is not matched for a player card 802 (i.e., if each player indicia 808 within pattern 902 has not been matched by house indicia that have been selected), the game continues unless it is determined 3628 that a predetermined number of house indicia has been selected. In one embodiment, the predetermined number of house indicia is 36 such that the game ends after 36 house indicia have been selected. If the predetermined number of house indicia has been selected, a payout for each player card and/or the game is credited 3629 to the player account, the game ends 3630, and another game may be selected by each player or the game may be repeated using the same characteristics and selections from the prior game as described herein.

If a pattern 902 is matched for a player card 802 of a particular player, the number of house indicia that have been called is determined 3632 (i.e., the number of house indicia that were required to be called to match the pattern). For example, if 20 house indicia have been called before pattern 902 is matched, the determined number of house indicia is 20. A payout or a prize is determined 3634 based on the number of house indicia called. The payout or prize may be determined using a pay table associated with the selected game and the selected pattern 902.

If the predetermined number of house indicia has not been selected, the game continues and new house indicia are selected 3624 as described above. Accordingly, if one player has won a local progressive prize, each other player continues to play to win other prizes until the predetermined number of house indicia has been selected. If two or more players match the required pattern to win the same prize (e.g., the same local progressive prize) with the same number of ball calls, the prize may be split between the players, or each player who matched the pattern may receive the full prize or a portion of the prize. In one embodiment, if a player wins a local progressive prize, local server 110 may transmit a message or another notification to gaming device 114 of each other player identifying the progressive prize won and the number of ball calls that occurred before the prize was won. In one embodiment, once the progressive prize is awarded, the progressive prize amount is reset to a base amount that is incremented or otherwise changed as the play of the game continues.

Once the predetermined number of house indicia have been selected, the game ends 3630. After the game ends 3630, gaming device 114 determines 3636 whether sufficient credits are available to continue playing (i.e., to play another game). If sufficient credits are not available, the player is prompted to insert 3638 additional cash or credits to continue. If sufficient credits are available, the player is presented with several options. The player may select 3640 a cash out button or icon in which case the playing session or the game session ends 3642 and the player is paid any remaining credits or money. The player may also select 3644 a play button or icon, or a bet max button or icon, to repeat the game using the same game selections (e.g., the same player cards, the same wager amount, etc.). Accordingly, a game ticket is issued 3616 and method 3600 continues as described above. Alternatively, the player is enabled 3646 to change the game and/or the game characteristics after the game ends (and before a new game is started). For example, the player may select a new game, a new game size, and/or a new game variation to play. The player may additionally or alternatively select a new wager amount, a different number of player cards 802 to be played, and/or different player indicia 808 to be used in the game in a similar manner as described above. A new game ticket may be issued 3616 and method 3600 may continue as described above.

Referring to FIG. 37, a screenshot 3700 of a user interface 3702 that may be presented during execution of method 3600 is illustrated. User interface 3702 may include a bingo flashboard 1502, a player card icon 1504, and a ball call display 1506. In addition, user interface 3702 may include a pay table 3404 and a plurality of user interface icons 1508 that may be selected to interact with the game and/or to change the game or the characteristics of the game. User interface 3702 is similar to user interface 1501 (shown in FIG. 15) and user interface 3402 (shown in FIG. 34), and similar components are labeled in FIG. 37 with the same reference numerals used in FIG. 15 and FIG. 34.

Bingo flashboard 1502 is displayed with the numbers 1-12 in the first column below the first letter "B," the numbers 13-24 in the second column below the letter "A," the numbers 25-36 in the third column below the second letter "B," and the numbers 37-48 in the fourth column below the letter "Y." Alternatively, any suitable indicia may be used instead of numbers. As each house indicia is selected during the play of the game, a corresponding number (or other indicia) of bingo flashboard 1502 is highlighted or at least partially covered by a symbol indicative of the selected house indicia.

In one embodiment, player card 802 is displayed as a selectable player card icon 1504 having a 4×4 matrix of spaces 806. Each space 806 of player card icon 1504 includes a player indicia 808 that has been selected by the player and/or selected by gaming device 114 or local server 110. Alternatively, only the spaces 806 covered by the selected pattern are filled with player indicia 808. In one embodiment, the player may select player card icon 1504 to change player card 802 and/or to select new player indicia 808 for player card 802.

Ball call display 1506 illustrates the number of balls (or other house indicia) that have been selected or called during the play of the game. In addition, the total number of balls that may be called during the game may be displayed. As each new ball is called, the number displayed in ball call display 1506 is incremented. Ball call display 1506 may also show the number of players competing for the local progressive prize or prizes as well as a time remaining until the next game begins.

User interface icons 1508 may include a pay table icon 1510 (also referred to as a "see pays" or "help" icon), an add 1 card icon 3406, an add 10 cards icon 3408, a wager icon 3410, a show more cards icon 3412, a change game icon 1520, and a play icon 1522. Alternatively, one or more user interface icons 1508 may be omitted and/or replaced by other suitable icons.

Pay table icon 1510 enables the player to view a help screen or a pop-up window that describes how the game is played and/or other help topics. In addition, a pay table associated with the game and the selected pattern may be displayed in the help screen or pop-up window.

Add 1 card icon 3406 enables the player to add 1 more player card 802 to the game. Add 10 cards icon 3408 enables the player to add 10 more player cards 802 to the game. It should be recognized that add 1 card icon 3406 and/or add 10 cards icon 3408 may be changed to add any suitable number of player cards 802 to the game. In one embodiment, each player card 802 added uses the same pattern 902 that the player selected for the first player card 802, and each new player card 802 is filled with randomly selected player indicia 808. In addition, the same wager is used for each new player card 802. Alternatively, the player may select player indicia 808 and/or the wager for each new player card 802 added using the add 1 card icon 3406 and the add 10 cards icon 3408.

Wager icon 3410 enables the player to change the wager amount or increment for each player card 802 to be used in the game in a similar manner as described above with reference to FIG. 15. For example, the player may select wager icon 3410 to change the wager amount from $0.25 to $1 or to any suitable amount. In one embodiment, the player may enter a wager amount to be used for player cards 802 in the game. For example, the player may enter a non-standard amount such as $0.23, $1.12, or any other suitable amount that is between a predetermined minimum wager amount and a predetermined maximum wager amount.

Show more cards icon 3412 enables the player to display additional player cards 802 within user interface 3702. For example, if one player card 802 is shown in user interface 3702, the player may select show more cards icon 3412 to display a greater number of player cards 802, such as 9 player cards 802 as shown in FIG. 38. In one embodiment, the player may enter a number of player cards 802 to be displayed in user interface 3702 when the player selects show more cards icon 3412.

Change game icon 1520 enables the player to change the game to be played. For example, the player may select change game icon 1520 to select a new game, such as a Super Wild Bingo 25 game that is played on a 5×5 player card 804, for example. In one embodiment, wrapper program module 502 is called when change game icon 1520 is selected. Wrapper program module 502 presents a list of the available games to be played to the player. When the player selects a game from the list of available games, wrapper program module 502 calls the game module 504 associated with the selected game, and game module 504 presents the new game to the player.

Play icon 1522 enables the player to start the play of the game. For example, when the player selects play icon 1522, the house indicia are selected and are compared to player indicia 808 within pattern 902, as described above. In one embodiment, once the game is started, user interface icons 1508 become grayed out and/or become unable to be selected by the player until the game ends.

Pay table 3404 displays a list 3414 of payouts 3416 for each prize in the game, which may include, for example, bingo jackpot prize 3418. In one embodiment, payout 3416 for each prize is automatically adjusted (e.g., increased) when the player enters a wager for the game and/or adds more player cards 802 to the game. For example, bingo jackpot prize 3418 may be displayed in the form of a pari-mutuel, progressive, fixed, or any other suitable form of prize. Bingo jackpot prize 3418 may be awarded to the first player or group of players that achieve (or match) the winning pattern associated with bingo jackpot prize 3418, regardless of the number of ball calls needed to achieve the winning pattern. If a pattern 902 is matched during the play of the game, in one embodiment, a corresponding line in pay table 3404 may be highlighted to indicate that the player won the highlighted payout 3416.

Referring to FIG. 38, another screenshot 3800 of user interface 3702 that may be presented during execution of method 3600 is illustrated. More specifically, FIG. 38 illustrates user interface 3702 while the game is being played. For example, 36 house indicia have been called out of a maximum of 36 house indicia.

In the example shown, the player has not matched the selected coverall pattern 902 of any player card 802 within 36 house indicia (or within 36 ball calls). However, as indicated in a message at the top of user interface 3702, a player competing for the same local prizes in the same gaming establishment 102, for example, has matched a pattern 902 within 31 ball calls to win a bingo prize. It should be recognized that the game continued after the local player won the bingo prize and additional ball calls were conducted until the maximum number of house indicia had been selected (e.g., 36 house indicia). Accordingly, a plurality of players competing for the same local prizes may each win one or more of the prizes during the play of the game.

FIG. 39 illustrates a pay table 3900 that may be used with the systems and methods described herein during play of a game of chance, such as bingo. Pay table 3900 lists the prizes or payouts 3902 that may be awarded to a player depending on a number of house indicia, or ball calls 3904, that were required for the player card pattern 902 or patterns 902 to be matched. For example, if a player card pattern 902 was matched on the 53rd ball call, the player wins a prize of 2000 credits.

In the example shown in FIG. 39, pay table 3900 is associated with a coverall pattern 918. However, it should be recognized that other pay tables may be used for a coverall pattern 918 and/or for other patterns 902. It should also be recognized that any suitable amount may be wagered, including wagers in non-whole dollar increments. If a player wagers a non-whole dollar amount, such as $1.55, pay table 3900 may be modified to award prizes that are predetermined multiples of the wagered amount.

While pay table 3900 is shown as having a plurality of predetermined, or fixed prize amounts for a given wager, it should be recognized that pay table 3900 may be set up to award a progressive or pari-mutuel prize in addition to, or in place of, the predetermined prize amounts.

FIG. 40 illustrates another pay table 4000 that may be used with the systems and methods described herein during play of a game of chance, such as bingo. Pay table 4000 lists the prizes or payouts 4002 that may be awarded to a player depending on a number of house indicia, or ball calls 4004, that were required for the player card pattern 902 or patterns 902 to be matched. For example, if a player card pattern 902 was matched on the 23rd ball call, the player wins a prize of 1199 credits.

In the example shown in FIG. 40, pay table 4000 is associated with a letter X pattern 914. However, it should be recognized that other pay tables may be used for a letter X pattern 914 and/or for other patterns 902. It should also be recognized that any suitable amount may be wagered, including wagers in non-whole dollar increments. If a player wagers a non-whole dollar amount, such as $1.55, pay table 4000 may be modified to award prizes that are predetermined multiples of the wagered amount.

While pay table 4000 is shown as having a plurality of predetermined, or fixed prize amounts for a given wager, it should be recognized that pay table 4000 may be set up to award a progressive or pari-mutuel prize in addition to, or in place of, the predetermined prize amounts.

FIGS. 41-137 illustrate additional example pay tables that may be used with one or more games of chance described herein. While the pay tables may be described herein as being used with one or more specific games, any of the pay tables may be used with any suitable embodiment described herein.

FIGS. 41-64 illustrate example pay tables that may be used with a Super Cash Bingo game as described above with reference to FIGS. 14-18. More specifically, FIG. 41 is a pay table 4100 for a single bingo pattern played on a 3×3 player card. FIG. 42 is a pay table 4200 for a double bingo pattern played on a 3×3 player card. FIG. 43 is a pay table 4300 for a 4-pack bingo pattern played on a 3×3 player card. FIG. 44 is a pay table 4400 for a 6-pack bingo pattern played on a 3×3 player card. FIG. 45 is a pay table 4500 for a letter X bingo pattern played on a 3×3 player card. FIG. 46 is a pay table 4600 for a "stairs" bingo pattern played on a 3×3 player card. FIG. 47 is a pay table 4700 for a letter U bingo pattern played on a 3×3 player card. FIG. 48 is a pay table 4800 for a coverall bingo pattern played on a 3×3 player card.

FIG. 49 is a pay table 4900 for a single bingo pattern played on a 4×4 player card. FIG. 50 is a pay table 5000 for a double bingo pattern played on a 4×4 player card. FIG. 51 is a pay table 5100 for a triple bingo pattern played on a 4×4 player card. FIG. 52 is a pay table 5200 for a letter U bingo pattern played on a 4×4 player card. FIG. 53 is a pay table 5300 for a 6-pack bingo pattern played on a 4×4 player card. FIG. 54 is a pay table 5400 for a 9-pack bingo pattern played on a 4×4 player card. FIG. 55 is a pay table 5500 for a frame bingo pattern played on a 4×4 player card. FIG. 56 is a pay table 5600 for a coverall bingo pattern played on a 4×4 player card.

FIG. 57 is a pay table 5700 for a single bingo pattern played on a 5×5 player card. FIG. 58 is a pay table 5800 for a double bingo pattern played on a 5×5 player card. FIG. 59 is a pay table 5900 for a triple bingo pattern played on a 5×5 player card. FIG. 60 is a pay table 6000 for a letter X bingo pattern played on a 5×5 player card. FIG. 61 is a pay table 6100 for a 6-pack bingo pattern played on a 5×5 player card. FIG. 62 is a pay table 6200 for a 9-pack bingo pattern played on a 5×5 player card. FIG. 63 is a pay table 6300 for a frame bingo pattern played on a 5×5 player card. FIG. 64 is a pay table 6400 for a coverall bingo pattern played on a 5×5 player card.

FIGS. 65-88 illustrate example pay tables that may be used with a Super Bonus Bingo game as described above with reference to FIGS. 19-22. More specifically, FIG. 65 is a pay table 6500 for a single bingo pattern played on a 3×3 player card. FIG. 66 is a pay table 6600 for a double bingo pattern played on a 3×3 player card. FIG. 67 is a pay table 6700 for a 4-pack bingo pattern played on a 3×3 player card. FIG. 68 is a pay table 6800 for a 6-pack bingo pattern played on a 3×3 player card. FIG. 69 is a pay table 6900 for a letter X bingo pattern played on a 3×3 player card. FIG. 70 is a pay table 7000 for a stairs bingo pattern played on a 3×3 player card. FIG. 71 is a pay table 7100 for a letter U bingo pattern played on a 3×3 player card. FIG. 72 is a pay table 7200 for a coverall bingo pattern played on a 3×3 player card.

FIG. 73 is a pay table 7300 for a single bingo pattern played on a 4×4 player card. FIG. 74 is a pay table 7400 for a double bingo pattern played on a 4×4 player card. FIG. 75 is a pay table 7500 for a triple bingo pattern played on a 4×4 player card. FIG. 76 is a pay table 7600 for a letter U bingo pattern played on a 4×4 player card. FIG. 77 is a pay table 7700 for a 6-pack bingo pattern played on a 4×4 player card. FIG. 78 is a pay table 7800 for a 9-pack bingo pattern played on a 4×4 player card. FIG. 79 is a pay table 7900 for a frame bingo pattern played on a 4×4 player card. FIG. 80 is a pay table 8000 for a coverall bingo pattern played on a 4×4 player card.

FIG. 81 is a pay table 8100 for a single bingo pattern played on a 5×5 player card. FIG. 82 is a pay table 8200 for a double bingo pattern played on a 5×5 player card. FIG. 83 is a pay table 8300 for a triple bingo pattern played on a 5×5 player card. FIG. 84 is a pay table 8400 for a letter X bingo pattern played on a 5×5 player card. FIG. 85 is a pay table 8500 for a 6-pack bingo pattern played on a 5×5 player card. FIG. 86 is a pay table 8600 for a 9-pack bingo pattern played on a 5×5 player card. FIG. 87 is a pay table 8700 for a frame bingo pattern played on a 5×5 player card. FIG. 88 is a pay table 8800 for a coverall bingo pattern played on a 5×5 player card.

FIGS. 89-101 illustrate example pay tables that may be used with a Super Gold Mine Bingo game as described above with reference to FIGS. 23-25. More specifically, FIG. 89 is a pay table 8900 for a single bingo pattern and a double bingo pattern played on a 3×3 player card. FIG. 90 is a pay table 9000 for a 4-pack bingo pattern and a 6-pack bingo pattern played on a 3×3 player card. FIG. 91 is a pay table 9100 for a letter X bingo pattern and a letter T bingo pattern played on a 3×3 player card. FIG. 92 is a pay table 9200 for a letter U bingo pattern and a coverall bingo pattern played on a 3×3 player card. FIG. 93 is a pay table 9300 for a stairs bingo pattern played on a 3×3 player card.

FIG. 94 is a pay table 9400 for a single bingo pattern and a double bingo pattern played on a 4×4 player card. FIG. 95 is a pay table 9500 for a triple bingo pattern and a letter U bingo pattern played on a 4×4 player card. FIG. 96 is a pay table 9600 for a 6-pack bingo pattern and a 9-pack bingo pattern played on a 4×4 player card. FIG. 97 is a pay table 9700 for a frame bingo pattern and a coverall bingo pattern played on a 4×4 player card.

FIG. 98 is a pay table 9800 for a single bingo pattern and a double bingo pattern played on a 5×5 player card. FIG. 99 is a pay table 9900 for a triple bingo pattern and a letter X bingo pattern played on a 5×5 player card. FIG. 100 is a pay table 10000 for a 6-pack bingo pattern and a 9-pack bingo pattern played on a 5×5 player card. FIG. 101 is a pay table 10100 for a large frame bingo pattern and a coverall bingo pattern played on a 5×5 player card.

FIGS. 102-107 illustrate example pay tables that may be used with a Super Pattern Bingo game as described above with reference to FIGS. 26-28. More specifically, FIG. 102 is a pay table 10200 for a low volatility group of bingo patterns and medium volatility group of bingo patterns played on a 3×3 player card. FIG. 103 is a pay table 10300 for a high volatility group of bingo patterns played on a 3×3 player card. FIG. 104 is a pay table 10400 for a low volatility group of bingo patterns and medium volatility group of bingo patterns played on a 4×4 player card. FIG. 105 is a pay table 10500 for a high volatility group of bingo patterns played on a 4×4 player card. FIG. 106 is a pay table 10600 for a low volatility group of bingo patterns and medium volatility group of bingo patterns played on a 5×5 player card. FIG. 107 is a pay table 10700 for a high volatility group of bingo patterns played on a 5×5 player card.

FIGS. 108-131 illustrate example pay tables that may be used with a Super Wild Bingo game as described above with reference to FIGS. 29-32. More specifically, FIG. 108 is a pay table 10800 for a single bingo pattern played on a 3×3 player card. FIG. 109 is a pay table 10900 for a double bingo pattern played on a 3×3 player card. FIG. 110 is a pay table 11000 for a 4-pack bingo pattern played on a 3×3 player card. FIG. 111 is a pay table 11100 for a 6-pack bingo pattern played on a 3×3 player card. FIG. 112 is a pay table 11200 for a letter X bingo pattern played on a 3×3 player card. FIG. 113 is a pay table 11300 for a stairs bingo pattern played on a 3×3 player card. FIG. 114 is a pay table 11400 for a letter U bingo pattern played on a 3×3 player card. FIG. 115 is a pay table 11500 for a coverall bingo pattern played on a 3×3 player card.

FIG. 116 is a pay table 11600 for a single bingo pattern played on a 4×4 player card. FIG. 117 is a pay table 11700 for a double bingo pattern played on a 4×4 player card. FIG. 118 is a pay table 11800 for a triple bingo pattern played on a 4×4 player card. FIG. 119 is a pay table 11900 for a letter U bingo pattern played on a 4×4 player card. FIG. 120 is a pay table 12000 for a 6-pack bingo pattern played on a 4×4 player card. FIG. 121 is a pay table 12100 for a 9-pack bingo pattern played on a 4×4 player card. FIG. 122 is a pay table 12200 for a frame bingo pattern played on a 4×4 player card. FIG. 123 is a pay table 12300 for a coverall bingo pattern played on a 4×4 player card.

FIG. 124 is a pay table 12400 for a single bingo pattern played on a 5×5 player card. FIG. 125 is a pay table 12500 for a double bingo pattern played on a 5×5 player card. FIG. 126 is a pay table 12600 for a triple bingo pattern played on a 5×5 player card. FIG. 127 is a pay table 12700 for a letter X bingo pattern played on a 5×5 player card. FIG. 128 is a pay table 12800 for a 6-pack bingo pattern played on a 5×5 player card. FIG. 129 is a pay table 12900 for a 9-pack bingo pattern played on a 5×5 player card. FIG. 130 is a pay table 13000 for a frame bingo pattern played on a 5×5 player card. FIG. 131 is a pay table 13100 for a coverall bingo pattern played on a 5×5 player card.

FIGS. 132-134 illustrate example pay tables that may be used with a Super Wide Bingo game as described above with reference to FIGS. 33-35. More specifically, FIG. 132 is a pay table 13200 for a coverall bingo pattern played on a 3×3 player card. FIG. 133 is a pay table 13300 for a coverall bingo pattern played on a 4×4 player card. FIG. 134 is a pay table 13400 for a coverall bingo pattern played on a 5×5 player card.

FIGS. 135-137 illustrate example pay tables that may be used with a Super Local Bingo game as described above with reference to FIGS. 36-38. More specifically, FIG. 135 is a pay table 13500 for a coverall bingo pattern played on a 3×3 player card. FIG. 136 is a pay table 13600 for a coverall bingo pattern played on a 4×4 player card. FIG. 137 is a pay table 13700 for a coverall bingo pattern played on a 5×5 player card.

Figure 138:
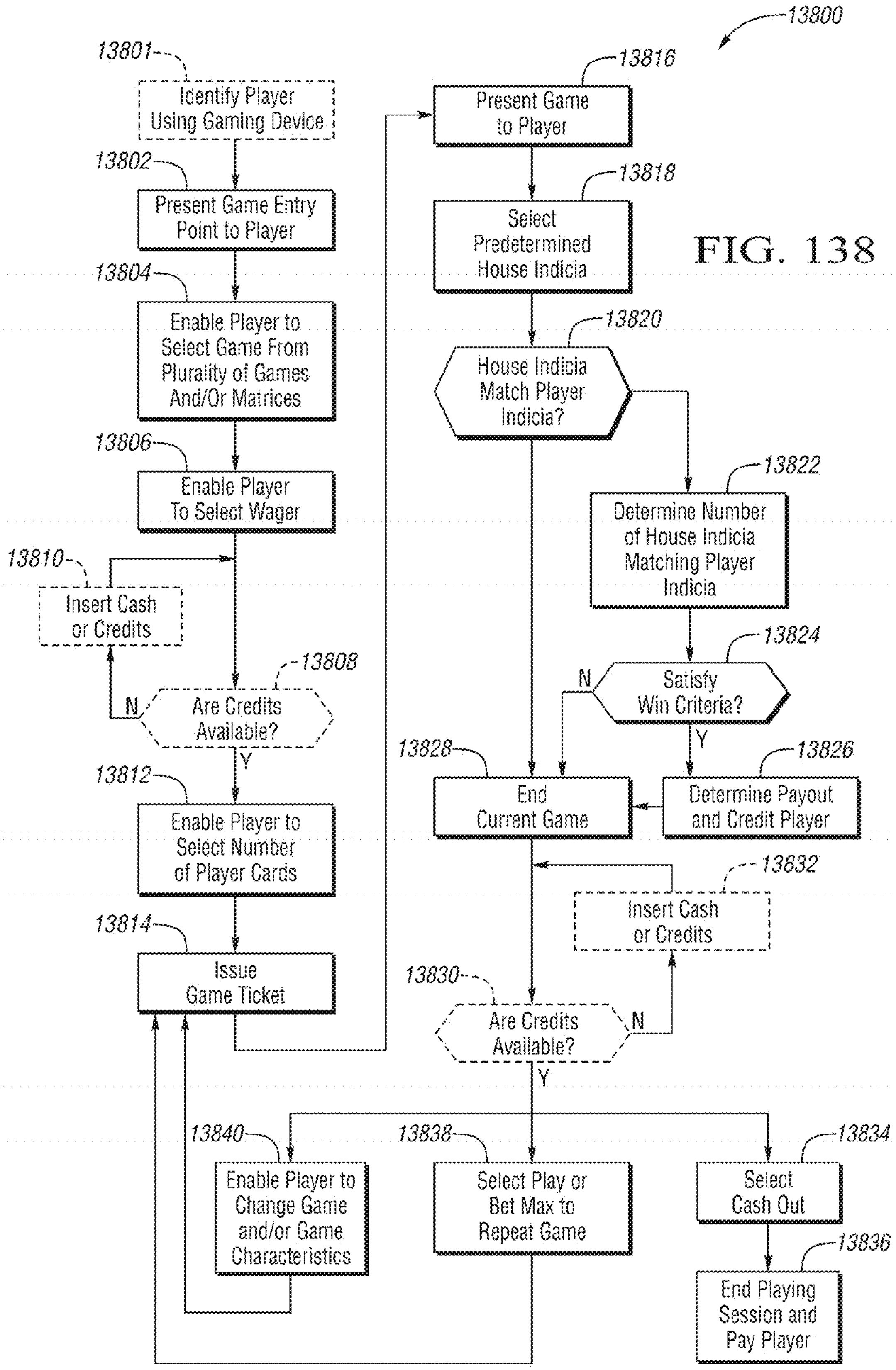
FIG. 138 is a flow diagram of a method of playing another game of chance that may be used with the systems and methods described herein.

FIG. 138 is a flow diagram of a method 13800 of playing a game of chance, such as a game of keno, that may be used with the systems and methods described herein. In one embodiment, the keno game may be played on a standalone kiosk gaming device 114. Alternatively, the keno game may be played on any suitable gaming device 114, local server 110, and/or WAP server 120. FIGS. 139-145 are example screenshots of the game that may be presented to the player during play of the game when method 13800 is executed. In one embodiment, wrapper program module 502 calls a game module 504 associated with the game of chance when the player selects the game using user interface 312. Game module 504 presents the game of chance to the player on display 310.

In one embodiment, a player may be identified 13801 and/or authorized to play a game of chance using gaming device 114. A game entry interface or entry point (such as game entry interface 1200) is presented 13802 to the player on gaming device 114 using wrapper program module 502, for example, as described above with reference to FIG. 6. Wrapper program module 502 enables 13804 the player to select a game to be played from a plurality of games presented on the game entry interface 1200. In addition, wrapper program module 502 may enable 13804 the player to select one or more game matrices to be used in the game. In one embodiment, the player selects the game by selecting a game size and a game variety associated with the game that the player wishes to play. For example, the player may select the game to be a Super Cash Keno 25 game that is played on a 5×5 player card 804.

The player is enabled 13806 to select a wager for the selected game. For example, the player may select an amount of $0.25 as a wager for the selected game. Gaming device 114 may determine 13808 whether sufficient credits are available in the player account for the selected wager. If sufficient credits are not available, gaming device 114 prompts the player to insert 13810 cash or credits, for example, into gaming device 114 for the selected wager.

If sufficient credits are available in the player account for the selected wager, the player is enabled 13812 to select a number of player cards 802 to be played during the game. In one embodiment, the player is also enabled to select some or all of the player indicia 808 for each player card 802 as described above. Optionally, gaming device 114 may have default values as desired so that the player may simply select an icon or button to initiate play of the game after inserting or applying credits as described herein.

A game ticket for the player is issued 13814 to gaming device 114, for example, by local server 110 or WAP server 120 for use in playing the selected game. The game ticket may include each player card 802 selected and the wagered amount for each player card 802. The game is presented 13816 to the player by gaming device 114 on display 310. In one embodiment, wrapper program module 502 selects and loads a game module 504 associated with the selected game, and the selected game module 504 presents 13816 the selected game to the player.

During play of the game, a predetermined number of house indicia is selected 13818 using randomization device 414 of local server 110 or WAP server 120. Alternatively, in an embodiment in which the game is administered by gaming device 114, randomization device 414 of gaming device 114 is used to select the house indicia. In one embodiment, the house indicia are randomly selected from a pool of numbers between 1 and 80, and one or more of the selected house indicia may be designated or randomly selected to be a bonus ball. The house indicia that have been selected are compared with player indicia 808 on each player card 802 to determine 13820 whether the house indicia match player indicia 808.

If no house indicia match the player indicia after all the house indicia have been selected (i.e., after the predetermined number of house indicia have been selected), the game ends. However, if one or more house indicia match the player indicia, the number of matching indicia is determined 13822. If the number of house indicia that match the player indicia satisfies 13824 one or more win criteria (or winning criteria) based on an associated pay table, a payout is determined 13826 and is credited to the player, such as to the player account, and the game ends 13828. However, if the number of house indicia that match the player indicia is insufficient to satisfy a win criteria (also referred to as a winning criteria), the game ends 13828 without a payout to the player. In some embodiments, a consolation prize or another payout may be awarded to the player despite not satisfying a win criteria.

After the game ends 13828, gaming device 114 determines 13830 whether sufficient credits are available to continue playing (i.e., to play another game). If sufficient credits are not available, the player is prompted to insert 13832 additional cash or credits to continue. If sufficient credits are available, the player is presented with several options. The player may select 13834 a cash out button or icon in which case the playing session or the game session ends 13836 and the player is paid any remaining credits or money. The player may also select 13838 a play button or icon, or a bet max button or icon, to repeat the game using the same game selections (e.g., the same player cards, the same wager amount, etc.). Accordingly, a game ticket is issued 13814 and method 13800 continues as described above. Alternatively, the player is enabled 13840 to change the game and/or the game characteristics after the game ends (and before a new game is started). For example, the player may select a new game, a new game size, and/or a new game variation to play. The player may additionally or alternatively select a new wager amount, a different number of player cards 802 to be played, and/or different player indicia 808 to be used in the game in a similar manner as described above. A new game ticket may be issued 13814 and method 13800 may continue as described above.

Figure 139:
FIGS. 139-145 are screenshots of user interfaces that may be presented during execution of the method described in FIG. 138.

Referring to FIG. 139, a screenshot 13900 of an example game entry interface 13902 that may be used with method 13800. Game entry interface 13902 may be presented by wrapper program module 502, for example, when a player operates gaming device 114. A plurality of game selection buttons or icons 13904 are presented to the player. In addition, a plurality of wager selection buttons or icons 13906 are presented to the player on game entry interface 13902.

Game selection icons 13904 operate similarly to game selection icons 1202 (shown in FIG. 12) and enable the player to select a game to be played and/or one or more game matrices to be used during the game. The games available to be played may be categorized by game size or game matrices (e.g., using 5×5 player cards 802 having 25 spaces, 7×7 player cards 802 having 49 spaces, 8×10 player cards 802 having 80 spaces, etc.) and by game variety (e.g., Super Gold Mine Keno, Super Cash Keno, Super Bonus Keno, Super Wild Keno, Super Multi-Step Keno, etc.). Accordingly, the player may select the game selection icon 13904 labeled "Super Cash Keno 25" to play a Super Cash Keno game using a player card 802 having 25 spaces 806 or spots.

Wager selection icons 13906 are similar to wager selection icons 1204 (shown in FIG. 12) and enable the player to select an amount of money or credits to be wagered on the game selected. For example, if the player selects a wager selection icon 13906 labeled "$1," an amount of $1 in credits or currency will be wagered on each player card 802 used during the play of the selected game. It should be recognized that the game and the wager may be changed or reselected after each game is completed or prior to the start of the game.

Figure 140:
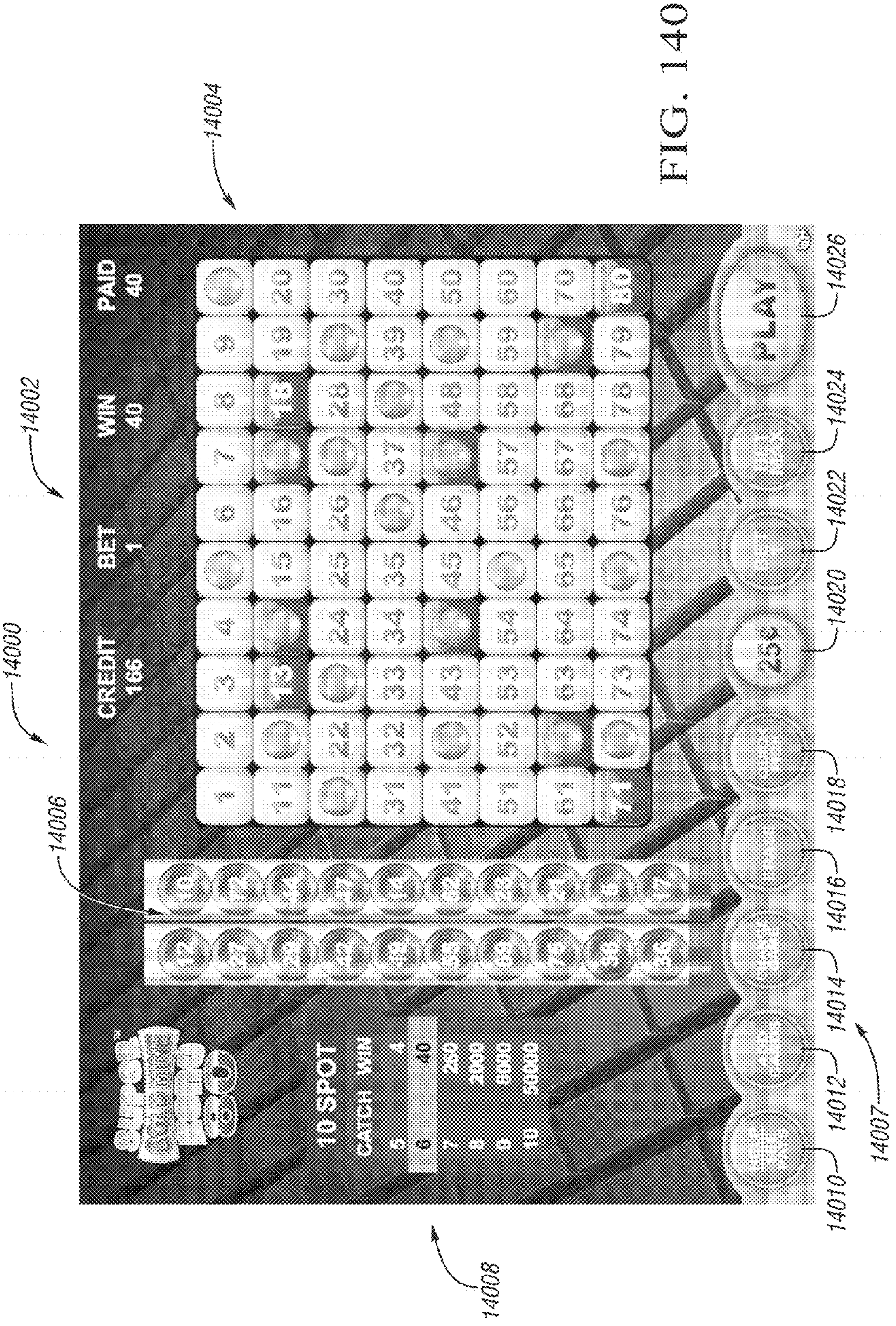

Referring to FIG. 140, a screenshot 14000 of a user interface 14002 that may be presented during execution of method 13800 is illustrated. For example, user interface 14002 may be presented during the play of a Super Gold Mine Keno game. User interface 14002 may include a keno board 14004 or player card, and a ball call display 14006 (also referred to as a tube display). In addition, user interface 14002 may include a plurality of user interface icons 14007 that may be selected to interact with the game and/or to change the game or the characteristics of the game, and may also include a pay table 14008.

Keno board 14004 displays the house indicia that are available to be selected or called during play of the game. In addition, in one embodiment, keno board 14004 displays a marker (or "daub") on the house indicia that are selected during the game and a different marker or daub on the player indicia that have been selected for the player card.

Ball call display 14006 illustrates the balls (or other house indicia) that have been selected or called during the play of the game. Pay table 14008 displays a list of win criteria and a list of payouts for each win criteria. In one embodiment, one or more win criteria that are satisfied (and an associated payout of the satisfied win criteria) are highlighted in pay table 14008.

User interface icons 14007 may include a pay table icon 14010 (also referred to as a "see pays" or "help" icon), an add cards icon 14012, a change game icon 14014, an erase icon 14016, a quick pick icon 14018, a wager icon 14020, a bet 1 icon 14022, a bet max icon 14024, and a play icon 14026. Alternatively, one or more user interface icons 1508 may be omitted and/or replaced by other suitable icons. In one embodiment, pay table icon 14010 is similar to pay table icon 1510, add cards icon 14012 is similar to add cards icon 1512, change game icon 14014 is similar to change game icon 1520, wager icon 14020 is similar to wager icon 1516, bet 1 icon 14022 is similar to bet 1 icon 1514, bet max icon 14024 is similar to bet max icon 1518, and play icon 14026 is similar to play icon 1522.

Erase icon 14016 causes the player indicia that have been previously selected to be removed from keno board 14004 to enable new player indicia to be selected. Quick pick icon 14018 causes the player indicia to be randomly selected for each player card, rather than receiving the player indicia selections from the player.

In the example shown in FIG. 140, the player has matched or "caught" 6 player indicia or spots during the game. According to pay table 14008, the player wins a payout of 40 credits. It should be recognized that this example is merely illustrative, and any suitable pay table 14008 and/or game operation may be provided.

Figure 141:
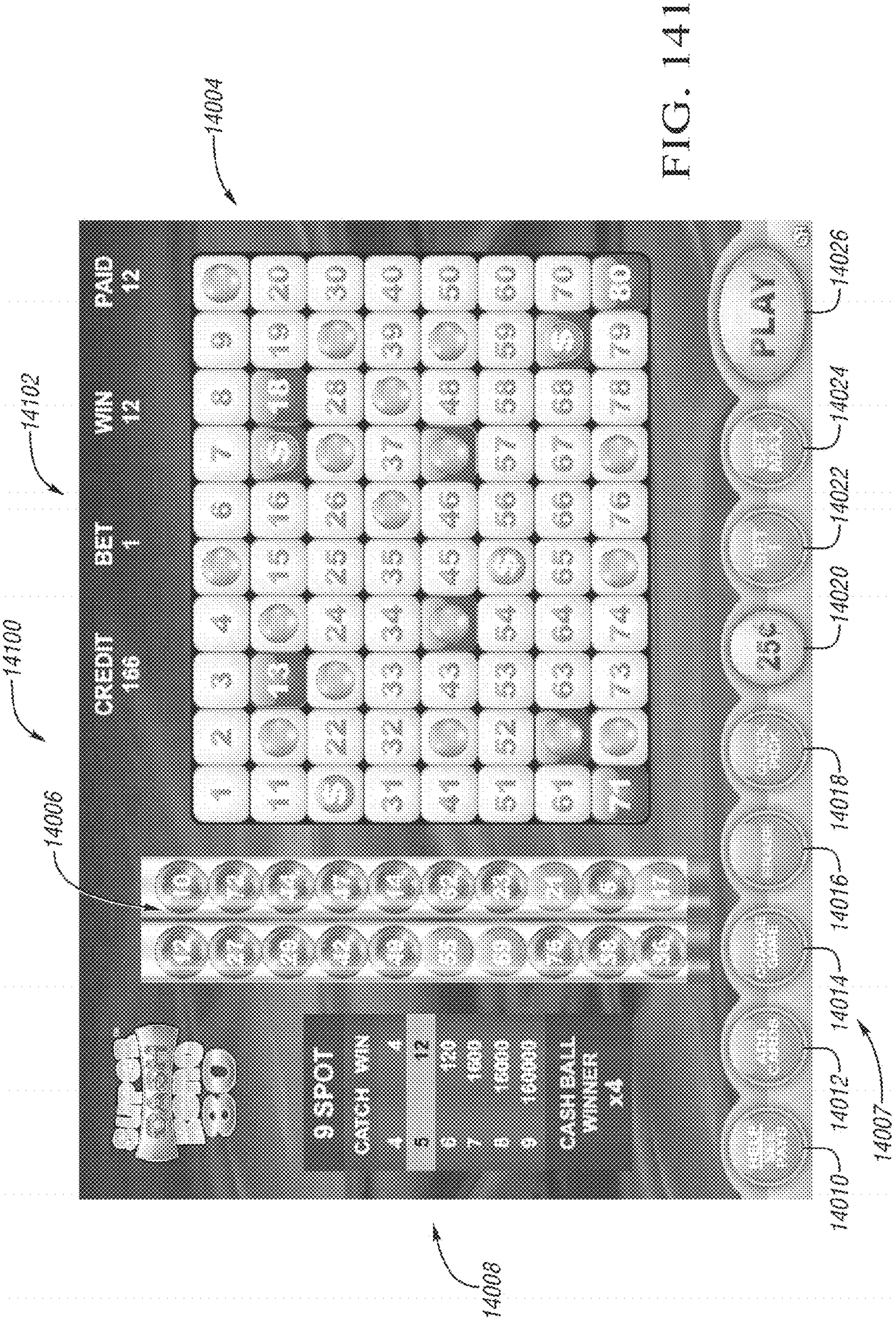

Referring to FIG. 141, a screenshot 14100 of another user interface 14102 that may be presented during execution of method 13800 is illustrated. For example, user interface 14102 may be presented during the play of a Super Cash Keno game. User interface 14102 is similar to user interface 14002 (shown in FIG. 140), and similar components are labeled in FIG. 141 with the same reference numerals used in FIG. 140. As described above with reference to FIG. 140, user interface 14102 may include keno board 14004, ball call display 14006, a plurality of user interface icons 14007 and may also include a pay table 14008.

In the example shown in FIG. 141, the player has matched or caught 5 player indicia during the game. In addition, two cash balls (or bonus balls) have been matched (indicia numbers 17 and 69) by the player indicia. Cash balls that have been called are highlighted in ball call display 14006 and are also identified in keno board 14004 using a $ symbol, although any suitable symbol or marker may be used to show the cash balls. Accordingly, in this example, the player receives a bonus payout of 4 times a normal payout. Pay table 14008 illustrates a normal payout of 12 credits for matching 5 indicia, so the player would receive an enhanced payout of 48 credits. It should be recognized that this example is merely illustrative, and any suitable pay table 14008 and/or game operation may be provided.

Figure 142:
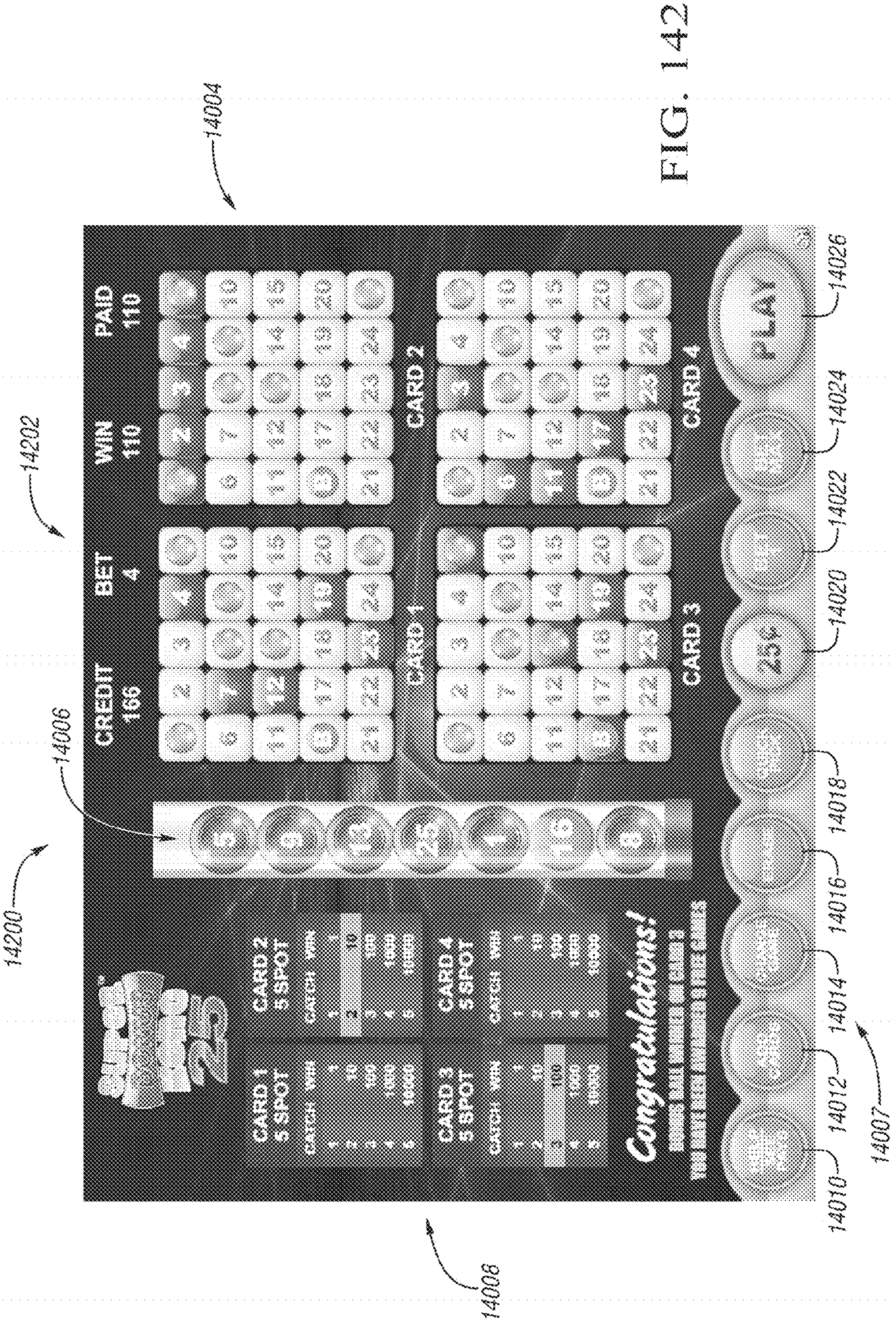

Referring to FIG. 142, a screenshot 14200 of another user interface 14202 that may be presented during execution of method 13800 is illustrated. For example, user interface 14202 may be presented during the play of a Super Bonus Keno game. User interface 14202 is similar to user interface 14002 (shown in FIG. 140), and similar components are labeled in FIG. 142 with the same reference numerals used in FIG. 140. As described above with reference to FIG. 140, user interface 14202 may include keno board 14004, ball call display 14006, a plurality of user interface icons 14007 and may also include a pay table 14008.

In the example shown in FIG. 142, the player has played 4 player cards, with each player card requiring a match of one or more of a predetermined selection of 5 player indicia to satisfy the win criteria. The first player card and the fourth player card did not satisfy the win criteria as none of the called house indicia matched the selected 5 player indicia for the card. The second player card satisfied the win criteria as two house indicia matched the selected player indicia. In this example, the player wins 10 credits according to pay table 14008. The third player card also satisfied the win criteria as 3 house indicia matched the selected player indicia. One of the matched house indicia was also selected to be a bonus ball (indicia number 16), thus causing the player to win a bonus. Bonus balls that have been called are highlighted in ball call display 14006 and are also identified in keno board 14004 using a B symbol, although any suitable symbol or marker may be used to show the bonus balls. In the example shown, the bonus awarded to the player for matching the bonus ball is 9 free games in addition to the normal payout of 100 credits the player won for matching 3 house indicia. It should be recognized that this example is merely illustrative, and any suitable pay table 14008 and/or game operation may be provided.

Figure 143:
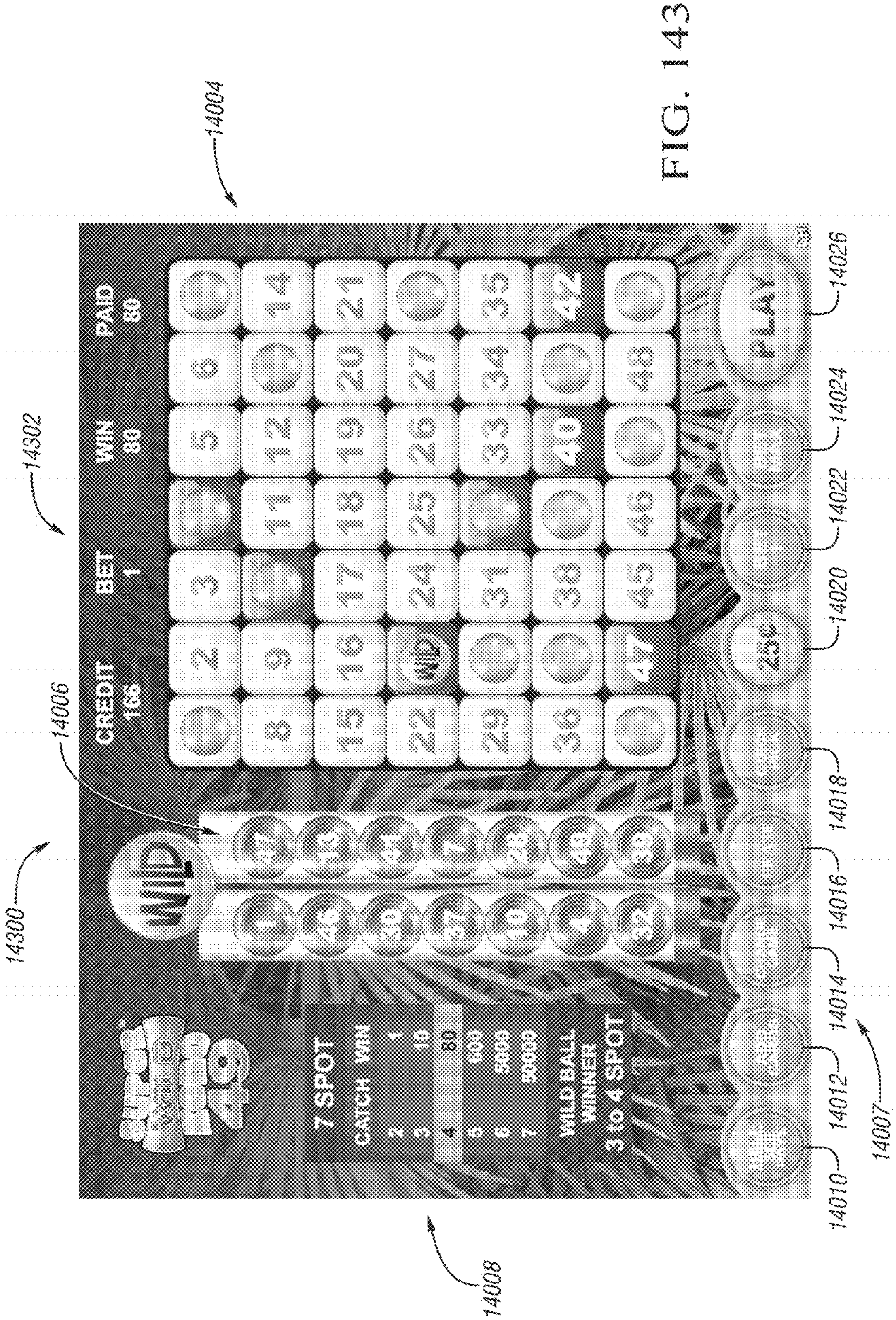

Referring to FIG. 143, a screenshot 14300 of another user interface 14302 that may be presented during execution of method 13800 is illustrated. For example, user interface 14302 may be presented during the play of a Super Wild Keno game. User interface 14302 is similar to user interface 14002 (shown in FIG. 140), and similar components are labeled in FIG. 143 with the same reference numerals used in FIG. 140. As described above with reference to FIG. 140, user interface 14302 may include keno board 14004, ball call display 14006, a plurality of user interface icons 14007 and may also include a pay table 14008.

In the example shown in FIG. 143, the player has matched or caught 4 player indicia during the game. In addition, one wild ball (or bonus ball) has been matched (indicia number 23) by the player indicia. Wild balls that have been called are highlighted in ball call display 14006 and are also identified in keno board 14004 using a WILD symbol, although any suitable symbol or marker may be used to show the wild balls. The wild ball enhances the payout awarded to the player by increasing the payout by one level. Accordingly, in this example, the player would have qualified for a payout of 10 credits by matching 3 house indicia. However, as a result of matching the wild ball, the player is awarded a payout of 80 credits as if the player had matched an additional 4th house indicia. It should be recognized that this example is merely illustrative, and any suitable pay table 14008 and/or game operation may be provided.

Figure 144:
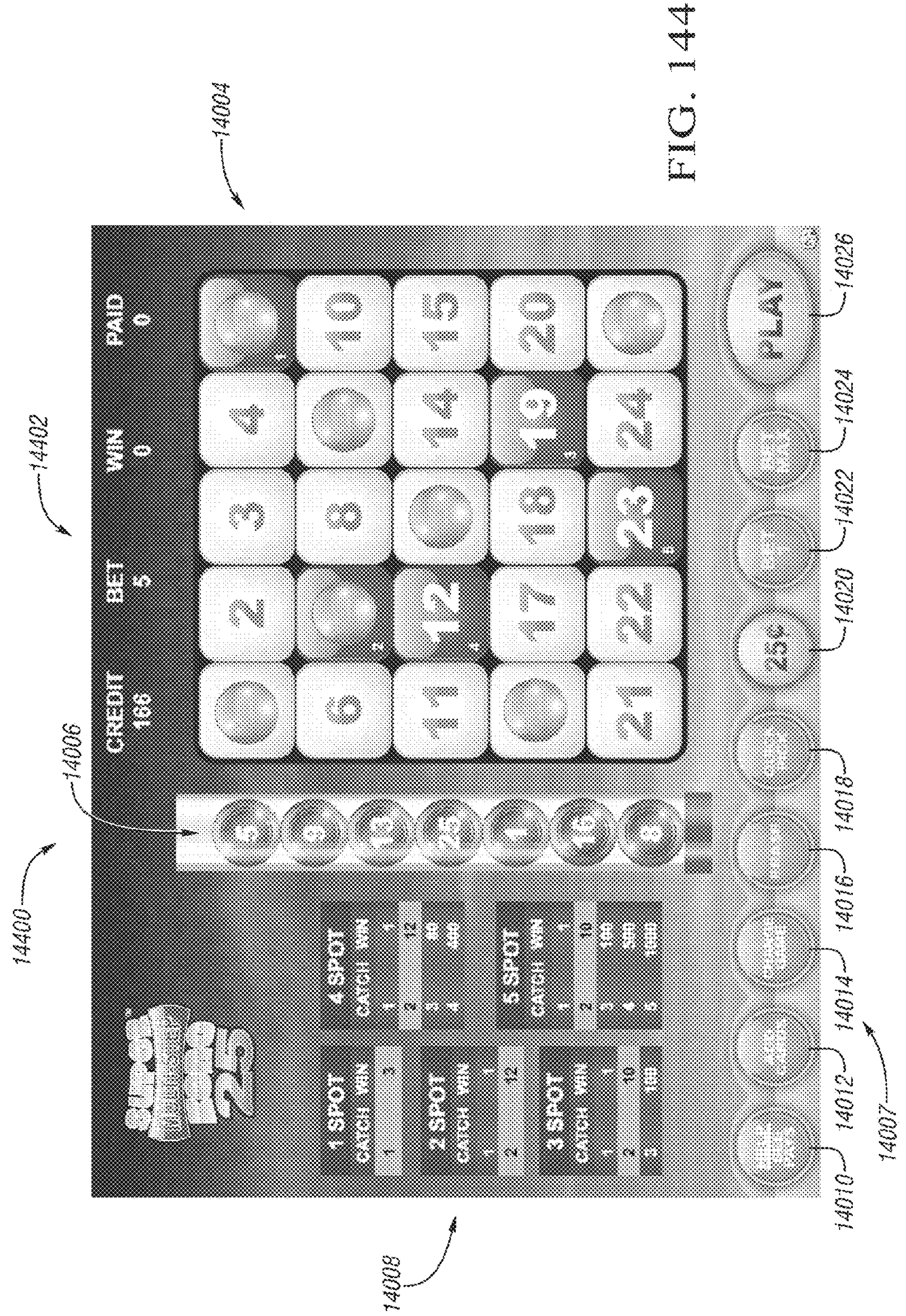

Referring to FIG. 144, a screenshot 14400 of another user interface 14402 that may be presented during execution of method 13800 is illustrated. For example, user interface 14402 may be presented during the play of a Super Multi-Step Keno game. User interface 14402 is similar to user interface 14002 (shown in FIG. 140), and similar components are labeled in FIG. 144 with the same reference numerals used in FIG. 140. As described above with reference to FIG. 140, user interface 14402 may include keno board 14004, ball call display 14006, a plurality of user interface icons 14007 and may also include a pay table 14008.

In the example shown in FIG. 144, the player has wagered 5 credits which enables the player to play 5 different combinations of the selected 5 player indicia. The first credit wagered enables the player to play a 1 spot with a first player indicia (indicia number 5 labeled with a subscript numeral 1), and the second credit wagered enables the player to play a 2 spot with the first player indicia and a second player indicia (indicia number 7 labeled with a subscript numeral 2). The third credit wagered enables the player to play a 3 spot with a first player indicia, the second player indicia, and a third player indicia (indicia number 19 labeled with a subscript numeral 3), and the fourth credit wagered enables the player to play a 4 spot with the first player indicia, the second player indicia, the third player indicia, and a fourth player indicia (indicia number 12 labeled with a subscript numeral 4). The fifth credit wagered enables the player to play a 5 spot with the first player indicia, the second player indicia, the third player indicia, the fourth player indicia, and a fifth player indicia (indicia number 23 labeled with a subscript numeral 5). The player wins payouts for each of the different combinations that satisfies a win criteria. Each subscript numeral may indicate a sequence that the player selected the indicia. Accordingly, one player indicia labeled with subscript 1 may indicate that the player selected that player indicia first, and another player indicia labeled with subscript 2 may indicate that the player selected that player indicia next. Each player indicia selected for a lower numbered combination may be used in higher numbered combinations. For example, a first indicia selected for the lowest combination (1 spot) may also be used in each higher numbered combination (2 spot, 3 spot, 4 spot, and 5 spot).

In the example shown, the player matched the first indicia which satisfies the win criteria for each combination (the 1 spot, the 2 spot, the 3 spot, the 4 spot, and the 5 spot). In addition, the player matched the second indicia which increases the payout for the 2 spot, the 3 spot, the 4 spot, and the 5 spot. Accordingly, the player wins 3 credits for the 1 spot, 12 credits for the 2 spot, 10 credits for the 3 spot, 12 credits for the 4 spot, and 10 credits for the 5 spot as illustrated in pay table 14008. It should be recognized that this example is merely illustrative, and any suitable pay table 14008 and/or game operation may be provided.

Figure 145:
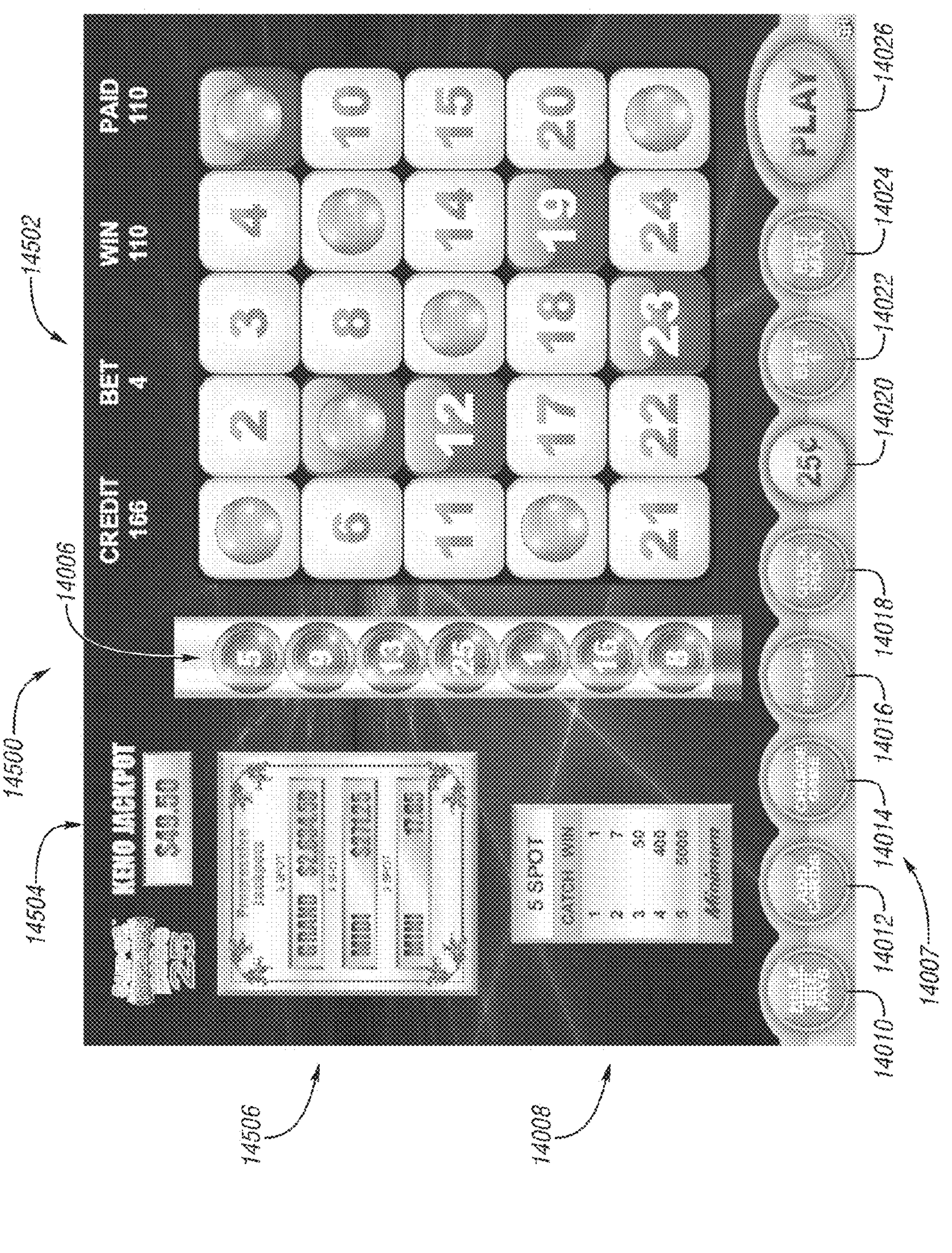

Referring to FIG. 145, a screenshot 14500 of another user interface 14502 that may be presented during execution of method 13800 is illustrated. For example, user interface 14502 may be presented during the play of a Super Progressive Keno game. In one embodiment, the Super Progressive Keno game is similar to the Super Wide Bingo game and the Super Local Bingo game described in FIGS. 33-38 except that the Super Progressive Keno game is played as a keno game. User interface 14502 is similar to user interface 14002 (shown in FIG. 140), and similar components are labeled in FIG. 145 with the same reference numerals used in FIG. 140. As described above with reference to FIG. 140, user interface 14502 may include keno board 14004, ball call display 14006, a plurality of user interface icons 14007 and may also include a pay table 14008. In addition, a keno jackpot 14504 and/or one or more progressive prizes 14506 may be provided and displayed in user interface 14502.

In one embodiment, keno jackpot 14504 may be similar to bingo jackpot prize 3418. In one embodiment, the player who has the highest number of catches (i.e., matched house indicia) in the game wins keno jackpot 14504. If two or more players tie for the highest number of catches, the players may split keno jackpot 14504 or may each be awarded the entire keno jackpot 14504 or a portion of keno jackpot 14504.

In the example shown in FIG. 145, the player has matched or caught 2 player indicia during the game. The player did not satisfy the win criteria for keno jackpot 14504 or for progressive prizes 14506. Accordingly, in this example, the player is only awarded a payout of 7 credits for catching 2 house indicia on a 5 spot card. It should be recognized that this example is merely illustrative, and any suitable pay table 14008 and/or game operation may be provided.

In some embodiments, players of different games may play together using the same randomization device 414, such as a randomization device 414 of WAP server 120, local server 110, a ball blower, manual ball draw, or the like. For example, a first player may play a Super Gold Mine Bingo game using the same randomization device 414 as a second player playing a Super Bonus Bingo game. In such an embodiment, randomization device 414 generates a common set of house indicia to be used in each of the different games. If bonus balls (or other indicia) that are used in one game (such as Super Bonus Bingo) are selected, the bonus balls (or other indicia) are ignored in games (such as Super Gold Mine Bingo) that do not use the bonus balls (or other indicia) or a bonus ball may be used to signify house indicia if the bonus ball is part of the house indicia. In one embodiment, the players who are playing different games may also play to win one or more common prizes, such as one or more progressive prizes. However, in some embodiments, the players playing different games may only play to win one or more common prizes if the statistical chance of satisfying a winning criteria for the common prize is similar for each of the different games, or if the statistical chance of satisfying the winning criteria for the common prize is within a predetermined acceptable range for each of the different games. For example, if the statistical chance of satisfying the winning criteria for a progressive prize in a Super Gold Mine Bingo game (e.g., the chance of matching a coverall pattern) is similar to the statistical chance of satisfying the winning criteria for the progressive prize in a Super Cash Bingo game (e.g., the chance of matching a coverall pattern), then players who are playing the Super Gold Mine Bingo game and players who are playing the Super Cash Bingo game may each play to win the same progressive prize.

In addition, keno and bingo games, or other games of chance, may be played together using the same randomization device 414, ball blower, manual ball draw, or the like. For example, players playing Super Gold Mine Keno may use the same randomization device 414, ball blower, manual ball draw, or the like as players playing Super Gold Mine Bingo or another bingo game variety in a similar manner as described above. House indicia selected by randomization device 414, ball blower, manual ball draw, or the like that are only usable with a subset of the games played together are ignored by the games that cannot use the house indicia. For example, if a keno game uses a house indicia pool of 80 numbers, and a bingo game uses a house indicia pool of 75 numbers, randomization device 414, ball blower, manual ball draw, or the like would set the house indicia pool to be 80 numbers and would randomly select or call house indicia from the pool of 80 numbers. The called house indicia that exceed 75 may be ignored by the bingo game. In some embodiments, players playing one or more keno games may play to win the same prize or prizes (e.g., progressive prizes) that players playing one or more bingo games are playing to win, in a similar manner as described above.

The systems, methods, and examples described herein should be viewed as illustrative rather than limiting. For example, while the embodiments described herein refer to games of bingo and keno, it should be recognized that the systems and methods described herein may be used with any suitable game of chance. Additionally, any number and type of house indicia and/or player indicia may be used with player cards during the game. Player cards, keno boards, and bingo flashboards may be of any suitable size or shape as desired to comply with relevant gaming regulations.

Unless otherwise specified, “a” or “an” means one or more of a referenced object or step. Furthermore, unless otherwise specified, each method described herein is not limited to the order in which the steps of each method are described or introduced. Rather, the steps may be rearranged in any suitable order, may be omitted, and/or may be combined with steps of other methods as desired. In addition, aspects or components of each embodiment and/or figure described herein may be omitted, or may be combined with, or modified to include, aspects or components of any other embodiment and/or figure unless otherwise specified.

This written description uses examples to describe embodiments of the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:

a memory device configured to store instructions that are executable by a processor to provide a game of chance;

an input device configured to receive a physical item associated with a monetary value;

a user interface configured to:

enable a player to select a wager for the game of chance; and enable the player to initiate a cash out operation; and a processor coupled to said memory device for executing the instructions, wherein, when said processor executes the instructions, said processor is programmed to:

add the monetary value to a credit balance for the player;

deduct the selected wager from the credit balance;

provide a plurality of matrix sizes for player cards to be used during the game of chance;

enable the player to select one of the plurality of matrix sizes to be used during the game of chance;

enable the player to select a plurality of player cards having the selected matrix size, wherein each player card of said plurality of player cards comprises one or more player indicia;

randomly select a predetermined number of house indicia from the pool of house indicia during a draw of house indicia;

provide a random chance of selecting a bonus indicia during the draw of house indicia;

determine whether a winning criterion has been achieved for each player card of said plurality of player cards by matching a winning number of the one or more player indicia of each said player card with the selected house indicia, regardless of whether a pattern is formed by the matched player indicia;

present a bonus to the player upon a determination that the winning criterion has been achieved for at least one player card of said plurality of player cards and that the bonus indicia matches a player indicia of the one or more player indicia for said at least one player card;

increase the credit balance based on at least one of the achievement of the winning criterion and the bonus; and decrease the credit balance in response to the cash out operation.

2. The system of claim 1, wherein said processor is further programmed to select one of the predetermined number of house indicia to be the bonus indicia.

3. The system of claim 1, wherein said processor is further programmed to determine that the player wins a prize upon the determination that the winning criterion has been achieved for said at least one player card, wherein the prize is in addition to the bonus presented to the player.

4. The system of claim 3, wherein said processor is further programmed to continue the game after said processor determines that the player wins the prize.

5. The system of claim 3, wherein said processor is further programmed to end the game after the predetermined number of house indicia have been selected.

6. The system of claim 3, wherein said processor is further programmed to enable the player to select at least a portion of the one or more player indicia for each player card of said plurality of player cards for use in determining whether the player wins the prize.

7. The system of claim 1, wherein said processor is further programmed to enable the player to select a number of player indicia for each player card of said plurality of player cards to be used during the game.

8. The system of claim 1, wherein said processor is further programmed to enable the player to select how many house indicia will be selected as the predetermined number of house indicia to be used during the game.

9. The system of claim 3, wherein said processor is further programmed to determine that the player wins the prize even when the winning criterion has been achieved by another player playing the game.

10. The system of claim 1, wherein the game is a first game of a plurality of games, said processor is further programmed to enable the player to switch from the first game to a second game of the plurality of games.

11. The system of claim 10, wherein said memory device comprises a wrapper program module comprising instructions that, when executed by said processor, program said processor to transfer gameplay data from the first game to the second game.

12. The system of claim 1, wherein said processor is further programmed to enable the player to start the game on a first device and obtain the result of the game on a second device.

13. The system of claim 1, wherein the game is a first game, said processor is further programmed to present the bonus to the player by presenting at least one second game to the player.

14. The system of claim 13, wherein said processor is further programmed to present the at least one second game to the player as a free game.

15. The system of claim 14, wherein said processor is further programmed to award a prize having a bonus payout to the player upon a determination that the player satisfies a winning criterion for at least one player card provided within the at least one second game.

16. The system of claim 15, wherein a first payout amount is determined to be paid for achieving the winning criterion during the first game in which the bonus indicia does not match one of the one or more player indicia, said processor is further programmed to determine the bonus payout to be a second payout amount that is higher than the first payout amount.

17. The system of claim 16, wherein said processor is further programmed to determine the second payout amount to be at least double the first payout amount.

18. The system of claim 1, wherein the bonus indicia is one of a plurality of bonus indicia that are randomly selectable by said processor.

19. The system of claim 18, wherein said processor is further programmed to select each bonus indicia of the plurality of bonus indicia to be one of the selected house indicia.

20. A method of providing a game of chance, said method comprising:

receiving a physical item associated with a monetary value using an input device of a gaming device;

adding the monetary value to a credit balance;

provide a plurality of matrix sizes for player cards to be used during the game of chance;

enable a player to select one of the plurality of matrix sizes to be used during the game of chance;

enabling the player to select a plurality of player cards having the selected matrix size using a user interface of the gaming device, wherein each player card of the plurality of player cards includes one or more player indicia;

receiving an input from the player to select a wager for the game of chance using the user interface;

deducting the selected wager from the credit balance;

randomly selecting a predetermined number of house indicia from the pool of house indicia during a draw of house indicia;

providing, by a processor, a random chance of selecting a bonus indicia during the draw of house indicia;

determining, by the processor, whether a winning criterion has been achieved for each player card of the plurality of player cards by matching a winning number of the one or more player indicia of each player card with the selected house indicia, regardless of whether a pattern is formed by the matched player indicia;

presenting, by the processor, a bonus to the player upon a determination that the winning criterion has been achieved for at least one player card of the plurality of player cards and that the bonus indicia matches a player indicia of the one or more player indicia of the at least one player card;

increasing the credit balance based on at least one of the achievement of the winning criterion and the bonus;

enabling the player to initiate a cash out operation using the user interface; and decreasing the credit balance in response to the cash out operation.

21. The method of claim 20, further comprising selecting one of the predetermined number of house indicia to be the bonus indicia.

22. The method of claim 20, further comprising determining that the player wins a prize upon the determination that the winning criterion has been achieved for the at least one player card, wherein the prize is in addition to the bonus presented to the player.

23. The method of claim 22, further comprising continuing the game after the player wins the prize.

24. The method of claim 22, further comprising ending the game after the predetermined number of the house indicia have been selected.

25. The method of claim 22, further comprising enabling the player to select at least a portion of the one or more player indicia for each player card of the plurality of player cards for use in determining whether the player wins the prize.

26. The method of claim 20, further comprising enabling the player to select a number of player indicia for each player card of the plurality of player cards to be used during the game.

27. The method of claim 20, further comprising enabling the player to select how many house indicia will be selected as the predetermined number of house indicia to be used during the game.

28. The method of claim 22, further comprising determining that the player wins the prize even when the winning criterion has been achieved by another player playing the game.

29. The method of claim 20, wherein the game is a first game of a plurality of games, said method further comprising enabling the player to switch from the first game to a second game of the plurality of games.

30. The method of claim 29, further comprising transferring gameplay data from the first game to the second game.

31. The method of claim 20, further comprising enabling the player to start the game on a first device and obtain the result of the game on a second device.

32. The method of claim 20, wherein the game is a first game, said method further comprising presenting the bonus to the player by presenting at least one second game to the player.

33. The method of claim 32, further comprising presenting the at least one second game to the player as a free game.

34. The method of claim 33, further comprising awarding a prize having a bonus payout to the player upon a determination that the player satisfies a winning criterion for at least one player card provided within the at least one second game.

35. The method of claim 34, further comprising:

determining a first payout amount to be paid for achieving the winning criterion during the first game in which the bonus indicia does not match one of the one or more player indicia; and determining the bonus payout to be a second payout amount that is higher than the first payout amount.

36. The method of claim 35, further comprising determining the second payout amount to be at least double the first payout amount.

37. The method of claim 20, wherein the bonus indicia is one of a plurality of bonus indicia that are randomly selectable, said method further comprising selecting each bonus indicia of the plurality of bonus indicia to be one of the selected house indicia.

* * * * *